United States Patent [19]

Pitt et al.

[11] 4,290,115

[45] Sep. 15, 1981

[54] DATA PROCESSING METHOD AND MEANS FOR DETERMINING DEGREE OF MATCH BETWEEN TWO DATA ARRAYS

[75] Inventors: Paul E. Pitt, Cypress; Edward L. Glaser, Santa Monica; Louis M. Galie, Culver City, all of Calif.

[73] Assignee: System Development Corporation, Santa Monica, Calif.

[21] Appl. No.: 38,518

[22] Filed: May 14, 1979

[30] Foreign Application Priority Data

May 31, 1978 [GB] United Kingdom .............. 25738/78

[51] Int. Cl.³ .............................................. G06F 15/40
[52] U.S. Cl. ..................................................... 364/900
[58] Field of Search ... 364/200 MS File, 900 MS File

[56] References Cited

U.S. PATENT DOCUMENTS

| | | | |
|---|---|---|---|
| 3,221,158 | 11/1965 | Roth et al. | 364/900 |
| 3,729,712 | 4/1973 | Glassman | 364/900 |
| 4,068,298 | 1/1978 | Dechant et al. | 364/200 |
| 4,084,260 | 4/1978 | Fleming et al. | 364/900 |

OTHER PUBLICATIONS

"IBM System/360 and System/370 (OS) Storage and Information Retrieval System", booklet GH12-5107-0, Sep. 1971.

*Primary Examiner*—Raulfe B. Zache
*Attorney, Agent, or Firm*—Christie, Parker & Hale

[57] ABSTRACT

Method and means are disclosed for determining a particular criterion value and an associated positional value for a degree of match between the juxtaposition of a plurality of events of a query and a plurality of events of a stored data base entry. The method and means use a processing means having a plurality of data stores and a temporary store for each data store. Each data store stores a group of data values. The data values are priorly formed and represent the number of event positions between the occurrence of events in the query and the occurrence of the corresponding events in the stored data base. The processing means using the plurality data stores, the temporary stores and the data values stored therein form determined data values and sum-of-distance values which are then used by a utilizing means for in turn deriving a criterion value and a positional value corresponding to the degree of match between the query and the data base.

57 Claims, 48 Drawing Figures

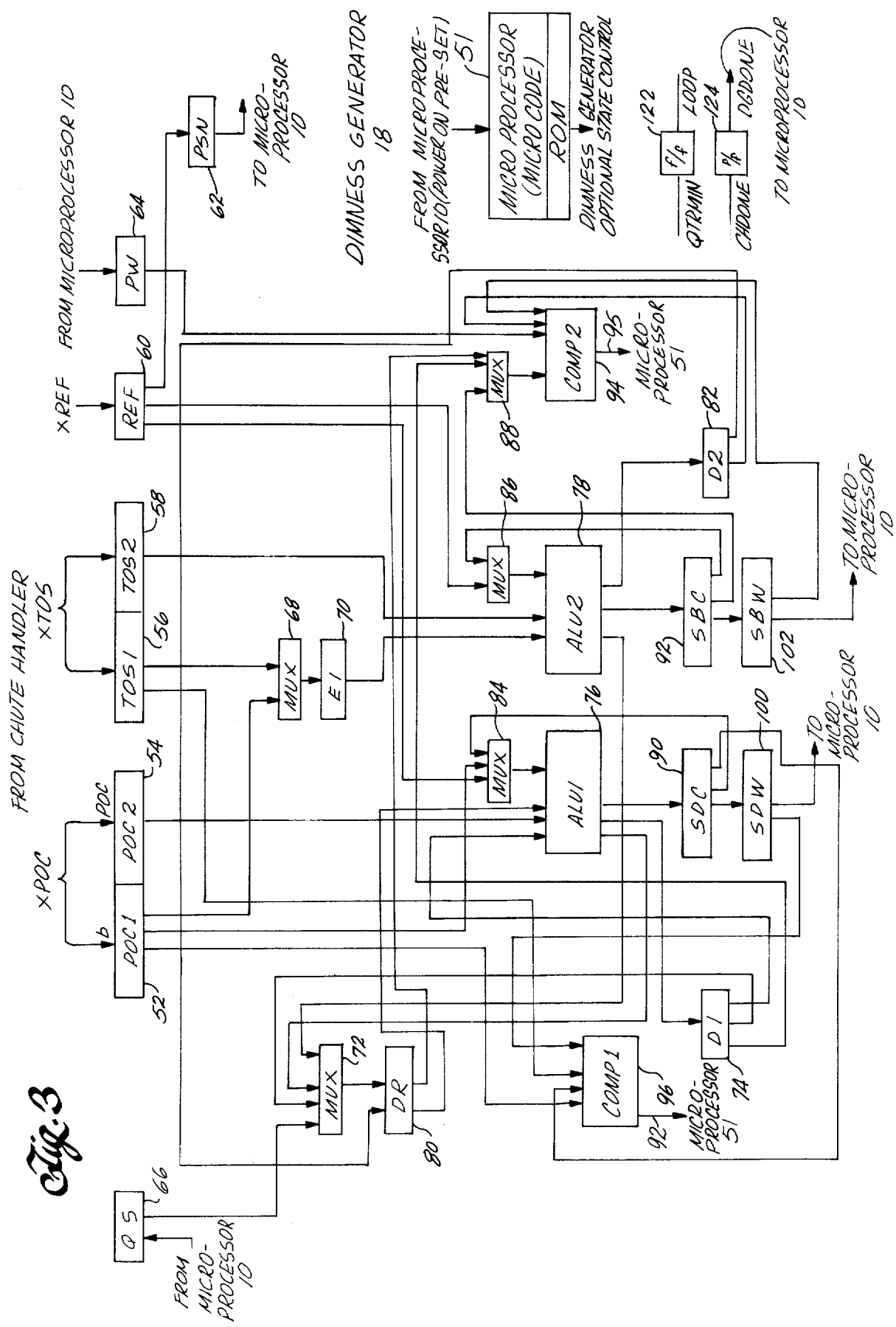

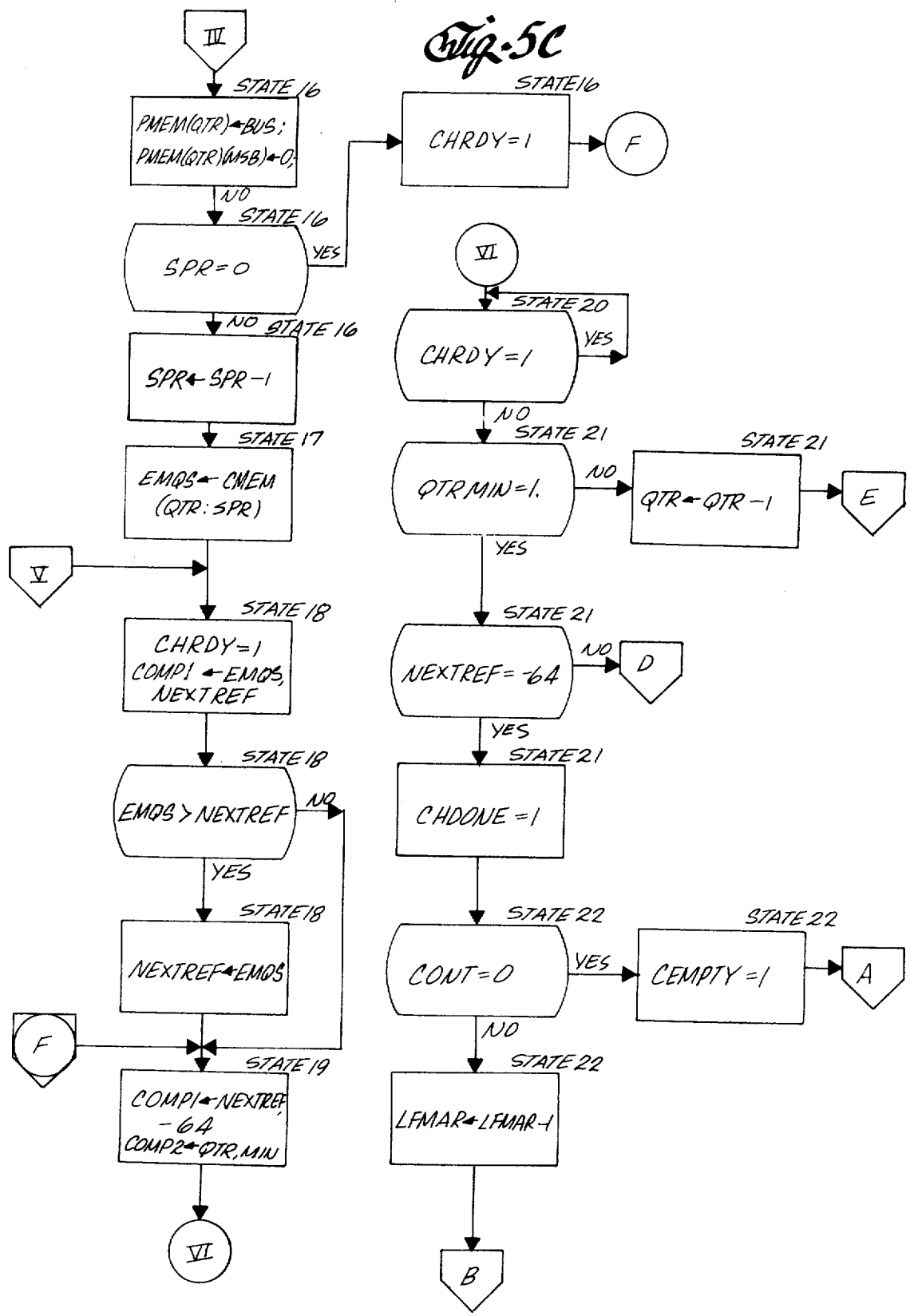

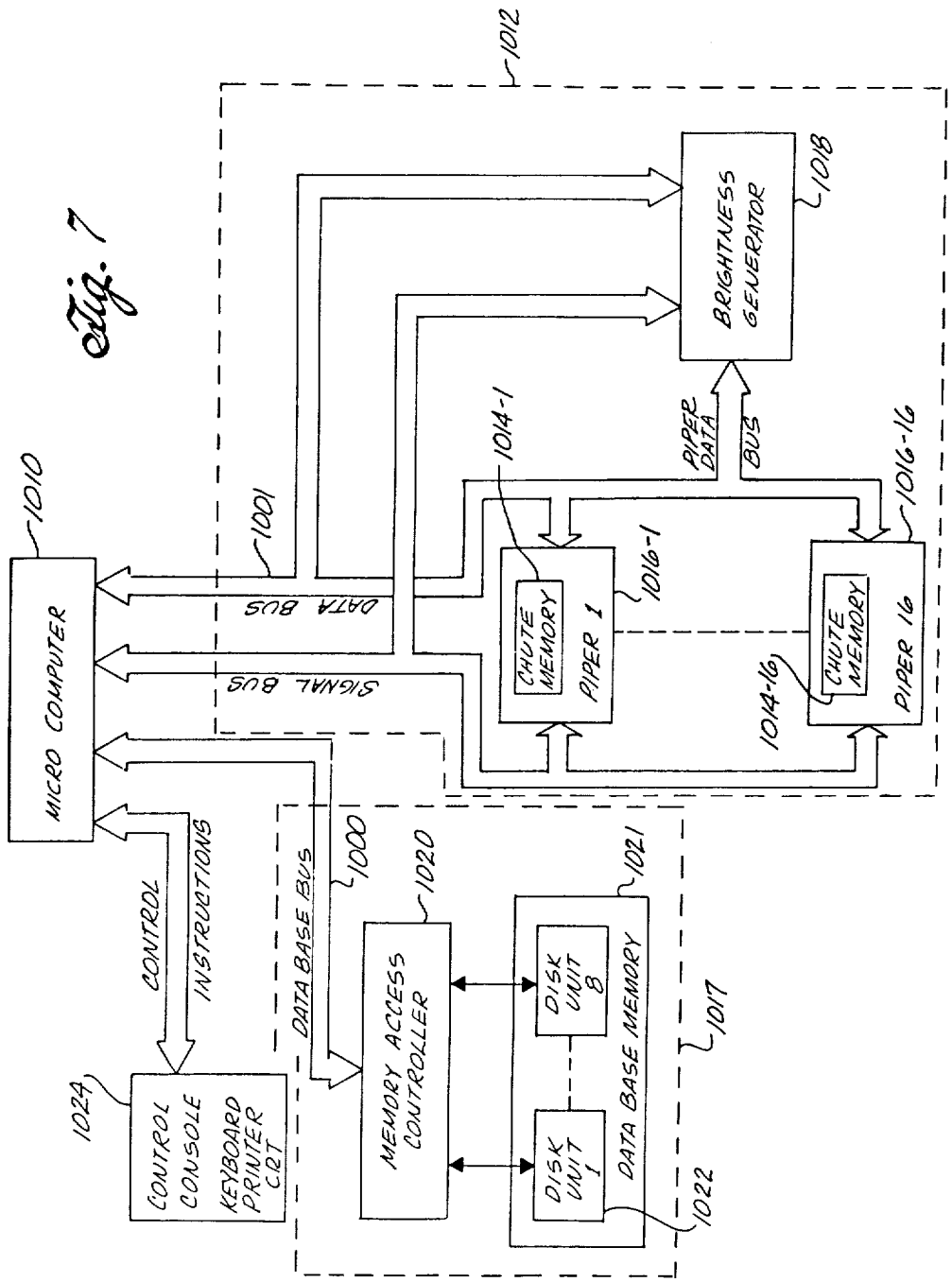

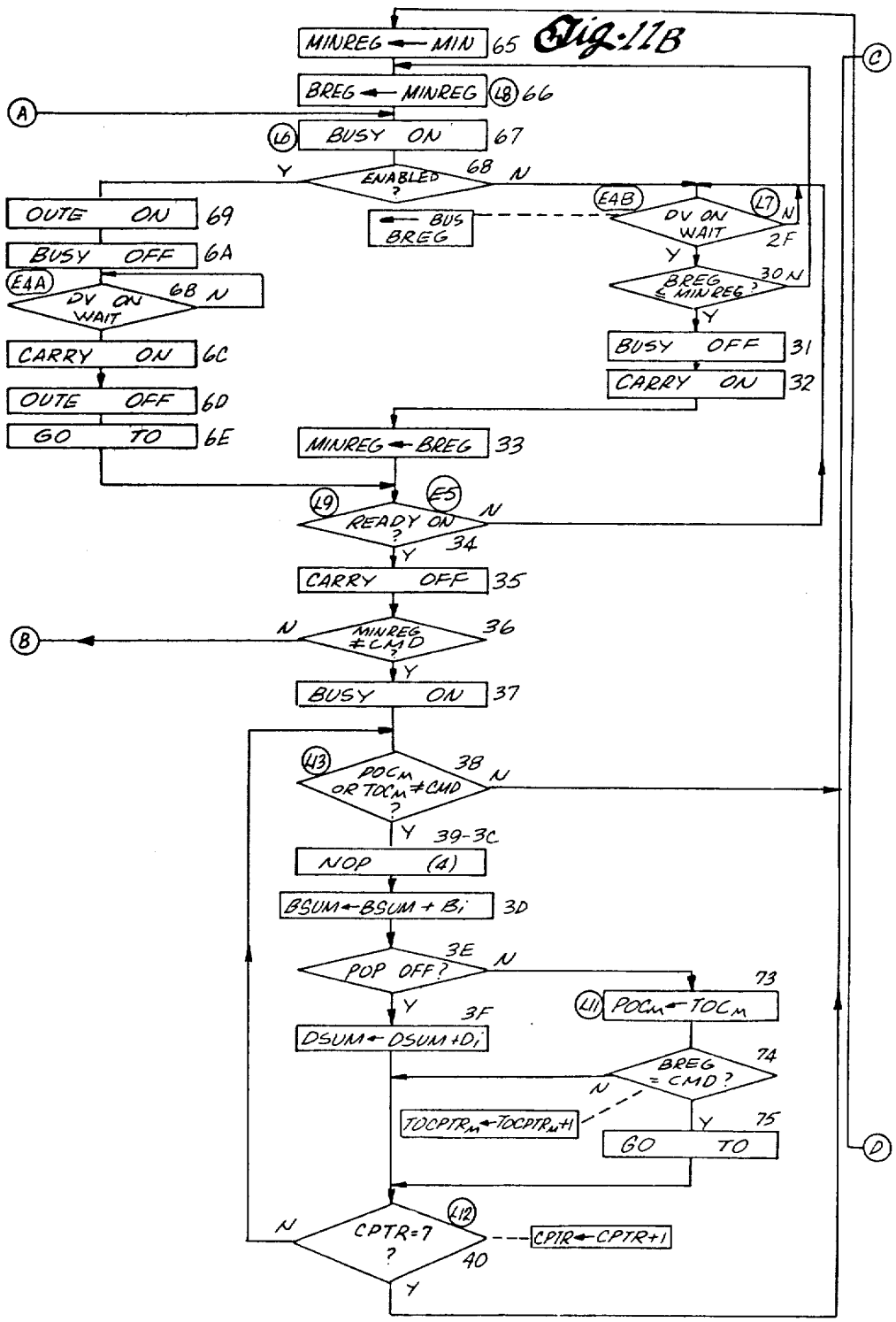

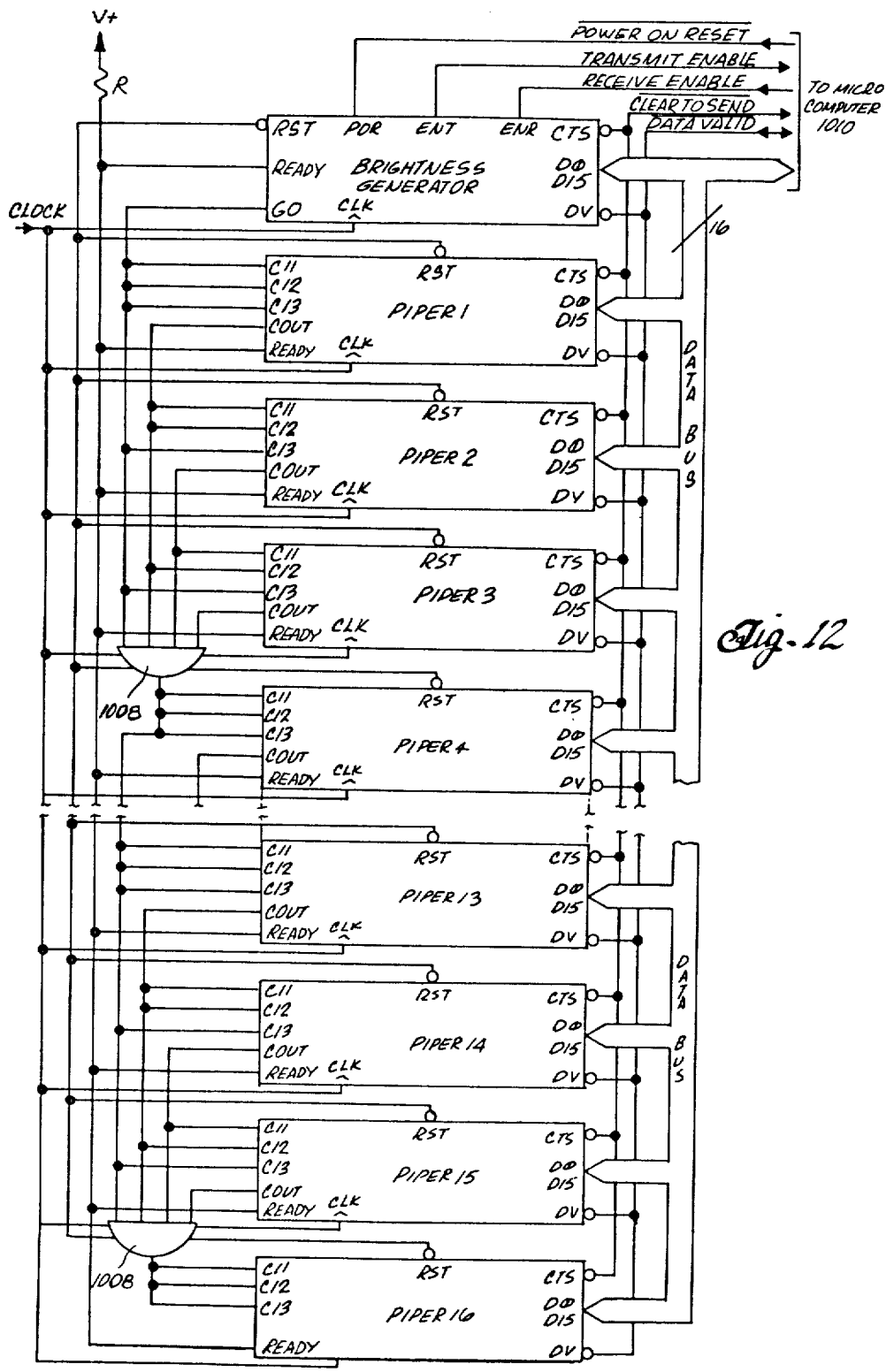

(.) BINARY POINT POSITION

EXPONENT | MANTISSA (.) BINARY POINT POSITION

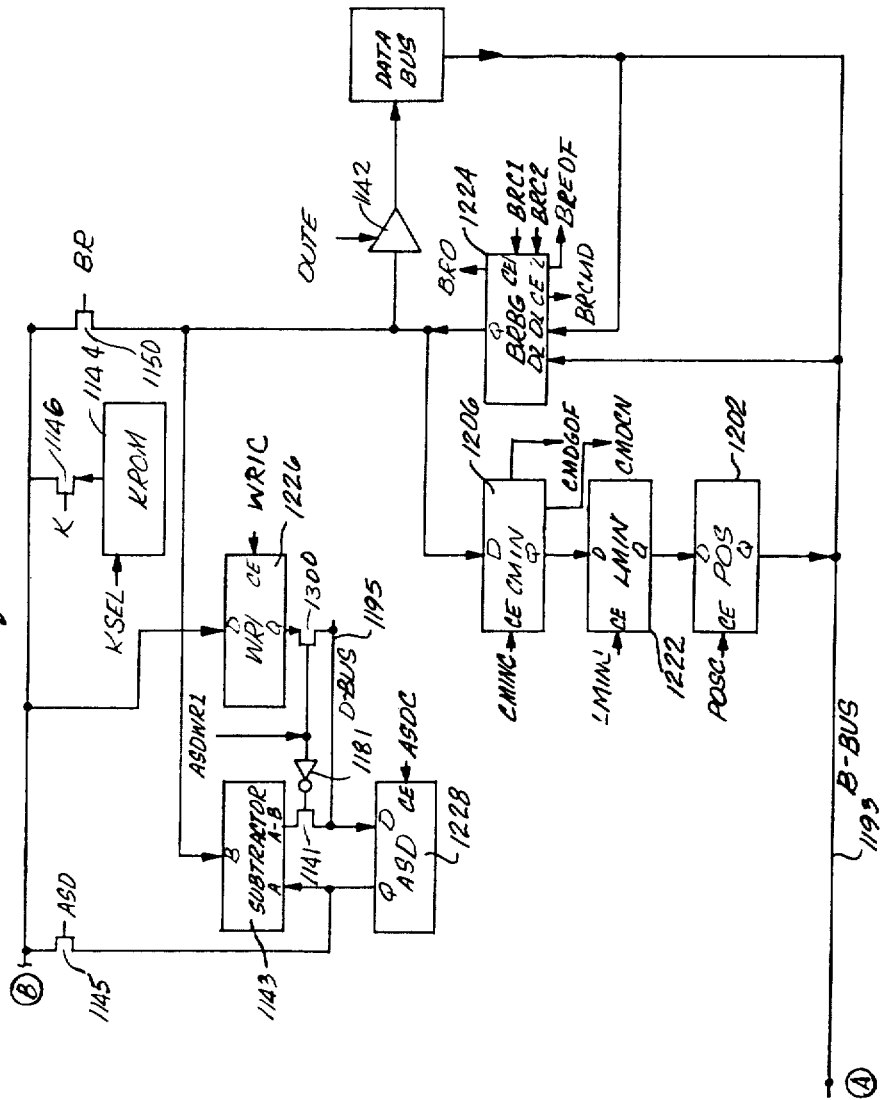

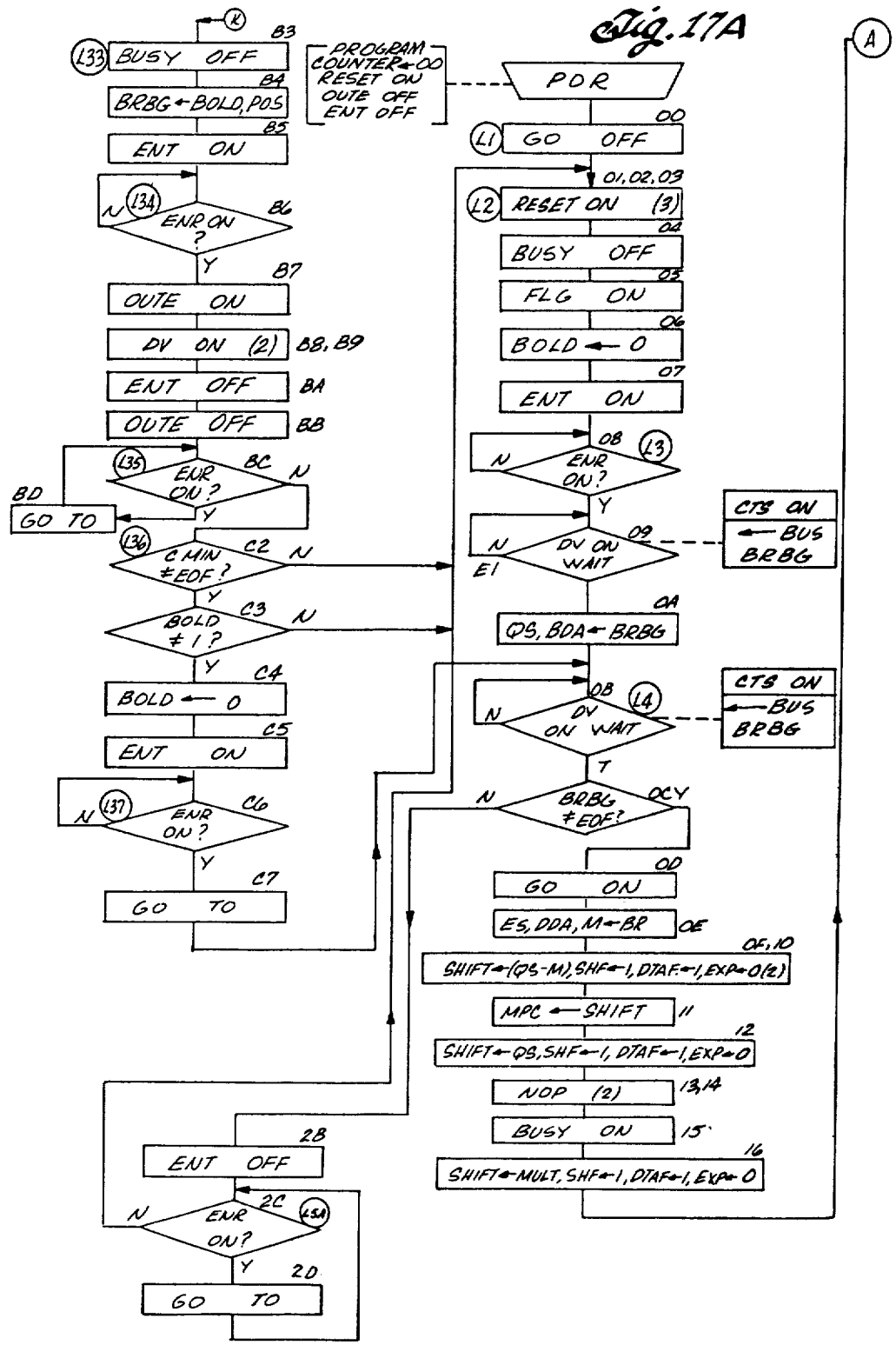

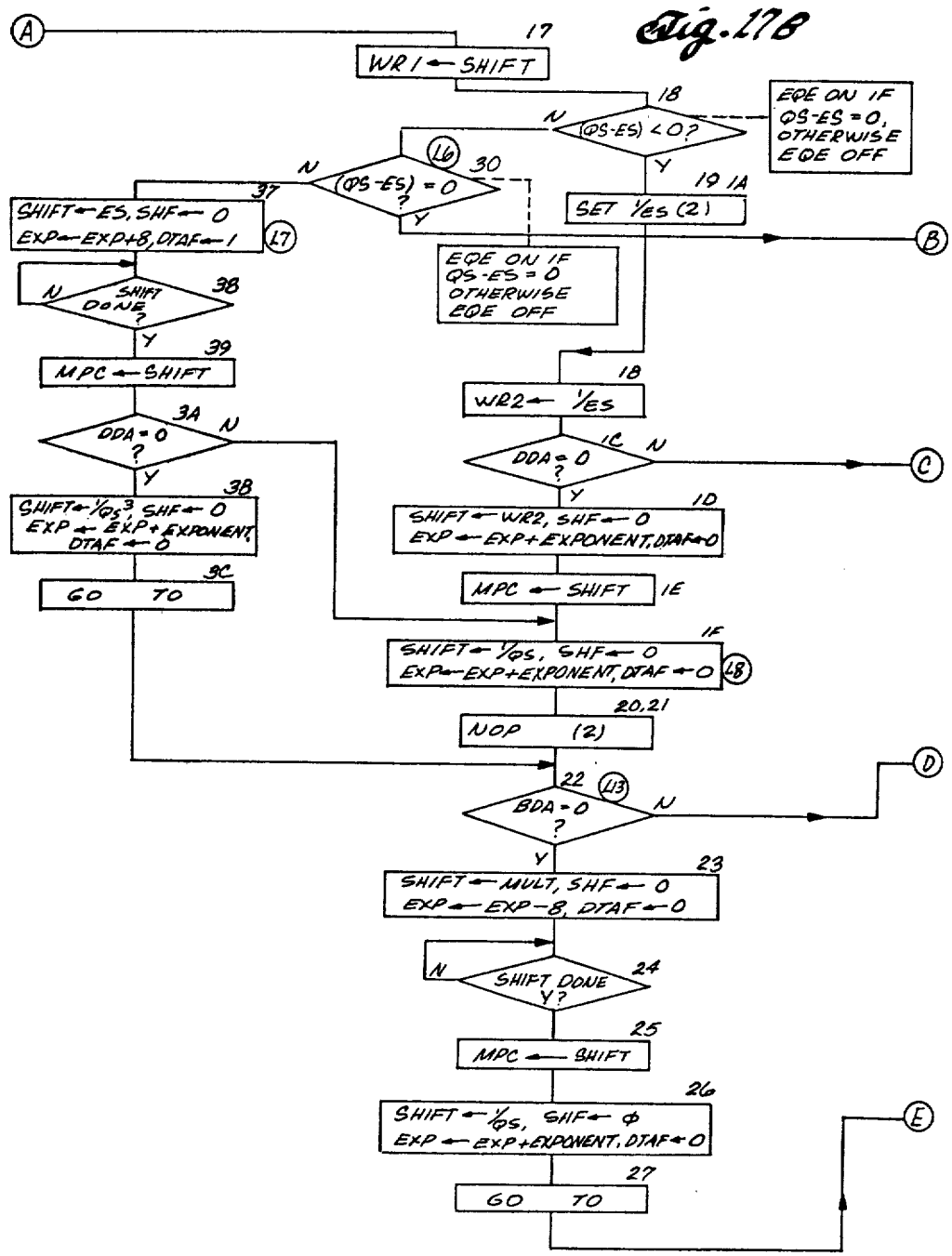

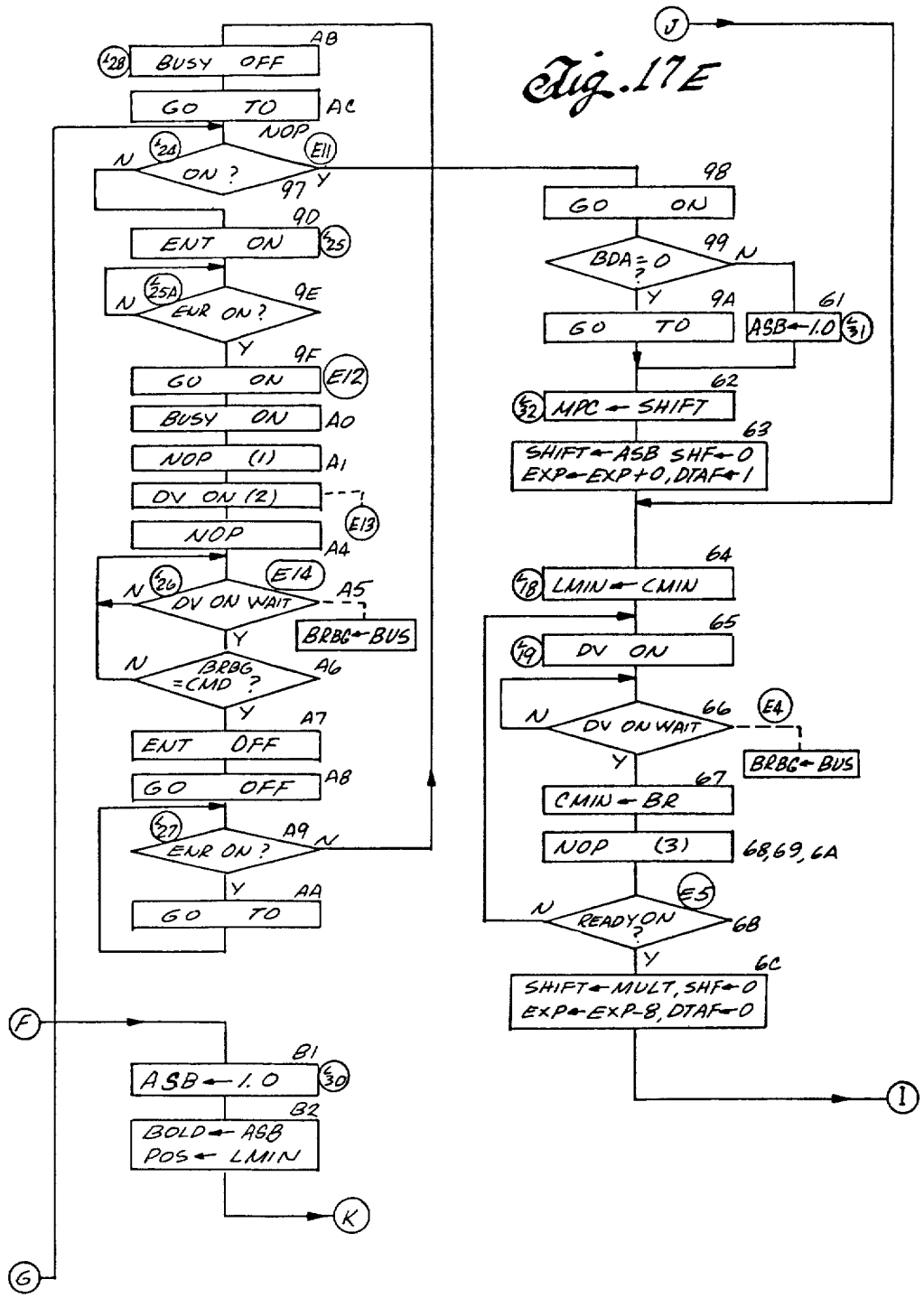

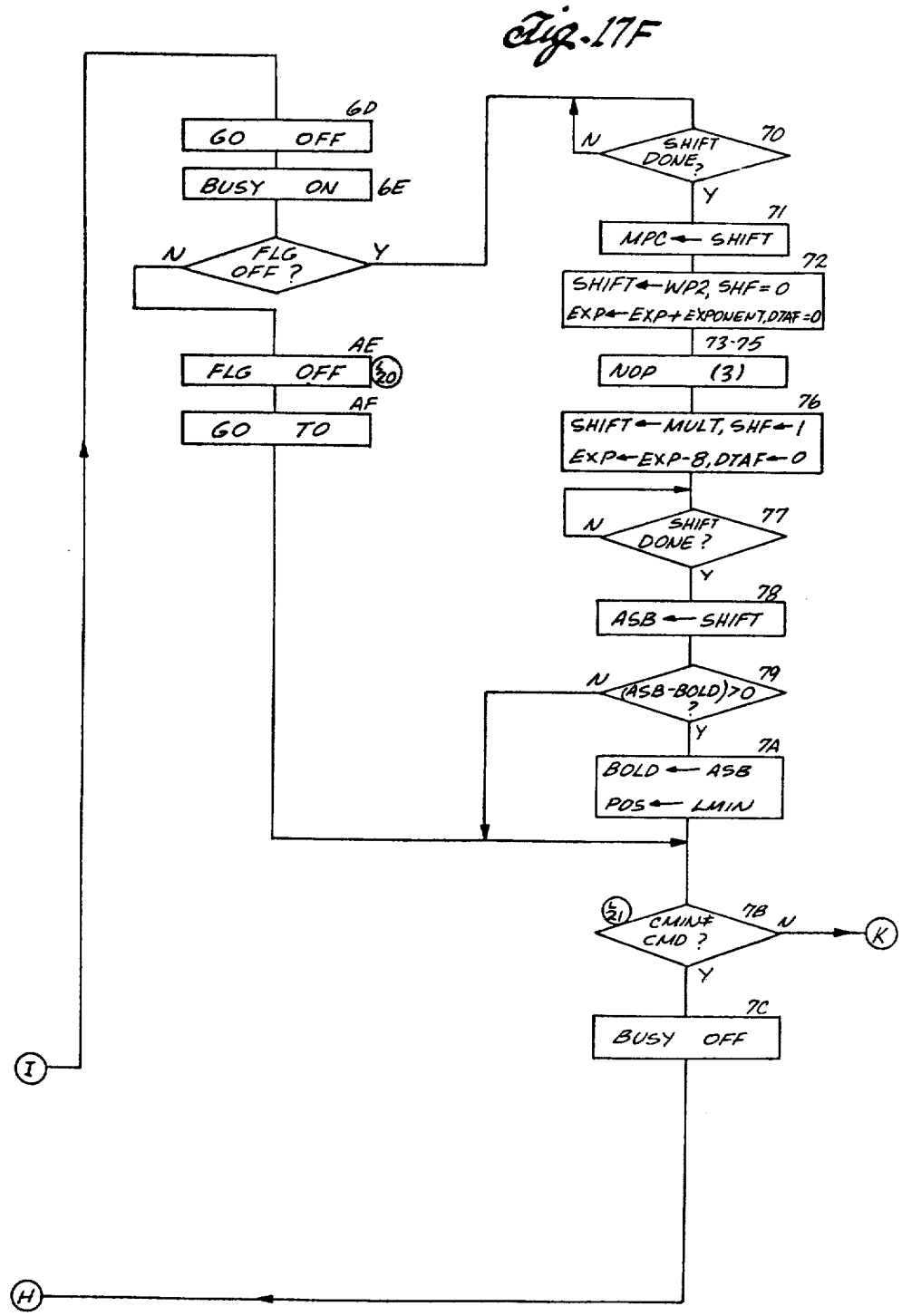

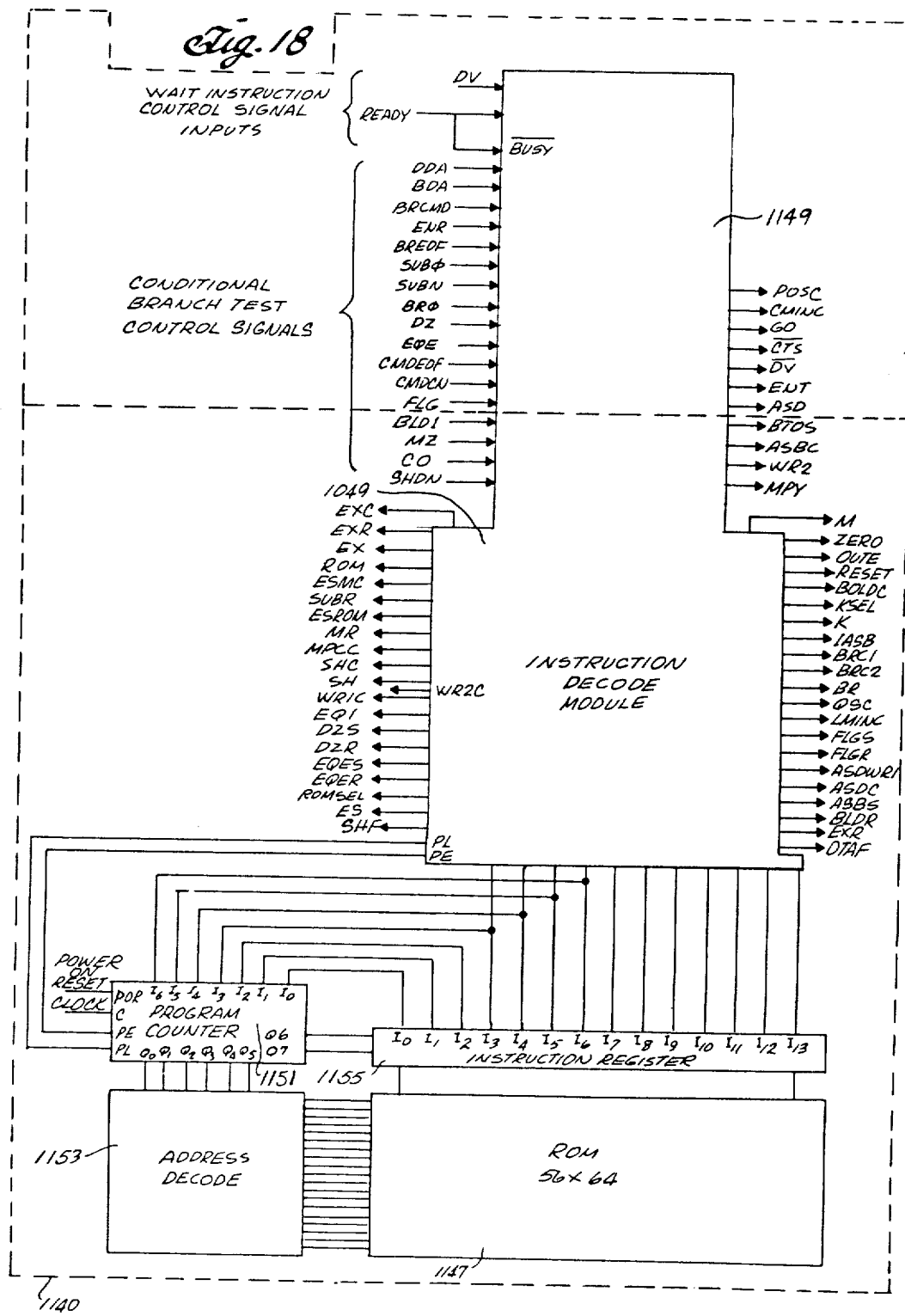

DATA PROCESSING METHOD AND MEANS FOR DETERMINING DEGREE OF MATCH BETWEEN TWO DATA ARRAYS

CROSS REFERENCE TO RELATED APPLICATIONS

U.S. application Ser. No. 038,517 titled METHOD AND MEANS UTILIZING MULTIPLE PROCESSING MEANS FOR DETERMINING DEGREE OF MATCH BETWEEN TWO DATA ARRAYS, filed on even date herewith in the names of Galie and Glaser discloses common subject matter with this application.

BACKGROUND OF THE INVENTION

This invention relates to digital data processing systems and more particularly to method and means utilizing data processing means for determining the degree of match between two data arrays.

Data processing methods and means are known for processing data arrays. Methods and means of this type are also known which look for a match between one data array, hereinafter called a query, and a stored data base array.

One method and means of the latter type is disclosed in U.S. Pat. No. 4,068,298. This patent discloses a method and means using concepts called "piping" and "brightness" to locate those entries in a stored data base which have a predetermined degree of match, i.e., "brightness" to a query. Event times or time ticks are used to represent the order of occurrence of events and entries (composed of events) making up the data base. Utilizing the time ticks, the method and means determine those stored data base entries which have a predetermined degree of match with the query. The number of event positions of displacement between an event of the query and a corresponding (i.e., like) event in the data base is used in determining the predetermined degree of match. As a result, exact and inexact retrievals of data from the stored data base are more easily, efficiently and rapidly achieved.

The above referenced application titled METHOD AND MEANS UTILIZING MULTIPLE PROCESSING MEANS FOR DETERMINING DEGREE OF MATCH BETWEEN TWO DATA ARRAYS is broadly directed to an improved method and means utilizing data processing means to aid in the process of rapidly and efficiently determining the degree of match between a query array and a stored data base array. This application discloses method and means which operate on or utilize a priorly-formed array of data values. Each data value represents the number of event positions between the occurrence of events in the stored data base. The method and means use the priorly-formed array of data values to rapidly and efficiently process and determine the position or entry in the stored data base which has the best match with the query and importantly forms a criterion value. The criterion value relates to the "brightness" or degree of match between the query and the identified entry in the stored data base.

SUMMARY OF THE INVENTION

Briefly, a method accordig to the present invention utilizes a plurality of data processing means. Each data processing means comprises a plurality of data stores and a corresponding temporary store for each such data store. The method determines a particular criterion value for the degree of match between the juxtaposition of a plurality of events of a query and a plurality of corresponding events of a stored data base entry. The method utilizes a priorly-formed array of data values in which each data value represents the number of event positions between the occurrence of an event in the query and the occurrence of a corresponding event in the stored data base. A group of one or more data values is provided for each of a plurality of different types of query events. Each different group is stored in a different data store with the data values thereof arranged in a monotonic order from a first end. The method is summarized as follows: Designate in each data processing means a data value in each of a plurality of the data stores as a first data value. Detect in each data processing means at least one of the designated first data values which has a predetermined magnitude relative to the other designated first data values in such data processing means. Determine from among the detected data values for all of the data processing means that detected data value which has a predetermined magnitude relative to the others and provide a corresponding determined value. Store in each data processing means the at least one detected data value in the temporary store which corresponds to the data store in which the detected data value is detected. Form in each data processing means for each of the individual data stores thereof a first distance value which represents the algebraic difference between the determined data value and the designated data value for such data store. Form in each data processing means for each individual data store thereof a second distance value representing the algebraic difference between the determined data value and the data value in the temporary store corresponding to such individual data store. Select in each data processing means for each of individual data stores a distance value from the corresponding first and second distance values, the selected distance value having a predetermined magnitude relative to the other. Form in each data processing means for a detected data value a sum-of-distance value which represents the sum of the absolute values of the selected distance values formed therefrom. Designate in each data processing means a new data value in the data value stores containing the determined data value and repeat the steps, including the present step, using such new data value and the new designated data value. The step of designating a new data value designates in a predetermined order in the monotonic order of data values the next data value from the one which was previously designated. Finally, utilize the sum-of-distance values, which correspond to the determined data values, provided in each data processing means during the preceding steps for deriving such criterion value.

Preferably, the method determines a particular positional value which is associated with the criterion value and the last step utilizes the determined data values and the corresponding sum-of-distance values which correspond to the determined data values for deriving both the criterion value and a positional value.

Preferably the data values in each group are arranged in a monotonic order with the smallest data value as a first data value and the step of detecting detects the smallest data value of the first data values.

Preferably the step of determining determines the smallest of the designated first data values.

Preferably in each data processing means the step of selecting selects the smallest of the first and second distance values.

Preferably in each data processing means there is a store for a pipewidth value. The method additionally, for each data processing means, includes the following steps: Detect a predetermined relation between each algebraic difference, used in the step of forming a sum-of-distance value, and a value in the pipewidth value store, operative upon the detection of such a predetermined relation as to a particular algebraic difference for substituting a predetermined value for such algebraic difference when forming such sum-of-distance value.

Preferably in each data processing means, if the formed distance value represents zero for a particular data store, the designated data value is stored in the temporary store which corresponds to such data store, and the next data value in such data store is designated as the first data value.

Preferably, the data processing means includes a store for a positional value and a positional value which corresponds to a determined data value is stored in the positional value store.

Preferably each data processing means has a weighting value stored in the data store in association with each of the data values. The method includes the additional step of combining the weighting values that are associated with the data values that are used in the step of forming a sum-of-distance value to thereby form sum-of-weighting values.

Preferably in each data processing means, each temporary store and corresponding data store which have a data value in the temporary store and a designated first data value, the method includes the following steps: Detect if the distance values formed from the data value in the temporary store and the designated data value of the corresponding group are equal. Select from the two weighting values that are associated with the data values which are associated with the distance values that are detected equal, that weighting value which has a predetermined magnitude relative to the other. Utilize the selected weighting value in the step of combining the weighting values. Also preferably in each data processing means the step of selecting from the two weighting values includes the step of selecting the largest weighting value of the two weighting values. Preferably for a determined weighting value, the sum-of-distance value and the corresponding sum-of-weighting value formed in each data processing means are combined to form a criterion value.

Preferably the data processing means comprises a store for a criterion value, and for a determined data value the sum-of-distance value and the corresponding sum-of-weighting value formed in each data processing means are combined to form a criterion value. The criterion value replaces a priorly-formed criterion value in the criterion value store if the newly-formed criterion value has a predetermined relation to the value in the criterion value store. Preferably the value in the criterion value store is replaced with the newly-formed criterion value when the newly-formed criterion value exceeds the value in the criterion value store. Preferably there is a store for the positional value and the value in the positional value store is replaced with the positional value corresponding to the detected data value used in forming a criterion value having the predetermined relation to the value in the criterion value store.

Preferably, the step of utilizing comprises the step of forming a criterion value "B" according to the following:

$$B = (QS(QS - M) - SSD)(M + SSB)\frac{MIN(QS,ES)}{MAX(QS,ES)} \cdot \frac{1}{QS^3}$$

where:
QS = the plurality of events of a query,
ES = the plurality of events of a stored data base entry,
M = the number of events in the query for which at least one corresponding event type is not found in the entry,
SSD = the total of the sum-of-distance values from each data processing means,
SSB = the total of the sum-of-weighting values from each data processing means,
MAX(QS,ES) = the larger of QS and ES, and
MIN(QS,ES) = the smaller of QS and ES.

Preferably the steps of the process are repeated until all data values in the data stores in all data processing means have been processed in accordance with the recited method.

In addition to the method, means is disclosed for performing the aforementioned method.

A number of advantages flow from the method and means according to the present invention. By way of example, a significant simplification is achieved and increase in speed is achieved over the arrangement in the aforementioned U.S. patent.

A specific embodiment of the present invention utilizes a data processing means comprising a store for a dimness value, a store for a positional value, a plurality of data stores, and a temporary store for each such data store. In the method, the data processing means detects the data value at the first end of the group(s) that has a predetermined relation to other data stores. Preferably, the largest data value is detected and the monotonic order is arranged, beginning with the largest value at the first end of the group. The detected data value, is transferred from the corresponding group to the corresponding temporary store, replacing a previous data value, if any, in the temporary store. The data values are then combined to form a dimness value. The dimness value represents the sum of the absolute values of the algebraic differences where each algebraic difference is taken between the data value which is detected and transferred to the temporary store and different ones of the data values existing at the first ends of the groups in the data stores and in the temporary stores. A detection is made to determine whether the dimness value formed has a predetermined relation to the value in the dimness value store. Preferably, detection is made if the dimness value is smaller than that contained in the dimness value store. The value in the dimness value store is replaced with the formed dimness value if the formed dimness value is detected as having the predetermined relation. The value in the positional store is replaced with the detected data value used in the step of combining if the dimness value formed from such data value is detected as having the predetermined relation.

According to the specific embodiment, the data processing means has a store for weighting value and a different weighting value is stored in association with each of the data values. The method also includes combining the weighting values which are associated with the data values, which are combined in the step of forming a dimness value, to thereby form a sum-of-weighting value. The value in the weighting value store is replaced with the formed sum-of-weighting value. The replacement occurs when the newly-formed dimness value has such predetermined relation.

Preferably, the method also includes the step of transferring additional data values to the corresponding temporary stores, which data values are the same value as the detected data value.

Preferably, during the method, a condition will be found where each temporary store and the correponding data store will contain a data value in both the temporary store and the first end of the corresponding group of data stores. Preferably, the method includes determining the algebraic difference between the detected data value and the data value in the temporary store. The algebraic difference between the detected data value and the data value at the first end of each group is determined. The data processing means detects if the algebraic difference in the preceding two steps has a predetermined relation to the other algebraic difference. The detected algebraic difference is then selected for use in forming the dimness value representing the sum of the absolute value of the algebraic differences.

Preferably, each temporary store and corresponding data store contain a data value in both the temporary store and at the first end of the corresponding group.

Preferably, the method includes detecting if the data values in the temporary store and in the first end of the corresponding group are equal. The data processing means selects from the two weighting values that are associated with the two data values which are detected to be equal, that weighting value which has a predetermined magnitude relative to the other. The selected weighting value is utilized in the step of combining the weighting values.

According to the specific embodiment of the invention, there is a store for a pipewidth value. Preferably, the method includes detecting a predetermined relation between each algebraic difference in the step of combining, and the value in the pipewidth value store. The data processing means is operative upon the last step, detecting such predetermined relation as to particular algebraic difference, for substituting the predetermined value for such algebraic difference when forming a dimness value representing such sum of absolute values of the algebraic difference.

In the specific embodiment of the present invention, the data processing means is provided for operating in accordance with the aforementioned steps.

BRIEF DESCRIPTION OF THE DRAWINGS

FIGS. 1-6 depict one embodiment of the invention.

FIG. 1 is a general block diagram of the data processor controlled by a microprocessor;

FIG. 2 is a block diagram of the chute memory and chute handler modules;

FIG. 3 is a block diagram of the dimness generator module;

FIGS. 4(A)-4(C) are the word formats for the CMEM, QTLF, and PMEM memories;

FIGS. 5(A)-5(C) are flow diagrams illustrating the sequence of operation of the chute memory module and the chute handler module;

FIGS. 7-19 depict an alternate embodiment of the invention.

FIG. 7 is an overall block diagram of an embodiment of the data processing means of the present invention;

FIG. 8 is a flow diagram illustrating the overall operation of each of the piper modules shown in FIG. 7;

FIG. 10 is a block diagram of the program controller for each of the piper modules of FIGS. 9A-9D;

FIGS. 11A-11C are detailed flow charts illustrating the sequence of operations of each of the piper modules of FIGS. 9A-9D;

FIG. 12 is a block diagram of the interconnection of the pipers of FIG. 7;

FIG. 14 is a block diagram of a multiplier for use in the brightness generator module;

FIG. 15 is a flow diagram illustrating the operation of the brightness generator module of FIG. 7;

FIGS. 16A-16C form a block diagram of the brightness generator;

FIGS. 17A-17F are flow charts illustrating the sequence of operation of the brightness generator module of FIG. 7;

FIG. 18 is a block diagram of the program controller for the brightness generator.

DETAILED DESCRIPTION

INDEX

I. FIRST EMBODIMENT OF FIGS. 1-6 AND TABLES 1-5
  A. GENERAL DESCRIPTION
  B. BRIEF DESCRIPTION OF DATA PROCESSOR 12, FIGS. 2 and 3
    1. CHUTE MEMORY
      COMPONENTS
    2. CHUTE HANDLER p3 COMPONENTS
      FLAGS
    3. DIMNESS GENERATOR
      COMPONENTS
      FLAGS
  C. DETAILED OPERATIONAL DESCRIPTION OF THE CHUTE HANDLER AND DIMNESS GENERATOR
    1. GENERAL
      (a) CHUTE HANDLER OPERATION
      (b) DETAILED DIMNESS GENERATOR OPERATION
  D. SUMMARY OF THE FIRST EMBODIMENT
II. SECOND EMBODIMENT OF FIGS. 7-19 AND TABLES 6-11.
  A. GENERAL DESCRIPTION
  B. GENERATION OF DATA ARRAY
  C. ENTRIES, EVENTS AND EVENT TYPES
  D. QUERY-TO-ENTRY POSITIONS
  E. CHUTE DATA GENERATION
  F. LAYERED DATA BASE
  G. PIPING METHOD
  H. PIPER PROCESSING PHASES
  I. PIPING METHOD STEPS FOR A SINGLE PIPER J. PIPING METHOD STEPS FOR MULTIPLE PIPERS
K. PIPING METHOD APPLIED TO A SAMPLE DATA ARRAY SHOWN IN TABLES 2A-2N
  1. PIPER MODULE
    (a) GENERAL DESCRIPTION
      1. CONTROL LOGIC BLOCK
      2. PIPER MODULE OVERVIEW
         INITIALIZATION
         CHUTE FILLING
         MINIMUM MIN DETERMINATION
         PIPING
         NMD SERVICING (CHUTE REFILLING)
    (b) DETAILED DESCRIPTION OF THE PIPER INSTRUCTION PROGRAM
    (c) MULTIPLE PIPER ENABLING
  3. BRIGHTNESS GENERATOR MODULE
    (a) GENERAL DESCRIPTION
      1. BRIGHTNESS CALCULATION
      2. BRIGHTNESS EQUATION
      3. BRIGHTNESS CALCULATION MATHEMATICAL OPERATION FIXED POINT FORMAT FLOATING POINT FORMAT
      4. FIXED AND FLOATING POINT TRANSFERS AND TRANSFORMATIONS
      5. FIXED AND FLOATING POINT MULTIPLICATION
      6. BRIGHTNESS GENERATOR CONTROL SIGNALS
      7. EXACT CONDITION DETERMINATION LOGIC BLOCK
      8. BRIGHTNESS GENERATOR MODULE OPERATIONAL SUMMARY INITIALIZATION MINIMUM MIN DETERMINATION SSD AND SSB COLLECTION NMD SERVICING BRIGHTNESS CALCULATION AND TRANSFER
      9. BRIGHTNESS GENERATOR MODULE OVERVIEW INITIALIZATION MINIMUM MIN DETERMINATION SSD AND SSB COLLECTION NMD COMMAND SERVICING NORMALIZED BRIGHTNESS CALCULATION AND TRANSFER
    (b) DETAILED DESCRIPTION OF THE BRIGHTNESS GENERATOR
    (c) DETAILED DESCRIPTION OF THE BRIGHTNESS INSTRUCTION PROGRAM
L. SUMMARY OF THE SECOND EMBODIMENT
III. APPENDIX A
INDEX OF TABLES

DETAILED DESCRIPTION

I. FIRST EMBODIMENT OF FIGS. 1-6 and TABLES 1-5

A. GENERAL DESCRIPTION

Figure 1:
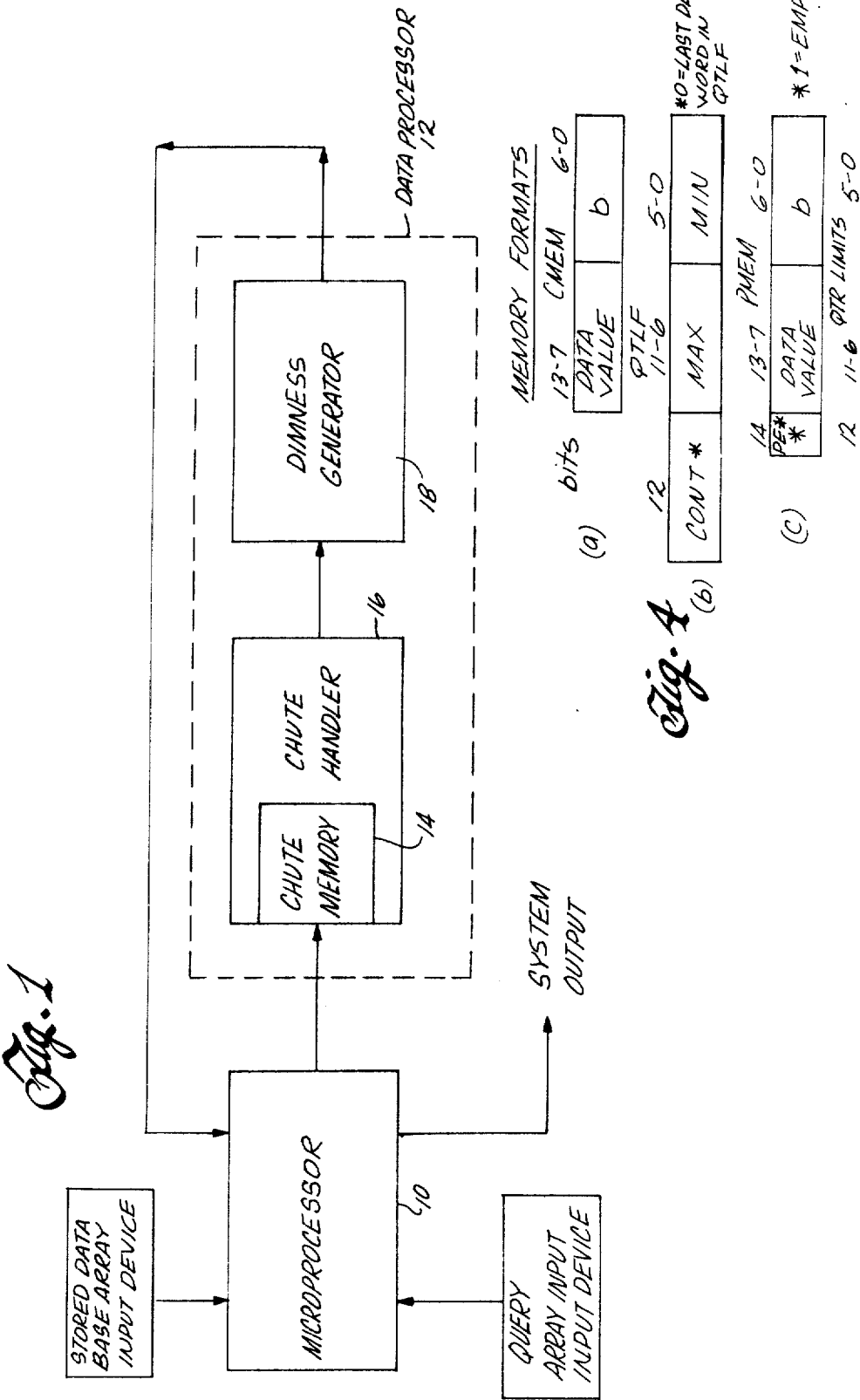

FIGS. 1 through 6 and Tables 1 through 5 pertain to a first embodiment of the invention. Considering the first embodiment of the invention, FIG. 1 is a block diagram of a data processor 12 controlled by a microprocessor 10 that forms a data management and data base interrogation system and embodies the present invention. The data processor 12 includes a chute memory 14, a chute handler 16, and a dimness generator 18. The data processor is designed to perform certain specialized data handling functions in the process of determining a degree of match between a plurality of events of a query array of events (hereinafter called a query) and a plurality of events of entries of a stored data base array (hereinafter called an entry).

The events of a query as well as the entry are digitally coded characters, each event occupying a single location in the corresponding query and entry arrays. A degree of match between the query and the entry is formed by sequentially juxtaposing the locations of the query relative to the entry (and summing) the number of locations between like events of each array at each of such juxtapositions. The best match occurs at the location where the sum thus formed is at a minimum.

The above-described sequence is illustrated in Table 1 (a). The query word, TENT, is compared to the entry word, STATEMENT. The shift location refers to the relative position of the query and the entry so that in shift location 0 the first event S of the entry STATEMENT is in juxtaposition with the first event T of the query TENT. Under the heading of No. of Locations (Table 1a), there is tabulated the number of locations between the first like event of each event of the query and the entry. Under the heading, Sum, there is tabulated the sum of locations between like events in the query and entry for each juxtaposition thereof. Under the heading, Shift Location, is tabulated the relative location of the query and the entry.

As an example, in shift location −3, there are 4 locations between the first T in TENT and the first T in STATEMENT. Similarly, there are 6 locations between the first E in TENT and the first E in STATEMENT, 8 locations between the first N's, and 1 location between the last T in TENT and the first T in STATEMENT. The corresponding sum of locations is 19. The lowest sum, namely 2, indicates that the best fit between the sample query and entry is at shift location 5.

Table 1(b) is the array of the number of locations between like events of the described example for an initial juxtaposition in the 0 shift position. The values aligned with the query event T refer to the number of shift positions as well as the shift position required for the juxtaposition with each T in the entry. Similarly, the values aligned with all the other events in the query refer to the corresponding number of locations required for the juxtaposition with like events in the entry.

Given such a set of numbers, the data processor 12 of the herein described invention determines that relative juxtaposition of the query and entry in which the sum of the number of locations between all like events is a minimum.

The data processor 12 generates a number, called the dimness, that is a measure of the degree to which all stored entry events are similar to the query events. The similarity between the query and entry is in terms of the sequential order of occurence of such like events and perfect similarity occurs when the query contains the same event types arranged in the same sequential order.

An example of a sample data array transferred to the data processor 12 from the microprocessor 10 is shown in Table 2. Table 2 also depicts certain storage devices employed in the data processor 12 in determining the dimness value. The storage devices include five chute stores and a temporary store, called a Pocket, for each chute. Each chute and corresponding pocket is assigned a chute/pocket number. Additional stores or registers and the data to be stored in each register are summarized below.

| REGISTER | |
|---|---|
| d | Candidate Difference Sum |
| b | Candidate Brightness Sum |
| D | Final Difference Sum |
| B | Final Brightness Sum |
| PSN | Location of compared data in which final sum in the D register is derived. |
| QS | The number of events in a query string and for Table 1, QS = 5. |
| PW | Pipewidth which is the maximum permissible value of the difference between a query event position and an entry event position, for this example: PW = QS = 5. |

Each row or data values forms a different group of values and is for a different type query event and is stored in different chutes. The data values in each chute are a series of values arranged in monotonic decreasing order, from left to right. Each value represents the number of locations between like events of a query and an entry of a stored data base. Stored in the chutes and in association with each data value is a decimal weighted value which is always less than or equal to 1. The weighted value is called a brightness value and represents the brightness of a query element obtained in response to an interrogation in a lower level data structure. Such data structures and brightness values are described in detail in U.S. Pat. No. 4,068,298.

The first data value of every chute which is also the largest data value in that chute is initially placed in the location called the top of the chute. If there are no like values for a particular type of query event in the entry of the stored data base, then the chute is designated as empty as illustrated by chute 3 of Table 2. The pockets are set to empty by the chute handler 16 to the introduction of any data into the pocket. To be discussed infra, a value of −64 is entered into the pocket locations to indicate an empty condition.

Thus, given the data arrangement of Table 2, the data processor 12 proceeds to empty the chutes and determines final register values according to the following set of rules:

1. Find the chute with the most positive value exposed at the top of the chute and move it into its associated pocket, replacing any previous value already in the pocket from that chute.
   (a) If there is an identical value at the top of one or more of the other chutes, transfer it out into its pocket.
2. Calculate the absolute value of the algebraic difference between the pocket value being processed (last value brought out into a pocket) and each of the values presently in the tops and pockets of the other chutes. Sum these absolute values and, in each case, sum the brightness values (weights) associated with the chute or pocket value from which the pocket value being processed was subtracted.
   (a) If a value exists both in the top of the chute and in its associated pocket, use the smaller of the absolute value of the algebraic difference between the pocket value being processed, and the just described other two values.
   (b) If the difference between the pocket value being processed and a chute value and its associated pocket value are equal, add the largest brightness of either the chute or associated pocket to the brightness sum.
   (c) If a chute and its associated pocket are empty of data, the value QS, i.e., the number of events in a query, is added to the dimness sum and the value 1 is added to the brightness sum.
   (d) If the difference between a pocket value and the corresponding top-of-chute value is zero, the brightness value used in the brightness sum is that larger brightness associated with either the pocket or top-of-chute.
   (e) If any difference calculated in the described step 2 is greater than the pipewidth value PW, replace the difference formed with the value QS.
3. If the sum calculated in step 2 is smaller than the existing value in the D register, replace the existing value in that register with the just calculated value, replace the existing entry in the PSN register with the pocket value being processed, and replace the value in the B register with the brightness sum just calculated.
   (a) If the distance sum equals the value in the D register, and the value in the B register is smaller than the brightness sum, replace the B register value with the brightness sum just calculated, and the existing value in the PSN register with the pocket value being processed.
4. Repeat steps 1 through 3(a) until all chute values have been processed. At such time, the value in the D register will be the minimum sum of the differences, or dimness; the value in the PSN register will be the relative shift position for the dimness calculated; and the B register will contain the cumulative brightness associated with the dimness found.

Illustration of the data processor execution of the foregoing rules is illustrated in Tables 3(a) through 3(h) with the result that the best fit between query and entry is in position 1, yielding a dimness of 6 and a brightness value of 3.7. The asterisks that appear in all of the Tables 3(a) through 3(h) relate to the particular processing rule that requires the described data array operation. The value −64 initially placed in the pockets by microprocessor 10 is equivalent to an empty condition in the pockets.

Consider briefly the operation of the data processor 12 in carrying out the example depicted in Tables 3(a) through 3(h). Referring to Table 3(a), initially the data processor detects the data value at the top end of the groups of data values which is the largest, i.e., has the largest value in relation to the other data values at the top of the chutes. To this end, the data value 5 is detected at the top of chute/pocket No. 1.

The detected data value of 5 is then transferred from the top of its chute to the corresponding pocket, replacing the empty value −64.

The data processor then combines the data values to form a dimness value. Specifically, the sum of the absolute values of the algebraic differences are formed where each algebraic difference is taken between the data value which has been detected and transferred to the corresponding pocket and different ones of the data values existing at the top of the chutes and in the pockets. To this end, the data processor determines the algebraic difference between the data values 5 and 4 contained in pocket of chute/pocket No. 1 and the top of the chute in chute/pocket No. 0, respectively, and an absolute value of 1 is formed and is stored in the d register. Subsequently, the absolute difference between the value 5 contained in the pocket and the top-of-chute of chute/pocket No. 1 is formed, and the resultant value 0 is combined with the value 1 in the d register.

Subsequently, the algebraic difference between the data value 5 and data value 3 contained in the pocket of chute/pocket No. 1 and the top of the chute of chute/pocket No. 2, and the absolute value of the result, namely, a value 2, is combined with the sum in the d register. Subsequently, it is found that the pocket and chute of chute/pocket No. 3 are empty and accordingly a value equal to the length of the query which, in the example of Table 3(a) is 5, is added to the sum in the d register. Similar to that described above, the algebraic difference between the values 5 and 1 in chute pocket Nos. 1 and 5 is formed and the absolute value, namely, 4 is added to the sum in the d register, providing a total sum, i.e., a dimness value, of 12.

Additionally, the brightness values 0.6, 0.3, 0.9, 1, and 0.8 are summed in the b register, providing a total brightness value of 3.6. Since the DB and PSN registers are initially empty, the dimness value 12 is transferred to the B register, and the data value 5 being processed in the chute/pocket No. 1 is transferred to the PSN register.

Consider now the operation of the data processor depicted in Table 3(b).

The data value 4 at the top of chute in chute/pocket No. 0 is detected as being the largest value at the top of the chutes and is transferred to the corresponding pocket. The sequence of operations discussed hereinabove with respect to Table 3(a) is now repeated, taking the algebraic difference between the data value 4 in the pocket of chute/pocket No. 1 and each of the data values at the top of the chute in each of chute/pocket Nos. 1, 2, and 4. Since chute/pocket No. 3 is empty, the length of the query, namely, 5, is utilized for chute/pocket No. 3 as described hereinabove for Table 3 (a).

Additionally, the brightness values associated with each of the data values with which the data value 4 is combined, are summed, so that the total appears in the d register. Following the formation of the sum of absolute values of algebraic differences and the summation of the brightness values, the d register contains a value 10 and the b register a value 4. The data processor detects that the dimness value in the d register is smaller than that in the D register and therefore transfers the dimness value 10 and the sum-of-brightness values 4 from the d register and the b register to the D register and the B register, respectively. Additionally, the data value 4 which had just previously been detected and was being processed in the pocket of chute/pocket No. 0, is transferred to the PSN register. In this manner, the previous dimness value contained in the D register is replaced with the smaller dimness value contained in the d register. Similarly, the value contained in the PSN register is replaced with the data value which has been detected and used for forming the new dimness value.

Consider now the operation of the data processor depicted in Table 3(c).

The data values, 3, at the top of chute/pocket No. 1 and chute/pocket No. 2 are detected as being the largest value at the top of the chutes and are transferred to their corresponding pockets. Scanning the pockets from chute/pocket No. 4 to chute/pocket No. 0 the processor detects the value 3 in chute/pocket No. 2 first and thus selects it as the value to be processed rather than the value 3 in chute/pocket No. 1. Detecting and selecting the value 3 in chute/pocket No. 1, however, would yield the identical calculated results.

The sequence of operations discussed hereinabove with respect to Table 3(a) is now repeated, taking the algebraic difference between the data value in the pocket/chute No. 2 and the data value at the top-of-chute in the chute/pocket No. 4. Since chute/pocket No. 3 is empty, the length of the query, namely 5, is added to the sum in d register. Since there are values in both the pocket and top-of-chute of chute/pocket No. 0, the smallest difference between the pocket value 3 in chute/pocket No. 2 and the pocket value 4 in chute/pocket No. 0 and the top-of-chute value 0 in chute/pocket No. 0 is utilized. Consequently, the value 1, which is the smaller magnitude difference taken between (3-4) and (3-0), is added to the sum in the dimness generator.

Additionally, the brightness values associated with each of the data values with which the data value 3 of chute/pocket No. 2 is combined are summed so that the total appears in the d register. Following the formation of the sum of absolute values of algebraic differences and the summation of the brightness values, and d register contains a value 8 and the b register, a value 4. The data processor 12 detects that the dimness value in the d register is smaller than that in the D register and, therefore, transfers the dimness value 8 and the sum-of-brightness value 4 from the d register and the b register to the D register and B register, respectively. Additionally, the data value 3, which had just previously been detected as being processed in the pocket of chute/pocket No. 2, is transferred to the PSN register. In this manner, the previous dimness value contained in the d register is replaced with the smaller dimness value contained in the d register. Similarly, the value contained in the PSN register is replaced with the data value which has been detected and used for forming the new dimness value.

Consider now the operation of the data processor depicted in Table 3(d).

The data value 1 at the top of chute in chute/pocket No. 4 is detected as the largest value at the top-of-the chutes and is transferred to the corresponding pocket. In addition, the chute value 1, which is now considered as the top-of-chute for both chute/pocket Nos. 1 and 2, is transferred into their corresponding pockets along with their associated brightness values. The sequence of operations discussed hereinabove with respect to to Table 3(a) is now repeated, taking the algebraic difference between the data value 1 in the pocket of chute/pocket No. 4 and the data value at the top-of-chute in chute/pocket No. 0 and the pocket value in chute/pocket Nos. 1, 2 and 4. Since chute/pocket No. 3 is empty, the length of the query, namely 5, is utilized for chute/pocket No. 3 as described for Table 3(a). Since a value exists both in the pocket and the chute for chute/pocket No. 0, the smallest difference between the data value 1 in chute/pocket No. 4 and the values in the pocket and chute of chute/pocket No. 0 is added to the d register. Consequently, 1, which is the smaller of differences between (1-0) and (1-4), is added to the sum in the d register.

Following the formation of the absolute values of algebraic differences and the summation of the brightness values, the d register contains a value 6, and the b register contains a value of 3.7. The data processor 12 detects that the dimness value in the d register is smaller than that in the D register and, therefore, transfers the dimness value 10 and the sum of-brightness-values 3.7 from the d register, and the B register, respectively.

Additionally, the data value 1, which had just previously been detected and was being processed in the pocket of chute/pocket No. 4, is transferred to the PSN register. In this manner, the previous dimness value contained in the d register is replaced with the smaller dimness value contained in the d register. Similarly, the value contained in the PSN register is replaced with the data value which has been detected and used for forming the new dimness value.

Consider now the operation of the data processor depicted in Table 3(e).

The data value 0 at the top of the chute in chute/pocket No. 0 is detected as being the largest value at the top of the chutes and transferred to the corresponding pocket. The sequence of operations discussed hereinabove with respect to Table 3(a) is now repeated, taking the algebraic difference between the data value 0 in the pocket of chute/pocket No. 0 and each of the data values in the pocket of each of chute/pocket Nos. 0, 1, 2, and 4. Since chute/pocket No. 3 is empty, the length of the query, 5, is utilized for chute/pocket No. 3 as described above for Table 3(a). Additionally, the brightness values associated with each of the data values with which the data value 0 in the pocket of chute/pocket No. 0 is combined are summed so that the total appears in the d register. Following the formation of the sum of the absolute values of algebraic differences and the summation of the brightness values, the d register contains a value 8, and the b register contains a value 3.7. The data processor detects that the dimness value in the d register is larger than that in the D register and, therefore, does not transfer the dimness value 8 and the sum-of-brightness values 3.7 from the d register and the b register to the D register and the B register, respectively. Consequently, the data value 0, which had just previously been detected and was being processed in the pocket of chute/pocket No. 0, is not transferred to the PSN register. In this manner, the previous dimness value contained in the D register is not replaced with the larger dimness value contained in the d register. Similarly, the value contained in the PSN register is not replaced with the data value which has been detected in use for forming the new dimness value.

Consider now the operation of the data processor depicted in Table 3(f).

The data value −1 at the top of the chute in chute/pocket No. 2 is detected as being the largest value at the top of the chutes and is transferred to the corresponding pocket. The sequence of operations discussed with respect to Table 3(a) is now repeated, taking the algebraic difference between the data value −1 in the pocket of chute/pocket No. 2 and the data value at the top-of-chute in chute/pocket No. 4. As before, since chute/pocket No. 3 is empty, the length of the query, namely 5, is utilized for chute/pocket No. 3 and is added to the d register. Since no data values exist in the top of the chute and chute/pocket Nos. 0 and 1, the differences are taken between the value and the pocket of chute/pocket No. 2 and the values in the pockets of chute/pockets 0 and 1. Following the formation of the sum of absolute values of algebraic differences and the summation of the brightness values, the d register contains a value 10, and the b register contains a value 3.6. The data processor detects that the dimness value in the d register is larger than that in the D register and, therefore, does not transfer the dimness value 10 and the brightness value 3.6 from the d register and the b register to the D register and the B register, respectively. Additionally, the data value −1, which had just previously been detected and was being processed in the pocket of chute/pocket No. 2, is not transferred to the PSN register.

Consider briefly the operation of the data processor in carrying out the example depicted in Table 3(g). The data value −3 at the top of the chute in chute/pocket No. 4 is detected as being the largest value at the top of the chutes and is transferred to the corresponding pocket. Following the data processor steps as herein described in Tables 3(a) through 3(g), the data processor forms the sum of the absolute values of the algebraic differences and the summation of the brightness values, and the d register contains a value 14, and the b register contains a value 3.6. The data processor detects that the dimness value in the d register is larger than that in the D register and, therefore, does not transfer the dimness value 14 and the sum-of-brightness values 3.6 from the d register and the b register to the D register and the B register, respectively. Additionally, the data value −3, which had just previously been detected and was being processed in the pocket of chute/pocket No. 4, is not transferred to the PSN register.

Consider briefly the operation of the data processor in carrying out the example depicted in Table 3(h) wherein no more chute values exist to be processed.

The data value −4 at the top of the chute in chute/pocket No. 4 is detected as being the largest value at the top of the chutes and is transferred to the corresponding pocket. Following the processing steps described in Tables 3(a) through 3(g), the data processor forms a sum of absolute values of the algebraic differences in the summation of the brightness values. The d register contains a value 17, and the b register contains a value 3.4. The data processor detects that the dimness value in the d register is smaller than that in the D register and, therefore, does not transfer the dimness value 17 and the brightness value 3.4 from the d register and the b register to the D register and the B register, respectively. Additionally, the data value −4, which has just previously been detected and was being processed in the pocket of chute/pocket No. 4, is not transferred to the PSN register.

The results of the operation of the data processor in carrying out the examples depicted in Tables 3(a) through 3(h) show that the best fit between the query and the entry occurs at position 1 with a corresponding dimness of 6 and an associated brightness of 3.7.

B. BRIEF DESCRIPTION OF DATA PROCESSOR 12, FIGS. 2 AND 3

Briefly, a data processor is disclosed for determining a particular match between a plurality of events of a query and a plurality of events of a stored data base, utilizing a priorly-formed array of data values. An example of the priorly-formed array of data values is depicted in Table 2. Each data value represents the number of event positions between the juxtaposed position of an event in the query and the corresponding event in the stored data base. As discussed above, a group of one or more data values is provided for each of a plurality of different types of query events. The data processing means includes a store SDW 100 for a dimness value, a store PSN 62 for a positional value, and a plurality of data stores, each consisting of a storage location called a chute in the CMEM memory 20. Each different group of data values is stored in a different one of the chutes in the CMEM memory 20, with the data values arranged in monotonic order beginning at the top with the largest data value. To be explained in more detail, the top is not a fixed location in each chute, but is specified by a stack pointer SPR 32, which points to the next data value in the chute to be processed in that chute. The PMEM memory 26 contains a separate pocket or temporary store for each of the storage locations (chutes) in the CMEM memory 20. Each pocket stores one data value and, to be explained, an associated brightness value.

Figure 2:
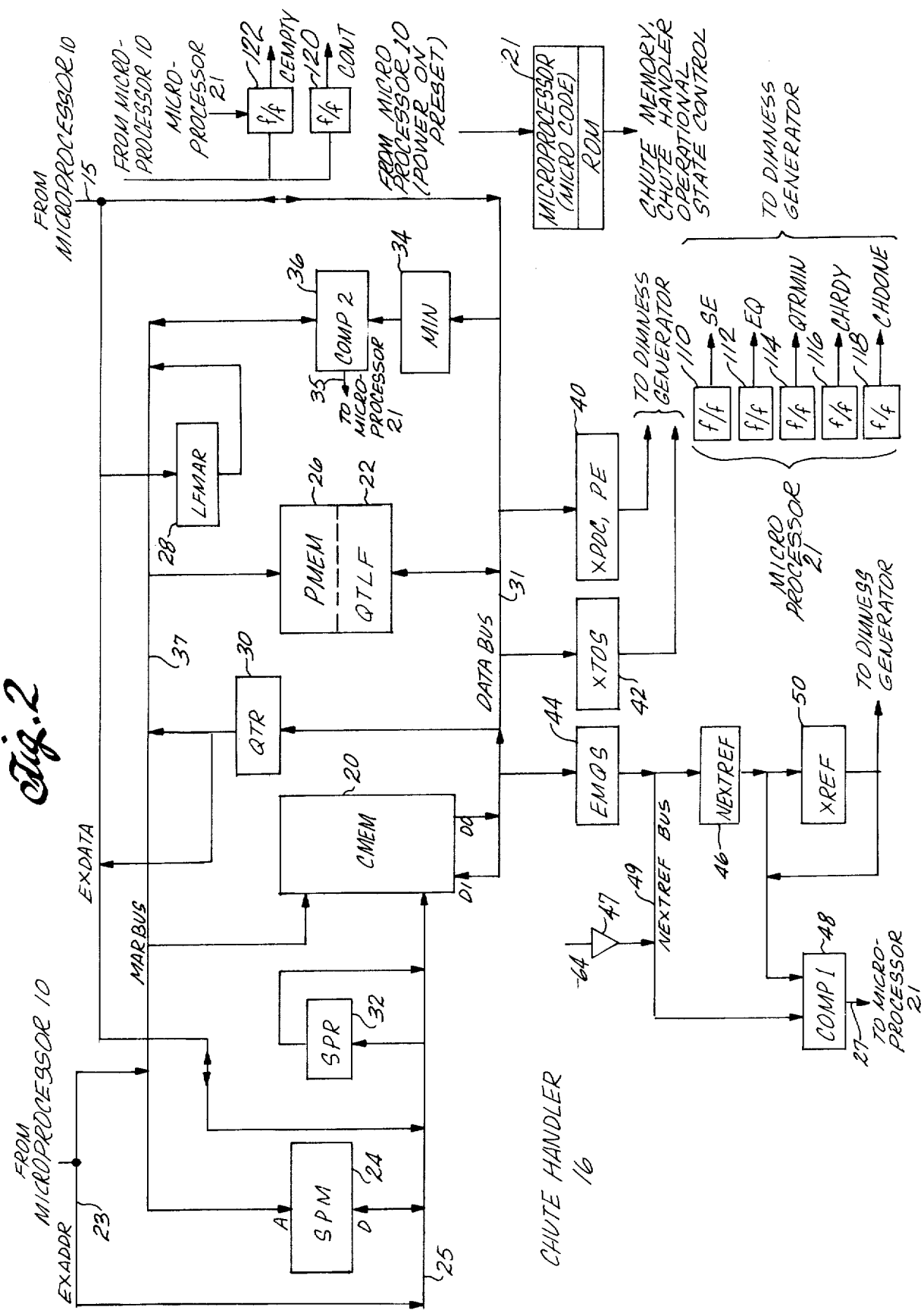

Considering the operation of the data processor 12, the chute handler 16, FIG. 2, detects the data value at the top of the CMEM memory 20, which has a predetermined relation to the other data values at the top of the chutes in the CMEM memory 20. More specifically, the chute handler compares the data values at the tops of the chutes, detects the largest data value, and stores it into the XREF register 50. This is effected by the microprocessor 21 during its states 2 through 6 for first detected data values, and states 10, 17, and 18 for the second and subsequent detected data values. The chute handler causes the detected largest data value to be transferred from the corresponding location in the CMEM memory 20 to the corresponding pocket in the PMEM memory 26. This is effected by the microprocessor 21 during its states 14, 15, and 16.

The dimness generator 18 combines the detected data value with the other data values at the top of the chutes and the data values stored in the pockets of PMEM memory 26. To this end, the absolute value of the algebraic difference between the detected largest data value and the individual data values stored at the top of each chute, and in each of the pockets, is determined, and the sum thereof is taken to form a dimness value in the manner discussed hereinabove. This takes place in the dimness generator for each chute as follows. The detected data value in XREF 50 is transferred to REF 60 (FIG. 3), and the top of chute data value and associated brightness value are transferred to registers TOS2 58 and TOS1 56, respectively (FIG. 3), and the data value and its associated brightness value are transferred from XPOC 40 to registers POC2 54 and POC1 52, respectively. The algebraic difference is formed between the detected data value stored in REF 60 and the data values in POC2 54, and the algebraic difference is formed between the detected data value in REF 60 and the data value in TOS2 58. The smaller of those differences is summed into a candidate dimness sum being formed in an SDC accumulating register 90. It should be noted that the brightness value in TOS1 56 and POC1 52 are associated, respectively, with the data values in TOS2 58 and POC2 54. Also, the brightness value associated with the data value from TOS2 58 or POC2 54, which resulted in the smaller difference, is summed into an SBC accumulating register 92. This is effected by the microprocessor 51 during states 4, 5, 6, 7, and 10.

The above addresses the condition where the algebraic differences formed are not equal. If the algebraic differences are equal, then the brightness values in registers TOS1 56 and POC1 52 are compared, and the larger brightness of the two is summed into the SBC accumulating register 92, and the corresponding data value is summed into the SDC accumulating register 90. This is effected by the microprocessor 51 during states 4, 5, 6, 7, and 10, state 7 being the one where equal and unequal states are detected.

The microprocessor 51 in states 12 and 13 detects if the dimness value, which is formed and stored in SDC 90, is smaller than the value presently contained in the SDW register 100. The SDW register 100 contains the minimum dimness value thus far determined.

The microprocessor 51 in state 14 forms the means for replacing the value in SDW 100 with the just formed dimness value contained in SDC 90 when the value in SDC 90 is less than the value in SDW 100. Concurrently, the value in SBW 102 is replaced with the value in SBC 92. Additionally, when the formed dimness value in SDC 90 is detected as being the smaller, the value stored in a positional store PSN register 62 is replaced with the detected data value stored in the REF register 60. The value in PSN 62 is the relative position of the query and the entry that gives rise to the value in SDW 100.

For the case when SDC 90 equals SDW 100, the microprocessor 51 detects if the brightness value in SBC 92 is larger than the brightness value in a storage register SBW 102. SBW 102 contains the brightness value associated with the dimness value presently in SDW 100. The value in SBW 102 is replaced by the value in SBC 92 when SBC exceeds SBW, and the value in SDC 90 replaces the value in SDW 100 and the value in REF 60 replaces the value in PSN 62. This is effected by the microprocessor 51 during state 14.

1. CHUTE MEMORY

All chute handler data and data access pointers reside in four memories, namely, CMEM 20, QTLF 22, SPM 24, and PMEM 26. These memories are filled with appropriate data and address pointers by the microprocessor 10 prior to initiation of the chute handler operation. An address register LFMAR 28 is also filled by microprocessor 10 with an initializing value which is the address of the first data item in QTLF to be processed by the chute handler 16.

(a) Components CMEM

The CMEM memory 20 is a 4K × 14 bit (K = 1024) random access memory (RAM), preferably fourteen Intel Device No. 2147, for storing the chute array element values transferred from the microprocessor 10. The CMEM memory 20 is preferably a 64 × 64 word array having 64 chutes, each chute having 64 words. The memory storage word format is illustrated in FIG. 4(a), namely a 14-bit word having bits 7 through 13 containing the value for each data value element of the chute, while bits 6 through 0 contain the brightness value associated with the corresponding chute element. Each word in the memory is addressable by a 12-bit number formed by the concatenation of the value stored in QTR register 30 as the 6 MSBs, which contains the number of the chute being processed, the value stored in stack pointer register SPR 32 as the 6 LSBs, which "points" to the word location in a given chute that is to be accessed. Chute memory data values and associated brightness values are loaded from the microprocessor 10 via the data bus 31 prior to chute handler operation.

(b) QTLF

The QTLF memory 22 is a conventional 1K × 16 bit, preferably four Intel Device No. 2114 (RAM) and each storage word in QTLF contains the chute addresses that define the upper and lower chutes that define one complete array to CMEM 20. The QTLF 22 13-bit word format is illustrated in FIG. 4(b). Bit 12 contains the CONT flag which is set to 1 by the microprocessor 10 in all entries of QTLF 22, except the last when it is set to 0 to indicate the final entry. Bits 11 through 6 contain MAX, the address of the first chute in the CMEM 20 array, and bits 5 through 0 contain MIN, the address of the last chute in the array. QTLF 22 contains 64 words of storage, the maximum possible number of arrays that can be stored in CMEM 20.

The value of MAX is transferred to the QTR register 30, and the value of MIN is transferred to the MIN register 34 by the chute handler 16. The value in QTR 30 is utilized, then decremented until the value in QTR 30 equals the value in MIN 34. At such time all top-of-chute values have been scanned. The MIN register 34 is a conventional octal D-type flip/flop, preferably Texas Instruments' Device No. 74LS377. The LFMAR register 28, which is a conventional 4-bit counter, preferably two Texas Instruments' Devices No. 25LS2569, serves to address QTLF 22. The LFMAR register 28 is then decremented by 1 to step the chute handler 16 through the storage words in the QTLF register 22, and thus the arrays in CMEM 20.

(c) SPM

The stack pointer memory, SPM 24, is a conventional 2K × 16 bit RAM, preferably two Intel Devices No. 2114-2, where each storage word, addressed by QTR 30, points to one more than the next data value in a CMEM 20 chute to be processed by the chute handler 16.

(d) PMEM

The pocket memory PMEM 26 is a conventional 2K × 16 bit RAM, preferably four Intel Devices No. 2114, that contains the corresponding pocket for each of the 64 chutes in CMEM 20. The 15-bit PMEM 26 word format is illustrated in FIG. 4(c). Bit 14 of the word contains the pocket empty (PE) flag that indicates to the dimness generator 18 whether a value exists in the pocket of the chute being processed. If the value in bit location 14 is 1, the pocket is empty; conversely, if bit 14 is 0, a pocket value exists. Bits 13 through 7 contain the pocket data value, and bits 6 through 0 contain the brightness value corresponding to the data value contained in bits 13 through 7.

2. CHUTE HANDLER

The basic function of the chute handler is to empty the chutes in a sequential order and provide the top-of-chute data value and associated brightness, the corresponding pocket data value and associated brightness, and a most positive data value reference to the dimness generator for each iteration of chute processing. In addition, the chute handler provides operation control flag to the dimness generator.

Components (a) SPR

Stack pointer register SPR 32 is a conventional 8-bit counter register, preferably two Advanced Microproducts' Devices No. 25LS2569, that contains a value that "points" to the next data value to be processed in a chute. The SPR register 32 is filled by the SPM memory 24 via the SPM bus 25. Each data value in a CMEM 20 chute is identified in turn by decrementing SPR 32. When the value contained in SPR 32 equals 0 for a particular chute, all data values in that chute have been processed.

(b) QTR

The QTR register 30 is an 8-bit register counter, preferably two Advanced Microproducts' Devices No. 25LS2569, that contains a value that points to the next chute to be processed. The QTR register 30 is filled by the QTLF memory 22 via data bus 31. Each chute in a CMEM 20 array is identified by decrementing the value in QTR 30. When QTR equals MIN, all chutes in a particular CMEM array 20 have been processed. The QTR register 30 also serves as the address register for SPM 24 and contains the most significant bits of each CMEM 20 address.

(c) MIN

The MIN register 34 is an octal D-type flip/flop, preferably Texas Instruments' Device No. 74LS377, that contains the address of a chute in CMEM 20 that denotes the lower chute limit of a CMEM 20 array. The value in QTR 30, as decremented, is compared to the value in MIN 34, and coincidence therewith indicates that all of the chutes of a CMEM 20 array have been processed. MIN 34 is loaded from QTLF 22 via data bus 31.

(d) COMP2

COMP2 36 is an 8-bit comparator, preferably Advanced Microproducts' Device No. 25LS2521, which is of the type that provides an output only when the quantities being compared are equal. COMP2 36 detects when QTR 30 and MIN 34 are equal, thus indicating that all chutes have been processed. COMP2 36 is loaded from QTR 30 via the MAR bus 37 and directly from the MIN register 34.

(e) XPOC, PE

XPOC, PE 40 is an octal D-type flip/flop, preferably two Texas Instruments' Devices No. 74LS377, containing pocket data corresponding to the chute currently being processed. The most significant bit of XPOC 40 is the pocket empty (PE) flag. XPOC 40 is the register that provides each pocket data value, the corresponding brightness and the PE flag to the dimness generator 18 required for particular chute processing by the dimness generator 18. XPOC 40 is loaded by CMEM 20 via the data bus 31.

(f) XTOS

XTOS 42 is an octal D-type flip/flop, preferably two Texas Instruments' Devices No. 74LS377, that contains the data value and associated brightness existing in the top of the chute being processed. XTOS 42 is loaded by CMEM 20 via data bus 31. XTOS 42 provides, for each particular chute, the chute data values and associated brightness to the dimness generator 18 used for dimness generator calculations.

(g) EMQS

The EMQS register 44 is an octal D-type flip/flop, preferably two Texas Instruments' Devices No. 74LS374, that contains the data value portion of a CMEM 20 data word without the associated brightness. The value in EMQS 44 is utilized to find the largest data value in the tops of the chutes. EMQS 44 is loaded from CMEM 20 via data bus 31.

(h) NEXTREF

The NEXTREF register 46 is an octal D-type flip/flop, preferably two Texas Instruments' Devices No. 74LS374, that contains the largest top-of-chute value yet detected. NEXTREF 46 is initialized to a value of −64 which guarantees that on the first compare operation performed by comparator (COMP1) 48, EMQS 44 will always have a value greater than that existing in NEXTREF 46. This ensures that the first top-of-chute value processed is placed in the NEX- TREF register 46. NEXTREF 46 is initialized directly by means of a non-inverting octal tri-state buffer amplifier 47, preferably Texas Instruments' Device No. 74LS244, to an initial value of "−64" via NEXTREF bus 49. The value of "−64" is derived from buffer amplifier 47 whose input is permanently wired to produce an output of −64. NEXTREF 46 is loaded directly by the EMQS register 44 only when the value in EMQS 44 exceeds that which exists in NEXTREF 46.

(i) COMP1

COMP1 is an 1-bit comparator, preferably two Texas Instruments' Devices No. 74LS85, that compares the values in EMQS 44 and NEXTREF 46 and causes the value in EMQS 44 to be loaded into NEXTREF 46 when the value in EMQS 44 exceeds that value which exists in NEXTREF 46.

(j) XREF

The XREF register 50 is an octal D-type flip/flop, preferably Texas Instruments' Device No. 74LS374, that contains the most positive value in the tops of the chutes. XREF 50 is loaded from NEXTREF 46 after the scan of all chutes is complete. XREF 50 provides the dimness generator with said most positive value which is used in dimness generator calculations.

Flags

All the flags are generated at the output of dual D-type flip/flop, preferably Texas Instruments' Device No. 74LS374A.

(a) SE

The SE flag, the output of flip/flop (f/f) 110, which is set to 1 by the microprocessor 21 when the value in SPR=0, serves to indicate that all the data values in a chute have been processed.

(b) EQ

The EQ flag, the output of f/f 112, is set to 1 by microprocessor 21 when a pocket value and the corresponding top-of-chute value are equal.

(c) QTRMIN

QTRMIN is the output of f/f 114 and is set to 1 by microprocessor 21 when the value in QTR 30 is equal to the value in MIN 34, thus indicating that the chute handler has complete one scan of the chutes in a CMEM 20 array.

(d) CHRDY

CHRDY, the output of f/f 116, is set to 1 by microprocessor 21 to indicate that the data in XPOC 40, XTOS 42 and XREF 50 are ready for transfer to and processing by the dimness generator 18.

(e) CHDONE

CHDONE, the output of f/f 118 is set to 1 by microprocessor 21 to indicate to the dimness generator 18 that the chute handler 16 has completed processing a CMEM 20 array.

(f) CONT

CONT, the output of f/f 120, which is also bit 12 of the QTLF data word, is set by microprocessor 10 to 1 when more data arrays are to be processed in CMEM 20 and, conversely, when CONT is cleared to 0 by microprocessor 10, no more arrays remain to be processed.

(g) CEMPTY

CEMPTY, the output of f/f 122, is set by microprocessor 21 to 1 when all entries in CMEM 20 have been processed. CEMPTY places the chute handler 16 in an idle mode until CMEM 20 is reloaded with a new set of data arrays by microprocessor 10. Microprocessor 10 then clears CEMPTY to 0 to indicate that the chute handler 16 is to begin operation.

3. DIMNESS GENERATOR

The dimness generator 18 receives data from the chute handler 16 for each data array processed. Such data consists of the top-of-chute data value and associated brightness, the pocket data value and associated brightness, and the most positive reference data value for each chute processed. The dimness generator forms the absolute difference values between the reference data value and both the top-of-chute data value and pocket data value for each chute. It then finds the minimum sum of such absolute difference values for all chutes. In addition the dimness generator sums the brightness values corresponding to the data values used to form the absolute difference values.

Components (a) POC1

The POC1 register 52 is an 8-bit octal D-type flip/flop register, preferably Texas Instruments' Device No. 74LS374, that contains the brightness value associated with the data value in POC2 54. POC1 52 is loaded from register XPOC 40.

(b) POC2

The POC2 register 54 is an 8-bit octal D-type flip/flop register, preferably Texas Instruments' Device No. 74LS374, that contains the pocket data value of the chute being processed. POC2 54 is loaded directly from XPOC 40.

(c) TOS1

The TOS1 register 56 is an 8-bit octal D-type flip/flop register, preferably Texas Instruments' Device No. 74LS374, that contains the brightness value associated with the data value in the TOS2 register 58. The TOS1 register 56 is loaded directly from the XTOS register 42.

(d) TOS2

The TOS2 register 58 is an 8-bit octal D-type flip/flop register, preferably Texas Instruments' Device No. 74LS374, that contains the top-of-chute data value of the chute being processed. The TOS2 register 58 is loaded directly from the XTOS register 42.

(e) REF

The REF register 60 is an octal D-type flip/flop register, preferably Texas Instruments' Device No. 74LS377, that contains the most positive top-of-chute reference data value for the current top-of-chute scan. The REF register 60 is loaded directly from the XREF register 50.

(f) PSN

The PSN register 62 is an octal D-type flip/flop register, preferably Texas Instruments' Device No. 74LS377, which contains the most positive top-of-chute data reference associated with the minimum dimness sum. The PSN register 62 is loaded directly from the REF register 60.

(g) PW

The PW register 64 is an octal D-type flip/flop register, preferably Texas Instruments' Device No. 74LS374, which contains a limit value that restricts the maximum allowable difference between the reference data value stored in the REF register 60 and the POC2 register 54 and the TOS2 register 58 to a predetermined value. The PW register 64 is loaded directly from the microprocessor 10.

(h) QS

The QS register 66 is an octal D-type flip/flop register, preferably Texas Instruments' Device No. 74LS377, that contains a value that represents the number of data values in a query. It is loaded directly from the microprocessor 10 and is used in the dimness calculation whenever the difference between the value in REF register 60 and the POC2 register 54 and TOS2 register 58 exceeds the value in the PW register 64.

(i) MULTIPLEXER (MUX) 68

The multiplexer (MUX) 68 is a 14-line to 7-line multiplexer, preferably two Texas Instruments' Devices No. 74LS157, conditionally transferring the output of either the POC1 register 52 or the TOS1 register 56 to the input of a temporary storage register 70. The conditional transfer is determined by microprocessor 51.

(j) E1

The E1 register 70 is an octal D-type flip/flop register, preferably Texas Instruments' Device No. 74LS374, that provides intermediate storage for the contents of the POC1 52 or TOS1 56 registers.

(k) MULTIPLEXER (MUX) 72

The multiplexer (MUX) 72 is a 28-line to 7-line multiplexer, preferably four Texas Instruments' Devices No. 74LS253, conditionally transferring the contents of the QS register 66, the contents of a temporary storage register (DI) 74, the output of an arithmetic logic unit (ALU1) 76, and the output of an arithmetic logic unit (ALU2) 78, to a temporary storage register (DR) 80. The conditional transfer is determined by microprocessor 51.

(1) DR

The DR register 80 is an octal D-type flip/flop register, preferably Texas Instruments' Device No. 74LS374, that serves as a temporary storage register that holds the minimum difference calculation between the REF register 60 value and the POC2 register 54 and TOS2 register 58 values. The DR register 80 is loaded directly by either the output of MUX 72 or the output of a temporary storage register D2 82.

(m) MULTIPLEXER (MUX) 84 The multiplexer (MUX) 84 is a 19-line to 12-line multiplexer, preferably Texas Instruments' Device No. 74LS157, that conditionally transfers the output of the REF register 60 or the output of a sum-of-difference candidate (SDC) register 90 to ALU1 76. Transfer is determined by microprocessor 51.

(n) MULTIPLEXER (MUX) 86

The multiplexer (MUX) 86 is a 19-line to 12-line multiplexer, preferably Texas Instruments' Device No. 74LS157, that conditionally transfers the output of the REF register 60 or the output of a sum-of-brightness candidate (SBC) register 92 to ALU2 78. Transfer is determined by microprocessor 51.

(o) MULTIPLEXER (MUX) 88

THe multiplexer (MUX) 88 is a 19-line to 12-line multiplexer, preferably Texas Instruments' Device No. 74LS157, that conditionally transfers the output of the SBC register 92, the output of the D1 register 74, or the output of the DR register 80 to one input of a comparator COMP2 94. Transfer is determined by the microprocessor 51.

(p) COMP1

The comparator (COMP1) 96 is a 12-bit comparator, preferably three Texas Instruments' Devices No. 74LS85, that compares the output of the POC 1 register 52 to the output of the TOS1 register 56 and the output of the SDC register 90 to the output of a sum-of-difference winner (SDW) register 100. The output 97 of COMP1 96 goes to microprocessor 51.

(q) COMP2

The comparator (COMP2) 94 is a 12-bit comparator, preferably three Texas Instruments' Devices No. 74LS85, that compares the output of the D1 register 74 to the output of the D2 register 82, the output of the DR register 80 to the output of the PW register 64, and the output of the SBC register 92 to the output of a sum-of-brightness winner (SBW) register 102.

(r) ALU1

The arithmetic logic unit 1 (ALU1) 76 is comprised of two conventional ALU function generators, preferably Texas Instruments' Device No. 74LS381, a 4-bit adder, preferably Advanced Microproducts' Device No. 25LS2517, and a look-ahead carry generator, preferably Texas Instruments' Device No. 74LS182. ALU1 76 forms the absolute value between the output of the POC2 register 54 and the output of the REF register 60. In addition, ALU1 76 sums the output of the SDC register 90 with the output of the DR register 80.

(s) ALU2

The arithmetic logic unit 2 (ALU2) 78 is comprised of a conventional ALU function generator, a 4-bit adder, and a look-ahead carry generator identical to the devices used in ALU1 76. ALU2 78 forms the absolute value between the output of the TOS2 register 58 and the output of the REF register 60. In addition, ALU2 78 sums the output of the E1 register 70 with the output of the SBC register 92.

(t) D1

The D1 register 74 is an octal D-type flip/flop register, preferably Texas Instruments' Device No. 74LS374, that provides temporary storage for the output of ALU1 76, which is the difference between the value in the REF register 60 and the value in the POC2 register 54.

(u) D2

The D2 register 82 is an octal D-type flip/flop register, preferably Texas Instruments' Device No. 74LS374, that provides temporary storage for the output of ALU2 78, which is the difference between the value in the REF register 60 and the value in the TOS2 register 58.

(v) SDC

The sum-of-difference candidate (SDC) register 90 is an octal D-type flip/flop register, preferably Texas Instruments' Device No. 74LS374, that contains the accumulated sum of the absolute values of the differences found between the output of the REF register 60 and the outputs of the POC2 register 54 and TOS2 register 58 for a particular top of the chute scan. SDC 90 is loaded directly from ALU1 76.

(w) SBC

The sum-of-brightness candidate (SBC) register 92 is an octal D-type flip/flop register, preferably Texas Instruments' Device No. 74LS377, that contains the accumulated sum of the brightness values associated with the sum in SDC 90 for a given chute scan. The SBC register 92 is loaded directly from ALU2 78.

(x) SDW

The sum-of-difference winner (SDW) register 100 is an octal D-type flip/flop register, preferably Texas Instruments' Device No. 74LS374, that contains the minimum difference sum determined by the data processor 12 after all processing steps have been completed. The SDW register 100 is loaded directly by the SDC register 90.

(y) SBW

The sum-of-brightness winner (SBW) register 102 is an octal D-type flip/flop register, preferably Texas Instruments' Device No. 74LS374, that contains the largest brightness sum associated with the value in the SDW register 100. The SBW register 102 is loaded directly by the SBC register 92.

Flags

All the flags are generated at the output of dual D-type flip/flop, preferably Texas Instruments' Device No. 74LS374.

(a) LOOP

The LOOP flag, the output of flip/flop (f/f) 122, is set to the complement of QTRMIN which is provided by the chute handler 16. When the LOOP flag is cleared, a top of the chute scan has been completed.

(b) DGDONE

The DGDONE flag, the output of f/f 124, is set to the value of the CHDONE flag by microprocessor 21 in chute handler 16. The DGDONE flag is cleared by microprocessor 10 to indicate that microprocessor 10 has received the output data from dimness generator 18.

C. DETAILED OPERATIONAL DESCRIPTION OF THE CHUTE HANDLER AND DIMNESS GENERATOR

1. GENERAL

The dimness generator 18 and chute handler 16 work both serially and in parallel to accomplish their processing tasks. More specifically, the chute handler 16 extracts sets of data values from the chute memory CMEM 20 in a manner to be described below and passes the data values on to the dimness generator 18 for the calculation of the dimness and brightness values. While the chute handler 16 is obtaining subsequent sets of data values from CMEM 20, the dimness generator 18 processes the data values fed to it just prior by the chute handler 16. Chute handler 16 operation is suspended while microprocessor 10 fills the chute memory CMEM 20 with data to process. When the chute filling operation is complete, the microprocessor 10 signals the chute handler 16 to begin operation. When the chute handler 16 has processed the last data value stored in CMEM 20, it is maintained in an idle mode by microprocessor 10 until a new data array is transferred into CMEM 20 by microprocessor 10.

Dimness generator 18 operation is suspended until microprocessor 10 clears flag DGDONE, thus indicating that the microprocessor 10 has accepted the last formed dimness and brightness values from the dimness generator 18. At this time, the dimness generator 18 clears flags CHDONE, sets flag PASS1, initializes the SDC 90 and SBC 92 registers to zero, and then enters an idle mode until the chute handler 16 indicates that a set of data values is available for dimness generator 18 processing. The dimness generator 18 continues to process data sets supplied by the chute handler 16 until all data values in CMEM 20 have been processed by the chute handler 16. At this time, the output of the dimness generator 18 is made available to microprocessor 10 and is maintained in an idle mode until the microprocessor 10 indicates that all data provided by the dimness generator 18 has been received.

(a) CHUTE HANDLER OPERATION

Figure 5A:
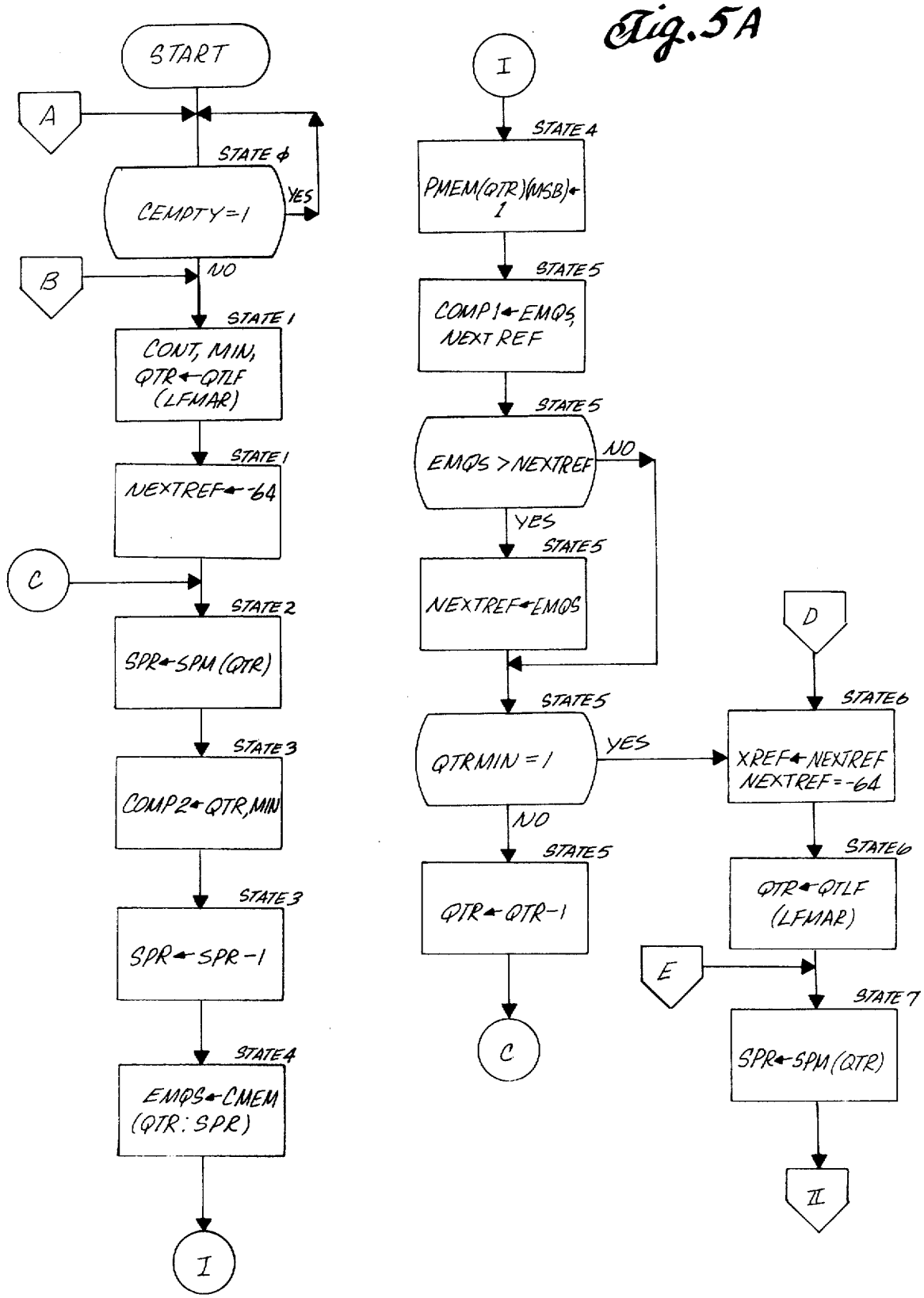
Figure 5B:
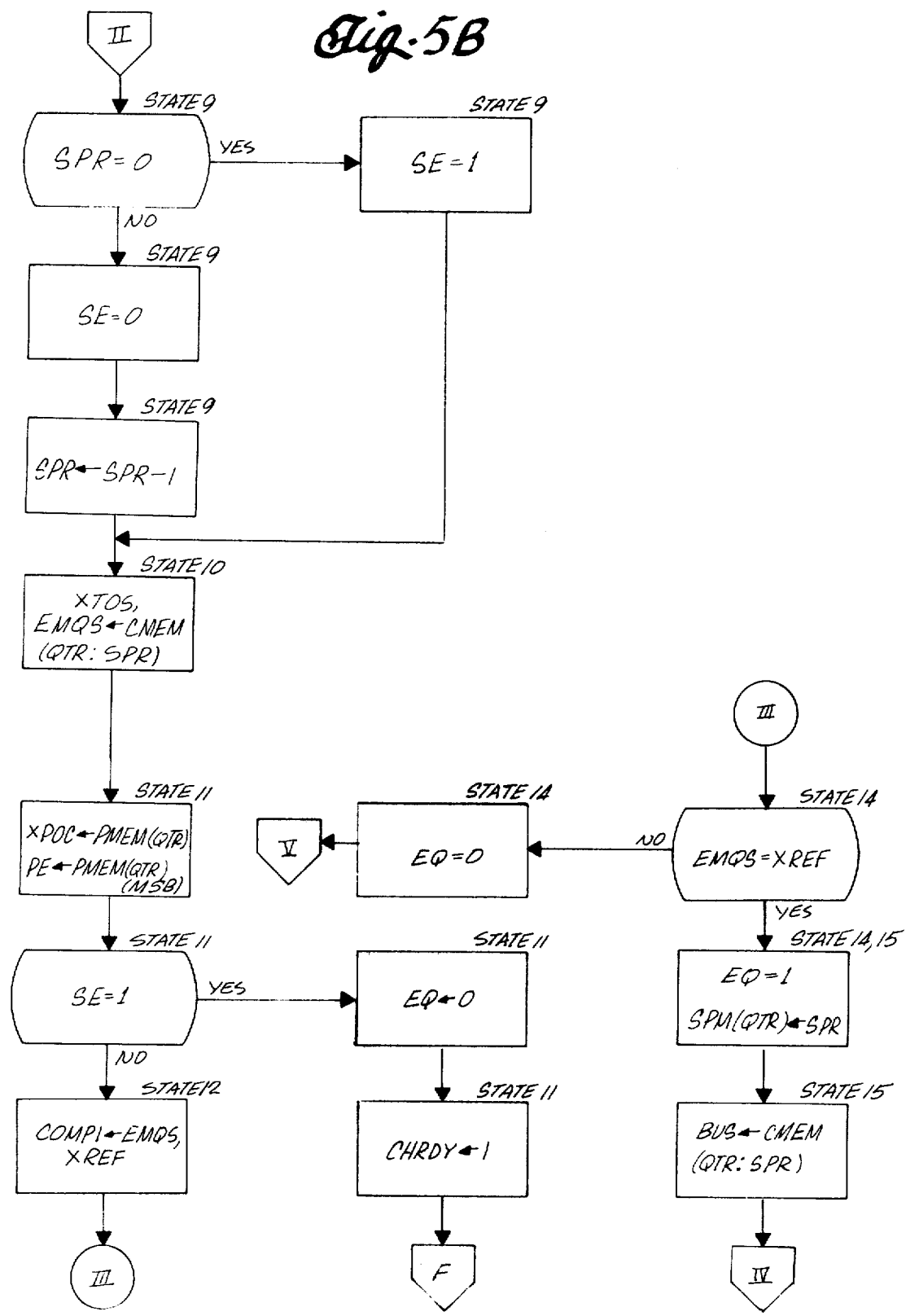

Table 4 contains the program listing of logical equations that describe the operation of the chute memory and chute handler modules. FIGS. 5a through 5c show the flow charts illustrating the sequence of operations for each state described in Table 4 and should be referred to in the following discussion.

Power-On Processing

When power is first applied at system turn-on, a power-on preset line is brought low by microprocessor 10 which forces the chute handler to state 0 (wait state). The microprocessor 10 holds the power-on preset line low while it fills the chute memory CMEM 20 with the first data value arrays to process. When this task is complete, the microprocessor 10 pulls the power-on preset line high, which allows the chute handler 16 to begin processing.

Normal Processing

Microprocessor 21 implements a series of chute handler 16 controls provided by a preprogrammed read only memory (ROM) that effects the chute handler 16 operational states. Microprocessor 21 remains in an idle state as long as the CEMPTY flag is set to 1. Microprocessor 10 clears the CEMPTY flag to 0 when the array transfer from microprocessor 10 to the chute memory CMEM 20 is complete. When flag CEMPTY is cleared, microprocessor 21 accesses the QTLF 22 data word addressed by the value in LFMAR 28 (state 1), storing field CONT into flag CONT, field MAX into QTR 30, and field MIN into MIN 34. This series of operations specifies the particular data array in CMEM 20 that the chute handler 16 is to process.

The first major task that microprocessor 21 has to accomplish is the detection of the first most positive data value presently in the tops of the chutes. To do this, microprocessor 21 initializes NEXTREF 46 to a value of −64 (state 1). This ensures that the first top-of-chute data value encountered will be larger than the value in NEXTREF, and thus will be stored in NEXTREF 46 for subsequent comparison with the other top-of-chute data values. Microprocessor 21 next iterates the controls specified to be executed in states 2 through 5 for each chute of the data value array in CMEM 20 being processed. Microprocessor 21 accesses the SPM 24 data word addressed by the value in QTR 30, storing the data in SPR 32 (state 2). The data value in the QTRth data word of SPM 24 is the address pointer into the QTRth chute of CMEM 20 that points to the SPRth chute data value to be accessed, plus 1. The chute data value to be accessed is defined as the top-of-chute data value. Next, the values in QTR 30 and MIN 34 are stored in comparator COMP2 36 (state 3) for subsequent testing in state 5. The purpose of this comparison is to detect when the value in QTR 30 (as decremented) equals the value in MIN 34, indicating that all tops-of-chute values have been accessed. The microprocessor 21 then decrements the value in SPR 32 by 1 (state 3), so that this value now points to the QTRth top-of-chute data value. The value in bits 13-7 of the CMEM 20 word addressed by the concatenated values in QTR 30 and SPR 32 is stored in EMQS 44 (state 4). The value in QTR 30 (the six MSBs of the CMEM 20 address) locates the chute being processed, and the value in SPR 32 (the six LSBs of the CMEM 20 address) locates the particular top-of-chute data value. The value in EMQS 44 is now the top-of-chute data value to be compared to the value in NEXTREF 46. The most significant bit (bit 14) of the PMEM 26 data word addressed by the value in QTR 30 is now set to 1 (state 4). Bit 14 serves as the pocket empty (PE) flag. PE=1 indicates that the corresponding pocket does not contain a data value; PE=0 indicates that the corresponding pocket does contain a data value. The value in EMQS 44 and the value in NEXTREF 46 are placed in comparator COMP1 48 (state 5). The greater of these two values, as indicated by the output of COMP1 48, is stored in NEXTREF 46 (state 5). Microprocessor 21 next checks the condition of flag QTRMIN (state 5). The condition of QTRMIN is determined by the results of the comparison performed in state 3 between the value of QTR 30 and the value in MIN 34. If COMP2 indicates equality, QTRMIN is set to 1; otherwise, QTRMIN is set to 0. If the microprocessor 21 detects that QTRMIN=0, namely, that the value in QTR 30 is still greater than the value in MIN 34, i.e., that more top-of-chute values are to be accessed, then the value in QTR 30 is decremented by 1 so that it points to the next chute to process; and microprocessor 21 control returns to state 2 to access the next top-of-chute value. If microprocessor 21 detects that QTRMIN=1 (all chutes have been processed), the value in NEXTREF 46 is stored in XREF 50 (state 6). The value in XREF 50 is the most positive top-of-chute value encountered, since this value has been compared with all other top-of-chute values in COMP1 48. This completes microprocessor 21 processing to detect the first most positive reference values. A value of −64 is then stored in NEXTREF 46 (state 6) as the first step in finding subsequent top-of-chute values to serve as the most positive reference value. Note that each data value in the CMEM 20 array being processed serves, in descending order of value, as one of the most positive reference values.

The microprocessor 21 accesses the QTLF 22 data word addressed by the value in LFMAR 28, and stores field MAX in QTR 30 (state 6). This serves to reselect the first chute of the CMEM 20 data array to allow microprocessor 21 to begin chute processing. The microprocessor 21 then accesses the SPM 24 data word addressed by the value in QTR 30, and stores the data into SPR 32 (state 7). The SPR register 32 is then checked by microprocessor 21 to see if the value it now contains is equal to 0 (state 9). If so, it means that all data values in the QTRth chute in CMEM 20 have been processed, and that the chute is now "empty", and microprocessor 21 sets flag SE to 1, to indicate such a condition. Otherwise, the microprocessor 21 sets flag SE to 0 (state 9), and microprocessor control is transferred to state 10. The value in SPR is decremented by 1 (state 9) so that it points to the top-of-chute data value in the QTRth chute. The CMEM 20 data word, addressed by the concatenated values in QTR and SPR, is accessed (state 10) and:

(a) the values in bits 13-7 are stored in EQMS 44.
(b) the values in bits 13-0 are stored in XTOS 42. The PMEM 26 data word addressed by the value in QTR 30 is accessed, and the values in bits 13-0 are stored in XPOC 40 (state 11), and the value in bit 14 is stored in PE (state 11), which is the remainder of the word in XPOC 40. The microprocessor 21 then checks flag SE (state 11). If SE equals 1, indicating that all data values in the QTRth chute have been processed, flag EQ is set to 0 (state 11) to indicate that the QTRth top-of-chute data value cannot be equal to the QTRth pocket data value (since the chute is "empty" and the pocket must contain a data value from a previous iteration of chute processing). The logic of this condition is as follows:

(a) Normally all chutes initially contain at least one data value, so that the value in SPR 32, the address pointer of the value in the chute, must be greater than 0.
(b) For the value in SPR to equal 0 (and hence for SE=1 and EQ=0), at least one data value in that chute must have been processed and moved into the QTRth pocket. Thus, a pocket data value must exist in the QTRth pocket when the pointer into the QTRth chute (the value in SPR 32) is 0. Flag CHRDY is then set to 1 (state 11) to indicate that the values in XREF 50, XTOS 42, and XPOC 40 are available for processing by the dimness generator 18.

Conversely, if SE=0 (state 11), the values in EMQS 44 and XREF 50 are placed in comparator COMP1. If microprocessor 21 detects that the value in EMQS does not equal the value in XREF (state 14), then flag EQ is set to 0, and microprocessor 21 control is transferred to state 18. If microprocessor 21 detects that the value in EMQS 44 equals the value in XREF 50, flag EQ is set to 1 (state 14). When the value in EMQS 44, and thus the data value in the QTRth top-of-chute equals the value in XREF 50, the value presently in XREF 50 is indicated as being taken from this top-of-chute data value, and thus that this data value must be moved into the corresponding pocket. The microprocessor 21 next stores the value in SPR 32 back into the SPM 24 data word addressed by the value in QTR 30 (state 15). This is done so that when this particular data word of SPM 24 is again stored in SPR 32 and decremented, the resulting value in SPR 32 will point to the data value in the QTRth chute that is next in succession to be processed (since the previous data value has been moved into the corresponding pocket).

The data word in CMEM 20 addressed by the concatenation of the values of QTR 30 and SPR 32 is accessed by microprocessor 21, and the values in bits 13-0 of the data word are stored on the data bus 31 (state 15). Bus contents are then stored in the data word of PMEM 26 addressed by the value in QTR 30 (state 16). Bit 14 (MSB) of the QTRth data word in PMEM 26 (flag PE) is then set to 0 (state 16) to indicate that the pocket of the QTRth chute contains a data value. The microprocessor 21 checks the value in SPR 32 (state 16). If the value is 0, indicating an empty chute, flag CHRDY is set to 1 (state 16) to indicate that the values in XREF 50, XTOS 42, and XPOC 40 are available for processing by the dimness generator 18. If the value in SPR 32 is not 0, this indicates that more data values remain to be processed in the QTRth chute, so the value in SPR 32 is decremented by 1 to point to the next top-of-chute data value (state 16).

The microprocessor 21 stores the values in bits 13-7 of the CMEM 20 data word addressed by the concatenation of the values in QTR 30 and SPR 32 into EMQS (state 17). Flag CHRDY is set to 1 by microprocessor 21 (state 18) to indicate that the values in XREF 50, XTOS 42, and XPOC 40 are available for processing by the dimness generator 18. Next, the value in EMQS 44 and the value in NEXTREF 46 are placed in COMP1 48. If microprocessor 21 detects that the value in EMQS 44 is larger than the value in NEXTREF 46 (state 18), then it stores the value in EMQS 44 into NEXTREF 46 (state 18). The value in NEXTREF 46 and the value of −64 loaded by means of buffer amplifier 47 are placed in comparator COMP1 48 (state 19) in preparation for the test in state 21. Also, the value in QTR 30 and the value in MIN 34 are placed in comparator COMP2 36 (state 19) in preparation for the test in state 21.

The microprocessor 21 checks the condition of flag CHRDY (state 20). If flag CHRDY=1, indicating that the dimness generator has not yet transferred the data available in XREF 50, XTOS 42, and XPOC 40, microprocessor 21 control remains in state 20. When flag CHRDY=0, having been cleared to 0 by dimness generator 18 processing, microprocessor 21 checks the status of flag QTRMIN (state 21). If QTRMIN=0, indicating that more chutes remain to be processed, microprocessor 21 decrements the value in QTR 30 by 1 (state 21), and microprocessor 21 control returns to state 7 to process the next chute. If QTRMIN=1, indicating that all tops-of-chutes have been processed, microprocessor 21 checks the value of NEXTREF 46 (state 21). If the value in NEXTREF is −64, no new data values were found in CMEM 20, and thus all data values have been processed (state 21). If the value in NEXTREF 46 is greater than −64, this means that at least one more data value remains in the CMEM 20 data array to be processed, in which case microprocessor 21 control returns to state 6 (state 21) to continue processing with a new XREF 50 value. Otherwise, the microprocessor 21 sets the CHDONE flag to 1 (state 21) to indicate to the dimness generator 18 that processing is complete for a given CMEM 20 array. The microprocessor 21 checks flag CONT (state 22). If CONT=0, indicating that the CMEM 20 array just processed was the last array in CMEM, microprocessor 21 sets flag CEMPTY to 1, and microprocessor 21 control transfers to state 0 (state 22) to await refilling of CMEM 20 by microprocessor 10. Otherwise, the value in LFMAR 28 is decremented by 1 (state 22) so that it points to the next data array in CMEM 20 to process, and microprocessor 21 control is transferred to state 1 to process the next CMEM 20 data array.

(b) DETAILED DIMNESS GENERATOR OPERATION

Figure 6A:
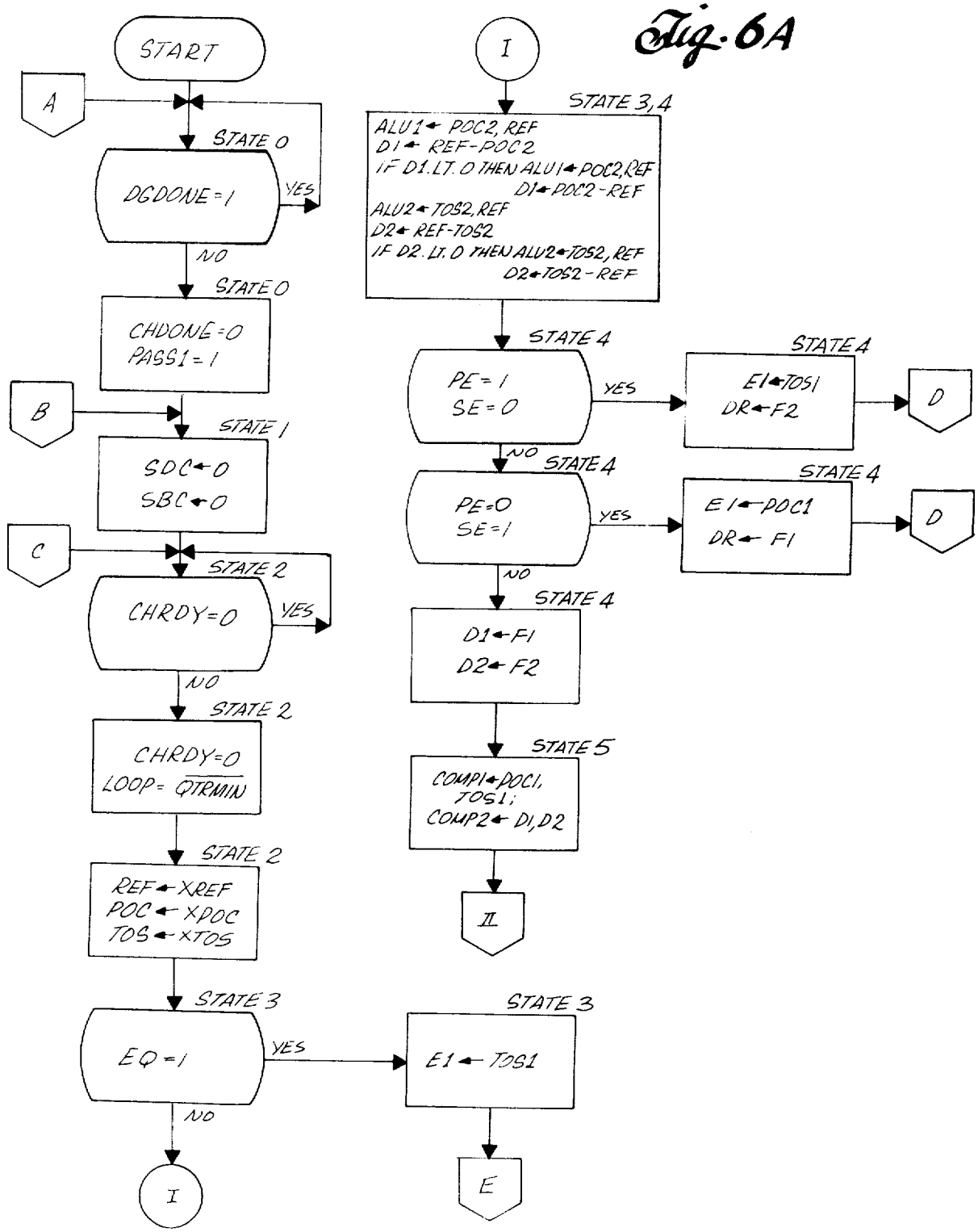
FIGS. 6(A)-6(B) are flow diagrams illustrating the sequence of operation of the dimness generator.
Figure 6B:
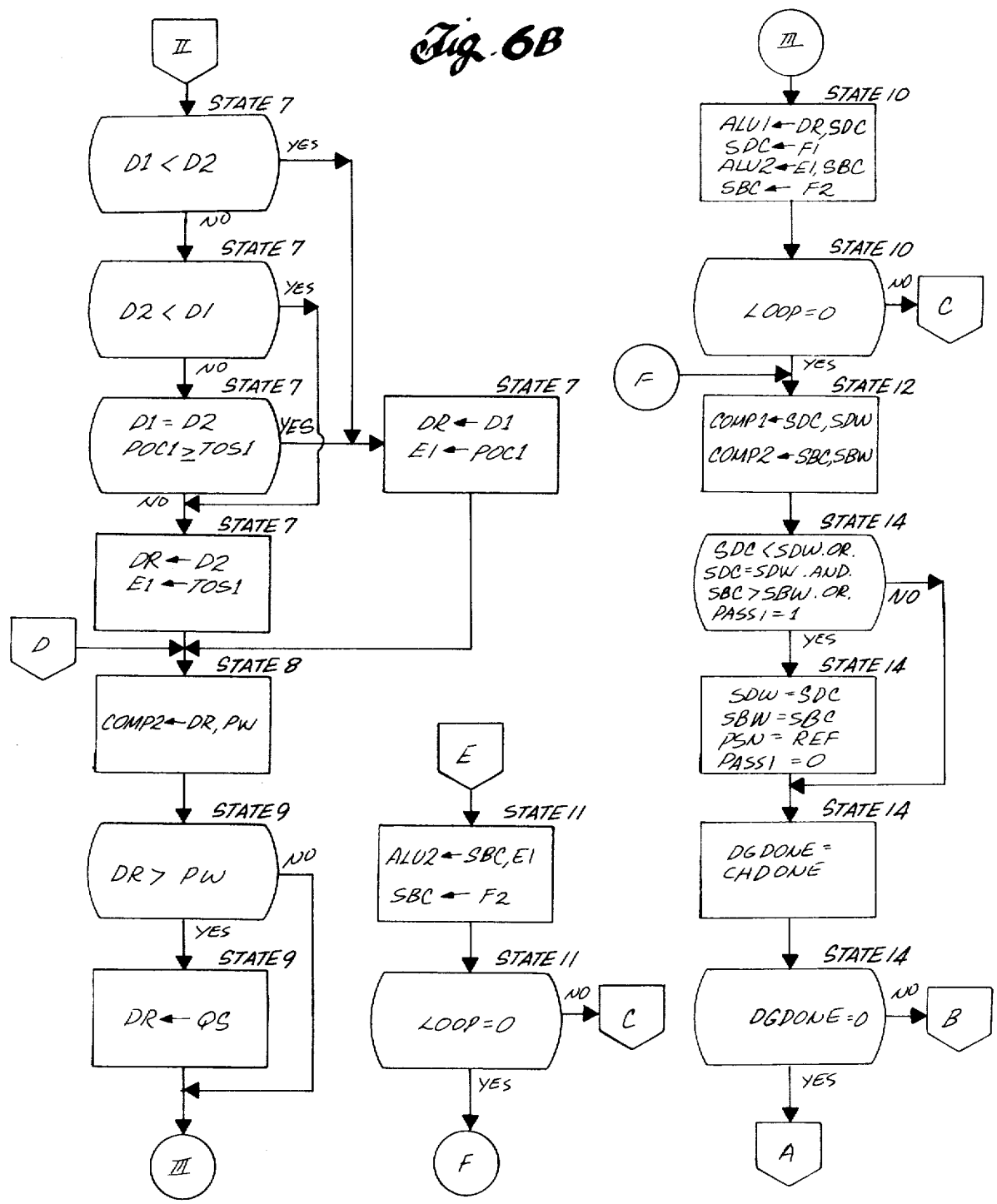
Figure 8:
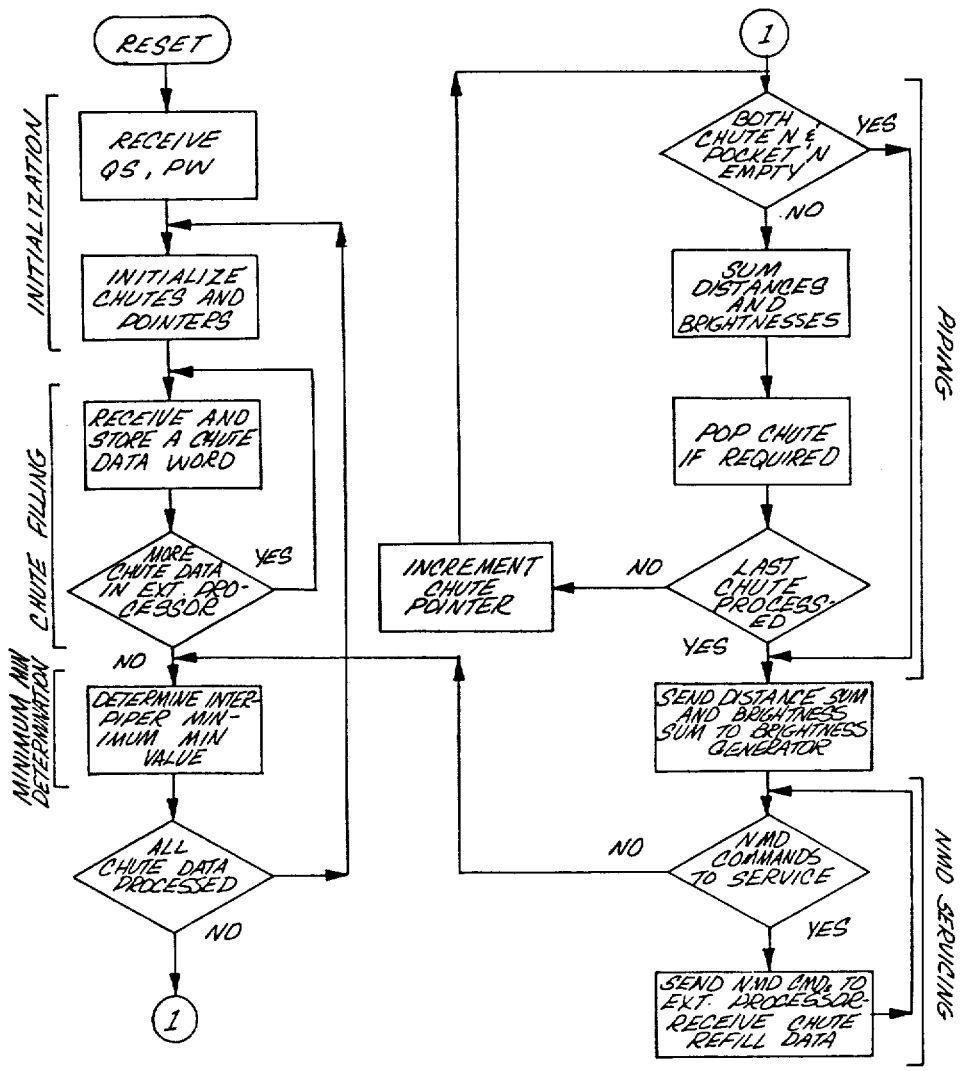

Table 5 contains the program listing of logical equations that describe the operation of the dimness generator module. FIGS. 6a and 6b show the flow charts illustrating the sequence of operations for each state described in Table 5 and should be referred to in the following discussion.

Power-on Processing

When power is first applied at system turn-on, a power-on preset line is brought low by microprocessor 10 which forces the dimness generator 18 to state 0 (idle state). The microprocessor 10 holds the power-on preset line low while it fills the chute memory CMEM 20 with the first data value arrays to process. When this task is complete, the microprocessor 10 pulls the power-on preset line high, which allows the dimness generator 18 to begin operation.

Normal Operation

Microprocessor 51 implements a series of dimness generator 18 controls provided by a preprogrammed read-only memory (ROM) that effects the dimness generator 18 operational states. Microprocessor 51 remains in an idle state as long as the DGDONE flag is set to 1. Microprocessor 10 clears the DGDONE flag to 0 after it has received the last formed dimness and brightness values from the dimness generator 18. When flag DGDONE is cleared (state 0), microprocessor 51 sets flag CHDONE to 0 to indicate to the chute handler 16 that the dimness generator 18 is ready to process data. Microprocessor 51 also sets flag PASS1 to 1 (state 0) to indicate that the dimness generator 18 is ready for its first processing pass on new data from the chute handler 16. Microprocessor 51 next sets the values in SDC 90 and SBC 92 to 0 to prepare for the accumulation by microprocessor 51 of difference values and brightness values in the processing below.

Microprocessor 51 checks the status of flag CHRDY. CHRDY=0 indicates to microprocessor 51 that the chute handler does not yet have data values ready for the dimness generator 18 to process. The dimness generator 18 remains in an idle mode (state 2) until flag CHRDY is set to 1 by the chute handler 16. When microprocessor 51 detects that flag CHRDY equals 1, indicating that the chute handler 16 has data values for the dimness generator 18 to process, the microprocessor 51 resets CHRDY to 0 (state 2) to indicate to the chute handler 16 to resume processing of the top-of-chute values in CMEM 20. Microprocessor 51 also sets flag LOOP to the complement of flag QTRMIN. LOOP=0 (QTRMIN=1) indicates that the chute handler 16 has completed one pass through the top-of-chute values in CMEM 20, allowing the dimness generator 18 to update the dimness and brightness registers SDW 100 and SBW 102 after a test of flag LOOP in state 10.

Following the setting of flag LOOP (state 2), microprocessor 51 stores the data value in XREF 50 into REF 60; the data value and associated brightness value in XPOC 40 into POC2 54 and POC1 52, respectively; and the data value and associated brightness value in XTOS 42 into TOS2 58 and TOS1 56, respectively (state 2). Microprocessor 51 next checks flag EQ. If flag EQ=1 (state 3), indicating that the top-of-chute value in TOS2 58 and the pocket value in POC2 54 both equal the most positive reference value in REF 60, the brightness associated with TOS2 58, namely, TOS1 56, is stored in E1 70, and microprocessor 51 control is transferred to state 11. If EQ=0, indicating that the values in TOS2 58 and REF 60 are not equal, then microprocessor 51 does the following (states 3 and 4):

(a) forms the absolute value of the algebraic difference between the value in TOS2 58 and the value in REF 60.

(b) forms the absolute value of the algebraic difference between the value in POC2 54 and the value in REF 60.

Microprocessor 51 next checks the condition of flags PE and SE as follows (state 4):

(a) If PE=1 and SE=0, indicating that POC2 54 is empty and TOS2 58 contains a data value, then the value in TOS1 56, the brightness associated with the data value in TOS2 58, is stored in E1 70, and the absolute value of the algebraic difference between the value in TOS2 58 and the value in REF 60 is stored in DR 80. Microprocessor control is then transferred to state 8.

(b) If PE=0 and SE=1, indicating that POC2 54 contains a data value and TOS2 58 is empty, then the value in POC1 52, the brightness associated with the data value in POC2 54, is stored in E1 70, and the absolute value of the algebraic difference between POC2 54 and REF 60 is stored in DR 80. Microprocessor control is then transferred to state 8.

(c) If PE=0 and SE=0, indicating that both POC2 54 and TOS2 58 contain data values, then the absolute value of the algebraic difference between POC2 54 and REF 60 is stored in D1 74, and the absolute value of the algebraic difference between TOS2 58 and REF 60 is stored in D2 82.

Microprocessor 51 next places the brightness associated with the data values in POC2 54 and TOS2 58, namely, POC1 52 and TOS1 56, into comparator COMP1 96 (state 5). Microprocessor 51 then places the values in D1 74 and D2 82 into comparator COMP2 94 (state 5). The outputs of COMP1 96 and COMP2 94 are tested as follows:

(a) If the value in D1 74 is less than the value in D2 82, then the value in D1 74 is stored in DR 80, and the value in POC1 52 is stored in E1 70.

(b) If the value in D2 82 is less than the value in D1 74, then the value in D2 82 is stored in DR 80, and the value in TOS1 56 is stored in E1 70.

(c) If the value in D1 74 equals the value in D2 82, and the value in TOS1 56 is greater than the value in POC1 52, then the value in D2 82 is stored in DR 80, and the value in TOS1 56 is stored in E1 70.

(d) If the value in D1 74 equals the value in D2 82, and the value in POC1 52 is greater than or equal to the value in TOS1 56, then the value in D1 74 is stored in DR 80, and the value in POC1 52 is stored in E1 70.

Microprocessor 51 places the value in DR 80 and the value in PW 64 into comparator COMP2 (state 8). If the value in DR 80 is greater than the value in PW 64, the value in QS 66 is stored in DR 80 (state 9). If the value in DR 80 is equal to or less than the value in PW 64, microprocessor control is transferred to state 10.

Microprocessor 51 next sums the value in DR 80 and the value in E1 70 into the accumulating registers SDC 90 and SBC 92, respectively (state 10). Then the condition of flag LOOP is checked. If LOOP=1, indicating that the chute handler 16 has not yet completed a scan of the top-of-chute values in the CMEM 20 array being processed, microprocessor 51 control transfers to state 2 to await the next set of data values from the chute handler 16. If LOOP=0, indicating that the chute handler 16 has completed one scan of the top-of-chute values in the CMEM 20 array being processed, microprocessor 51 places the values in SDC 90 and SDW 100 in comparator COMP1 96, and the values in SBC 92 and SBW 102 in comparator COMP2 94 (state 12). When microprocessor 51 control is transferred from state 3, microprocessor 51 sums the value in E1 70 into SBC 92 (state 11). Microprocessor 51 tests the outputs of COMP1 96 and COMP2 94 as follows (state 14):

(a) If the value in SDC 90 is greater than the value in SDW 100, or the value in SDC 90 equals the value in SDW 100 and the value in SBC 92 is less than or equal to the value in SBW 102 or flag PASS1=0, microprocessor 51 sets flag DGDONE to the condition of flag CHDONE.

(b) If the value in SDC 90 is less than the value in SDW 100, or the value in SDC 90 equals the value in SDW 100 and the value in SBC 92 is greater than the value in SBW 102, or flag PSS1=1, microprocessor 51 stores the value in SDC 90 into SDW 100, the value of SBC 92 into SBW 102, the value in REF 60 into PSN 62, and sets flag PASS1 to 0. Microprocessor 51 then sets flag DGDONE to the condition of flag CHDONE.

Microprocessor 51 checks the condition of flag DGDONE. If DGDONE=0, indicating that the chute handler 16 has not finished processing the data array in CMEM 20 currently being processed, microprocessor 51 control transfers to state 1, where the SDC 90 and SBC 92 registers are cleared to prepare for another scan of the data array top-of-chute values. If DGDONE=1, indicating that the chute handler 16 has finished processing the current data array in CMEM 20, microprocessor 51 control returns to the state 0 idle mode to await an indication that microprocessor 10 has received the dimness generator 18 output, namely, the minimum dimness value in SDW 100, the brightness value in SBW 102 associated with the minimum dimness value in SDW 100, and the position value in PSN 62 associated with the minimum dimness value in SDW 100.

D. SUMMARY OF THE FIRST EMBODIMENT

There has been disclosed a method utilizing data processing means such as the data processor 12. The data processing means includes a plurality of data stores, for example, chutes, or storage locations in CMEM 20. For each data store, there is a corresponding temporary store, for example, a pocket or storage location in PMEM 26. The method determines a particular criterion value, i.e., dimness, and an associated positional value, i.e., the value that is stored in PSN. The criterion value and associated positional value indicate the degree of match between the juxtaposition of a plurality of event types of a query and a plurality of event types of a stored data base entry. The method utilizes a priorly-formed array of data values, for example, see the data values in Table 3. Each data value represents the number of event positions between the occurrence of an event type in the query and the occurrence of a corresponding event type in the stored data base. A group of one or more data values is provided for each of a plurality of different query event types. Each different group is stored in a different data store, the data values thereof arranged in a monotonic order from a first end. For example, see Table 3. The method includes the following steps:

Designate a data value in each of a plurality of data stores as a first data value. For example, at Table 4, states 2 and 3, the SPR pointer is set so that it points to the largest data value at the top-of-chute. This is done for each of the data stores.

Detect at least one of the designated first data values having a predetermined magnitude relative to the other designated first data values. For example, at Table 4, states 2-6, the data value at the top of each data store is compared with the data value at the top of each of the other data stores using NEXTREF , EMQS, and COMP1. Once the data store, i.e., storage location in CMEM is detected, the largest data value is then copied from its corresponding storage location in CMEM to the data bus and subsequently to the corresponding POCKET or storage location in PMEM.

Form, for each of individual data stores, a first distance value which represents the algebraic difference between the detected data value and the designated data value in such data store. By way of example, during Table 5, state 3, the REF and TOS2 registers in combination with the ALU2 arithmetic unit are used to form the algebraic difference between the detected data value and the data value at the top of each chute. Using intermediate transfer steps, the detected data value was previously transferred from NEXTREF to REF. The absolute value of the algebraic difference thus formed is stored in D2.

Form, for each of individual data stores, a second distance value representing the algebraic difference between the detected data value and the data value in the temporary store corresponding to such individual data store. In this regard, during Table 4, state 3, registers REF and POC2 in combination with the ALU1 arithmetic unit are used to form the algebraic difference between the detected data value in a particular chute and the data value in the corresponding POCKET. The absolute value of each difference is stored in register D1.

Select, for each of the individual data stores, a distance value from the corresponding first and second distance values, the selected distance value having a predetermined magnitude relative to the other. In this regard, during Table 5, state 7, the values in registers D1 and D2 for each particular chute are compared. For each D1 and D2 value, the comparison is stored in the DR register.

Form, for a detected data value, a sum-of-distance value representing the sum of the absolute values of the selected distance values formed therefrom. In this regard, during Table 5, state 10, the arithmetic unit ALU1 in combination with the registers DR and SDC are used to sum the absolute values of the selected distance values. In this regard, the distance value(s) sequentially stored in DR are in effect summed into the SDC register.

Designate a new data value in the data value store containing the at least one detected data value and repeating the aforementioned steps using the new data value as a designated data value. In this regard, during Table 4, state 16, the SPR pointer for the chute in which the detected data value was stored (i.e., the largest data value) is decremented so that it now points to the next data value in the monotonic order in the chute, and the steps discussed above are repeated, using the new data value. The sum-of-distance value is compared with a priorly-formed sum-of-distance value for determining the smaller value thereof. The smallest sum-of-distance value is referred to herein as the smallest dimness value and in the Summary as the criterion value. The actual comparison is accomplished utilizing the registers SDC, SDW, and COMP1.

Additionally, during the step of utilizing, a positional value is provided. The positional value, which is also the detected data value used in the steps discussed above, is stored in PSN.

The step of storing the at least one detected data value in the temporary store also includes the step of storing other designated data values in the corresponding temporary stores, which data values are the same value as the detected data value. To this end, during Table 4, states 14–16, any other data values which are at the top-of-chutes and are equal to the largest data value (detected data value) are also transferred from the corresponding top-of-chute to the corresponding POCKET.

The step of selecting for each individual data stores from the corresponding first and second distance values, includes the step of selecting the smallest of the first and second distance values. To this end, during Table 5, state 7, the smaller of D1 and D2 is stored in DR.

The data processing means includes a store for a pipewidth value PW, and the method includes the additional step of detecting a predetermined relation between each selected distance value and a value in a pipewidth value store PW. To this end, during Table 5, state 8, the value in DR is compared in COMP2 with the value PW. Operative upon the last step of detecting such predetermined relation as to a particular selected distance value, a predetermined value is substituted for such selected distance value when forming a sum-of-distance value. To this end, during Table 5, state 9, if the value DR is greater than the value PW, a quantity QS, which equals a query size, replaces the value in DR.

A weighting value is stored in association with each of said data values, and the method includes the additional step of combining the weighting values that are associated with the data values that are used in the step of forming a sum-of-distance value to thereby form a sum-of-weighting value. In this regard, during Table 5, state 10, the arithmetic unit ALU2, in combination with the registers E1 and SBC, are used to sum the weighting value and to thereby form a sum-of-weighting values. In this regard, the weighting values sequentially stored in E1 are in effect summed into the SBC register.

For each temporary store and corresponding data store, which have a data value in the temporary store and a designated first data value of the corresponding group, the method incudes the steps of detecting if the distance values formed from the data value in the temporary store and the designated data value of the corresponding group are equal. In this regard, during Table 5, state 5, D1 and D2 are compared in COMP2. Upon such a detection, a selection is made from the two weighting values that are associated with the two data values which are associated with the two distance values detected to be equal of that weighting value which has a predetermined magnitude relative to the other. To this end, during Table 5, state 5, the values POC1 and TOS1 representing the weighting value associated with the data value in the temporary store and the weighting value associated with the data value in the top-of-chute, respectively, is compared in COMP1. The larger of POC1 and TOS1 is stored in register E1. Additionally, during Table 5, state 10, the selected weighting value is utilized with arithmetic unit ALU2 in combination with register SBC to form the sum-of-weighting value.

The step of utilizing comprises the step of utilizing for a detected data value, the corresponding sum-of-distance value and the corresponding sum-of-weighting value in forming such criterion value. To this end, during Table 5, state 10, a sum-of-distance value is formed utilizing arithmetic unit ALU1 in combination with registers DR and SDC, and a sum-of-weighting value is formed utilizing arithmetic unit ALU2 in combination with registers E1 and SBC.

The method also includes replacing the value in the criterion value store with a newly-formed criterion value when the newly-formed criterion value has a predetermined relation to the value in the criterion value store. In this regard, during Table 5, state 12, the newly-formed criterion value stored in SDC is compared in COMP1 with the value in the criterion value store SDW. During Table 5, state 14, the value in SDC replaces the value in SDW if the value in SDC is less than the value in SDW.

The method further includes replacing the value in the positional value store with the positional value corresponding to the detected data value used in forming a criterion value having the predetermined relation to the value in the criterion value store. To this end, during Table 5, state 14, the value in REF is copied into register PSN if the value in SDC is less than the value in SDW.

The aforementioned steps are repeated until all the data values in the chutes have been processed.

II. SECOND EMBODIMENT OF FIGS. 7-19 AND TABLES 6-11

A. GENERAL DESCRIPTION

FIGS. 7 through 19 and Tables 6 through 11 pertain to the second embodiment of the invention. Referring now to FIG. 7, there is shown a block diagram of a data processing means 1012 controlled by a microcomputer 1010 that forms an alternate embodiment of the data management and data base interrogation system of the present invention. The microcomputer may be any one of a number of computers well known in the art, a microprogram computer, or a specially designed computer. Coupled to the microcomputer 1010 by means of a Data Base Bus 1000 and a memory access controller 1020 is a data base memory 1021. The data base memory 1021 includes a plurality of conventional magnetic disc memory units 1022. To be explained later in more detail, a data base containing events arranged in entries is stored in the disc units of the data base memory 1021. Also coupled to the microcomputer 1010 is an operator-controlled console 1024 that includes a keyboard, printer and CRT display. The microcomputer 1010 contains a program which supervises the operation of the data processing means 1012. The data processing means 1012 is designed to perform certain specialized data handling functions in a method of determining a degree of match between a plurality of events of a query array of events hereinafter referred to as a query, and a plurality of events of an entry array of events contained in the data base hereinafter referred to as an entry. The method of determining such degree to match is called piping.

Under the supervision of microcomputer 1010, sixteen pipers 1016-1 through 1016-16, each of which includes a plurality of memory registers and logic blocks, and a brightness generator 1018 that includes registers, read-only memory, and logic blocks, execute the steps of the method for determining the degree of match. As shown in FIG. 7, the data processing means 1012 contains a plurality of identical pipers 1016 and thereby increase the data management and data base interrogation capacity of the overall data processing means. Only pipers 1016-1 and 1016-16 are specifically shown, the others being indicated by dashed lines.

A query is supplied to microcomputer 1010 by means of the operator console 1024. The query is restructured and compared by means of the application of a piping method in the microcomputer 1010 to form a criterion value for certain selected entries of the data base in the disc memories 1022.

To this end, the microcomputer 1010 issues executory commands to the memory access controller 1020, causing data base entries to be sequentially retrieved from the data base memory 1021 and sequentially compared in the data processing means with the query to determine the degree of match therebetween. To be later explained, each query and entry comprises a plurality of serially positioned event types and during the process of comparing the microcomputer 1010 forms for selected entries in the data base, an array of data values wherein each data value represents the number of event positions between the occurrence/alignment of an event type in the query and a corresponding like event type in the data base entry.

As a result of the comparison, a criterion value, called brightness, is generated by the data processing means. To be explained later, brightness is a measure of the degree of match between the event types of a query and the event types of a data base entry. As will be discussed, the brightness values thus determined are used as weighting values associated with a corresponding array of data values for a subsequent comparison with another data base entry.

Subsequent to forming the array of data values and brightness values, the microcomputer 1010 transfers the array via the Data Bus 1001 to the pipers 1016-1 through 1016-16. A piper control program (not disclosed) in each piper determines the number of pipers required to process the data of each particular array. It will be appreciated by those skilled in the art that the number of pipers disclosed in the present application, namely sixteen, is by no means restrictive, and by suitable modification of the hardware an increased number of pipers may be utilized to carry out the method herein described. Determinative of the number of pipers utilized is the size of the query and data base entries compared.

Under the supervisory control of microcomputer 1010, the pipers execute the steps of the piping method to determine a particular criterion value which as mentioned represents the degree of match between the event types of a query and the event types of a data base entry. The pipers 1016-1 through 1016-16 supply to the brightness generator 1018, via the Data Bus 1001, the piping method generated variables required for the calculation of the criterion value. As is hereinafter described, the criterion value formed in the brightness generator 1018 is a brightness value calculated from an equation having as inputs piper-supplied data that represent the result of each processing cycle of the piping method.

Brightness generator 1018 computes, by means of an equation to be explained later in the detailed Description of the brightness generator, a brightness value that corresponds to the degree of match between the query and data base entry at a particular position alignment thereof. The brightness generator 1018 compares a newly-formed brightness value with a previously-formed brightness value, replacing the previously-formed brightness value with the newly-formed brightness value when the newly-formed brightness value exceeds the value of the priorly-formed brightness value. Along with the brightness values, the brightness generator stores a corresponding positional value which identifies the alignment position of the query relative to the data base entry that gives rise to such calculated brightness values. As will be shown, the positional value is actually one of the data base entry values received by the pipers from the microcomputer. Thus, at the completion of the piping method, wherein all of the data values have been processed, the brightness generator returns to the microcomputer the highest brightness value and the position of the query relative to the data base entry at which the highest degree of match exists.

As discussed previously, more than one piper may be activated by the piper control program when the array of data values exceeds the capacity of a single piper. In the multiple piper arrangement, data is supplied to each piper from the microcomputer in a serial manner; that is, data is supplied to piper 1016-1, then to piper 1016-2, etc., until all the data from the microcomputer has been transferred to the pipers. Execution, however, of the piping method occurs in parallel. That is, each active piper simultaneously calculates the variables that are to be later processed by the brightness generator in generating the criterion value and positional value.

B. GENERATION OF DATA ARRAY

Prior to a discussion of the piping method, it is important to have an understanding of the generation of the data array to be processed by the method.

Solution of the piping method requires that the data array be in a specified form and ordering. The data array to be processed by the piping method consists of data generated by the microcomputer 1010 and transmitted to the pipers 1016-1 through 1016-16 via the Data Bus.

A discussion of the following concepts provides an understanding of chute data generation and processing:
 (a) the concepts of Entries, Events and Event types;
 (b) the concept of Query-to-Entry position; and
 (c) the concept of Layered Data Base.

C. ENTRIES, EVENTS AND EVENT TYPES

A query or entry consists of a plurality of events. An event is a number that indicates the order of occurrence of an event type within a query or entry. An event can also indicate the order of occurrence of a plurality of event types called a package. A package of event types consists of a plurality of event types associated with an event. Package size is the number of event types in a package.

An event type is an item of data, such as a number or a symbolic representation of an item of data such as a number representing a letter, line segment or another entry, associated with a given event.

An example of a layered data base (to be later explained) illustrating such event types, events, and entries is given in Table 6A. A data base entry file shown in Table 6A comprises on the word layer the sentences "THIS IS THE TIME. ONE DAY IS LIKE ANOTHER." Each word in each sentence is identified as an entry in the order of occurrence of the words in the sentences. Thus, the word "THIS" is identified as entry 1, the word "IS" is identified as entry 2, etc., up to the word, "ANOTHER" which is identified as entry 8. Each entry is composed of event types, i.e., characters. Each event type in each entry has associated therewith a number called an event that indicates the order of occurrence of the associated event type within the entry.

Thus, the word "THIS" which is identified as entry 1 is composed of four event types in the following order. Event type T, the first letter of the word "THIS", occurs at event 1. Event type H, the second letter of the word "THIS", occurs at event 2, and so on until all the event types have been so identified.

D. QUERY-TO-ENTRY POSITIONS

If the event types of an entry or query are visualized as occurring in the event order from left to right as shown in the word layer entries in Table 6A, then a query and an entry can be compared by aligning one under the other. The position of a query relative to an entry is defined as any horizontal alignment in which at least one event type of the query is positioned directly beneath, i.e., in alignment with, one event type of the entry. Position zero is defined as that position in which event 1 of the query is positioned in alignment with event 1 of the entry, event 2 of the query is positioned in alignment with event 2 of the entry, and so on. All other positions are numbered relative to position zero. Positions in which the query is to the left of position zero are assigned negative values, e.g., $-1$, $-2$.

Table 6B shows a sample query and entry with the query occupying all positions relative to the entry in which at least one event of the query is in alignment with one event of the entry. In 6B, query size QS, the number of events of a query, equals 4, and entry size ES, the number of events of an entry, equals 5. For any given QS and ES pair, the number of possible positions equals $(QS+ES)-1$.

A store is created for each event type or package of a query for which there is one or more occurrences of a corresponding event type in the entry and each such store is called a chute. Chute data is generated by the microcomputer 1010 for a given query/entry pair and contains information only on those positions of such query and entry in which at least one event type of the query is positioned in alignment with a corresponding event type in the entry. The positions, $-1$, 1, and 2 shown in Table 6B satisfy this condition. For position $-1$, event 4 of the query is in alignment with event 3 of the entry. Both event 4 of the query and event 5 of the entry are associated with event type 1. Thus, at this query-to-entry position, corresponding event types are in alignment.

Likewise, for position 1, event 1 of the query is aligned with event 2 of the entry, which causes event type 2 of the query and the corresponding event type 2 of the entry to be in alignment. Also for position 1, event 4 of the query is in alignment with event 5 of the entry, causing the corresponding event type 1 of the query and event type 1 of the entry to be in alignment.

Position 2 causes event 2 of the query and event 4 of the entry to be in alignment. Both of these events are associated with a corresponding event type 8.

All other positions of query-to-entry alignment; namely, positions $-3$, $-2$, 0, 3, and 4; do not cause the alignment of corresponding query event types and entry event types.

E. CHUTE DATA GENERATION

Each event type or package of a query for which there is one or more occurrences of the corresponding event type in the entry causes the generation of data for one chute. For example, if a query contains event type 63, and an entry to which the query is compared also contains event type 63 associated with one or more events of the entry, then data (to be explained) is generated for one chute.

If an entry does not contain one event type corresponding to an event type or one event type of a package of event types in the query, then no chute is assigned for the unmatched query event type and no chute data is generated for that query event type. In each case in which a query event type has no corresponding entry event type, or in which at least one query event type of a package of query event types has no corresponding entry event types, the quantity 1.0 is added to M (M is initially set to zero for each query/entry pair). M is the number of events in the query for which at least one corresponding event type is not found in the entry. M is used in calculating the criterion value which is a measure of the degree of match between a query and the entry.

Data for a chute is generated in the following manner. If a query and an entry are aligned at the zero position, then subtracting the events associated with corresponding event types in query and entry provides those positions of query relative to the entry where such corresponding event types are in alignment, as for example with the query in the zero position (underscored) (see Table 1B) relative to the entry, the event type 2 of the query occurring at event 1 of the query has a corresponding event type occurring at event 2 of the entry. To cause these corresponding event types to be in alignment, the entire query must be moved one position to the right, i.e., to position 1.

Alternately, this information can be determined by subtracting the query event, i.e., 1, of the query event type 2, from the entry event, i.e., 2, of the corresponding entry event type 2. The result $2-1=1$ yields the query position relative to the entry position where the two identical event types are in alignment.

For query event type 8 at event 2, the closest corresponding entry event type occurs at entry event 4. Referring again to Table 6B, event type 8 of the entry and query are in alignment when the query is at position 2. Subtracting the aforementioned query and entry event numbers also provides this information, i.e., $4-2=2$.

For query event type 1 at query event 4, corresponding entry event types occur at entry events 3 and 5. Subtracting the query event number from the entry event number yields $3-4=-1$, and $5-4=1$. Table 6B shows that shifting the query to position $-1$ results in the alignment of query event type 1 within the corresponding entry event type located at entry event 3. Table 6B further shows that shifting the query to position 1 results in the alignment of query event type 1 with the corresponding entry event type located at entry event 5.

Query event type 13 at query event 3 does not have a corresponding entry event type at any entry event. Therefore, no position numbers can be generated, and the quantity 1.0 is added to M.

As previously discussed, the chutes contain the position numbers generated by subtracting the event numbers of corresponding query and entry event types, as discussed above. Since these numbers represent the displacement (distance), where referenced to the zero position, between the occurrence of an event type in the query and one or more occurrences of the corresponding event type in the entry, these numbers are called distances and are placed in the distance (D) field of a chute data word (see FIG. 19I).

Chute data for a given query/entry pair consists of a separate series of one or more chute data words for every query event type or package for which there is one or more occurrences of a corresponding entry event type. This means that if a query contains five event types that have corresponding event types in the entry, then chute data would contain five separate series of one or more chute data words. The sample query shown in Table 6B contains three event types, i.e., 2, 8, and 1, that have one or more occurrences of a corresponding event type in the entry. Therefore, three series od chute data words are generated for this query/entry pair. Thus, query event type 2 generates a distance of 1, query event type 8 generates a distance of 2, and query event type 1 generates a distance of $-1$ and a distance of 1. Table 6B depicts how this data is arranged in three chutes.

A chute data word (see FIG. 19I) contains the distance field in bits 0-7 and a weighting value field in bits 8-14. A weighting value (to be discussed in the section entitled "Layered Data Base") associated with a given distance, has a value between zero and 1. The weighting values are processed along with the distances in arriving at a criterion value which is a measure of the degree of match between a query and entry.

F. LAYERED DATA BASE

One way in which package events and weighting values may arise is in the interrogation of a layered data base. Table 6A is a representation of such a layered data base. The word layer contains events (alphabetic characters) grouped into entries (words). Each character is an event type occurring in the order indicated by the event sequence of each word. Each word is an entry on the word layer. The entries are numbered consecutively. The two sentences stored in this data base are: "THIS IS THE TIME. ONE DAY IS LIKE ANOTHER." Note that the entry IS, common to both words, is stored only once.

The sentence layer consists of event types that are the entry numbers of the words on the word layer, grouped to represent the sentences on the word layer. The entry numbers of the sentence layer identify the sentences and then sequence on the word layer.

Such a layered data base is interrogated by first comparing the words of a given query sentence with each entry on the word layer.

The results of these comparisons on the word layer form a sentence query that is compared in a similar fashion with each entry on the sentence layer.

The results of the sentence layer comparisons yield the degree of match between the given query sentence and one or more stored data base entry sentences. The highest degree of match generated identifies which sentences in the stored data base are "most" similar to the given query sentence.

As an example of the foregoing, assume that the layered data base of Table 6A is interrogated by a given three-word query sentence. The first word of the given query sentence is compared with each entry on the word layer. A package of these word layer entry numbers is thereby formed, and the associated criterion values assigned as weighting values. This package is assigned an event number of 1, since the package was generated by the first word of the given query sentence. An example of such a package is listed under the numeral 1 shown in Table 6C. Word entries 1 and 4 (see Table 6A—word layer) exist in the package because the assumed associated criterion values, i.e., 0.5 and 0.6, respectively, were greater than zero. A criterion value of zero indicates no match at all between the event types of a query word and the event types of an entry word.

Likewise, comparing the second word of the given query sentence causes word entry 6 at an assumed criterion value of 0.8 to be retained and assigned an event number of 2. Word 3 of the given query sentence causes word entry numbers 3 and 8 at an assumed criterion value of 0.7 and 0.5, respectively, to be retained as package event 3. This package query, consisting of individual words of the given query sentence compared with the word layer, is now used to query the sentence layer. The criterion values returned during the word layer piping are used as weighting values during sentence layer interrogation.

Thus, interrogating a layered data base results in the formation of package queries and weighting values associated with each event type.

The foregoing method of comparison and generation of criterion values thereby determining the degree of match between an entry and a query, describes the process heretofore identified as piping.

Table 6D (and referring again to FIG. 7) contains a sample example of a sentence package query of 11 package events at the zero position with a sentence entry of 24 events. The sentence package query represents 5×4×6×4×3×4××4×5×5×4=4,608,000 possible sentences to match against the sentence entry. The chute data generation steps illustrated in Table 6E through 6O and subsequent method steps illustrated in Tables 7A through 7N identifies which one of these 4,608,000 possible sentences is the best match, the degree of such match (criterion value) and the position at which this best match occurs.

The chute data is generated in the same manner as shown in Tables 6A-6C, with the exception that the microcomputer 1010 matches as many events as possible in a given package to entry events.

This process is illustrated in Tables 6E through 6O. Note that the order of events in a package is irrelevant, as is the order in which the microprocessor 1010 attempts to match the package query event types with the corresponding entry event types. Chute data, however, is placed into the chutes with the position/weighting value pairs arranged in increasing monotonic order from word 1 of the chute. The number of the chute in which the position/weighting value pairs are placed in arbitrary. In the example, however, the matching process proceeds from the lowest numbered to the highest numbered query event, and the chute data thus generated is placed sequentially in the chutes starting from the lowest numbered chute. The processing of the query/entry pair thus proceeds from the leftmost position with corresponding event types aligned to the rightmost position with corresponding events aligned. The maximum number of data words that can be prepared for a given chute is 127 in the current implementation arranged by the microcomputer in groups of 15 data words plus an NMD command word. Chute number 1 contains that data generated for the first (from the left) query package event found to have corresponding event types in the entry. Likewise, chute number 2 contains that data generated for the second query even package found to have corresponding event types in the entry, and so on through the last query event package found to contain corresponding event types in the entry. The maximum number of chutes possible in data processing means 1012 is 127 (16 pipers).

Referring to Table 6E, the entry is scanned to find event types matching any of the event types contained in query event 1 package. A match is found for query event type 8 at entry event 5. The distance data is obtained as previously described by subtracting the event number of the query package containing a given event type from the event number of the corresponding entry event type (5−1=4). A corresponding entry event type is also found for query event type 21 at data base entry event number 9. In each case, the weighting value associated with the query event type being matched is paired with the distance data. The complete data for chute number 1, then, is 4/.5, 8/.6.

Referring to Table 6F, the microcompter finds corresponding event types in the entry for event types 21, 360, and 52 of query package event number 2 at entry events 9, 11, and 7 respectively. The distance for each is 7 (9-2), 9 (11-2), and 5 (7-2). The quantity 2 is subtracted in these cases because the correspondence occurs with query event number 2 event types. Chute number 2 data is therefore 5/.4, 7/.7 and 9/.8.

Referring to Tables 6G through 6O, the same operations are carried out for each query package event containing at least one event type that has a corresponding event type in the entry. In Table 6J, query event package 6 contains no event types that have a corresponding event type in the data base entry. In this case, no chute is created, and a 1 is added to the quantity M (missing event count).

The pipers, as demonstrated in Tables 7A through 7N, process the chute data generated in Tables 6E through 6O, using the piping method described below. In effect, the piping method does the following:

(a) Detects the leftmost (smallest) unprocessed position of a given query-to-entry in which at least one event type of the query is in alignment with one event type of the entry;

(b) Measures and totals the minimum distances between all corresponding event types of query and entry at the position detected in (a);

(c) Totals the weighting factors associated with the distances totaled in (b); and (d) Uses the totals computed in (b) and (c) and the value of M (missing events) to compute brightness, a criterion value representing the degree of match between the given query and entry at a detected position.

G. PIPING METHOD

In order to understand the piping method and brightness calculation technique, especially in the situation when there is more than one active piper, it is important to have an understanding of the piping method steps and the hardware that executes such a method, and to consider the method applied to a sample example.

Figure 9A:
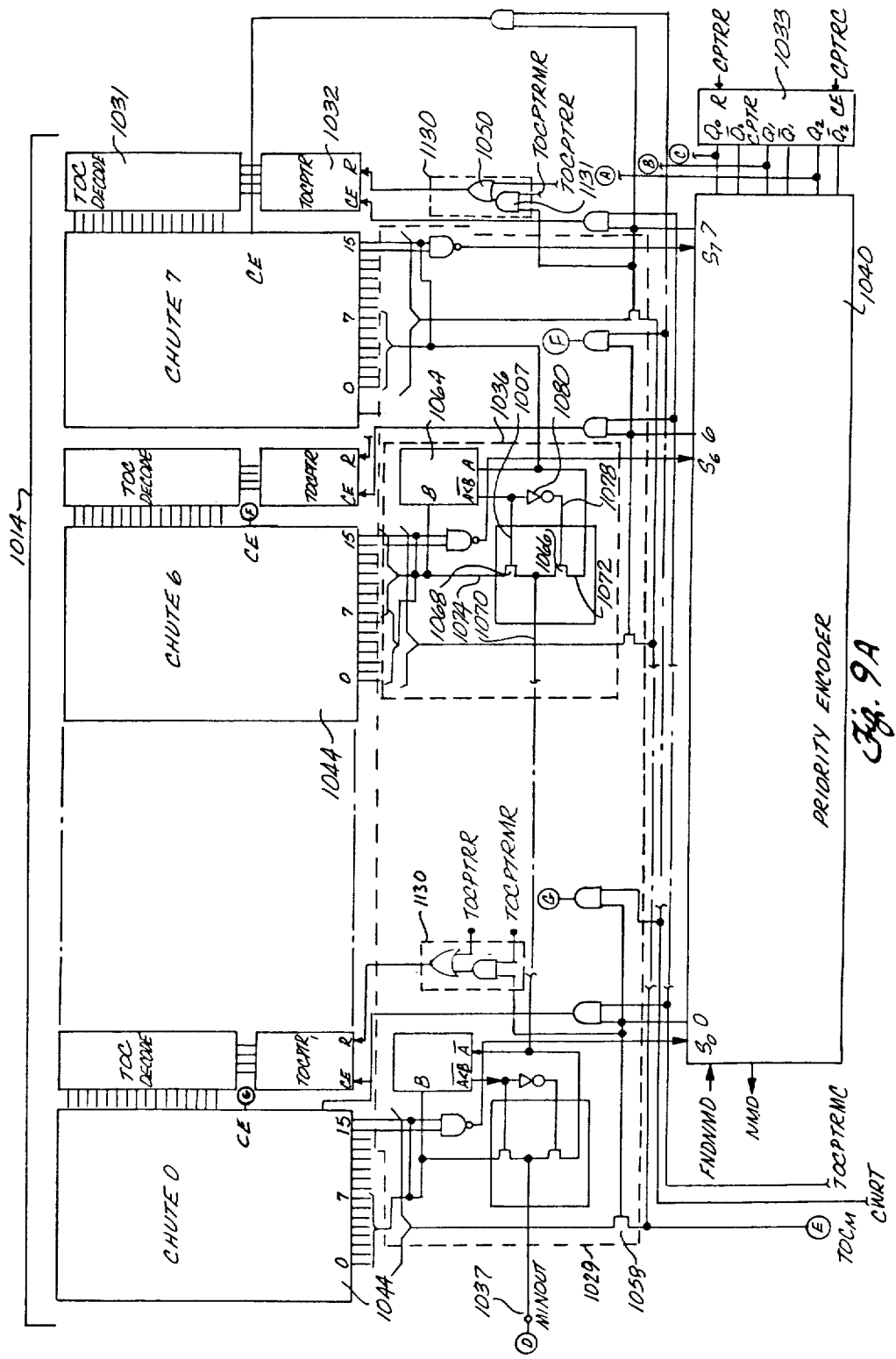
FIGS. 9A-9D form a block diagram of each of the piper modules of FIG. 7.
Figure 9B:
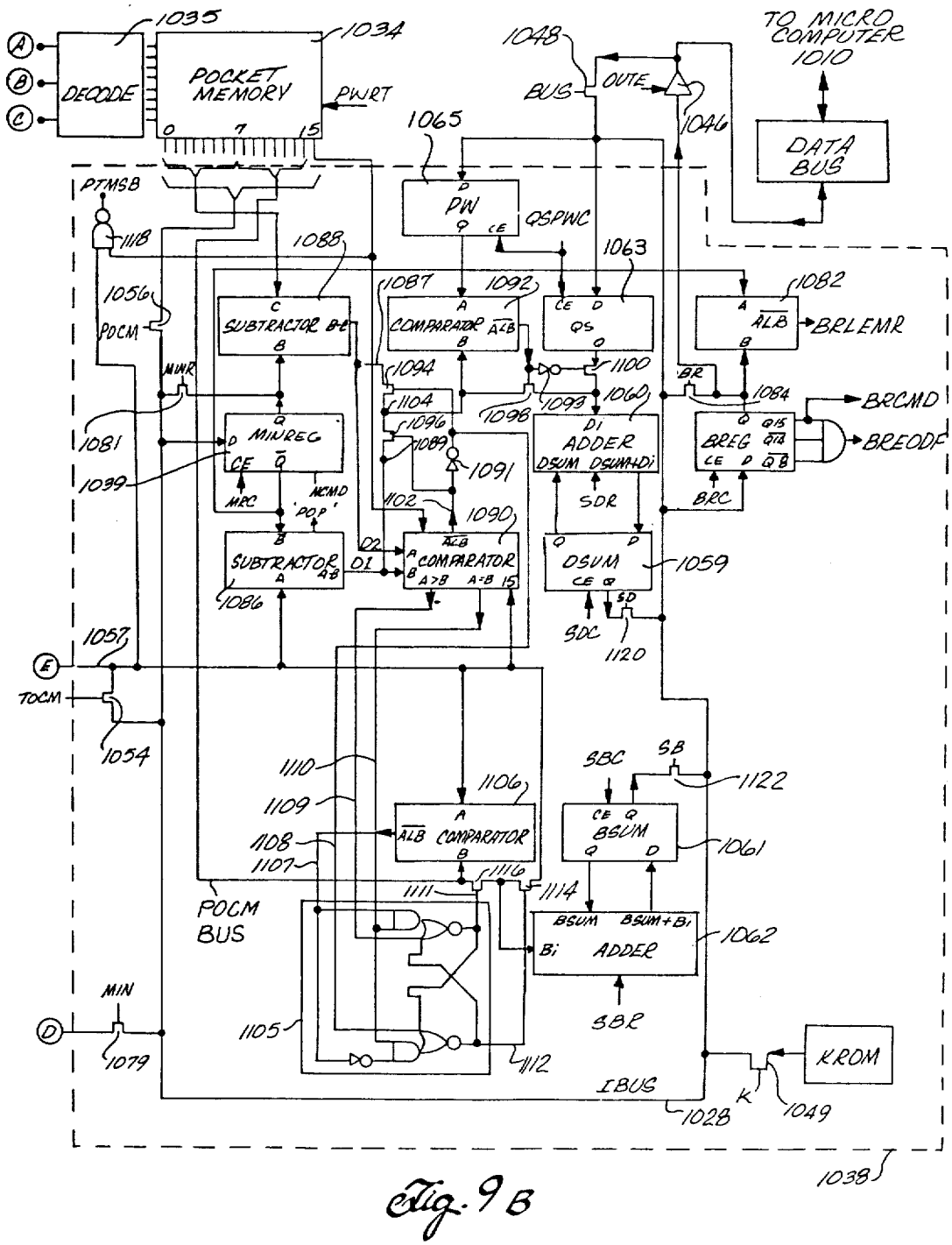

Referring now to Tables 7A-7N and making reference to FIGS. 9A, 9B, and 12, there is shown the sample data array transferred to pipers 1 and 2 by the microcomputer. For the example shown, the amount of information supplied by the microcomputer requires the use of two active pipers. The data delivered by the microcomputer 1010 is loaded into a chute memory block 1014 of each piper. The chute memory block 1014 consists of eight 16-word static random access memories (RAMs) with associated addressing logic blocks. Each of these memories is identified by reference numeral 1044 and is termed a "chute". Each chute word storage location is 16 bits wide. The chute memory block has associated with it logic blocks including a chute pointer CPTR 1033 and a top-of-chute pointer TOCPTR 1032 and top-of-chute decoders TOC 1031. The chute pointer CPTR 1033 and the top-of-chute pointer TOCPTR 1032 are indexed to address a particular word storage location within one chute to be processed. In addition to the chute memory block 1014, each piper 1016 has a pocket memory 1034 having eight addressable word locations. A pocket POC is a word storage location in the pocket memory 1034. There is one pocket POC that corresponds to each chute in a particular piper. The word storage location is indexed by the chute pointer CPTR 1033 such that indexing the CPTR causes the pocket POC to be indexed along with the corresponding chute.

Each piper also contains a minimum value finding logic block 1029, whose output MIN 1037 is stored in a register MINREG 1039. Also included in the piper is an accumulator register DSUM 1059 for accumulating a sum-of-difference value and an accumulator register BSUM 1061 for accumulating a sum-of-weighting value. Available to each piper is a variable called query size QS, which is the number of events in a query string, and for Tables 7A–7N, QS equals 11. Each piper also receives on the data bus and in the same word a quantity called "pipewidth" PW, which is a maximum permissible value of the difference between a query event position and an entry event position. For Tables 7A–7N, pipewidth is equal to 9.

It will be appreciated from the above discussion that the data values stored in each chute are a series of values arranged in monotonic increasing order from a first end to a second end of the chute. Each value represents the number of event positions between like events of a query and an entry of the stored data base. Stored in the chutes, and corresponding to each data value, is a weighting value, which is always less than or equal to one. The weighting value represents a degree of match of a query obtained in response to an interrogation in a lower level data structure.

The first data value in every chute, which is also the smallest data value in that chute, is initially placed in a word storage location called the "top-of-chute" TOC. Each of the other data values are separately stored in sequentially addressable word storage locations following TOC. The word storage location after the last data value stored in each of the chutes of each of the pipers contains a command word either EOC, EOD, EOF or NMD. The EOC command word, when encountered, indicates an End-of-Chute and only that no more data exists for that particular chute, (see by way of example the EOC command word in chute number 1 of piper number 1 in Table 7A). EOF is a command word when encountered indicates the end of data for the last entry in the data base. The last chute data word in the last piper-enabled chute is followed by a command word EOD. EOD is a command word that signals the end of chute data for a particular data base entry, see by way of example of EOD command word in chute number 2 of piper number 2 in Table 7A. During initialization, the pockets that correspond to chutes of each chute memory block are cleared by a piper control program and loaded with an EOC command word.

H. PIPER PROCESSING PHASES

Each piper executes a prescribed series of logical operations. A summary of the operational flow is given in FIG. 8. The figure shows five processing phases: initialization, chute filling, minimum MIN determination, piping, and NMD servicing.

In the initialization phase, a piper loads the first word which includes the values QS and PW appearing on the Data Bus into the QS register 1063 and the PW register 1065. Additionally, the pointers are initialized such that the TOCPTR pointers are set to point to the first top-of-chute of each chute and CPTR is set to point to the first chute.

In the chute-filling phase, a piper fills its chutes with data values from the microcomputer, via the Data Bus, until either all chutes have been filled, or an EOD or EOF command word has been detected on the Data Bus. EOF represents a command word that signals the end of a data base entry file for a particular piping cycle.

Each piper is controlled by a piper control program (Table 9) which is stored in a Read-Only Memory ROM 1043 of the piper control logic block 1042. Upon instruction from the piper control program the piper then begins the minimum MIN determination.

In the minimum MIN determination phase, the piper establishes which top-of-chute holds the smallest value in the distance (D) field (see D output of the chutes in FIG. 9A) of each data word in the top-of-chutes across all the pipers. This number is stored in the MINREG register of each piper. If MINREG contains either an EOD or EOF command word, it signifies that all data has been piped, and the piper returns to the chute-filling phase. If MINREG contains a data value, then more data remains to be processed, and the piper proceeds to the piping phase to process the chute data.

In the piping phase, the top-of-chutes and their corresponding pockets are evaluated according to the piping algorithm (to be discussed below). This process is repeated until all values in all chutes have been evaluated, and a summed difference and weighting value are transferred to the brightness generator. The piper then enters the NMD servicing phase.

In the NMD servicing phase, the tops of all chutes are examined for the existence of NMD commands. An NMD command word may be written in any chute word location, however, for the embodiment presented herein, an NMD command word is written into the sixteenth data word location of a chute, by the microcomputer, when the microcomputer detects that more than fifteen data word locations are required for storage of data in a particular chute. Upon detection of an NMD command, the microcomputer refills the identified chute with the remaining data for such a chute. The NMD detection and chute refill process continues until no more NMD commands are detected. Once all NMDs have been serviced, or if no more NMDs exist, the piper returns to the minimum MIN determination phase again and continues processing.

Thus, for a single piper, the data processing means 1012 proceeds to empty the chutes and determines the final DSUM and BSUM register values by execution of the following steps:

I. PIPING METHOD STEPS FOR A SINGLE PIPER

Step 1

Find the chute or chutes with the smallest data value MIN existing at the top of such chute(s).

Step 2

Form the absolute difference between such smallest data value MIN and the data value in each top-of-chute in each chute not having a data value in its corresponding pocket, retaining this difference and the weighting value associated with such top-of-chute value. STEP 3

Form the difference between the data value in the pocket and MIN for each chute that has a data value in the pocket but no data value in the top-of-chute retaining this difference and the weighting value associated with the data value in the pocket.

STEP 4

Form the absolute difference between such smallest data value MIN and each data value in the pocket and each data value in each top-of-chute in each chute having a data value in both the pocket and top-of-chutes, retaining the smaller of the differences and the weighting value associated with the data value (pocket or top-of-chute) used in forming such smaller difference. If the differences calculated are equal, retain the difference and the larger of the two weighting values associated with the pocket and top-of-chute.

STEP 5

In steps 2 and 4 above, if the data value obtained when MIN is subtracted from the data value in the top-of-chute value is zero, retain the zero and the weighting value associated with the data value in the top-of-chute, place the MIN value in the associated pocket, replacing any previous data value already in the pocket from such chute, and designate the next data value in that chute as the top-of-chute.

STEP 6

If any difference calculated in the described Steps 2-5 is greater than the pipewidth PW, replace the difference formed with a predetermined value. For the embodiment presented herein, the predetermined value is equal to the query size QS. Note this does not affect the weighting value to be retained.

STEP 7

Sum the retained differences obtained in Steps 2-6 to form sum-of-difference value, also sum the retained weighting values to form sum-of-weighting values.

STEP 8

Utilize the sum-of-difference value and the sum-of-weighting value in a brightness formula to derive a criterion brightness value (B).

STEP 9

If B is greater than the previous brightness value calculated (or is the first brightness value to be calculated), replace the previously-calculated brightness value with the just calculated brightness value and retain MIN as the position value for that calculated brightness value.

STEP 10

Repeat Steps 1-9 until all chute values have been processed. The brightness value retained at the end of these steps is the criterion value for the degree of match between a query and a data base entry. The associated position represents the relative position of the query relative to the entry at which such a criterion value was obtained.

J. PIPING METHOD STEPS FOR MULTIPLE PIPERS

Given the arrangement of Table 7A requiring more than one piper, i.e., two pipers, the data processing means 1012 proceeds to empty the chutes and determines the final DSUM and BSUM register values by excution of the following steps:

STEP 1(A)

Within each piper, detect the chute or chutes with the smallest data value MIN existing at the top of such chute or chute(s).

STEP 1(B)

Compare the MIN values found in step 1(A), selecting the smallest of these MIN values (minimum MIN) and replacing the MIN value in each piper with the minimum MIN thus selected.

STEP 2

Within each piper, form the absolute difference between such smallest data value minimum MIN and each top-of-chute data value in each chute not having a data value in its corresponding pocket, retaining this difference and the weighting value associated with such top-of-chute data value.

STEP 3

Within each piper, form the difference between the pocket data value and the minimum MIN for each chute that has a pocket data value but no top-of-chute data value, retaining this difference and the weighting value associated with the pocket data value.

STEP 4

Within each piper, form the absolute difference between such smallest data value minimum MIN and each pocket data value and each top-of-chute data value in each chute having a data value in both the pocket and top-of-chute, retaining the smaller of the differences and the weighting value associated with the data value (pocket or top-of-chute) used in forming such smaller difference. If the differences calculated are equal, retain the difference and the larger of the two weighting values associated with the pocket and top-of-chute.

STEP 5

In steps 2 and 4 above, if the value obtained when the minimum MIN is subtracted from the top-of-chute data value is zero, retain the zero and weighting value associated with the top-of-chute data value, place the minimum value in the associated pocket replacing any previous data value already in the pocket from such chute, and designate the next chute data value in that chute as the top-of-chute.

STEP 6

Within each piper, if any difference calculated in Steps 2-5 is greater than the pipewidth value (PW), replace the difference formed with a predetermined value. For the embodiment presented herein, the predetermined value is the the value query size (QS). Note this does not affect the weighting value to be retained as described in Steps 2-5.

STEP 7

Within each piper, sum the retained differences obtained in Steps 2-6 to form a sum-of-difference (DSUM), also sum the retained weighting values to form a sum-of-weighting value (BSUM).

STEP 8(A)

Sum all DSUMs from all active pipers to form the sum of DSUMs (SSD), and sum all BSUMs to form the sum of BSUMs (SSB). Utilize the quantities SSD and SSB in a brightness formula for deriving a brightness (B).

STEP 9

If B is greater than the previous brightness calculated (or is the first brightness to be calculated), replace the previous brightness with the just calculated brightness and retain the minimum MIN as the position value for that brightness.

STEP 10

Repeat Steps 1-9 until all chute values in all active pipers have been processed. The brightness retained at the end of this procedure is the criterion for degree of match between query and data base entry.

The piper executes the method steps in a piping logic block 1038 (see FIG. 9B). The piping logic block continuously monitors the top-of-chute TOC and the pockets POC being addressed by the CPTR and TOCPTR and calculates the difference between the value in the distance D field of TOC and the data value in MINREG, and the difference between the distance field of the data value in the pocket POC and the value in MINREG. The data value in MINREG is the smallest value MIN exposed at the top of such chutes. D1 is defined as the difference between the data value in the top-of-chute and the data value in MINREG, and D2 is defined as the difference between the data value in MINREG and the data value in the corresponding pocket such that (in shorthand notation) D1 equals D(TOC(-TOCPTR) (CPTR)-MINREG, and D2 equals MINREG - D(POC(CPTR)). D(TOC(TOCPTR) (CPTR) indicates the value in the distance field of the data value stored in the word storage location of the top-of-chute TOC indexed (indicated) by the top-of-chute pointer TOCPTR of the chute indexed (indicated) by the chute pointer CPTR. Similarly, D(POC(CPTR) indicates the value in the distance field of the data value stored in the word storage location of the pocket POC as indexed by CPTR. B refers to the weighting value field of the data value being indexed.

The piping logic block executes the method steps by performing the following logical operations:

a. If POC(CPTR), i.e., the pocket word storage location as indexed by CPTR, contains a command word (i.e., does not contain data), then D1 and B(TOC(-TOCPTR) (CPTR) shall be made available at Di and Bi inputs of adder registers 1060 and 1062 respectively (see FIG. 9B). Di represents the difference between the value in MINREG and the value in the presently indexed TOC or POC. Bi represents the weighting value associated with such TOC or POC. The values Di and Bi will be added in accumulator registers DSUM 1059 and BSUM 1061 respectively with such Di and Bi values determined for the previously indexed TOCs and POCs. As will be shown later, the accumulator registers DSUM and BSUM will contain the accumulated Di and Bi values corresponding to the TOCs and POCs of all the chutes indexed in a complete chute processing cycle.

b. If POC(CPTR) does not contain a command word (i.e., contains data), and TOC(TOCPTR) (CPTR) contains a command word, then D2 and B(POC(CPTR) shall be made available at Di and Bi, respectively.

c. If POC(CPTR) and TOC(TOCPTR) (CPTR) both contain data (i.e., neither contains a command word), then D1 and D2 shall be compared.
  1. If D1 is less than D2, then D1 and B(TOC(-TOCPTR) (CPTR) shall be made available at Di and Bi, respectively.
  2. If D2 is less than D1, then D2 and B(POC(CPTR)) shall be made available at Di and Bi respectively.
  3. If D1 equals D2, then B(TOC(TOCPTR) (CPTR) and B(POC(CPTR) shall be compared.
    (a) If B(TOC(TOCPTR) (CPTR) is greater than or equal to B(POC(CPTR)), then B(TOC(-TOCPTR) (CPTR) shall be made available at Bi.
    (b) Otherwise, B(POC(CPTR)) shall be made available at Bi.
    (c) In either case, D1 (or D2) shall be made available at Di.

d. If D1=0 (D(TOC(TOCPTR) (CPTR)=MINREG), i.e., the value in the distance field of the presently-indexed TOC equals the value in MINREG, a flag POP shall be set on (high); if not, the flag shall be set off (low). The value D1 is formed in subtractor 1086 (see FIG. 9B) and if the A input of subtractor 1086 (see FIG. 9B) and if the A input of subtractor 1086 which corresponds to the D(TOC(TOCPTR) (CPTR) value equals the $\overline{B}$ input (inverted MINREG value), the "POP" flag output of subtractor 1086 goes on (high).

e. In any of the above cases, if the value to be made available to Di is greater than PW, then QS shall be made available at Di. (This does not affect the output to Bi.)

f. Bi shall be summed in BSUM.

g. The state of the POP flag shall be checked;
  1. If the POP flag is set off for a given chute, then Di shall be summed to DSUM.
  2. If the POP flag is set on for a given chute, then TOC(TOCPTR) (CPTR) shall be transferred to POC(CPTR); i.e., the chute shall be "popped".

h. When all top-of-chutes have been processed by the piping logic block, DSUM and BSUM shall be transferred to the brightness generator.

K. PIPING METHOD APPLIED TO A SAMPLE DATA ARRAY SHOWN IN TABLES 2A-2N

Illustration of the data processor execution of the foregoing method steps and piping logic operations is illustrated in Tables 7A through 7N. As will be described in detail below, the best fit between query and entry is in position 8, yielding a brightness value of 0.236915.

Consider briefly Table 7A. Table 7A depicts the data arrangement for the number of queries requiring the use of two pipers. The piping method and piping logic operations are identical for each piper. The results of the data processing of each piper are accumulated to form an overall criterion value of brightness that is formed in a brightness generator. As described, each piper contains eight chutes with each chute identified by a chute/pocket number. An indexed pointer CPTR points to the particular chute in which the present data manipulation is being performed. Each chute of each piper may contain as many as 15 information values, and a top-of-chute pointer TOCPTR is indexed to point to the particular data value in the presently-addressed chute required in the piping method. The data values are arranged in the chutes in monotonic increasing order, each data value having associated therewith a weighting value which is either equal to or less than 1. After the last data value in each chute, an EOC command word exists. As previously discussed, the EOC command word terminates any data processing for the chute or pocket in which such command word exists. An EOD command in a chute indicates that no more data exists for the query/entry pair being processed.

Each piper has a number of registers that contain information necessary to perform the piping method. Thus, at the lower portion of Tables 7A-7N and listed for each piper under the piper registers are: the MINREG register, which contains the minimum top-of-chute value for a present processing pass; a chute pointer register CPTR, which points to the chute presently being processed; a series of top-of-chute TOCPTR pointers 1 through 8 that indicate the location in which the present top-of-chute value exists; a subtractor register, which contains the value D1 that is equal to the difference between the minimum value of the top of the chutes as presently stored in the MINREG register and the other top-of-chute values; a D2 subtractor register, which contains the difference value D2 between the minimum of top-of-chute which presently exists in the MINREG register and the pockets of each of the chutes; a DSUM register, which accumulates the smaller value of D1 and D2 for each processing pass of the piping method; a BSUM register that accumulates the weighting values associated with the information values that are used in forming the D1 and D2 values; a QS or query size register 1063 containing a number of events in a particular query, and for the sample example, QS equals 11; and pipewidth PW register 1065 containing a value which is the maximum permissible value of the difference between a query event position and an entry event position and for the present example, PW equals 9.

Also included in the Tables 7A–7N is a list of brightness generator registers containing values necessary for establishing the criterion value required for determining the position for the best degree of fit between a query and an entry. Thus, included are: a candidate brightness register BOLD containing the criterion brightness value resulting from the completion of a piping algorithm processing pass; a candidate position register LMIN containing the relative position of the query and the entry that gives rise to such candidate brightness value; a selected criterion brightness B register containing a brightness value that has a predetermined relation to the other calculated brightness value, and, for the data processing means herein described, the selected criterion brightness is the largest of the brightness values calculated through all of the processing steps through all of the information values in all of the chutes; a selected position register POS containing the position at which the selected criterion brightness was calculated; a register containing the value M which is equal to the number of events in the query for which at least one corresponding event type is not found in the entry, i.e., the number of event types in the query that are not contained in the entry; and an ES register containing the entry size, i.e., the number of events that make up the data base entry currently being piped.

Consider briefly now the operation of data processing means 1012 in carrying out the example depicted in Tables 7A through 7N while also making reference to FIGS. 9A–9B and 6. Referring to Table 7A, initially the data processing means 1012 detects the data value at the top-of-chutes TOC of each of the pipers which is the smallest, i.e., has the smallest value in relation to the other data values at the top of the chutes. To this end, the data processing means 1012 detects, in those data locations identified by the top-of-chute pointer TOCPTR equaling 1, the smallest data values and determines that for piper 1 the data value 1 in chute number 7 is the smallest relative to the remaining TOC values. The data processing means detects in piper 2 a data value of 0 in the data location identified by the TOCPTR equal to 1 and the chute/pocket number 2.

The data processing meand determines the smallest value of the minimum detected TOC in piper 1 and the minimum detected TOC in piper 2, and loads the smallest value found into the MINREG register of piper 1 and piper 2. Thus, for the examples shown, the value 0 is loaded into the MINREG register of piper 1 and piper 2.

In conforming with Step 2 of the piping method, the absolute difference is formed between the value in the MINREG register and each TOC data value in each chute not having a value in its corresponding pocket POC. This difference is added in the DSUM register and the corresponding weighting value associated with such top-of-chute value is added in the BSUM register. To this end, the data processing means determines the algebraic difference between the value 0 in the MINREG register and the value 4 in the TOC of chute number 1. This difference, designated as D1 for the present example, equals 4, and the value 4 is added to the value in the DSUM register, and the corresponding weighting value of 0.5 is added to the value in the BSUM register. Since a command word, i.e., EOC, exists in the POC corresponding to chute number 1, no difference is taken between the MINREG register value and the POC of chute number 1 of piper 1.

The chute pointer CPTR is now indexed by 1 such that CPTR equal 2, thereby making available to the piping method the TOC of chute number 2 of piper 1. In a manner as described previously, the difference value D1 is formed between the value 0 in the MINREG register and the value in the TOC of chute number 2 of piper 1. Thus, the difference value D1 equal to 5 is formed, and 5 is added to the value in the DSUM register, and the corresponding weighting value of 0.4 is added to the value in the BSUM register.

The CPTR is next indexed by 1, thereby making available the TOC of chute number 3 for processing in the piping method. Thus, the difference between the value 0 in the MINREG register and the value 3 in the TOC of chute number 3 of piper 1 is formed, and the value D1 equal to 3 for such difference is added to the value in the DSUM register, and the corresponding weighting value of 0.4 is added to the value in the BSUM register.

The CPTR is next indexed by 1, and the information value of 6 at the TOC of chute number 4 of piper 1 is made available to the piping method. Thus, the difference between the value 0 in the MINREG register and the value 6 in the TOC of chute number 4 of piper 1 is formed. This difference D1 equal to 6 is added to the value in the DSUM register, and the corresponding brightness value of 0.2 is added to the value in the BSUM register.

The CPTR is indexed by 1, thus making available the TOC value of chute number 5 of piper 1 to the piping method. The difference is formed between the value 0 in the MINREG register and the value 12 in the TOC of chute number 5 of piper 1. The difference D1 of the value 12 is noted to have exceeded the pipewidth value 9, and, therefore, a predetermined value equal to the query size is added to the value in the DSUM register, and the corresponding weighting value of 0.9 is added to the value in the BSUM register. For the present example, the query size is equal to 11.

The CPTR is indexed by 1, thereby making available the TOC of chute number 6 of piper 1 to the piping method. Thus, the difference between the value 0 in the MINREG register and the value 3 in the TOC of chute number 6 of piper 1 is formed, and the resulting value for D1 equal to 3 is added to the value in the DSUM register, and the corresponding brightness of 0.1 is added to the value in the BS register.

The CPTR is indexed by 1, thereby making available the TOC of chute number 7 of piper 1 to the piping method. Thus, the difference between the value 0 in the MINREG register and the value 1 at the TOC of chute number 7 of piper 1 is formed, and the resulting value for D1 equal to 1 is added to the value in the DSUM register, and the corresponding weighting value of 0.9 is added to the value in the BSUM register.

The CPTR is next indexed by 1 so that the TOC value of chute number 8 of piper 1 is made available to the piping method. Thus, the difference is formed between the value 0 in the MINREG register and the value 15 in the TOC of chute number 8 of piper 1. The difference value of 15 is found to exceed the pipewidth value of 9, and, therefore, the query size value of 11 is added to the value in the DSUM register, and the corresponding weighting value of 0.2 is added to the value in the BSUM register.

At the completion of this processing pass, the sum of the differences formed equals 44, and the sum of the corresponding weighting values equals 3.6.

As indicated in Table 7A, the amount of piper chute data for the sample example requires more than one piper, i.e., two pipers. The piping method, as applied to piper 1, is applied identically to piper 2, and the execution of the method steps in piper 2 is carried on concurrently with the execution of the method steps in piper 1. Thus, the processing of the data in the pipers is accomplished in a parallel fashion so that the differences to be formed, as called out in the piping method and in the piping logic operations, are occurring simultaneously in all pipers.

Consider briefly the processing of the data in piper 2. The CPTR of piper 2 was initialized to the value 1 such that the TOC of chute number 1 of piper 2 is made available to the piping method. Thus, the difference between the value 0 and the MINREG register of piper 2 and the TOC of chute number 1 of piper 2 is formed. The resulting difference of 3 is calculated for D1 and added to the value in the DSUM register in piper 2, and the corresponding weighting value of 0.7 is added to the value in the BSUM register of piper 2.

The CPTR is indexed by 1 to make available the TOC of chute number 2 of piper 2 to the piping method. Thus, the difference between the value 0 in the MINREG register and the TOC of chute number 2 of piper 2 is formed. The value 0 in the MINREG register is, however, identical to the TOC value of 0, and, therefore, in accordance with the piping method, the TOC value for chute number 2 of piper 2 of 0 is transferred to the corresponding pocket for chute number 2 of piper 2. The TOCPTR is indexed by 1 such that the next succeeding data in chute 2 of piper 2 is designated as the new TOC for chute number 2 of piper 2. Since the value 0 in the MINREG register equals the value in the priorly-designated TOC value for chute number 2 of piper 2, 0 is added to the value in the DSUM register of piper 2, and the corresponding weighting value of 0.6 is added to the value in the BSUM register of piper 2.

The CPTR is indexed by 1 such that the TOC of chute number 3 of piper 2 is made available to the piping method. For chute number 3 of piper 2, a command word EOC exists in both the pocket and the top-of-chute. Upon this occurrence, the piping method terminates processing the remaining chutes of piper 2.

The value 44 in the DSUM register of piper 1 is combined with the DSUM register value in piper 2, and the BSUM register value of piper 1 of 3.6 is combined with the BSUM register value of 1.3 in piper 2, and these values are utilized in a brightness equation (to be later explained) to form a candidate criterion or brightness value B that is stored in register BOLD. For the presently-calculated values, a selected criterion brightness value of 0.127995 results, and the position of the query with respect to the entry that gives rise to such selected criterion brightness which is equal to 0 is stored in register LMIN. The value in LMIN also corresponds to the present value in the MINREG register.

Upon completion of the first processing pass through the piping method, the steps are repeated, and thus the minimum value of the TOC of each piper is detected and stored in the MINREG register of the piper in which such minimum detected value was found. The MINREG values of each piper are then compared, and the minimum of those values is returned and placed in the MINREG register of each of the pipers. To this end, the value 1 in the TOC of chute number 7 of piper 1 is found to be the minimum TOC value, and thus the value 1 is placed in the MINREG register of piper 1. Similarly, for piper 2, the minimum TOC value of 1 is found in chute 2, and the value 1 thus found is placed in the MINREG register of piper 2. The value of 1 in the MINREG register of piper 1 is compared with the value 1 in the MINREG register of piper 2 and found to be equal. Thus, the value 1 is returned to both MINREG registers, and the piping method is executed.

As previously described, the difference is formed between the value in MINREG and the TOC of each of the chutes and the corresponding POC of each piper, and such differences are added in the DSUM register. Thus, with appropriate indexing of the CPTR, the difference between the value 1 in the MINREG register and the TOC of chute number 1 is formed such that a value of 3 for D1 is added to the value in the DSUM register, and a value of 0.5 for the corresponding weighting value is added to the value in the BSUM register. For chute number 2, the value calculated for D1 is equal to 4 so that the value 4 is added to the value in the DSUM register, and the corresponding weighting value of 0.4 is added to the value in the BSUM register. For chute number 3, the value for D1 is calculated to be 2 so that the value 2 is added to the value in the DSUM register, and the corresponding weighting value of 0.4 is added to the value in the BSUM register.

For chute number 4, the value for D1 is calculated to be 5; therefore, the value 5 is added to the value in the DSUM register, and the corresponding weighting value of 0.2 is added to the value in the BSUM register. For chute number 5, the difference calculated for D1 is equal to 11. Since 11 exceeds the pipewidth value of 9, the value for the query size is added to the value in the DSUM register. For the sample example, the query size is also equal to 11; thus, this value is added to the value in the DSUM register, and the corresponding weighting value of 0.9 is added to the value in the BSUM register.

For chute number 6, the difference value calculated for D1 is equal to 2; thus, 2 is added in the value in the DSUM register, and the corresponding weighting value of 0.1 is added to the value in the BSUM register.

For chute number 7, the value 1 in the TOC equals that in the MINREG register. Therefore, the difference value D1 is calculated to be 0, such that the value 0 is added to the value in the DSUM register. The corresponding weighting value of 0.9 is added to the value in the BSUM register, and the value 1, which was detected to be equal to the MINREG value, is transferred from the TOC of chute number 7 to the corresponding POC of chute number 7, and the next succeeding value is designated as the new TOC value for chute number 7.

For chute number 8, the difference formed for D1 is equal to 14, which exceeds the pipewidth value of 9. Thus, the value 11, equal to the query size, is added to the value in the DSUM register, and the corresponding weighting value of 0.2 is added to the value in the BSUM register. This completes the processing of the TOC in piper 1.

Concurrently, however, the difference values for D1 are being calculated in piper 2. Thus, the difference between the value in the MINREG register, i.e., 1, and the current TOC value 3 for chute number 1 is calculated to be equal to 2, and thus the value 2 is added to the value in the DSUM register, and the corresponding weighting value of 0.7 is added to the value in the BSUM register. For chute number 2 of piper 2, it is observed that the present TOC value equals 1, and therefore, equals the value in the MINREG register.

It is also observed that a value of 0 exists in the pocket for chute number 2. Thus, the value D2, which is the difference between the value in the MINREG register and the pocket value for the chute presently being processed, is equal to 1. The value D1, which is the difference between the value in the MINREG register and the TOC, is calculated to be equal to 0. In accordance with the method steps, the smaller of the values of D1 and D2 for a particular chute and corresponding pocket is added to the value in the DSUM register. Thus, the value 0 is added to the value in the DSUM register, and the corresponding weighting value of 1 is added in the value in the BSUM register. Since the value 1 in the TOC of chute number 2 equals the value of 1 in the MINREG register, the value 1 is transferred to the POC of chute number 2 of piper 2, replacing the value 0 previously contained in the pocket for chute number 2, and the next succeeding value in chute number 2 is designated as the new TOC.

At the termination of this processing pass for piper 1, the value in the DSUM register equals 38, the value in the BSUM register equals 3.6, and for piper 2, the value in the DSUM register equals 2, and the value in the BSUM register equals 1.7. Utilizing these values in a brightness criterion equation, a value of 0.151860 is calculated. Since this value exceeds the value 0.127995, previously calculated, this presently-calculated value replaces the priorly-calculated value, and the candidate position, i.e., 1, replaces the candidate position 0 priorly calculated.

Consider now, briefly, the piping method applied to Table 7C. The minimum value presently existing in the top of all chutes of piper 1 is detected to be the value 3. The minimum value of the presently-designated top-of-chutes of piper 2 is detected to be 4. Thus, the minimum value of the minimum detected in each of the pipers, i.e., piper 1 and piper 2, is the value 3 from piper 1. Thus, the value 3 is stored in the MINREG registers of each of the pipers, and the piping method is reexecuted.

Thus, the piper 1 for chute number 1, the difference value for D1 is calculated to be 1, and thus the value 1 is stored in the DSUM register, and its corresponding weighting value of 0.5 is added to the value in the BSUM register.

For chute number 2, the value for D1 is calculated to be equal to 2. Thus, the value, 2 is added to the value in the DSUM register, and the corresponding weighting value of 0.4 is added to the value in the BSUM register.

For chute number 3, the value 3 presently existing in the TOC equals the value 3 in the MINREG register. Thus, the difference D1 is calculated to be 0. Since no value existed in the POC of chute number 3, D2 is not calculated. The value 3 is transferred to the POC of chute number 3, and the next succeeding data value in chute number 3 is designated as the new TOC.

For chute number 4, the value for D1 is calculated to equal 3. Thus, the value 3 is added to the value in the DSUM register, and the corresponding weighting value of 0.2 is added to the value in the BSUM register.

For chute number 5, the value for D1 is calculated to equal 9. Thus, the value 9 is added to the value in the DSUM register, and the corresponding weighting value of 0.9 is added to the value in the BSUM register.

For chute number 6, it is observed that the present TOC value of 3 is equal to the value in the MINREG register. Since a command word, i.e., EOC, exists in the pocket of chute number 6, D2 is not calculated, and the value for D1 equal to 0 is added to the value in the DSUM register, and the corresponding weighting value of 0.1 is added to the value in the BSUM register, value 3 is transferred to the POC of chute number 6, and the next succeeding value is now designated as new TOC for chute number 6.

For chute number 7, the value D1 is calculated to be equal to 3, and the value D1 is calculated to equal 2. Thus, the smaller of D2 and D1, i.e., the value 2, is added to the value in the DSUM register, and the corresponding weighting value of 0.9, that is, the weighting value associated with the data value in the POC of chute number 7, is added to the value in the BSUM register.

For chute number 8, the value D1 is calculated to equal 12, which exceeds the pipewidth value of 9. Thus, the query size value of 11 is added to the value in the DSUM register, and the corresponding weighting value of 0.2 is added to the value in the BSUM register.

For piper 2, it is observed that the TOC value of chute number 1 equals the value in the MINREG register. Since the commnad word EOC exists in the pocket of chute number 1, a calculation for D1 is not performed. The value of 0 for D1 is summed in the DSUM register, and the corresponding weighting value of 0.7 is added to the value in the BSUM register. For chute number 2, the value of 1 is calculated for D1 and the value of 2 is calculated for D2. The minimum value between D1 and D2 is 1 so that the value 1 is added to the value in the DSUM register, and the weighting value corresponding to the data value used in the D1 calculations is added to the value in the BSUM register.

Since no more data values are present for processing, the DSUM register value in piper 1 is combined with the DSUM register value in piper 2, and the BSUM register value in piper 1 is combined with the BSUM register value in piper 2, these sums being utilized for the criterion of brightness equation which yields a value of 0.170145. This presently-calculated brightness criterion value exceeds the just priorly-calculated value of 0.151860. Therefore, the priorly-calculated criterion brightness value is replaced with a newly-calculated criterion value, and the new candidate position replaces the prior candidate position.

In a like manner, the piping method is applied until all the data values and all the active pipers have been processed. For the example given, it is observed that a maximum criterion brightness value of 0.236915 occurs at position 8 so that, at the termination of the data processing, a selected criterion brightness of 0.236915 and a selected position of 8 results.

The exact way in which the piping method and the brightness calculations are completed is best understood in connection with each module. Accordingly, a more complete description and understanding of the various data processing means modules are presented below. Additionally, reference should be made to Table 8 for an identification and definition of the control signals and registers utilized in such data processing means.

1. Piper Module a. General Description

Referring now to FIGS. 9A and 9B, there is shown in block diagram of the piper module of the herein-described invention. The piper module 1016 of the data processing means 1012 processes microcomputer 1010 supplied chute data, in accordance with the chute emptying steps of the piping method, previously described. The pipers make available generated difference sums and weighting value sums to a brightness generator for the calculation of a criterion brightness value.

Each piper includes a chute memory array 1014, associated decoding logic blocks 1031, a top-of-chute pointer register TOCPTR 1032, a chute pointer register CPTR 1033, a pocket memory 1034 and associated decoding logic block 1035, and a minimum MIN finding block 1036. Also included in a piper is a piping logic block 1038 (FIG. 9B), a need-more-data NMD detection logic block and priority encoder 1040, and a controller logic block 1042.

The chute memory block 1014 shown in FIG. 9A includes eight 16-word Random Access Memories RAMs 1044. Each of the RAMs 1044 is termed a "chute". Each chute word is 16 bits wide (see FIG. 191 for the chute word formats). Bits 0 through 7 of the chute word contain distance (positional displacement) information; and bits 8 through 14 of the chute word contain the corresponding weighting value; and bit 15 of the chute word contains a command bit such that if bit 15 equals binary 1, then that chute is considered empty of data. The chute pointer register CPTR 1033 is a 3-bit counter register, whose value is the number of the particular chute being addressed at any given time. The CPTR is under instruction control from a piper control program (to be later explained) contained in controller logic block 1042 (see FIG. 9B) and receives instructions therefrom such that the CPTR is indexed by 1 after the processing of the data in the presently-pointed chute.

Associated with each chute is a top-of-chute pointer TOCPTR 1032. Each TOCPTR is a 4-bit counter register whose value indicates the storage word location being addressed in the chute to which that particular TOCPTR is assigned. The TOCPTR is under instruction control from the piper control program contained in controller logic block 1042 and addresses the word in the chute that is presently designated as the TOC.

It should be noted that for purposes of illustration, Tables 7A-7N refer to piper chutes 1 through 8 and top-of-chutes 1 through 16. The apparatus described herein uses a 3-bit counter register for CPTR 1033 to index the piper chutes and a 4-bit counter register for TOCPTR 1032 to index the top-of-chutes. The apparatus therefore is mechanized to identify the chutes as 0 through 7 and top-of-chutes as 0 through 15. The piper control program and flow charts describing operation of the various modules also follow this latter convention.

The pocket memory 1034 is an addressable register having eight storage word locations, each word location having 16 bits. Each pocket memory word location is associated with a particular chute in the chute memory block 1014. A pocket memory location word is loaded with data only from its corresponding chute during an operation called "popping the chute" (described in the section discussing the logical operations of the piper logic block). The pocket memory 1034 is addressed by the CPTR 1033 so that addressing any chute simultaneously addresses its corresponding pocket (POC). The decoding logic block 1035 (FIG. 9B) decodes the output of the CPTR to point to the word location of the value in the pocket memory corresponding to the chute presently being processed.

The data value presently existing at a designated TOC of each chute is supplied to a corresponding MIN finding block 1036 (FIG. 9A) that is associated with each of the chutes. Each of the MIN finding blocks 1036 of each chute is serially connected to form a minimum value finding logic block 1029 to determine the minimum value of the information values presently existing at all the TOCs of a piper. Each MIN finding block 1036 is connected to the distance fields, i.e., bits 0 through 7 plus bit 15 and of the current TOC. Thus, the value MIN existing at the output 1037 of the minimum value finding logic block 1029 represents the smallest value of the TOC of a single piper. It should be noted that the MIN finding block 1036 includes bit 15 along with bits 0 through 7 of the distance field in comparison of each TOC data value so that the end-of-chute EOC, end-of-data (EOD), and an end-of-file EOF command words are included in such comparisons. Thus, a command (see FIG. 19A) value will appear in the minimum value register MINREG 1039 after all valid data words have been processed.

The piping logic block 1038 continuously monitors the TOC and the POC storage locations being addressed by the CPTR and the TOCPTR registers, and calculates the difference between the distance field (D) of TOC and the value in MINREG and the difference between the D field of POC and the value in MINREG. The piping logic block performs the logical operations as described in the piping method steps and corresponding logical operations.

Figure 19A:
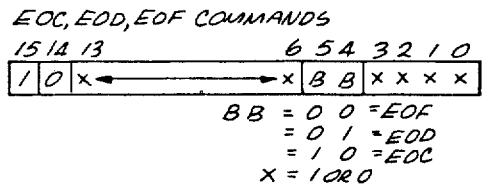
FIGS. 19A-19I are diagrams of the word formats used in the pipers and brightness generator of FIG. 7.
Figure 19B:
Figure 19C:
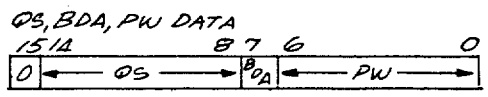
Figure 19D:
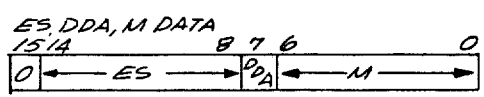
Figure 19E:
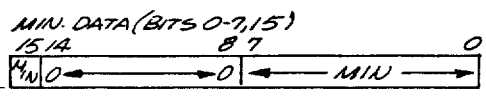
Figure 19F:
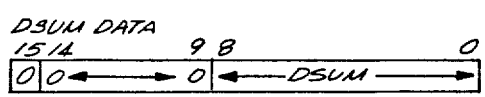
Figure 19G:
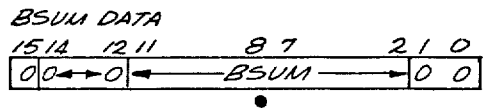
Figure 19H:
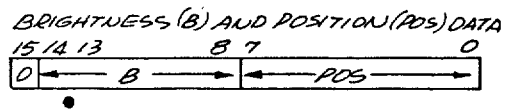
Figure 19I:
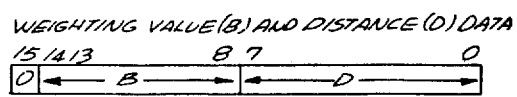

The need-more-data NMD detection logic block and priority encoder 1040 continuously monitors the TOC of every chute and provides and indication if any present TOC contains an NMD command (see FIG. 19B). An NMD command is indicated by a 1 in bit 14 and a 1 in bit 15 in an NMD command word that exists in word 15 (16th word) of the chute requiring such additional data. Bits 0 through 13 contain the chute refill identification information so that the microcomputer 1010 will have the proper address in its memory where the next segment of chute data for the indicated chute is located. The need-more-data detection logic block checks all the chutes for the existence of an NMD in one clock time.

The logic also sets CPTR to the address of the highest numbered chute containing an NMD command.

1. CONTROL LOGIC BLOCK

Figure 10:
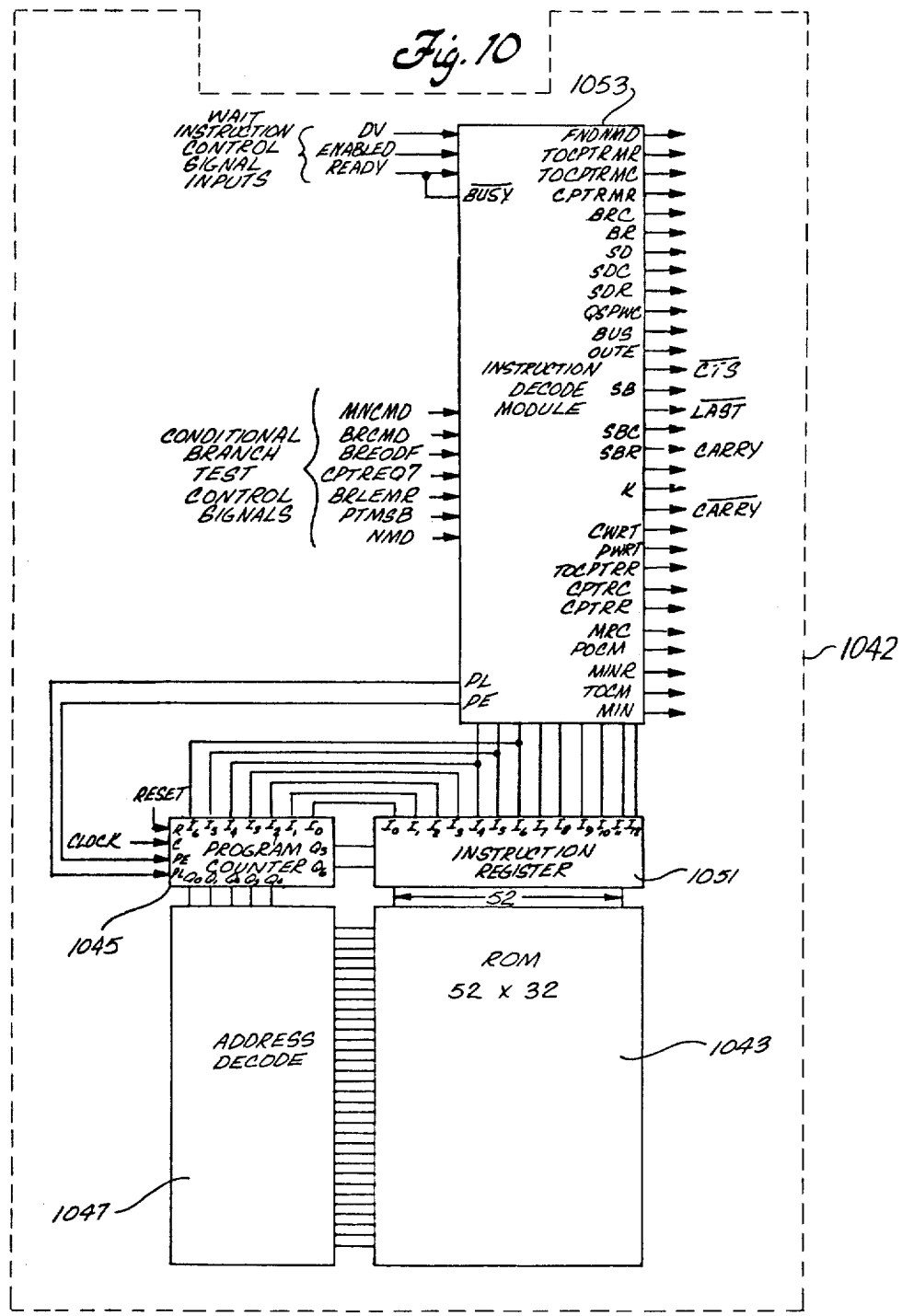

The control logic block 1042 shown in FIG. 10 includes a 52×32 Read-Only Memory ROM 1043 for storing instructions associated with a piper control program. The program counter 1045 stores the address of the instruction location of an instruction stored in the ROM 1043. The program counter 1045 is advanced by means of an external clock signal coupled to the Clock input terminal C of the program counter.

In the present embodiment, an external clock operating at 5 MHZ clock rate is used.

The program counter 1045 is enabled or disabled by a Program counter Enable PE control signal from the instruction decode module 1053. Upon receipt of each clock pulse, the program counter 1045 advances by 1 in hexadecimal order to the next instruction number. The advance occurs, however, only if control signal PE is not low. Control signal PE is low whenever a READY on wait, DV on wait, or ENABLED wait instruction is currently in the instruction register 1051, and the appropriate external control signal, READY, DV, or ENABLED input to the instruction decode module 1053 is off. Otherwise, control signal PE is high, and the program counter advances by 1. The wait instructions and the external control signals are explained during the detailed description of piper operation.

If the Parallel Load PL control signal is high at the same time that the PE control signal is high and a clock pulse arrives, the program counter 1045 does not advance by 1. Instead, it loads the address present on its input address lines 0–6 directly into its counter registers in order to execute jump instructions. These seven address lines are connected to bits 0–6 of the instruction register. Control signal PL is high (jump instructions are executed) whenever a conditional or nonconditional jump instruction is currently in the instruction register 1051, and the appropriate test control signal input to the instruction decode module is high. The jump instructions and test control signals are explained during the detailed description of piper operation. A Reset control signal is coupled to the R input terminal of the program counter 1045. A Reset control signal is issued by the brightness generator and causes the piper program counter to reset to the 00 instruction. A Reset signal overrides all other signals to the program counter.

The address decoder 1047 is coupled between the program counter 1045 and the ROM 1043. The address decoder decodes the 5-bit program counter output, i.e., Q0 through Q4 (see FIG. 10) and causes four instructions, whose location in the ROM is decoded by decoder 1047, to appear in the instruction register 1051, which is 52 bits wide, and thus accommodates four 13-bit instructions. Address lines Q5 and Q6 from the program counter 1045 selects one of the four instructions for execution.

The instruction decode 1053 is coupled to the instruction register 1051 and decodes the instruction contained therein, as selected by the seven address lines of the program counter 1045. The outputs (see FIG. 10) of the instruction decode 1053 are the control signals that control the various hardware elements that execute the piper operation. The high or low state of each control signal is set in accordance with the states specified by each instruction decoded from instruction register 1051.

The control logic block 1042 thus produces the control signals that sequentially step the piper components through the logical states required to execute the piping method by a rate set by the external clock control signal. The control logic block executes detailed microinstructions, contained in the ROM of the control logic block 1042, and activates the piper logic components in order to execute the steps of the piping method.

Table 9 is a listing of the piper control program that controls the execution of the steps of the piping method, as well as other piper functions. Explanation of the instructions and corresponding effect of such instruction in the piper is given in the detailed description.

2. PIPER MODULE OVERVIEW

Figure 9C:
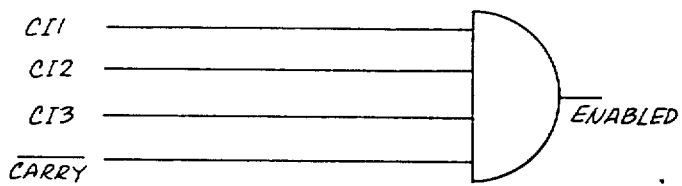
Figure 9D:
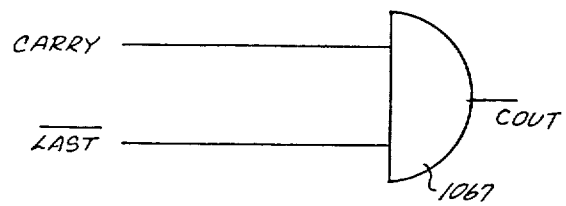
Figure 11A:
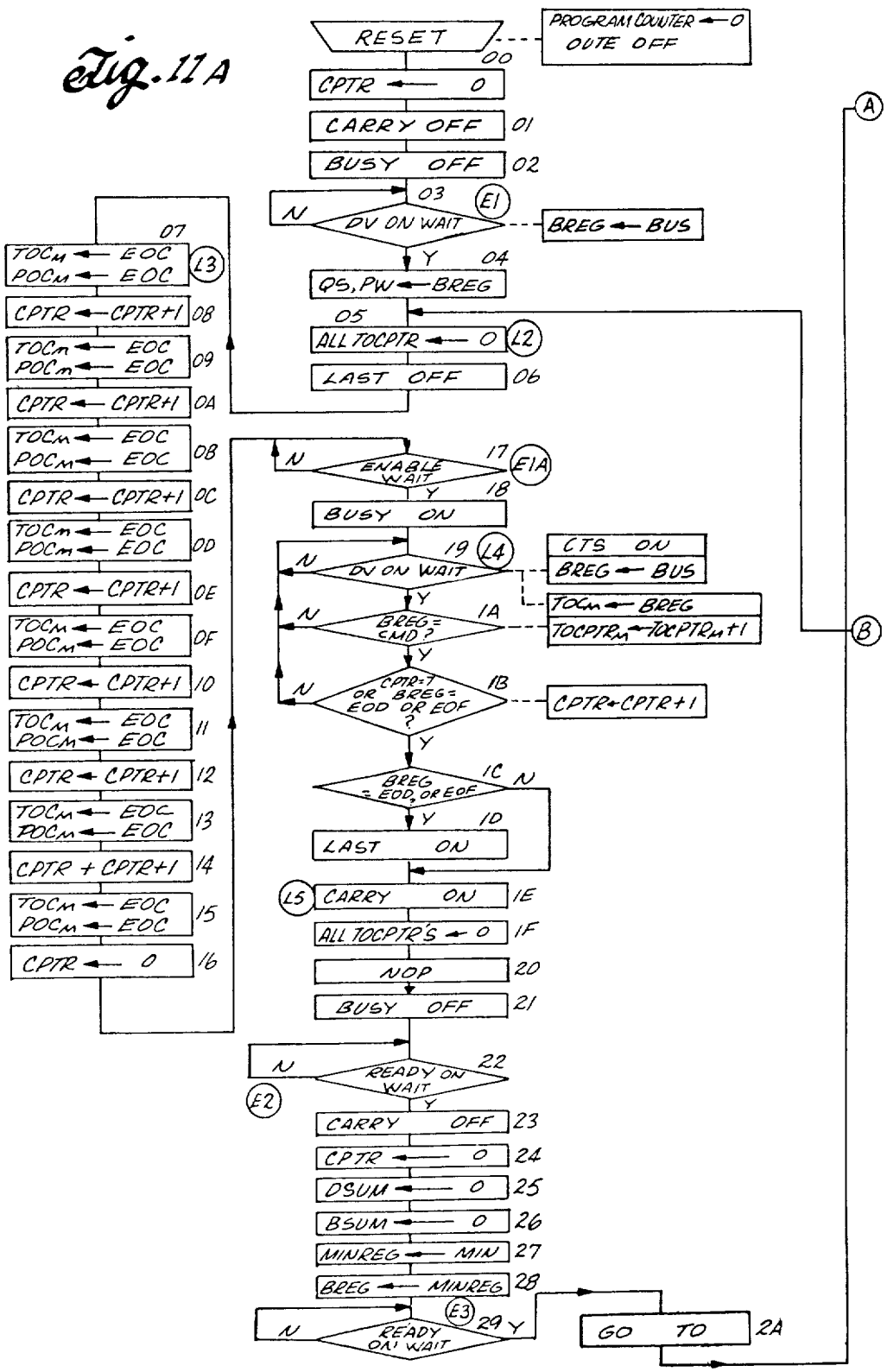
Figure 11C:
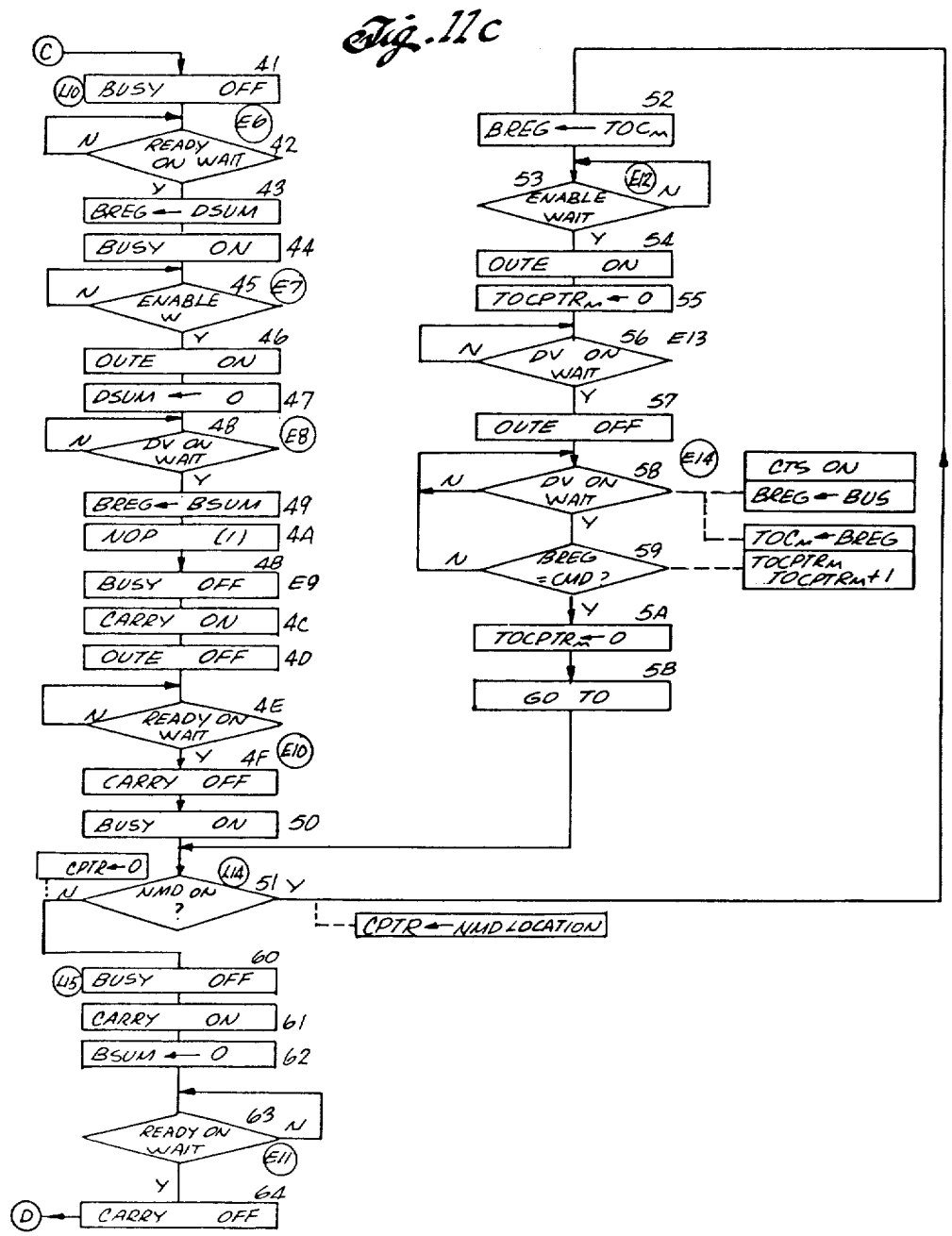

Prior to a detailed discussion of the piper in terms of the instruction sequence and effect on the piper hardware components, a more general operational overview utilizing the block diagrams of FIGS. 9A and 9D and the flow diagrams of FIGS. 11A through 11C is appropriate. References E1 through E14 in FIGS. 11A through 11C designate points of piper module synchronization with the brightness generator. Such reference numerals are also indicated in the brightness generator flow diagrams of FIGS. 17A through 17F. The references L1 through L16 in FIGS. 11A through 11C and Table 9 designate the first microinstruction following an entry point in the logic flow where processing control reenters the microinstruction sequence from a processing loop or a "return". As discussed, the piper executes five independent operational functions. Each of the functions is briefly discussed below with reference to the flow charts shown in FIGS. 11A through 11C.

The piper control signal instructions referred to in the following sections are stored in ROM 1043 that forms a part of the piper control logic block 1042 (see FIG. 10). The brightness generator control signal instructions referred to in the following sections are stored in ROM 1147 of the brightness generator program controller 1140 (see FIG. 19).

It should be noted that the numbers (not encircled) adjacent the function blocks shown in FIGS. 11A through 11C refer to the instruction identified by such instruction number executed by such function block. (See Table 9 for the piper control program instruction numbers and corresponding instruction).

INITIALIZATION

The initialization function is executed during instructions 0016. A RESET on signal from the brightness generator (see FIG. 18 and Table 11) resets the program counter to zero and thus the piper control program (see FIG. 10 and Table 9) is reset to instruction 00. As a result of the RESET command, the piper control program turns control signal OUTE off which disables the Data Bus line driver 1046 to decouple the output of register BREG from the Data Bus. The RESET command also initializes CPTR to zero so that it points to the first chute to be filled with data, sets control signal CARRY off which disables subsequent pipers (if any) "below" it on the Data Bus (see FIGS. 9D and 12), and turns BUSY off to release the READY line. The piper control program then enters the DV on wait state at E1 (FIG. 17) to test for the receipt of a DV (data valid) on signal from the microcomputer 1010. Control signal DV is set on by the microcomputer when data is ready to be transferred to the appropriate data processing means module. Since each DV on test simultaneously transfers Data Bus contents to the input of register BREG when the YES branch is taken at E1, (see FIG. 11A), valid data from the Data Bus exists in BREG. This first Data Bus word after a reset contains the new query size QS and pipewidth PW for the next cycle of piping. The value of QS and PW in BREG is then transferred to registers QS and PW and the piper begins chute filling processing.

CHUTE FILLING

The chute filling function is executed during instructions 17-1B. The piper control program initializes all TOCPTR registers to zero so that they point to the first TOC in each chute to be filled. It then sets control signal LAST off in case more chutes are required beyond the eight in the piper, and stores EOC command words in each TOC and POC to clear these memory locations of random startup values and to guarantee that bit 15 of each POC contains a 1. Piper control program uses bit 15 of POC and TOC to determine if data exists in a chute or pocket presently indexed. If bit 15=1, then that pocket or chute is considered "empty" of data. Storing a data word (noncommand) in a POC or TOC automatically clears bit 15.

The piper control program next checks to see if the piper has been enabled, i.e., CI1, CI2, and CI3 (see FIGS. 9C and 12) all on, signifying that the brightness generator and any pipers "above" (see FIG. 12) a given piper have finished initialization processing and filled their chutes without encountering an EOD or EOF command. Thus piper 2 will not be enabled until filling the chutes of piper 1 by microcomputer 1010 is completed. When a piper control program detects its piper Enabled control signal on (see FIGS. 3A and 4), it turns BUSY on to hold the READY line off, thus indicating to the remaining pipers that chutes are being filled in the presently enabled piper. Note (see FIGS. 10 and 12) that READY outputs of all pipers are tie-ORed, thus forcing synchronization of the piper array at the READY on WAIT instruction points in the logical flow. At each iteration of the DV on wait instruction (at L4), the control program: sets control signal CTS on to indicate to the microcomputer that the piper is ready for data; enables a BREG to TOC transfer to occur on the next instruction cycle; and checks for a DV on signal, each time transferring bus contents to BREG. After detecting the DV on signal, which indicates that valid data exists on the Data Bus, the control program takes the YES branch from the wait state. It next checks BREG for the presence of a command while simultaneously transferring Data Bus contents from BREG into TOC (TOCPTR)(CPTR), as set up by the previous microinstruction. As described below, TOC(-TOCPTR)(CPTR) is a shorthand notation that indicates the top-of-chute indicated by the value in the TOCPTR register of the chute indicated by the value in the CPTR register. If the last Data Bus word transferred was data (i.e., no command in BREG), the control program loops back to wait for another DV on signal and the next data or command word from the microcomputer. If BREG contains a command, indicating that the particular chute is full or requires no more data, the control program checks the contents of CPTR and BREG. If CPTR does not equal 7, indicating that not all chutes contain data, and BREG does not contain an EOD or EOF command, indicating that more chute data exists for the data base entry being piped, the control program increments CPTR to point to the next chute to be filled and takes the NO branch, returning to L4 to await the first chute word to be filled in the next chute from the microcomputer. If the YES branch is taken (all chutes filled or end of data), the control program checks to see if it was the result of finding an EOD or EOF command in BREG. If it was the result of an EOD or EOF command, LAST is set on to prevent the enabling of any subsequent pipers during piping of the current query/entry pair, since no more data is expected, and thus no more chutes required. Note that the "lower" piper enabling signal COUT (see FIG. 12) is formed in an "upper" piper, at the output of AND gate 1067 (see FIG. 9D) having input control signal CARRY on and LAST off (i.e., LAST on). If the branch was the result of CPTR=7, the control program branches around the LAST on instruction, leaving LAST off, as initially set, since at least one additional piper will be needed to provide at least one additional chute.

In either case, the control program next turns CARRY on to enable subsequent pipers, if any, to load their chutes. All TOCPTR registers are reinitialized to zero so that they point to the first word in each chute for the beginning of chute processing. The control program then turns BUSY off to indicate to the reset of the piper array that the piper is finished with chute loading and is ready to enter the next processing sequence on receipt of a READY on signal at E2.

When READY goes on, indicating that the pipers have finished chute loading, the control program turns CARRY off and initializes chute pointers and summation registers DSUM and BSUM, in preparation for minimum MIN determination and piping, and then waits at E3 until the brightness generator causes the microcomputer to decouple from the Data Bus. When READY goes on, the control program enters the minimum MIN determination processing.

MINIMUM MIN DETERMINATION

The minimum MIN determination function is executed during instructions 1C-34 and 65-6E. During minimum MIN determination, each current piper MIN value as found by the MIN finding logic block 1029 of each piper (see FIG. 9A) with the MIN values found in the other pipers, replaces higher values with lower values iteratively in register MINREG of each piper until all pipers contain the same value, i.e., the smallest existing MIN value for the current set of array TOCs, in their MINREG registers. Minimum MIN determination is performed after each change in the current set of TOC values in one or more pipers, i.e., after chute filling, piping, and NMD servicing. Minimum MIN determination processing proceeds as follows:

a. All Pipers

The control program first turns BUSY on at L6 (FIG. 11B) to hold all pipers and the brightness generator in the minimum MIN determination phase via the READY on check at E5 (FIG. 11B) until the minimum MIN (smallest TOC of the current set) is found and each piper has replaced its local MIN value with the array minimum MIN in its MINREG register.

b. Piper 1

On entering minimum MIN determination processing from either E3 (FIG. 11B) (first chute processing pass) or from E11 (after piping and NMD servicing), piper 1 is enabled by the brightness generator GO on signal. All other pipers at this time are disabled by one or more COUT off signals from other pipers. Therefore, piper 1 is always the first piper to take the YES branch from the ENABLED test function block that follows the BUSY on instruction at L6 and to place its MIN value on the Data Bus. The piper waits at E4B for a DV on signal from the brightness generator. Upon detection of the DV on, which indicates that the other pipers now have piper 1's MIN value transferred from the Data Bus for comparison, the piper 1 control program turns CARRY on (activating COUT) to enable the next pipers below it; decouples from the Data Bus; and subsequent to checking other pipers operating in the minimum MIN determination phase (READY off at E5), enters the MIN compare loop instructions 2F-33 (explained in c. below).

c. Other Pipers

Since all pipers other than piper 1 are disabled when first entering minimum MIN determination, they initially take the NO branch of the ENABLED instruction following L6; enter the MIN compare loop; and wait at EAB for a DV on signal while simultaneously transferring Data Bus contents to BREG at each iteration of the E4B check. When a DV on is detected, the pipers take the YES branch from E4B and compare the value of their local MIN with piper 1's MIN value just transferred from the Data Bus.

The pipers whose MIN values are equal to or greater than the piper 1 MIN value: (1) turn their BUSYs off, since they cannot contain the minimum MIN, (2) turn CARRY on to enable subsequent pipers (if any) whose MIN values were less than piper 1's and (3) replace their own MIN value with piper 1's smaller MIN value in register MINREG. Then, if READY is still off at E5, indicating that one or more pipers still remain whose MINs are less than the piper 1 MIN, these remaining pipers enter the MIN compare loop again to compare their newly-acquired (piper 1) MIN with the next enabled piper's (smaller) MIN value.

The pipers whose MIN values compared at E4B are smaller than the piper 1 MIN, loop back to enter the instruction sequence at L8. Of these surviving pipers, the one closest to piper 1 in "look ahead" order is the next piper to be enabled (i.e., GO on, plus piper 1 COUT on, plus possible COUT on signals from other pipers). Therefore, this "closest" piper now takes the YES branch from the ENABLED instruction and places its own MIN on the Data Bus. The other pipers that have looped back to L8, but are not enabled at this time, reenter the MIN compare loop.

The processing sequence just described above is repeated for the pipers whose MIN value is less than the current Data Bus MIN.

This cycle then repeats for succeeding piper(s) whose MIN value is less than the current Data Bus MIN until all pipers contain the minimum MIN value in their MINREG registers. The processing is now ready to proceed to the piping phase.

PIPING

The piping function is executed during instructions 35-50 and 73-75.

Following the YES branch at E5 (FIG. 11B), the control program checks MINREG to see if it contains a command. If all data has been processed, the control program returns to L2 to initialize and loads the chutes for the next piping cycle. If MINREG contains data, the control program turns BUSY on both to indicate that the piper is entering its piping phase, and to inhibit DSUM transfer to the brightness generator by the other pipers until the presently-enabled piper has completed its piping function. The control program checks POC(CPTR) and TOC(TOCPTR)(CPTR) for the presence of piping data (bit 15=zero). If neither contains piping data (i.e., both contain bit 15=1 and are thus "empty"), processing control branches directly to L10 to begin DSUM and BSUM transfer to the brightness generator. If piping data is present in either POC or TOC indicating that piping results from the piping combinatorial logic exists at the Bi and Di inputs of registers 1062 and 1060 respectively (see FIG. 9B), the control program waits four clock periods for the piping logic to stabilize. It then sums Bi into BSUM 1061 (see FIG. 9B) and checks the POP flag (an output of subtracter 1086). If POP is on, indicating that the contents of TOC(-TOCPTR)(CPTR) equals MIN (i.e., that this TOC provided the minimum MIN for this chute processing pass and therefore must be moved into its corresponding POC), the control program stores the contents of TOC(TOCPTR)(CPTR) in POC(CPTR) and increments TOCPTR(CPTR) to point to the next TOC in turn for that chute. If POP is off, then Di is non zero and the control program sums Di into DSUM 1059 (see FIG. 9B).

In either case, the control program next checks the value of CPTR. If it is less than 7, indicating that not all TOC's have been processed, the control program increments CPTR to point to the next chute and loops back to L13 to process it. If CPTR equals 7 (all chutes processed for a given chute processing pass), the control program turns BUSY off to indicate that the piper's TOC processing is complete, and waits at E6 for a READY on signal. When a READY on is received, indicating that all the pipers are finished with TOC processing, and the brightness generator has completed brightness calculations for the previous chute processing pass, the control program initiates DSUM and BSUM transfer to the brightness generator as follows.

The control program causes the transfer of DSUM into BREG for subsequent transfer to the Data Bus. Next it turns BUSY on to indicate to the pipers that a given piper is ready to transfer DSUM and BSUM and then such piper remains in a wait mode until enabled. When an enabled condition is detected at E7, indicating that the previous pipers have finished their DSUM and BSUM transfer to the brightness generator, the control program turns OUTE on the place the contents of BREG on the Data Bus; clears register DSUM in preparation for the next piping cycle; and waits at E8 for a DV on signal from the brightness generator. When DV on is detected, indicating that the piper's DSUM has been transferred to the brightness generator, the control program transfers the contents of BSUM into BREG, with OUTE still on to make BSUM available to the brightness generator. The piper and the brightness generator are in synchronization at this point due to the DV on synchronization at E8. The piper turns its BUSY off at E9 in synchronization with the brightness generator's response to its own DV on signal and simultaneously reads the piper's BSUM from the Data Bus. The control program next turns CARRY on to enable the next piper to transfer its DSUM and BSUM to the brightness generator and turns OUTE off to decouple BREG from the Data Bus (see FIG. 9B). The control program now enters the READY on wait state at E10 while the pipers complete sequentially transferring their DSUM and BSUM's to the brightness generator. When the READY on occurs, the control program turns CARRY off to prevent subsequent pipers from being enabled and using the Data Bus, and turns BUSY on to indicate that it is now in the NMD processing loop, holding the other pipers at E11 until the present piper completes NMD servicing.

NMD SERVICING (CHUTE REFILLING)

The NMD servicing function is executed during instructions 51–5B. If the NMD processing block 1040 (see FIG. 9A) indicates that an NMD command exists in a particular TOC, the control program loads CPTR with the chute number provided by the NMD processing block 1040, then loads the NMD command found at the particular TOC into BREG in preparation for transferring it to the Data Bus. When an enabled condition is detected at E12, the control program turns OUTE on to place the NMD on the Data Bus, and initializes TOCPTR (CPTR) to zero in anticipation of chute reloading. Concurrently, the brightness generator generates a DV on signal to cause the microcomputer 1010 to read the Data Bus, and when DV on is detected by the piper at E13, indicating that the microcomputer has received and read the piper's NMD, the control program decouples the piper output from the Data Bus, i.e., (OUTE off) and waits at E14 for a second DV on signal from the microcomputer indicating that it has chute refill data ready for transmittal to the piper. At each execution of the DV on wait instruction, the control program generates a CTS signal to indicate to the microcomputer that the piper is ready for data; transfers bus contents to BREG; and sets up a BREG to TOC data transfer to occur on the next instruction cycle. After DV on is detected, indicating that the microcomputer has placed data on the Data Bus, the control program takes the YES branch from the wait state to check the contents of BREG. The control program checks BREG to see if the chute refill word just received contains a command; transfers the contents of BREG into TOC(TOCPTR)(CPTR), as set up by the previous instruction; and increments TOCPTR(CPTR) to point to the memory location in the chute indexed by CPTR in which to store the next chute refill word. If BREG does not contain a command, then the control program loops back to L16 to repeat the E14 processing to take the next chute refill word from the Data Bus. If the chute refill word does contain a command, the chute refill operation is complete, and the control program initializes TOCPTR(CPTR) to zero so that it points to the new TOC for the chute indexed by CPTR at the beginning of the next chute processing pass.

The control program now returns to L14 to see if it has processed all remaining NMDs. If it has not, it branches to repeat the NMD processing described above for the next NMD. If no NMDs remain to be processed, the control program branches to L15 and turns BUSY off to indicate to the pipers that it has finished NMD processing, turns CARRY on to enable subsequent pipers to service their NMDs, if any, clears the BSUM register 1061 in preparation for a new chute processing pass and enters the READY on wait state at E11 to wait for the other pipers to finish NMD servicing.

When READY goes on at E11, the control program prepares for a new minimum MIN determination sequence by storing the new MIN, resulting from NMD chute refilling and chute popping, into MINREG, and turns BUSY on to cause the piper to take the NO branch at E5 as long as this or any other piper remains in the MIN compare loop. MIN processing now proceeds as previously described in the Minimum Min Determination section.

(b) DETAILED DESCRIPTION OF THE PIPER INSTRUCTION PROGRAM

Reference should be made to Table 9, FIGS. 9A, 9B, 9C, 9D, FIGS. 11A, 11B and 11C.

The piper control program as discussed provides the control signals that control the various hardware elements within each piper that execute the operational functions of the piper. The hardware elements, as will be discussed, respond to the state (i.e., on or off synonymous with high or low) of the control signals that are coupled to such hardware elements. The hardware contemplates implementation by means of LSI technology and therefore each hardware element will be described as to its function rather than a commercially-available equivalent.

The pipers are reset by a RESET signal from the brightness when the query size changes, such as occurs after an end-of-file is reached in the memory, or after a brightness value of 1 is calculated. A reset pulse is also issued by the brightness generator subsequent to its receipt of a Power On Reset POR signal from the microcomputer 1010.

In the piper, the reset pulse resets the program counter of the control logic block 1042 to 00 causing the logic block 1042 to select and decode instruction 00 from the logic block ROM 1043. The reset pulse also causes control signal OUTE to become low, thus turning off the Data Bus line driver 1046 and disconnecting the output of register BREG from the Data Bus.

In the following descriptions of instruction interpretation, control signals not described as high are low, regardless of their state during the previous instruction. The four exceptions to this are control signals BUSY, OUTE, CARRY, and LAST. Once made high or low, they remain in that state during subsequent instructions until second instructions specifically change their state. Instructions are numbered in the hexadecimal (base 16) notation.

During instruction 00, control signal CPTRR (see FIG. 9A) is caused to become high, which causes register CPTR to reset (initialize) to zero. Initializing the CPTR register to zero causes it to point to the first chute to be filled with data and command words from the Data Bus.

During the instruction 01, control signal CARRY is caused to become low, causing the output COUT (see FIG. 9D) of AND gate 1067 to go low, which disables pipers other than the one presently active.

During instruction 02, control signal BUSY is caused to become low. Since all pipers (the pipers required to store the present query) $\overline{\text{BUSY}}$ control signal lines are tie-ORed to produce control signal READY, synchronization of the pipers occurs at each READY on wait instruction. The individual piper control programs remain at each such instruction until all pipers finish the previous processing phase and cause their BUSY control signals to become low. Any BUSY control signal high causes control signal READY to become low (READY off). All BUSY control signals simultaneously low cause control signal READY to become high (READY on). Thus, entry into the next processing phase is inhibited until control signal BUSY in each piper is off.

FIG. 12 shows that all READY control signal inputs of the pipers and the brightness generator are connected in parallel to one end of a resistor R whose other end is connected to a power supply V+. Internally in each piper and the brightness generator, the READY control signal is connected to the instruction decode module (see FIGS. 10 and 18). The READY control signal is also connected to the $\overline{\text{BUSY}}$ output of the instruction decode module. When the BUSY control signal is caused to become high, $\overline{\text{BUSY}}$ becomes low. Since $\overline{\text{BUSY}}$ is connected to the READY input, the READY signal becomes low. Since all READY signals are tied together to the common resistor R shown in FIG. 12, all READY control signals to all pipers and the brightness generator also become low. Thus, control signal READY to all pipers and the brightness generator is low if any piper or the brightness generator has caused its BUSY control signal to become high. The READY control signal remains low until all pipers and the brightness generator have caused their BUSY control signals to become low simultaneously.

Instruction 03 of the controller program is next executed. The instruction causes the control signal BUS and the control signal BRC from the instruction decode module 1053 of control logic block 1042 to become high. BUS high causes IBUS input gate 1048 to become conductive, placing the information presently existing on the Data Bus line on the IBUS 1028. The Data Bus line and the IBUS line include 16 individual data lines to accommodate a 16-bit word format (see FIG. 19). BRC (coupled to the Chip Enable CE input of BREG, see FIG. 9B) high enables the BREG register, which has its data input (D) terminal coupled to the IBUS, to copy in the data presently existing on the IBUS. The data presently existing on the Data Bus is the value QS, the query size and PW, the pipewidth, both supplied by microcomputer 1010.

It should be noted that although the IBUS has 16 individual data lines to accommodate a 16 bit word format, the IBUS is shown in FIG. 9B as a single line. The convention of showing multiple single lines as a single signal line is maintained throughout this discussion. FIG. 19A through FIG. 19I show the word formats for each of the various data word and command words used herein. It should be understood that the signal lines carrying such data and command words or parts thereof have the number of lines for the transmittal of such words. The numerals above each pictorial representation of the words in FIGS. 19A-19I represent the bit positions in such word.

Additionally it should be understood that control signals are coupled to those hardware elements that are responsive to such control signals. Such coupling is identified in the appropriate hardware figures with the name of such control signals adjacent to the hardware element to which the control signal line is connected. This convention will be maintained throughout this discussion.

Instruction 04 of the controller program is next executed. The instruction causes the control signal QSPWC and BR from the instruction decode module of the control logic block 1042 to become high. BR high causes gate 1084 to become conductive, allowing the value in the BREG register to be copied onto the IBUS. A high state of control signal QSPWC, that is coupled to the Chip Enable CE input of both the QS register 1063 and PW register 1065, enables the PW register and the QS register to copy in the information presently existing on the IBUS. The PW register data input (D) is coupled to lines 0 through 6 of the IBUS, which presently contains a 7-bit word equal to the pipwidth value. The data input (D) of the QS register is coupled to lines 8 through 14 of the IBUS, which presently contains a 7-bit word equal in value to QS. At this point, the initialization phase of the piper is complete.

The chute-filling phase is initiated upon issuance of instruction 05 of the piper control program. The control logic block 1042 initialized all TOCPTR registers to zero, such that they point to the first word location in each chute. The instruction causes the control signal TOCPTRR to become high. TOCPTRR high causes the output of OR gates 1050 (see FIG. 9A) (one per chute) to become high. The outputs of these OR gates are connected to the rest terminals R of the TOCPTR pointer registers 1032 (one per chute). With R high, the TOCPTR registers are initialized to zero.

Instruction 06 causes control signal LAST to become low in case more chutes are required beyond the eight in the piper. Thus, when the control signal LAST is low ($\overline{\text{LAST}}$ high), and control signal CARRY is high, the output of AND gate 1067, i.e., COUT is high, thereby enabling the next succeeding piper.

During instruction 07 of the control program, control signals K, TOCM, CWRT, and POCM are caused to become high. Control signal K high causes gate 1049 to become conductive, placing the contents of KROM (an EOC command) on the IBUS. TOCM high causes gate 1054 to become conductive, placing the EOC command word appearing on the IBUS on the TOCM bus 1057 (see FIG. 9B), thereby making the EOC command word available to each chute. POCM high causes the POC gate 1056 to become conductive, thereby making available the EOC command word presently existing on the IBUS, to the pocket memory 1034. When write enable control signals CWRT and PWRT (see FIG. 9A), coupled to each chute and pocket respectively, are high, the contents of the TOCM bus 1057 and IBUS 1028 are copied into the chute and pocket, respectively, that are presently indexed by CPTR. Since CPTR was cleared during the initialization phase, it now points to the first chute (chute number 0), and since TOCPTR was reset to zero for each chute during instruction 05 of the control program, the command word EOC is copied into the first word location of chute number 0 and into the corresponding pocket for chute number 0.

Instruction 08 causes CPTR to be indexed by 1, such that the first word location of chute number 1 is presently addressed. Instruction 09 then causes the command word EOC to be copied into the first word location of chute number 1 and also into the corresponding pocket POC for chute number 1, as in instruction 07. The control program in instructions 0A through 15 repeats the above-described operation by indexing the CPTR by 1 and filling the corresponding chute and pocket with the EOC command words. The EOC command word in each TOC and POC clears these memory locations of random start-up values and guarantees that bit 15 of each POC memory locations contains a logical 1. The control program utilized bit 15 of POC and TOC to determine if data exists in a chute or in a chute pocket. If bit 15 equals logical 1, then that pocket or chute is considered "empty" of data. Storing a data word in a POC or TOC automatically clears bit 15.

Instruction 16 next clears CPTR by causing the control signal CPTRR to become high. The control program next executes an ENABLE wait instruction to determine whether a particular piper is enabled. For a better understanding of the ENABLE wait function, reference is made to the multiple pipers shown in FIG. 12.

(c) MULTIPLE PIPER ENABLING

Each piper has a CI1, CI2, and CI3 control signal input. In order to active (enable) a piper, all three control signals CI1, CI2, and CI3 must be high. Additionally, in order for a piper to be enabled, its internal CARRY control signal must be low, indicating that the piper is not enabling a subsequent piper.

Each piper is coupled to the GO control signal output of the brightness generator. The existence of a GO signal is a necessary condition to activate all pipers. The existence of a GO signal is a sufficient condition to active piper 1 in the piper string. If, for example, the storage capacity for piper 1 is insufficient for storage of an entry array, piper 1's COUT control signal will go high. Piper 1's COUT control signal is applied to the CI1 and CI2 inputs of piper 2, while the GO signal command is applied to the CI3 input of piper 2. Thus, since CI1, CI2, and CI3 of piper 2 are high, the piper will be enabled.

If, for example, the storage capacities of piper 1 and piper 2 are insufficient for storage of an entry array, the COUT control signal of piper 2 will go high. The CI1 input of piper 3 is coupled to the COUT input of piper 2. The CI2 input of piper 3 is coupled to the COUT of piper 1, and the CI3 input of piper 3 is coupled to the GO signal. Since for piper 3 its CI1, CI2, and CI3 control signals are high, piper 3 is enabled.

In a like manner, the succeeding pipers will be enabled when it is found that the storage capacity of the preceding piper is insufficient for storage of an entry array.

Referring to FIG. 9C, control signal ENABLED is the output of AND gate 1067. The output of AND gate 1067 is high only if control signals CI1, CI2, and CI3, and control signal $\overline{CARRY}$ from the piper instruction decode module are high simultaneously. $\overline{CARRY}$ is high when CARRY is low; i.e., when a given piper is not itself enabling a subsequent piper. As FIG. 12 shows, the GO control signal output from the brightness generator and the COUT control signals from the pipers are connected so that control signals CI1, CI2, and CI3 become high simultaneously for a given piper only if GO is high and the COUT control signals of all pipers, if any, between the given piper and the brightness generator (see FIG. 12) are also high. The GO control signal and COUT control signal are ANDed in AND gate 1008 for each group of four pipers to keep the number of enabling signals to not more than four.

The COUT control signal is caused to become high by a given piper to enable the next piper in the piper string (pipers 1–16) (see FIG. 12). As shown in FIG. 9D, the COUT control signal is the output of AND gate 1067. The output COUT of AND gate 1067 is high if control signal CARRY and $\overline{LAST}$ are high, simultaneously. Control signal LAST is high when control signal $\overline{LAST}$ is low. Control signal LAST is low when a given piper is not the last piper in the string to contain chute data. Control signal CARRY is caused to become high when processing requires that the next piper in sequence be enabled.

Instruction 18 of the control program causes the control signal BUSY to become high, which causes the control signal READY to become low. BUSY high at instruction 18 ensures piper synchronization at point E2 of the flow chart (see FIG. 11).

During instruction 19 of the control program, the following occurs simultaneously: Control signal CTS becomes low, thus indicating that the piper is ready to receive data from the Data Bus; and data on the Data Bus is copied into the BREG register. If the external DV control signal is off (high), instruction 19 is repeated. If the DV control signal is on (low), the program counter (see FIG. 10) increments to instruction 1A, and, simultaneously, the contents of the BREG register are copied into the TOC of the chute as indexed by the present settings of CPTR and TOCPTR. Since previous CPTR and all the TOCPTR registers have been set to zero, the first data word is placed in the first word location of chute number 0.

Data Bus contents are copied into BREG as follows: The control program sets control signal BUS high and control signal BRC high. To copy the contents of BREG into the first word location of chute number 0, the program controller causes control signal CWRT to become high, thus enabling all chutes to receive data. The control program causes control signal BR to become high, thus causing the contents of BREG to be copied onto the IBUS. Additionally, the control program causes control signal TOCM to become high, which causes the contents of the IBUS to be copied onto the TOCM bus.

The NMD detection logic block and priority encoder 1040 decodes the value in CPTR and, since the value in CPTR is presently zero, causes the 0 output of the priority encoder (see priority encoder 1040, FIG. 9A) to become high. A high on priority encoder output 0 causes the chute number 0 transfer gate 1048 to close, resulting in the copying of the contents of the TOCM bus into the chute location specified by the value in the TOCPTR register. The next instruction, 1A, simultaneously increments the value in the TOCPTR register by 1 and tests the contents of BREG for the existence of a command word. The test consists of checking whether control signal BRCMD, issued from the BREG register, is high or low. If BRCMD is low, indicating that the data contained in BREG is not a command, the program counter is decremented to instruction 19, and instruction 19 is reexecuted, causing the next data word to be copied into the next available chute word location. If control signal BRCMD is high, indicating that the contents of BREG is a command, the program counter is incremented to instruction 1B.

Instruction 1B simultaneously tests the value in CPTR and the value of control signal BREODF issued from BREG. If the value in CPTR is less than 7, the value in register CPTR is incremented by 1 so that the contents of CPTR point to the next chute to be filled with data, and the program counter is decremented to 19. Instruction 19 is then reexecuted, causing the next data word to be copied into the first word location of the next chute to be filled. If the value in register CPTR equals 7, indicating that chutes 0 through 7 have been filled with data, or if control signal BREODF is high, indicating that the contents of BREG consists of an EOD or EOF command, the program counter is incremented to instruction 1C.

Instruction 1C tests the control signal BREODF output of BREG. If control signal BREODF is high, indicating that the contents of BREG consists of an EOD or EOF command, the program counter is incremented to 1D. If the control signal BREODF is low, indicating that the contents of BREG do not consist of an EOD or EOF command, the program counter is incremented to 1E. In the former case, instruction 1D is executed, causing control signal LAST to become high. The program counter is then incremented to 1E. Instruction 1E is executed, which causes the control signal CARRY to become high. Instruction 1D is executed only if an EOD or EOF command has been detected in BREG. Either of the EOD or EOF commands indicates that no more data will be forthcoming on the Data Bus, and, therefore, no more pipers are needed to store the piper data. If control signal LAST is high, control signal COUT (see FIG. 9D) is caused to become low, preventing subsequent pipers in the piper string (see FIG. 12) to become enabled. If instruction 1D is not executed, control signal LAST will remain low, and since instruction 1E causes control signal CARRY to become high, control signal COUT becomes high. This enables the next piper in line to begin receiving data from the Data Bus.

Instruction 1F is next executed. This instruction causes control signal TOCPTRR to become high. TOCPTRR high causes all TOCPTR registers to reset to zero so that they point to the first word in each chute for the beginning of chute processing. Next, instruction 20, a NO-OP instruction, is executed. A NO-OP instruction does not set any control signals, but allows time for the values in the TOCPTR registers, reset in instruction 1F, to stabilize.

Instruction 21 causes control signal BUSY to become low, permitting control signal READY to become high if all other such BUSY signals are low. During instruction 22, control signal READY is tested. As long as control signal READY remains low, the program counter is not incremented. When control signal READY becomes high, the program counters of all pipers increment to instruction 23. During instruction 23, control signal CARRY is caused to become low, and if control signal LAST is off, causes external control signal COUT to become low, thus disabling any pipers below the present piper.

During instruction 24, control signal CPTRR is caused to become high. CPTRR high resets register CPTRR to zero, thus pointing to chute number 0.

During instruction 25, control signal SDR is caused to become high. SDR high resets 9-bit adder 1060 to zero. Concurrently with this operation, control signal SDC is caused to become high, thus enabling accumulator register DSUM, and, thus, the zero contents of 9-bit adder 1060 are copied into DSUM.

During instruction 26, control signal SBR is caused to become high. SBR high resets 10-bit adder 1062 to zero. Concurrently with the above operation, control signal SBC is caused to beome high. SBC high enables accumulator register BSUM to receive the contents of adder 1062, thus causing the zero contents of the adder 1062 to be copied into register BSUM. This operation clears the BSUM register to accumulate the next weighting value sum.

During instructions 1C through 26, the MIN finding logic determines the minimum distance value for the current TOC for each chute. This is accomplished by means of continuously evaluating the present TOC for each chute in MIN finding logic block 1029. The MIN finding logic block 1029 comprises a series connection of the MIN logic blocks 1036, with a block 1036 coupled to each chute. The distance field and the command field, that is, bits 0 through 7 and bit 15 of chute number 7, are applied to the MIN logic block 1036 that is coupled to chute number 7. The MIN logic block 1036 includes a 9-bit comparator 1064, having an A input coupled to the distance/command (D/C) fields of chute number 7 and a B input coupled to the D/C fields of chute number 6. Included in the MIN finding logic block 1036 are series-connected gates 1066 and 1068. The common connection point 1070 of the two series-connected gates forms the output of the MIN logic block. Gate 1066 has a terminal 1072 that is coupled to the D/C fields of chute number 7. Gate 1068 has a terminal 1074 that is coupled to the D/C fields of chute number 6. The A<B output of comparator 1064 is coupled to the control terminal 1070 of gate 1068 and the input terminal of inverter 1080. The output of inverter 1080 is coupled to the control terminal 1078 of gate 1066. If the D/C field value of chute number 7 applied to terminal A of comparator 1064 is greater than the D/C field value of chute number 6 as applied to terminal B of the comparator 1064, the output A<B of the comparator will be high, thus activating gate 1068 and, due to inverter 1080, inactivating gate 1066. Thus, the D/C fields in chute number 6 will appear at the output 1007 of the comparator. For the case when the D/C field value in chute number 7 is less than the D/C field value in chute number 6, the output A<B will be low, thereby deactivating gate 1068 and, due to inverter 1080, activating gate 1066. Thus, the D/C field value of chute number 7, being less than the D/C field value of chute number 6, will appear at the output 1070.

In a like manner, the value appearing at output 1070 will be compared to the D/C field value presently at the TOC of chute number 5. In accordance with the discussion previously described, the smaller of the two values, i.e., the value at output 1070 of a MIN logic block coupled to chute number 5 and the value in the D/C fields of the TOC of chute number 5, will be selected. After all chutes have been compared, the smallest TOC value of all the chutes will appear at the MINOUT terminal 1037, i.e. MIN finding logic block output terminal.

During program instructions 1D through 26, the minimum distance value in the TOCs of each chute of each piper will appear at the corresponding MINOUT terminal of each piper.

During instruction 27, the control program causes the control signal MIN to become high. MIN high activates gate 1079, thus placing the MIN value presently existing at MINOUT terminal 1036 on the IBUS. The control signal MRC becomes high, thus permitting the value on the IBUS to be copied onto the MINREG register.

During instruction 28, control signal MINR goes high, causing gate 1081 to become conductive, thereby placing the contents of the MINREG register onto the IBUS. Control signal BRC goes high, thereby enabling the BREG register, thus copying the value on the IBUS into the BREG register.

During instruction 29, the program counter "waits" until control signal READY becomes high. Control signal READY high at E3 of the piper logic flow indicates that the brightness generator has caused its BUSY control signal to become low (to be explained in discussion of brightness generator). When control signal READY becomes high, the program counter is incremented to instruction 2A. During instruction 2A, the program counter is incremented to instruction 67. During instruction 67, control signal BUSY is caused to become high. This causes the READY control signal between pipers to be tested low at E5 as long as pipers remain with MIN values to compare.

During instructions 68 through 6E and 2F through 34, the MIN value in each piper is compared with MIN value of a subsequent piper, and the minimum of such two values is returned to each piper and placed in their corresponding MINREG register. The foregoing process is repeated, and the value just determined is compared with the BREG register value of a subsequent piper, and the minimum value therebetween is returned and copied into the MINREG register of the pipers just tested. At the conclusion of the testing of all active pipers, the smallest value of the MIN determined in each piper will appear in the MINREG register of each piper.

During instruction 68, the state of control signal ENABLED is checked. If control signal ENABLED is high, indicating that the input control signals CI1, CI2, and CI3 are high, and the CARRY control signal is low, the program counter increments to instruction 69.

During instruction 69, control signal OUTE is caused to become high. OUTE high causes the line driver 1046 to connect the Data Bus to the output of the BREG register, thus causing the contents of BREG to be copied onto the Data Bus. The BREG register currently contains the MIN value in MINREG.

During instruction 6A, control signal BUSY is caused to become low with effects on control signal READY at E5 as previously described. During instruction 6B, the program counter remains at 6B until control signal DV becomes low, indicating that the other pipers have copied the contents of the Data Bus into their BREG registers (see instruction 2F). During instruction 6C, control signal CARRY is caused to become high. If control signal LAST is also low, control signal COUT becomes high, thus enabling the next succeeding piper when executing its instruction 68 to place the contents of its register BREG on the Data Bus for comparison by the other pipers.

During instruction 6D, control signal OUTE is caused to become low, thus disconnecting the BREG register from the Data Bus.

During instruction 6E, the program counter is decremented to instruction 34. During instruction 34, if the READY control signal is low, indicating that one or more pipers have not finished the comparisons of their MIN values with the MIN values in all of the other pipers, the program counter decrements to 2F. Returning to the discussion of instruction 68, if, during 68, control signal ENABLED is found to be low, the program counter is decremented to instruction 2F.

During instruction 2F, control signal DV is checked. Simultaneously with each check of DV, control signal BUS is caused to become high, thus copying the contents of the Data Bus onto the IBUS. Simultaneously, control signal BRC is caused to become high, which enables register BREG to receive the contents of the IBUS.

During instruction 30, the output of comparator 1082, namely, control signal BRLEMR, is checked. If control signal BRLEMR is low, indicating that the value in register BREG is greater than the value in MINREG, the program counter is incremented to instruction 66. Since the value in BREG, and hence the value on the Data Bus, is greater than the value in the MINREG register, this piper then has potentially the smallest value of all of the pipers in its MINREG register and, thus, must take its turn to put its MIN value on the bus for comparison with the MIN values of other pipers.

During instruction 66, control signal MINR and control signal BRC become high. MINR high causes gate 1081 to become conductive, thus copying the contents of the MINREG register onto the IBUS. BRC high enables the BREG register so that the contents of the IBUS are copied into the BREG register. Instructions 67, 68, 69, 6A, 6B, 6C, 6D, 7E, and 34 are again executed with this new value of MIN on the Data Bus.

Returning to the discussion of instruction 30, if the output of comparator 1082, namely, control signal BRLEMR, is high, indicating that the value in BREG is equal to or less than the value in register MINREG, the piper replaces its MINREG value with the value in BREG as follows. During instruction 31, control signal BUSY is caused to become low with effects on control signal READY at E5 as previously described. During instruction 32, control signal CARRY is caused to become high and, if control signal LAST is also low, causes control signal COUT to become high, thus enabling subsequent pipers.

During instruction 34, control signal BR and the control signal MRC are caused to become high. BR high renders gate 1084 conductive, causing the copying of the contents of the BREG register onto the IBUS. MRC high enables the MINREG register to receive the contents of the IBUS. If control signal READY is found to be high, indicating that all of the pipers have finished comparing the contents of the MINREG registers of all of the other pipers and have the minimum MIN value in their MINREG register, the program counter is incremented to instruction 35.

During instruction 35, control signal CARRY is caused to become low which is turn causes control signal COUT to become low, thus disabling any subsequent pipers.

During instruction 36, control signal MNCMD, which is an output of the MINREG register, is checked. Control signal MNCMD low (bit 15 of the MINREG register is high) indicates that the contents of the MINREG register is a command word. The command word in the MINREG register indicates that all data in the chutes has been processed. The program counter is decremented to instruction 05, and the chute refilling process commences. If control signal MNCMD is high, the program counter is incremented to instruction 37.

During instruction 37, control signal BUSY is caused to become high with effects on control signal READY at E6, as previously described.

Instructions 38 through 41 and 73 through 75, in conjunction with the piping logic block, implement the piping method. For a better understanding of the piping logic, reference is made to FIG. 9B containing the logic blocks that implement the steps of the piping method.

The A input of subtracter 1086 is coupled to lines 0-7 of the TOCM bus 1057. As described previously, lines 0-7 of the TOCM bus contain the distance field of the word existing at the presently-indexed TOC. The $\overline{B}$ input of subtracter 1086 is coupled to the $\overline{Q}$ output of the MINREG register. The $\overline{B}$ input and $\overline{Q}$ output, as just described, are used simply to accommodate the hardware mechanization of the subtracter function. The A-B output of subtracter 1086 is coupled to the B input of comparator 1090 and to terminal 1089 of D1 transfer gate 1096.

Coupled to the normal or Q output of the MINREG register is the B input of subtractor 1088. To the C input of subtractor 1088 is coupled the distance field of the pocket register. The B-C output of subtracter 1088 is coupled to terminal 1087 of D2 transfer gate 1094. The D1 transfer gate 1096 and D2 transfer gate 1094 are coupled in series-circuit arrangement, and the common connection point 1104 of said gates is coupled to both the B input of comparator 1092 and to the input side of transfer gate 1098. The B-C output of subtracter 1088 is coupled to the A input of comparator 1090. The $\overline{A<B}$ output of comparator 1090 is coupled to the control electrode of the D1 transfer gate 1096 and to the input of inverter 1091. The output of inverter 1091 is coupled to the control electrode of D2 transfer gate 1094.

The output of the PW register is coupled to the A input of comparator 1092. The $\overline{A<B}$ output of comparator 1092 is coupled to the control electrode of transfer gate 1098 and the input of inverter 1093. The output of inverter 1093 is coupled to the electrode of transfer gate 1100. Coupled to the input of transfer gate 1100 is the Q output of the QS register. The output of transfer gate 1100 is coupled to the Di input of the 9-bit adder 1060. Also coupled to the input D1 adder 1060 is the output of transfer gate 1098. Coupled to adder 1060 is accumulator register DSUM.

Bits 8-14 of the TOCM bus are applied to the A input of comparator 1106 and the input of transfer gate 1114. Bits 8-14 of the pocket memory 1034 are applied to the B input of comparator 1106 and the input of transfer gate 1116. The $\overline{A<B}$ output of comparator 1106 is coupled to input 1107 of decode module 1105. The output of inverter 1091 is coupled to the 1108 input of decoder 1105. The A>B, output of comparator 1090 is applied to the 1109 input of decoder 1105, and the A=B output of comparator 1090 is coupled to input 1110 of decoder 1105. Output 1111 of decoder 1105 is applied to the control electrode of transfer gate 1116. The output of transfer gate 1116 is applied to the input of 10-bit adder 1062. The output of transfer gate 1114 is also applied to the input of 10-bit adder 1062. The complementary output 1112 of decoder 1105 is coupled to the control electrode of transfer gate 1114. To the adder register 1062 is coupled accumulator register BSUM.

Data from the piping logic block 1038 exists at control program instruction 3D. The value, if any, at the present TOC of the presently-indexed chute is subtrated from the value in the MINREG register in subtracter 1086 thus forming the difference quantity D1 at the subtracter's output, i.e., the A-B output. The value, if any, in the corresponding POC of the presently-indexed chute, is subtracted from the value in the MINREG register in subtracter 1088, thus forming the difference quantity D2 at the subtracter's output, i.e., A-B output. D1 is compared with the value D2 in comparator 1090. If D1 is less than D2, output 1102, i.e., $\overline{A<B}$, of the comparator 1090 becomes high, thereby rendering D1 transfer gate 1096 conductive, thus making available D1 to the B input (1104) of comparator 1092. If D2 is less than D1, output 1102 of comparator 1092 becomes low, thereby rendering D2 transfer gate 1094 conductive, thus making available D2 to the B input 1104 of comparator 1092.

Also coupled to comparator 1090 are bits 15 of the presently-addressed TOC and the corresponding POC. If a command bit, i.e., EOC (see instructions 07-15), is detected in bit 15 of the TOC, comparison of D1 and D2 is bypassed, and D2 is made available to comparator 1092. If a command word is detected in the POC, the comparison of D1 and D2 in comparator 1090 is bypassed, and D1 is made available to comparator 1092. Comparator 1092 compares the value presently appearing at its B input 1104 and the value in the PW register. If the value at the B input 1104 is less than or equal to the value in the PW register, transfer gate 1098 is rendered conductive, thereby copying the value appearing at input 1104 into the 9-bit adder register 1060. If the value appearing at input 1104 is greater than the value in the PW register, transfer gate 1100 is rendered conductive, thereby copying the value in the QS register into adder register 1060 to be added to the value presently existing therein.

The corresponding weighting values are summed in accordance with the selection of D1 and D2. Thus, if D1 is selected for summation in adder register 1060, the 7-bit weighting value Bi in the presently-selected TOC data word is summed with BSUM in 10-bit adder register 1062. If D2 is selected for summation in adder register 1060, the 7-bit weighting value Bi in the selected POC is summed with BSUM in adder register 1062. If D1 and D2 are equal, then the larger of the 7-bit weighting values in the selected TOC and POC data words is summed with BSUM in adder register 1062. This logic is accomplished as follows.

If D1 is less than D2, the inverted output $\overline{A<B}$ of comparator 1090 becomes high, output A=B becomes low and output A>B becomes high. At this time, the status of the comparator 1106 $\overline{A<B}$ output is irrelevant. Decoder 1105 decodes inputs 1108, 1109 and 1110 and causes its output 1112 to become high, and output 1111 to become low. Output 1111 low renders gate 1116 nonconductive, and output 1112 high renders gate 1114 conductive, thus connecting the 7-bit weighting value Bi (on the TOCM bus) to the input of register 1062 thereby adding the weighting value Bi to the value in the BSUM register.

If D2 is less than D1, the inverted output $\overline{A<B}$ of comparator 1090 becomes low, the A>B output becomes low and the A=B output becomes low. Again, the comparator 1106 $\overline{A<B}$ output is irrelevant. Decoder 1105 decodes inputs 1108, 1109 and 1110 causing output 1111 to become high, and output 1112 to become low. Output 1112 low renders gate 1114 nonconductive, and output 1111 high renders gate 1116 conductive which connects the 7-bit weighting value (on the POCM bus) to the input of register 1062, thereby adding the POCM weighting value to the contents of the BSUM register.

Coupled to the input 1107 of decoder 1105 is the $\overline{A<B}$ output of comparator 1106. Comparator 1106 compares the weighting value in the TOCM data word with the weighting value in the POCM data word and causes its $\overline{A<B}$ output to become high when the TOCM weighting value is equal to or greater than the POCM weighting value; otherwise, the $\overline{A<B}$ output is low. If D1 equals D2, comparator 1090 inverted output $\overline{A<B}$ becomes high, output A>B becomes low, and output A=B becomes high, and if comparator 1106 output $\overline{A<B}$ is high, decoder 1105 decodes inputs 1107, 1108, 1109, and 1110 to cause output 1112 to become high, and output 1111 to become low. Thus, the 7-bit weighting value on the TOCM bus is added to the value in the BSUM register.

If the output $\overline{A<B}$ of comparator 1106 is low, decoder 1105 decodes inputs 1107, 1108, 1109, and 1110 to cause output 1111 to become high, and output 1112 to become low. Thus, the weighting value on the POCM bus is added to the value in the BSUM register.

During instruction 38, the output of NAND gate 1118 (see FIG. 9B) and control signal PTMSB are checked. If control signal PTMSB is high, indicating that either one or both TOC and POC data words of the presently-indexed chute do not contain a command word, the program counter is incremented to instruction 39. If control signal PTMSB is low, indicating that a command word exists in both TOC and POC, the program counter is incremented to instruction 41.

During instructions 39 through 3C, four NO-OP instructions are executed allowing time for the piping logic to select D1, D2 and the associated weighting values according to the logic discussed above.

During instruction 3D, control signal SBC is caused to become high. SBC high enables accumulator register BSUM to receive the new weighting value total from adder register 1062. The new weighting value total presently in the BSUM register is then copied back into adder register 1062 to be added to the next weighting value selected.

During instruction 3E, the control signal POP from subtractor 1086 is checked. Congrol signal POP is high if the A and B inputs to substractor 1086 are equal; otherwise, POP is low. If control signal POP is high, the program counter is incremented to instruction 73. If control signal POP is low, the program counter is incremented to the next instruction, 3F.

During instruction 73, control signals TOCM, POCM, and PWRT are caused to become high. Control signal TOCM high causes transfer gates 1054 to become conductive causing the value of the TOCM bus to be copied onto the IBUS. Control signal POCM high causes transfer gate 1056 to become high causing the value of this IBUS to be made available to the pocket memory. Control signal PWRT high causes the IBUS value to be copied into the POC that is indexed by the value in CPTR.

During instruction 74, control signal TOCPTRMC (see FIG. 9A) is caused to become high, causing TOCPTR as addressed by CPTR to increment its count by 1 so that the next data word in the chute is indicated as TOC. Also, control signal BRCMD, an output off the BREG register, is checked. If control signal BRCMD is low, indicating that no command exists in the BREG register, the program counter is decremented to instruction 40. If control signal BRCMD is high, indicating that a command exists in the BREG register, the program counter is incremented to instruction 75. Instruction 75 also increments the program counter to instruction 40.

During instruction 40, the value in CPTR is checked. If the value in CPTR is less than 7, the value in register CPTR is incremented by 1 (control signal CPTRC high) so that the contents of CPTR point to the next chute to be filled with data, and the program counter is decremented to instruction 38. If the value in CPTR equals 7, indicating that chutes 0 through 7 have been processed as described above, the program counter is incremented to instruction 41.

During instruction 3F, control signal SDC is caused to become high. Control signal SDC high enables register DSUM 1059 to receive the new difference value total in register 1060. The new difference value total now in the DSUM register is then copied back into register 1060 to be added to the next difference value, D1 or D2, selected.

During instruction 41, control signal BUSY is caused to become low in preparation for piper synchronization instruction 42.

During instruction 42, the status of control signal READY is checked. As long as control signal READY is low, the program counter is not incremented. When control signal READY is detected as being high, the program counters of all pipers are incremented to instruction 43.

During instruction 43, control signals SD and BRC are caused to become high. Control signal SD high causes transfer gate 1120 to become conductive which causes the contents of register DSUM to be copied onto the IBUS. Control signal BRC high enables the BREG register to receive the contents of the IBUS.

During instruction 44, control signal BUSY is caused to become high which causes READY to become low. READY low inhibits the pipers from entering the NMD processing phase at E10 until the last piper to be enabled has finished transferring its DSUM and BSUM values to the brightness generator.

During instruction 45, the status of control signal ENABLED is checked. As long as control signal ENABLED is low, the program counter is not incremented. When control signal ENABLED is detected as being high, the program counter is incremented to instruction 46.

During instruction 46, control signal OUTE is caused to become high, enabling line driver 1046. Enabling line driver 1046 causes the contents of the BREG register (presently DSUM) to be copied onto the Data Bus.

During instruction 47, control signal SDR and SDC are caused to become high. SDR high sets register 1060 to zero. SDC high causes register DSUM to receive the zero contents of the adder register 1060, thus clearing register DSUM.

During instruction 48, the status of control signal DV is checked. As long as control signal DV is high, the program counter is not incremented. When control signal DV is detected as being low, indicating that the brightness generator has received the DSUM value on the Data Bus, the program counter is incremented to instruction 49.

During instruction 49, control signals SB and BRC are caused to become high. Control signal SB high causes transfer gate 1122 to become conductive causing the contents of register BSUM to be copied onto the IBUS.

Control signal BRC high enables the BREG register to receive the contents of the IBUS.

During instruction 4A, a NO-OP instruction is executed. This instruction is needed for timing with the brightness generator.

During instruction 4B, control signal BUSY is caused to become low, thus allowing other pipers to proceed to instruction 4F, if the presently-enabled piper is the last piper enabled in the piper string (see FIG. 12).

During instruction 4C, control signal CARRY is caused to become high. If the present piper is not the last piper in the piper string (see FIG. 12), then CARRY high causes the next piper in the string to be enabled.

During instruction 4D, control signal OUTE is caused to become low, disabling line driver 1046 and disconnecting the output of BREG from the Data Bus.

During instruction 4E, the status of control signal READY is checked. As long as control signal READY is low, the program counter is not incremented. When control signal READY is detected as being high, the program counters of all the pipers are incremented to instruction 4F.

During instruction 4F, control signal CARRY is caused to become low, thus disabling any pipers below the present piper.

During instruction 50, control signal BUSY is caused to become high, causing control signal READY to become low. READY low holds pipers that have completed NMD processing at instruction 63 until all pipers have finished NMD servicing.

During instruction 51, control signal FNDNMD is caused to become high, and the status of control signal NMD, issued from the priority encoder 1040, is checked. Control signal FNDNMD high causes the priority encoder 1040 to check all TOCs for the presence of an NMD command. If one or more NMD commands are detected, the priority encoder 1040 causes control signal NMD to become high, and causes the value in CPTR to assume the highest chute number of one or more chutes containing NMD commands. If no NMD commands exist, the priority encoder 1040 causes the value in CPTR to become zero. If control signal NMD is high, indicating that an NMD command exists in the chute specified by the value placed in CPTR by the priority encoder 1040, the program counter increments to instruction 52. If control signal NMD is low, indicating that no NMD command exists in any chute, the program counter is incremented to instruction 60.

During instruction 52, control signals TOCM and BRC are caused to become high. Control signal TOCM high causes transfer gate 1054 to become high, thus causing the value on the TOCM bus to be copied onto the IBUS. Control signal BRC high enables BREG to receive the contents of the IBUS.

During instruction 53, the status of control signal ENABLED is checked. As long as control signal ENABLED is low, the program counter is not incremented. When control signal ENABLED is detected as being high, the program counter is incremented to instruction 54.

During instruction 54, control signal OUTE is caused to become high. Control signal OUTE high enables line driver 1046 which causes the contents of BREG, presently an NMD command, to be copied onto the Data Bus.

During instruction 55, control signal TOCPTRMR is caused to become high. TOCPTRMR high clears the CPTR-indexed TOC pointer register TOCPTR 1032 to zero in preparation for new data to be loaded into the particular chute presently indexed.

The above function is controlled by TOCPTR clearing logic block 1130 (see FIG. 9A). There is one logic block 1130 per chute. The logic block includes dual input OR gate 1050 and dual input AND gate 1131. The output of the OR gate is coupled to the Reset terminal R of TOCPTR 1032. One input of OR gate 1050 is control signal TOCPTRR which can directly reset all the TOCPTR registers. The other input of the OR gate is coupled to the output of AND gate 1131. One input of the AND gate is coupled to the TOCPTRMR control signal while the other input of the AND gate is coupled to the priority encoder output assigned to the chute for which the particular logic block 1130 is assigned. Thus, coincidence of a TOCPTRMR control signal on and the signal at the priority enocoder output assigned to each chute, for example, output 7 for chute number 7 (see FIG. 9A), causes the corresponding TOCPTR to be reset. The priority encoder output assigned to each chute is indexed by CPTR.

During instruction 56, the status of control signal DV is checked. As long as control signal DV is high, the program counter is not incremented. When control signal DV is detected as being low, indicating that the microcomputer 1010 has received the NMD command just copied onto the Data Bues, the program counter is incremented to instruction 57.

During instruction 57, control signal OUTE is caused to become low. Control signal OUTE low disables line driver 1046, thus disconnecting BREG from the Data Bus.

During instruction 58, the status of control signal DV is checked, while simultaneously control signal CTS is caused to become low, and control signals BUS and BRC are caused to become high. Control signal CTS low causes the microcomputer 1010 to place a data word on the Data Bus in response to an NMD command. Control signal BUS high causes gate 1048 to become conductive, thus causing the contents of the Data Bus to be copied onto the IBUS. Control signal BRC high enables BREG to receive the contents of the IBUS. When control signal DV is detected as being low, indicating that the microcomputer 1010 has valid data on the Data Bus, control signals BR, TOCM, and CWRT are caused to become high. Control signal BR high causes transfer gate 1084 to become conductive, thus causing the contents of BREG to be copied onto the IBUS. Cntrol signal TOCM high causes gate 1054 to become conductive, thus causing the contents of the IBUS to be copied onto the TOCM bus. Control signal CWRT high enables the chute, as selected by the value in CPTR (see FIG. 9A), to receive the data contained on the TOCM bus. Also, on detection of control signal DV low, the program counter is incremented to instruction 59.

During instruction 59, control signal BRCMD, issued by the BREG register, is checked. If control signal BRCMD is low, indicating that register BREG does not contain a command, the program counter is decremented to instruction 58, and instruction 58 is repeated. Simultaneously with the checking of control signal BRCMD, control signal TOCPTRMC is caused to become high. Control signal TOCPTRMC high increments the CPTR-selected TOCPTR pointer register by 1 (see FIG. 9A). If control signal BRCMD is detected as being high, the program counter is incremented to instruction 5A.

During instruction 5A, control signal TOCPTRMR is caused to become high. TOCPTRMR high clears the CPTR-selected TOCPTR register.

During instruction 5B, the program counter is decremented to instruction 51.

During instruction 60, control signal BUSY is caused to become low in preparation for piper synchronization at E11.

During instruction 61, control signal CARRY is caused to become high to enable the next piper, if any, to process NMD commands.

During instruction 62, control signals SBR and SBC are caused to become high. Control signal SBR high causes the contents of register 1062 to be cleared to zero. Control signal SBC high causes register BSUM to receive the contents of the register 1062, thus clearing register BSUM.

During instruction 63, the status of control signal READY is checked. As long as control signal READY is low, the program counter is not incremented. When control signal READY is detected as being high, the program counters of all pipers are incremented to instruction 64.

During instruction 64, control signal CARRY is caused to become low to disable subsequent pipers in preparation for another minimum MIN determination.

During instruction 65, control signals MIN and MRC are caused to become high. Control signal MIN high causes gate 1079 to become conductive allowing the value MIN at output 1037 to be copied onto the IBUS. Control signal MRC high enables the MINREG register to receive the contents of the IBUS.

2. BRIGHTNESS GENERATOR MODULE a. General Description

The brightness generator module 1018 (see FIG. 7) of the data processing means 1012 implements the criterion value calculation portion of the piping method. The brightness generator calculates a criterion value called "brightness" B for each data base entry against which a query is piped, and returns the largest brightness value computed to microcomputer 1010. Brightness is the final normalized value that is a measure of the degree of match between a query and an entry.

The brightness generator utilizes both summation data provided by its associated pipers, i.e., the sum-of-difference values DSUM and the associated sum-of-weighting values BSUM from each piper, and certain variables (to be explained later) supplied by the microcomputer 1010 in order to solve a brightness equation. The brightness generator includes registers, a Read-Only Memory and logic blocks (to be explained later) that execute the solution of a brightness equation as well as piper control, determination of an exact match condition, and internal brightness generator control.

A brightness calculation logic block (FIG. 16A) calculates a brightness B based upon piper-supplied DSUM and BSUM data. The exact logic block (FIG. 16C) detects when certain parameters of a query/entry pair indicate an exact match, i.e., a brightness equal 1. The brightness generator control logic block 1134 (see FIG. 18) decodes the internal Read-Only Memory ROM 1147 contained brightness generator program control instructions and issues control signals to the various brightness generator logic blocks in accordance with the control program and an external clock. In addition the brightness generator controls the data flow to and from the pipers and synchronizes piper activity in response to control signals from microcomputer 1010.

1. BRIGHTNESS CALCULATION

The brightness calculation is accomplished by a logic block 1132 that calculates a brightness value for each DSUM and BSUM received from the pipers. The logic block (see FIG. 16A) includes an 8-word by 8-bit multiplier 1168, a 6-bit shift register 1169, an exponent register EXP 1171, table lookup ROM 1184, and an intermediate adder register 1179 required for exponent manipulation. The brightness calculation is stored in a register BOLD 1200 (FIG. 16A) at the end of each piping cycle. At the completion of a pipeing cycle, the value in BOLD, along with the associated position value stored in a register POS 1202 (see FIG. 16B) is transferred to external microcomputer 1010. The value in BOLD represents the largest value of brightness calculated for a particular entry, the POS contains the position of the query relative to the entry at which such highest brightness was obtained.

2. BRIGHTNESS EQUATION

The brightness generator logic block 1132 solves the following brightness equation:

$$B = (QS(QS - M) - SSD)(M + SSB)\frac{(LCF)}{QS^3}$$

or $$B = (WR1 - SSD)(M + SSB)(WR2)$$

where:
QS = query size;
ES = entry size;
M = the number of events in the query for which at least one corresponding event type is not found in the entry;
SSD = the sum of DSUM's supplied by all active pipers;
WR1 = QS(QS − M)
WR2 = (LCF)/(QS$^3$)
SSB = the sum of BSUM supplied by all active pipers;
LCF = length correction factor equal to [MIN(QS,ES)]/[MAX(QS,ES)].

3. BRIGHTNESS CALCULATION MATHEMATICAL OPERATION

Figure 13A:
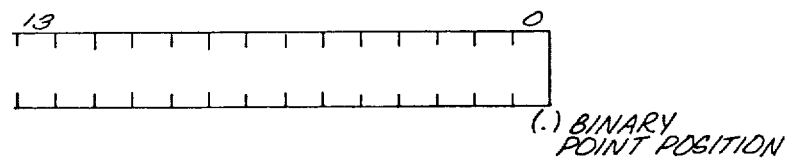
FIGS. 13A-13E are diagrams of the word formats used in the brightness generator multiplication technique.

The following describes the number of word formats used in the brightness calculation, the transformation required between formats, and the basic sequence of operation used to multiply numbers. Because of the range of values encountered in solving the brightness equation, and the finite number of bit positions available to hold a given number, numbers within the brightness generator are represented in both fixed point and floating point formats. Fixed point format is used for all addition and subtraction operations and for multiplication where the product will not exceed 16 significant bits (i.e., 16-bit accuracy will be retained). A normalized floating point format with an 8-bit mantissa is used for the potentially small quantities such as 1/QS$^3$ in order to retain 8 significant bits, and for multiplications where the result cannot be contained in 16 bits. c] FIXED POINT FORMAT There are three fixed point formats. FIG. 13A shows a fixed point format where the binary point position is to the right of the 0 bit position. This format is used for the quantities QS, ES, MIN, WR1-SSD, M and POS.

Figure 13C:
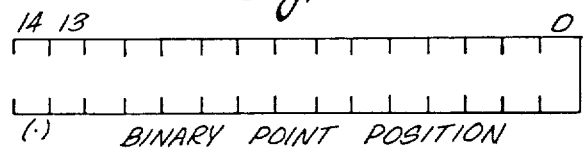
Figure 13B:
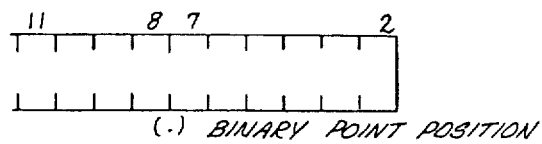

FIG. 13B shows a fixed point format wherein the binary point position is between the 7th and 8th bit positions. This format is used for BSUM only.

FIG. 13C shows a fixed point format wherein the binary point position is between the 13th and 14th bit positions. This format is used for the brightness value.

FLOATING POINT FORMAT

Figure 13D:
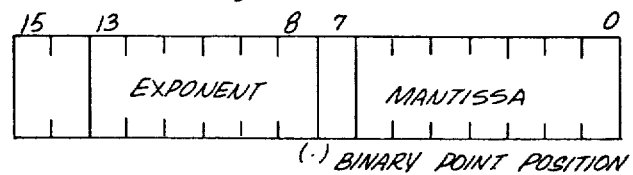

FIG. 13D shows a floating point format wherein the binary point position is between the 7th and 8th bit positions. This format uses the standard notation of fractional mantissa and associated exponent to the base 2 that properly locates the binary point. All floating point numbers are "normalized", meaning that the MSB of the mantissa is adjusted so as to occupy bit position 7, the first bit position to the right of the assumed binary point. The exponent is an unsigned binary number with a range of +31 to −32 in 2's complement notation.

4. FIXED AND FLOATING POINT TRANSFERS AND TRANSFORMATIONS

Figure 13E:
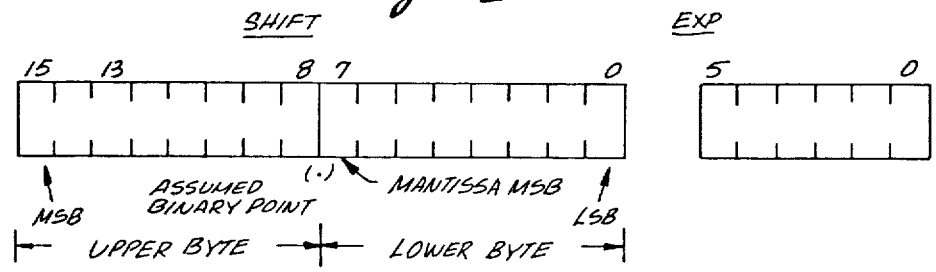

A shift register, SHIFT, 1169 in conjunction with exponent register EXP 1171 is used to transform fixed point numbers into normalized floating point format, normalize products of floating point multiplications, and to convert floating point products to fixed point format. The register SHIFT 1169 (see FIGS. 16A and 16B) has the capability to shift the bits contained therein to the left or right. Numbers shifted to the left and zeros at the least significant bit LSB (rightmost) bit position. Numbers shifted to the right add zeros at the most significant bit MSB (leftmost) bit position, and lose any bits shifted out of a register at the LSB position. FIG. 13E shows a representation of the words used in the SHIFT and EXP registers. The format shown in FIG. 13E is the assumed format when a floating point number is stored in SHIFT 1169. For fixed point numbers, the binary point is assumed to be to the far right of bit zero, and the value in EXP is set to zero. After a floating point product or fixed point number to be normalized is placed in SHIFT, the shift logic checks to see if the upper byte equals zero. If it does not, the logic shifts all bits in SHIFT simultaneously to the right, one bit position at a time, until the upper byte equals zero. This will result in bit position 7 containing a binary 1, the requisite for normalization to retain the magnitude of the number. Each right shift also causes the quantity in EXP to be increased by 1, i.e., an 8-bit shift right adds 8 to the value in EXP.

If the upper byte is initially zero, the logic checks to see if there is a 1 bit at bit position 7. If not, and the lower byte is not zero, it shifts the existing bits simultaneously left, one bit position at a time, until bit position 7 contains a binary 1, thus normalizing the number. Each left shift also causes the quantity in EXP to be decreased by 1, i.e., a 7-bit shift left adds −7 to the value in EXP.

When a floating point number is transferred from another register into SHIFT, the value in the lower byte of the register (mantissa) is placed in the lower byte of SHIFT, and the value in the upper byte of the register (exponent) is added algebraically to EXP. In a fixed point transfer into SHIFT, the upper and lower byte values in the register are placed in the upper and lower bytes of SHIFT, respectively, and EXP is set to zero.

When a floating point number is transferred from SHIFT to another register, the value in the lower byte of SHIFT is placed in the lower byte of the receiving register, and the value in EXP is placed in the upper byte of the receiving register. When a fixed point number is transferred from SHIFT to another register, the values in the upper and lower bytes of SHIFT are transferred to the upper and lower bytes, respectively, of the receiving register.

5. FIXED AND FLOATING POINT MULTIPLICATION

Figure 14:
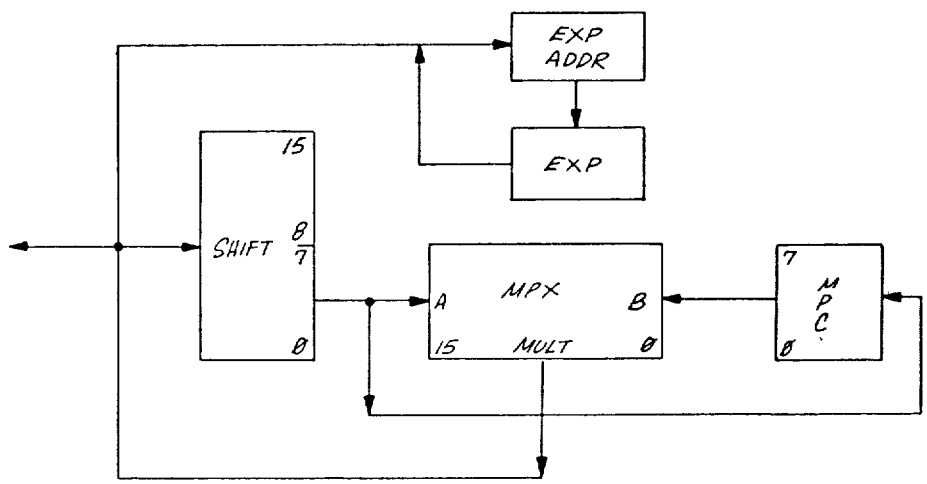

The registers involved in multiplication are shown in FIG. 14. MULT 1168 is an 8 times 8 bit multiplier whose combinatorial output, A*B, reflects the stabilized product of inputs A and B three clock cycles following any change in A or B. Note that MULT handles the quantities A and B as whole numbers. The proper binary point placement for floating point multipliers is automatically tracked by algebraically adding the floating point exponents in EXP, along with fixed quantity adjustments for binary point offsets when required. The lower 8 bits of SHIFT are used as input A to MULT. The following steps describe the techniques for multiplying two numbers:

1. EXP is cleared (initialized to zero by a high control signal EXR).
2. The first number is placed in SHIFT and normalized, if required. If the number is in fixed point format, and a fixed-to-floating point transformation is specified, +8 is added to EXP to preserve the original binary point relationship (except for a quantity (M+SSB), since BSUMs are received with their binary points properly located for transfer to SHIFT (see FIGS. 13A-E). If the number is in floating point format, the exponent associated with the number is added to EXP.
3. The first number is transferred from SHIFT to the multiplicand register, MPC 1204.
4. The second number is placed in SHIFT and normalized, if required. If the number is in fixed point format, and a fixed-to-floating point transformation is specified, +8 is added to EXP to preserve the original binary point relationship (except for a quantity (M+SSB), since BSUMs are received with their binary points properly located for transfer to SHIFT (see FIGS. 13A-E). If the number is in floating point format, the exponent associated with the number is added to EXP.
5. After three or more clock cycles have passed, the stabilized product of A and B is transferred from MULT to SHIFT, and normalized, if required. If the product is a floating point mantissa, −8 is added to EXP to preserve the original binary point relationship.
6. The product is transferred from SHIFT to a designated register after transformation to fixed or floating point format, as required. The value in EXP is also transferred to the exponent field if the number transferred is in floating point format.

6. BRIGHTNESS GENERATOR CONTROL SIGNALS

For a better overall understanding of the operation of the brightness generator, reference should be made to Table 8 containing a description of the control signals influenced by the operation of the brightness generator.

The brightness generator initiates each data exchange between the microcomputer 1010 and the pipers 1016-1 through 1016-16 (see FIG. 7) by setting a control signal ENT (see FIG. 18) on and waiting for an ENR on response from the microcomputer. If the pipers are expecting data (discussed in the Piper Description), the brightness generator generates a CTS on signal (after receiving ENR on). Upon receipt of an answering DV on signal, the piper and brightness generator copy data from the Data Bus. Each succeeding transfer in a series of data transfers is initiated by a CTS on signal from the pipers until all data transfers have been made. At such time that the pipers provide data to the microcomputer, the brightness generator or pipers place such data on the Data Bus and the brightness generator generates a DV on signal to cause the data from the Data Bus to be copied into the microcomputer.

The brightness generator controls and synchronizes the pipe functioning through the use of control signals RESET, GO, DV, and the READY signals as follows:

(A) RESET

The brightness generator turns control signal RESET on for at least two instruction cycles each time the brightness generator receives a POR (Power On Reset) on signal; when the brightness generator detects an EOF command in place of ES and M data; and if the value in register 1206 (see FIG. 16B) equals EOF or the brightness value in register BOLD equals 1. The microcomputer puts an EOF command word on the Data Bus whenever the brightness generator is waiting for the ES and M data to reset the pipers and initiate a new piping cycle. CMIN 1206 contains an EOF command whenever the pipers have piped the current query against all of the entries in the stored data base, i.e., the entry file, and a piper reset is required for them to obtain the next query for processing against the entry file. BOLD equals 1 indicates that the pipers have found a query that is an exact match for the current entry so no more piping against the current data base file is required. If the value in CMIN is not an EOF and BOLD is less than 1, then more entries in the current entry file remain to be piped against the query presently held in the pipers, so no reset is required of the pipers.

(B) GO

The brightness generator uses the control signal GO to control those external data transfers that the pipers must implement sequentially, i.e., chute filling, placing MIN values of on the Data Bus, transferring DSUM and BSUM piping results to the brightness generator, transferring NMD commands to the microcomputer, and transferring chute-refilling data to the pipers. For each of the above-described functions, the pipers are ENABLED beginning with piper number 1. Enabling of the remaining pipers is accomplished by the GO signal in conjunction with one or more individual piper COUT signals that are connected in a "look-ahead-carry-enabling circuit" (see FIG. 12). Such a circuit was described under the detailed description of the pipers.

(C) READY (BUSY ON/OFF)

The brightness generator uses the READY control signal to cause the pipers to perform incremental microinstruction sequences in step with the corresponding brightness generator control program. The brightness generator synchronizes the pipe functioning by use of its BUSY on (READY off) and the BUSY off (READY on) microinstructions; while it calculates WR2; terminates the chute-filling data transfers between microcomputer 1010 and the pipers; controls the NMD commands and chute-refill data transfers between the microcomputer and the pipers; and calculates the final brightness and the transmittal of such results to the microcomputer. Thus, all pipers commence each processing phase at the same control program instruction that initiates each processing phase. To this end, any BUSY on turns READY off, and the instructions issued by the control program in each piper are those issued between their corresponding READY on instruction. Between the READY on instructions, instruction control in each piper proceeds to the next READY on instruction where piper array resynchronization is achieved. When READY again goes on (all BUSYs off), instruction control in each piper starts exactly at the beginning of the next instruction sequence.

(D) DV

The brightness generator control program generates a DV on (DV low) signal to cause the brightness generator to read piper-provided MIN, DSUM, and BSUM values from the Data Bus, and to signal the microcomputer 1010 to read NMD values from the Data Bus. These DV signals also indicate that the piper-provided values have been read.

7. EXACT CONDITION DETERMINATION LOGIC BLOCK

The exact condition determination logic block consists of combinational logic utilizing the contents of data registers QS 1208, ASB 1210, and M 1212, and registers DDA 1214 (see FIG. 16C), BDA 1216, DZ 1218, and EQE 1220 as inputs. At the completion of SSD and SSB processing (to be explained later), the output of the logic block indicates whether or not the entry and the query are exact matches (i.e., brightness equal to 1). If the exact condition is true, the brightness value (1.0) and associated position is transferred to the microcomputer, and an exit is taken from the brightness determination processing. The following is the logic equation for the exact condition. See FIG. 16C for logic block mechanization of the EXACT equation where:

EXACT = ((QS − ASB = 0) OR BDA = 1)

AND ((DZ = on AND MZ = on) OR DDA = 1)

AND EQE = on

QS − ASB = 0 indicates that all weighting values = 1.0;
BDA = 1 indicates that weighting values are to be ignored;
DZ = on AND MZ = on indicates that SSD = 0 and there are no missing events (M);
DDA = 1 indicates that SSD and M are to be ignored;
EQE = on indicates that QS equals ES.

8. BRIGHTNESS GENERATOR MODULE OPERATIONAL SUMMARY

Figure 15:
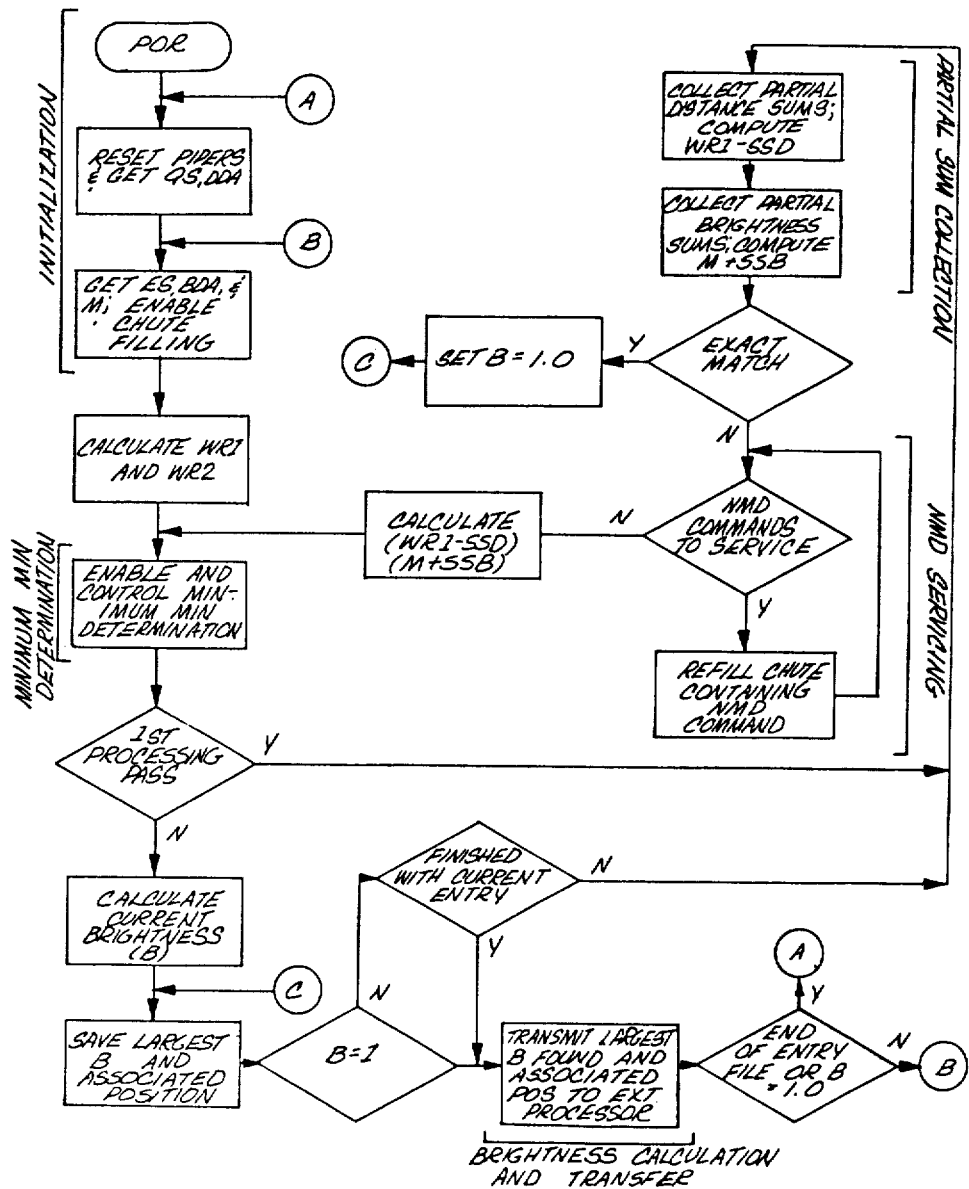

Referring now to FIG. 15, there is shown a flow chart of the operational flow of the brightness generator. Briefly, the brightness generator module executes five processing phases, namely, initialization, minimum MIN determination, SSD and SSB collection, NMD servicing, and brightness calculation and transfer.

INITIALIZATION

During initialization, the brightness generator resets the pipers and communicates with the microcomputer 1010 to receive query size, entry size, the number of missing events M, and the DDA (Distance DisAble) and BDA (Brightness DisAble) flags required for the next piping cycle (new query and new entry). The brightness generator enables the pipers to begin chute filling. Concurrent with the pipers filling the chutes, the brightness generator calculates WR1 and WR2 (see discussion of Brightness Equation).

MINIMUM MIN DETERMINATION

During the minimum MIN determination, the brightness generator controls the synchronization of the pipers and Data Bus access until all piper MIN values have been compared, and the smallest value thus found is stored in each piper's MINREG register and in the brightness generator CMIN register (see FIG. 16B).

SSD AND SSB COLLECTION

The brightness generator checks for the first processing pass for a new QS and ES. If it is the first pass, final brightness calculation processing is bypassed, and the SSD, the sum of all piper DSUMs, and SSB, the sum of all piper BSUMs, collection phase is begun. The brightness generator commences SSD and SSB collection by enabling each piper in turn to place its DSUM and BSUM on the Data Bus. As the DSUMs are collected, the brightness generator subtracts sequentially from WR1 as follows:

$$WR1 - DSUM1 - DSUM2 - \ldots - DSUMN.$$

N = the number of the last active piper. This calculation computes the term WR1-SSD directly. Similarly, the BSUMs are collected and summed sequentially with M as follows:

$$M + BSUM1 + BSUM2 + \ldots BSUMN.$$

This calculation computes the term M+SSB directly. This term is also the second term of the brightness equation. The brightness generator detects at this point if the query and entry are an exact match, i.e., brightness equal to 1. If brightness equals 1, control signal EXACT becomes high (true) indicating that the entry and query are identical. Thus, if the EXACT is high, brightness equals 1 at the query/entry position indicated in LMIN 1222 (see FIG. 16B) (to be later explained), and no more calculations need be performed for the current entry/query pair. The brightness generator sets B equal to 1 and exits from the brightness calculation instruction sequence. If EXACT is low (false), the brightness generator continues with normal data processing. At the end of this data processing phase, one pass through the TOC of all active pipers is completed.

NMD SERVICING

In preparation for the next pass, the brightness generator checks all pipers to see if more data must be loaded into any of the chutes, i.e., one or more pipers have NMD commands in one or more TOCs. Upon indication that the pipers have NMD commands to be serviced, the brightness generator is coupled to the microcomputer 1010 and enables the pipers to transmit their NMD commands to the microcomputer and receive chute refill data from the microcomputer.

After all NMD commands have been serviced, the first two terms of the brightness equation are multiplied, i.e., (WR1−SSD) is multiplied with (M+SSB), and processing control returns to the minimum MIN determination phase to prepare for a subsequent TOC processing pass.

If this is not the first time through the brightness generator processing for the present QS/ES pair, the brightness previously calculated is multiplied by the quantity WR2. The resulting brightness value is then compared with the value calculated on the previous processing pass, if any, for this entry, and the larger of the two brightnesses is stored, in BOLD, and the associated positional value (position equals the MIN value now in LMIN) associated with the collected SSD and SSB values from which the present highest brightness was derived is stored in POS 1202.

BRIGHTNESS CALCULATION AND TRANSFER

A check is now made to determine if all the chute data for every entry being piped has been processed (i.e., if CMIN 1206 contains a command word), and thus the value if the largest brightness found. If so, this brightness value and associated position of best degree of match between the query and the entry are sent to the microcomputer. Otherwise, processing control returns to the collection of DSUM and BSUM associated with the next position of the query relative to the entry.

Subsequent to the highest brightness and associated position of best match of a query relative to an entry have been sent to the microcomputer, the brightness generator determines if the entry just piped was the last entry in the entry file, or if the brightness equals 1. If the last entry was the last in the entry file (CMIN equals EOF), processing control returns to the initialization phase to receive the QS and ES for a new query and entry. If it is not the last entry in the entry file, but the brightness was equal to 1, processing control in the brightness generator also is returned to the initialization phase. If it is not the end of an entry file and the brightness does not equal 1, the brightness generator control program initiates the pipers to receive a new ES and associated data for piping against the same query.

9. BRIGHTNESS GENERATOR MODULE OVERVIEW

Figure 16A:
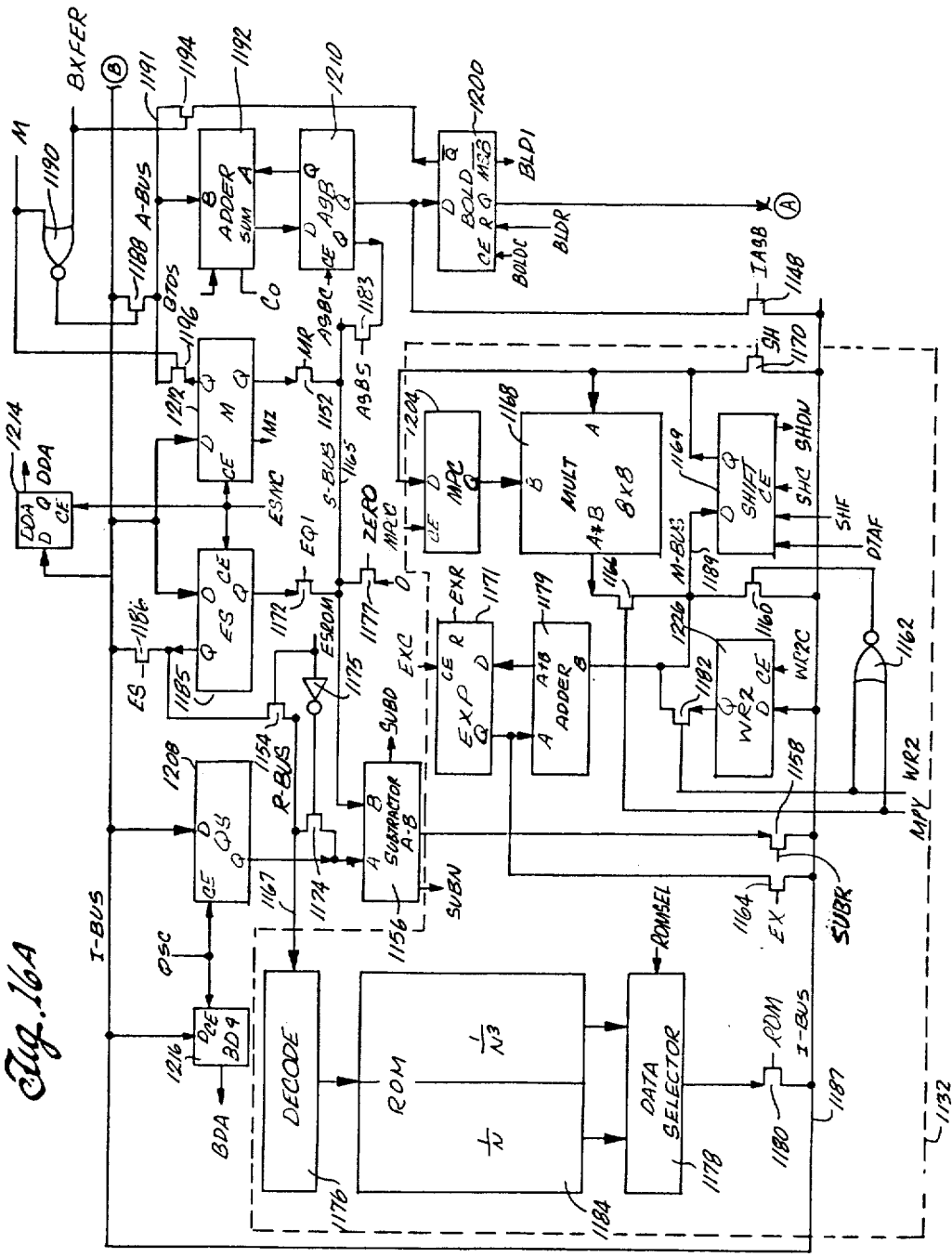
Figure 16C:
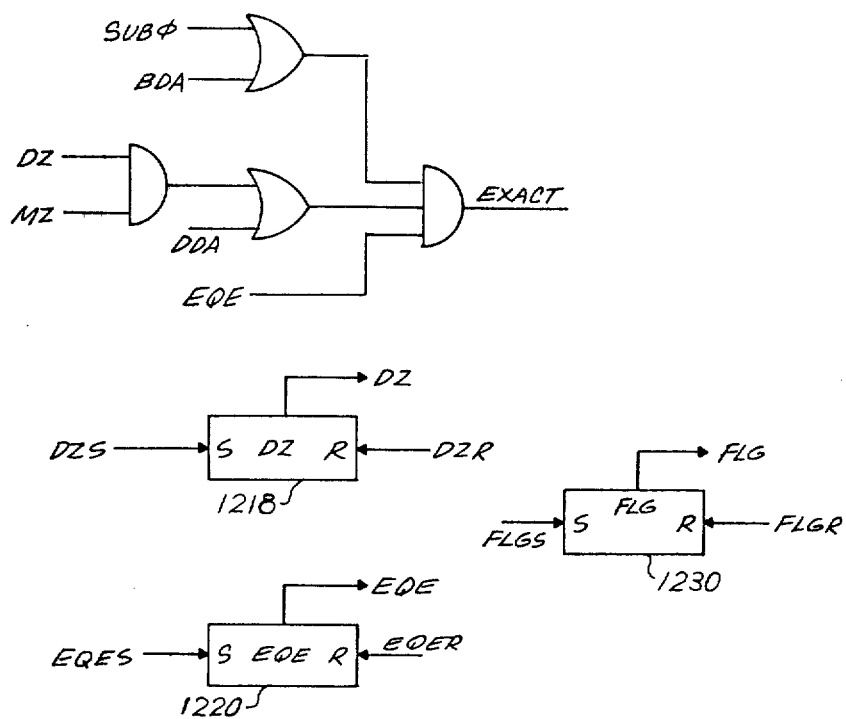
Figure 17C:
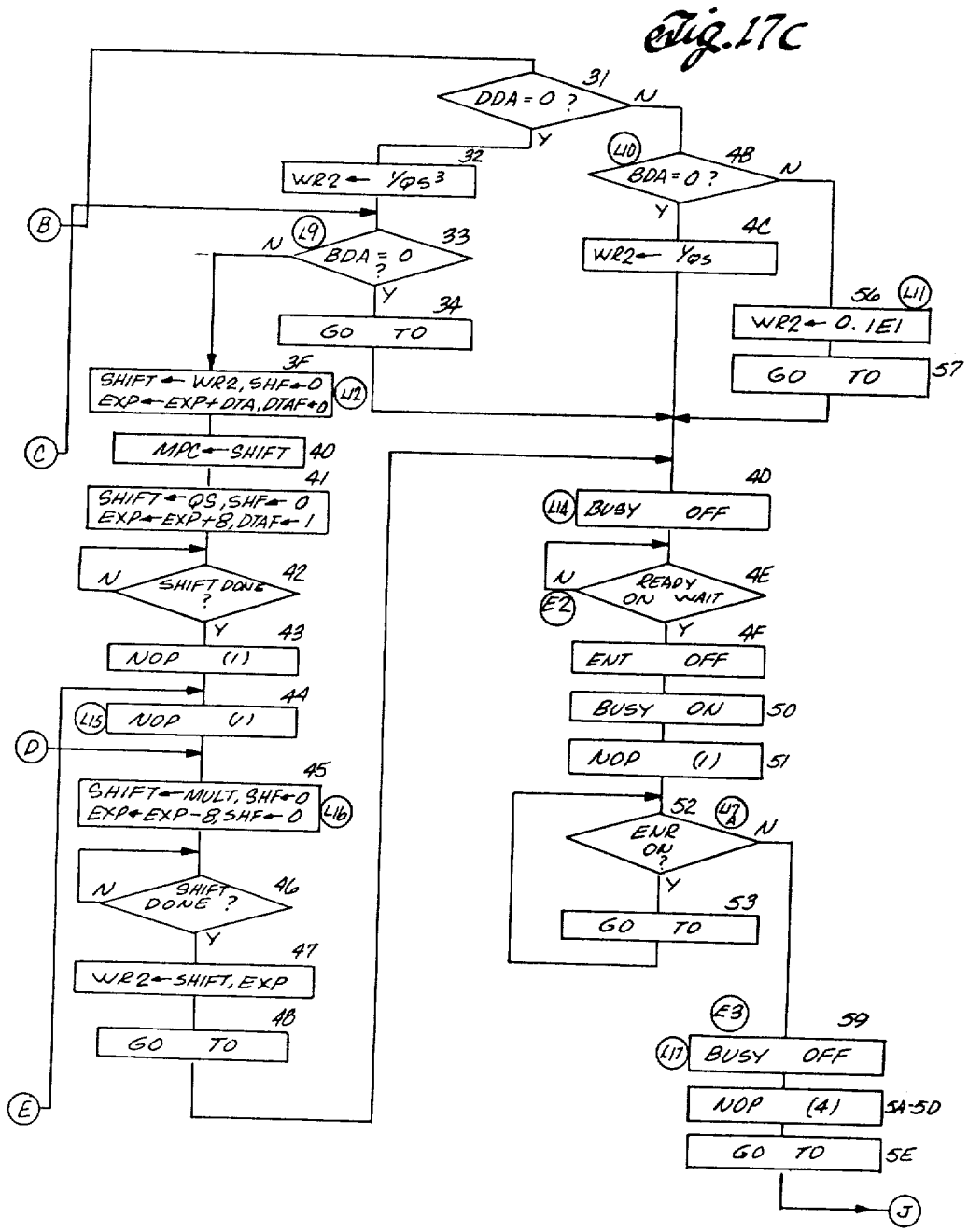
Figure 17D:
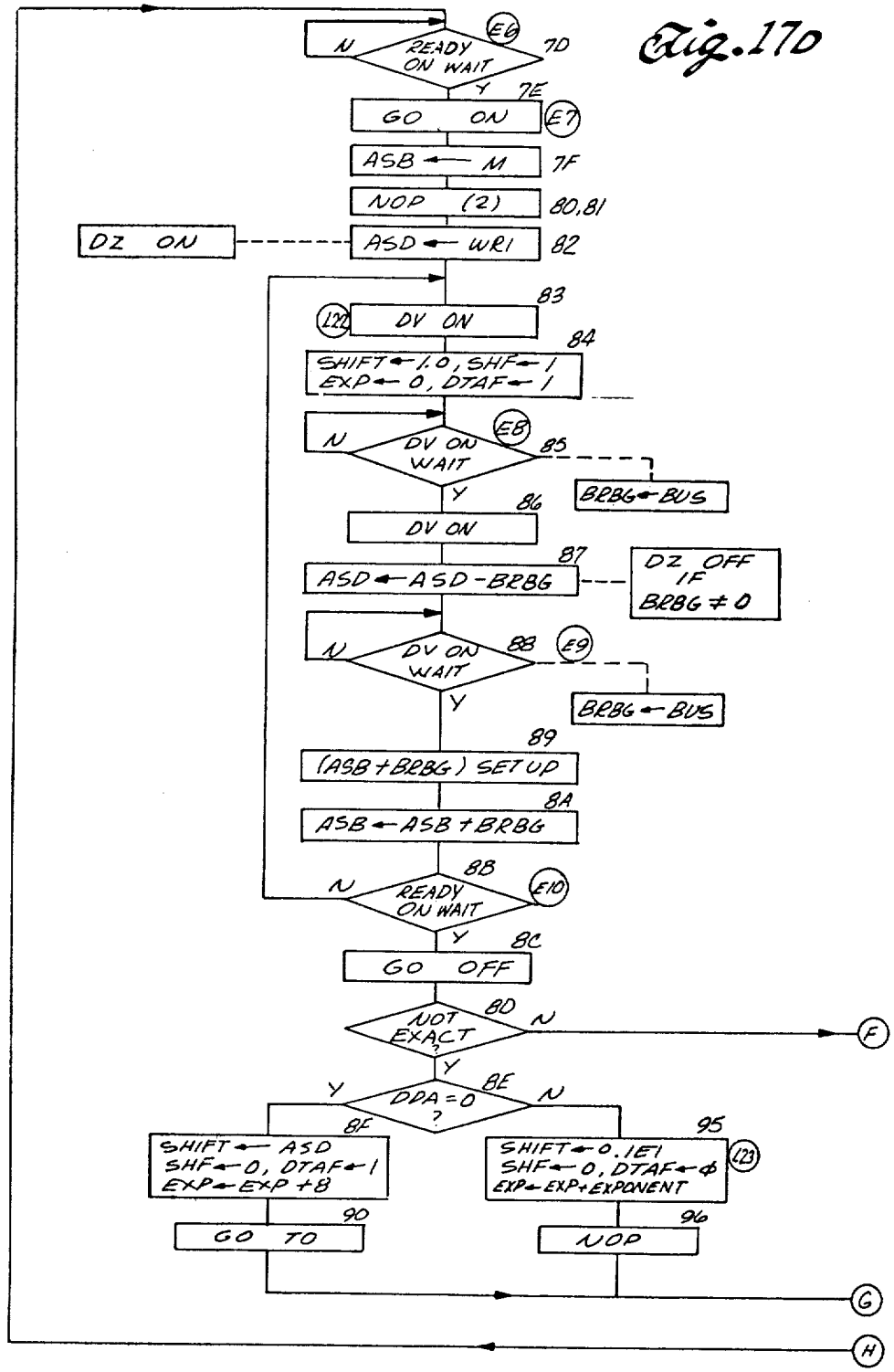

Prior to a detailed discussion of the brightness generator in terms of the instruction sequence and effect on the brightness generator hardware components, a more general operational overview utilizing the block diagram of FIGS. 16A and 16B and flow diagrams of FIGS. 17A through 17F is appropriate.

The brightness generator control signal instructions referred to in the following sections are stored in ROM 1147 of the brightness generator program controller 1140 (see FIG. 18). It should be noted that the numbers (not encircled) adjacent the function blocks shown in FIGS. 17A through FIG. 17F refer to the instruction number executed by such function block. See Table 11 for the brightness generator instruction numbers and corresponding instruction. Reference should also be made to Table 8 for the definition of the control signals and functions thereof referred to below.

As discussed, the brightness generator executes five independent operational functions. Each of the functions are briefly discussed below with reference to the flow charts shown in FIGS. 17A through 17F.

INITIALIZATION

The initialization phase is executed during brightness generator control program instructions 00-0C and 2B-2D, see Table 11. Upon receipt of a Power On Reset POR on signal from the microcomputer 1010, brightness generator program control returns to the POR function block (see FIG. 17A) where the program counter is set to zero, RESET is turned on to reset the pipers, OUTE is turned off to disconnect the bus output, and ENT is turned off to terminate any communication with the external processor. Next, GO is turned off to lock out piper enabling, and program control proceeds to instruction 00.

Non-POR initialization processing begins at instruction 01 after a complete entry file has been piped, an exact match has been found, or the microcomputer 1010 has initiated a reset by sending an EOF command in place of ES and DDA data. At location L2, the brightness generator control program generates three RESET on signals to reset the pipers. The control program then turns BUSY off to release the READY line, sets FLG (see FIG. 16C) to indicate an initial chute processing pass for a new piping cycle, and clears the final brightness register, BOLD, to receive new brightness values. The control program turns ENT on to couple to the microcomputer so that the pipers can receive a new QS and ES pair and associated chute data. An ENR on is received from the microcomputer to establish such coupling with the microcomputer. Then, on each instruction cycle at location E1, the control program generates a CTS on signal to indicate that it is ready to receive QS and BDA data, transfers existing Data Bus data to register BRBG 1224 (see FIG. 16B), and checks for a DV on signal from the microcomputer. When the signal is detected, indicating that the microcomputer has QS and BDA data on the Data Bus; the control program, having transferred the data from the Data Bus to BRBG as it detected the DV on, takes the YES branch from instruction E1 and transfers the data from BRBG into register QS 1208, see FIG. 16A, and one-bit flag register BDA. At the next DV on wait instruction at location L4, the control program generates another CTS on signal to indicate that it is ready to ES, DDA, and M data, and transfers bus contents and checks for a DV on. When DV on is received, indicating that the requested data is now on the Data Bus (and now also in BRBG), the control program checks for an EOF command in BRBG. If an EOF is detected, indicating that the microcomputer is forcing a reset of the piping array, the control program turns ENT off to initiate a microcomputer disconnect. When an ENR off is received from the microcomputer, indicating that the disconnect is complete, processing control returns to location L2 to initiate a new piping cycle.

If BRBG does not contain an EOF, the control program: turns GO on to enable the pipers to begin chute filling; transfers the ES data to register ES; transfers DDA data to one-bit flag register DDA; and transfers the M data to register M.

The brightness generator uses the remaining chute filling time to calculate WR1 and WR2. First, the control program clears EXP (sets the contents of EXP to zero), then calculates QS-M and multiplies the result by QS to obtain WR1. The control program then turns BUSY on to prevent the pipers from advancing beyond the piper and the brightness generator synchronization point at location E2 in case their chute filling is complete before the brightness generator has completed its task, and stores the calculated quantity in register WR1.

The control program now calculates WR2 as follows: The control program causes QS and ES to be compared in subtracter 1156. If ES=QS, the SUB0 output of subtracter 1156 is set to zero. The output SUB0 is coupled to the brightness generator program controller logic block 1140 (see FIG. 18), and as a result, flag EQE is caused to become on (high), otherwise, EQE is caused to become off (low).

As shown in Table 10, the control program calculates one of 12 quantities determined by the status of flags DDA and BDA and the result of the comparison. The resultant quantity, calculated in accordance with the brightness equation, is placed in register WR2 1226 (see FIG. 16A). The control program then turns BUSY off to release the pipers for their next processing sequence (locations E2 to E3), and the brightness generator enters the READY on wait state at location E2 to await resynchronization with the pipers (all piper BUSYs off).

When the READY on is received by the brightness generator, the control program initiates a decouple from the microcomputer (since all piper chutes are now filled and the pipers require use of the Data Bus during minimum MIN determination), turn BUSY on to hold the pipers at instruction E3 until the decouple is complete, and waits for a responding ENR off from the microcomputer. When the ENR off is received, completing the decouple, the control program turns BUSY off to release the pipers to begin minimum MIN determination. The control program causes the transfer of the contents of CMIN into LMIN. This last instruction is executed on the first processing pass for timing reasons only; the instruction's purpose on passes 2 and beyond is described in the section on NMD command servicing. The control program next commences minimum MIN determination processing.

MINIMUM MIN DETERMINATION

The minimum MIN determination phase is executed during instructions 65-6C Between locations E3 and E4, a currently-enabled piper will have placed its MIN value on the Data Bus, and the other pipers (not enabled) will be waiting at location E4 to compare their MIN value to the value on the Data Bus. The brightness generator control program generates a DV on signal to initiate these comparisons, and then tests for the presence of its own DV on signal while simultaneously transferring existing Data Bus data to BRBG 1224. When the brightness generator detects its DV signal on, the control program causes the transfer of the enabled piper's MIN value, already in BRBG 1224 to CMIN 1206, see FIG. 16B. The output Q of BRBG 1224 is coupled to the data input D of register CMIN 1206. Control signal LMINC is coupled to the Chip Enable CE input of CMIN. Transfer of data from BRBG to CMIN occurs when the control program causes LMINC to go on, thereby enabling CMIN to copy the data from BRBG. The control program checks the READY control signal. If READY is off, indicating that the pipers have not finished minimum MIN determination, the control program loops back to generate another DV on signal. At this time, the next enabled piper, if any, whose MIN value is less than the previously-enabled piper's MIN value, has its MIN on the Data Bus for comparison, and the brightness generator control program reads this next value into CMIN 1206. This process continues until all pipers have compared their MIN values and have copied the smallest MIN value found in their MINREG register. This latter value is now also in CMIN. READY then goes on at location E5 to allow the pipers and brightness generator to begin the next processing sequence.

The brightness generator control program next moves the product of (WR1−SSD) and (M+SSB) at A*B output of multiplier MULT 1168, see FIG. 16A, into register SHIFT in preparation for the final multiplication by WR2 (meaningful only on the second and subsequent chute processing passes); turns BUSY on and GO off to cause the pipers to wait at locations E6 and E7 for DSUM and BSUM collection or (if the piping cycle is done) at location E1A for chute refilling;

and checks the status of flag FLG. If FLG is on, indicating that this is the first chute processing pass for the current ES/QS pair, the control program causes FLG to go off; bypasses final brightness calculation; and checks the value in CMIN. If CMIN contains a non-command (bit 15=0), indicating that more data remains to be piped in the chutes (always the case on first pass, except for the special circumstance when only a command is loaded into the chutes), the brightness generator control program turns BUSY off and enters the READY on wait state at location E6, and processing proceeds. If CMIN does contain a command (bit 15=1), processing proceeds as described in the section describing the brightness calculation.

SSD AND SSB COLLECTION

The SSD and SSB collection phase is executed during instructions 7D-96. When READY goes on, indicating that all pipers have finished piping the data in the present TOC and have determined their current DSUM and BSUM values, the control program turns GO on to cause the pipers to put their DSUM and BSUM values sequentially on the Data Bus. The control program next transfers the value in register M 1212 into register ASB 1210, and the value in register WR1 1226 into ASD 1228, see FIG. 16A and FIG. 16B, in preparation for subtracting the DSUM values from WR1 and adding the BSUM values to M as they are received, see discussion on initialization. Flag DZ is also set on in this instruction. This flag is used to determine if SSD equals zero after all DSUM values have been received.

The control program now generates a DV on signal to synchronize piper processing at location E8, and zeros the contents of register EXP.

The control program responds at its DV on signal at location E8 and transfers a DSUM value on the Data Bus into BRBG. It subsequently generates another DV on signal in preparation to read a BSUM value from the Data Bus. The control program next causes the subtraction of the DSUM value just transferred from the Data Bus from the value WR1 contained in ASD 1228. If any DSUM value is not equal to zero, flag DZ is cleared to indicate that SSD for the current chute processing pass is not zero.

The control program responding to a DV on signal at location E9, transfers a BSUM value from the Data Bus and causes this value to be added to the contents of register ASB, which contains M, the missing events value.

As each piper sequentially places its DSUM and BSUM values on the Data Bus, each such piper turns its BUSY off, enables the next piper in the piper string, see FIG. 12, (CARRY on), and waits at location E10 for the other pipers to complete their DSUM and BSUM value transfer. The brightness generator control program now checks the status of the READY signal at location E10. If READY is off, the brightness generator control program loops back to generate another DV on signal to initiate retrieval of the next DSUM/BSUM pair from the next piper. This loop is repeated until all active pipers have copied their DSUM and BSUM values onto the Data Bus, at which time READY at location E10 goes on, and the brightness generator control program turns GO off to prevent piper enabling. Since each interation of the above-described loop subtracts a DSUM value from ASD and adds a BSUM value to ASB, the value remaining in ASD is WR1-SSD, and the value remaining in ASB is M+SSB.

The control program next checks for the EXACT condition being false (i.e. EXACT low/off). The EXACT condition is determined by logic (see FIG. 16C) that detects exact matches between query and entry, using parameters known at this point. As previously described, an exact match is detected when three specific conditions are met:
  condition 1: flag EQE is on (QS=ES);
  condition 2: flag DDA is on or flag DZ is on (DSUM is zero) and flag MZ is on (no missing events);
  condition 3: QS-ASB is equal to zero (for a query, all brightness values equals 1) or flag BDA is on.

If EXACT condition is true (i.e., EXACT high/on), indicating an exact match between query and entry as defined above, the control program places a 1.0 in BOLD 1200, and stores the value in LMIN 1222 (the position at which the exact match has been detected) into POS 1202, see FIG. 16B. Processing then continues as described in the brightness calculation section.

If EXACT condition is false (not an exact match), the control program checks the status of flag DDA. If DDA is on, the WR1−SSD portion of the brightness equation is not utilized and a 1.0 is transferred into SHIFT. If DDA is low, the contents of ASD (i.e., WR1−SSD), is transferred into SHIFT. The brightness generator then checks the status of the READY signal to see if any piper requires NMD command servicing. If so, READY is off, and the brightness generator enters NMD servicing processing. Otherwise, GO is turned on to enable piper minimum MIN determination and processing proceeds.

NMD COMMAND SERVICING

The NMD Command Servicing is executed during instructions 9D-AA. If READY is off at location E11, indicating that at least one piper has entered its NMD loop and requires one or more NMD commands to be serviced, the brightness generator control program couples the brightness generator to the microcomputer. When coupling is effected, the brightness generator control program turns GO on to enable the next piper in turn to send its NMD(s) to the microcomputer. Next, it turns BUSY on. This holds any non-NMD containing pipers at location E11 until the brightness generator control program can achieve a decoupling from the microcomputer. As long as NMDs remain to be serviced, the piper(s) involved will also keep READY off to hold the other pipers at location E11.

The control program next generates a DV on signal for two successive instruction cycles to cause the microcomputer to read an NMD command from the Data Bus, and to cause the piper sending the NMD to decouple from the Data Bus and generate a CTS on signal to tell the microcomputer that it is ready for chute refill data. The control program then waits for a DV on signal from the microcomputer (the extra instruction cycle DV signal and intervening NO-OP prevents the brightness generator from responding to its own DV signal). When a DV on signal is received from the microcomputer, indicating that it has chute refill data on the Data Bus for a piper, the control program checks if the chute word transferred from the Data Bus to BRBG at location E14 contains a command (bit 15=1), designating the end of chute data. If the chute word does not contain a command, the control program loops back to location L26 to wait for the next chute data word from the microcomputer. When a command is detected in the chute data word, the control program initiates a decouple from the microcomputer and turns GO off to inhibit piper enabling in preparation for another minimum MIN determination. It is necessary for the piper to determine another MIN value since the data in the TOC containing the current MIN value will have been moved to the corresponding POC and a new TOC value will now exist in the TOC. Also, NMD servicing may have added new chute data. Both changes will change the data input to the MIN finding logic block 1029 of one or more pipers, see FIG. 9A. When the decouple is complete, the control program turns BUSY off to release the pipers at location E11 to initiate minimum MIN determination (assuming that all pipers are finished with NMD servicing), and checks the status of the READY signal.

If READY if off, indicating that at least one piper still needs NMD servicing, the control program enters the NMD loop once more. Otherwise, the control program turns GO on to enable the first piper to begin minimum MIN determination, and checks the status of flag BDA. If BDA is low, processing proceeds directly to the calculation of (WR1−SSD)(M+SSB) (see brightness equation). If BDA is on, indicating that the M+SSB term is not to be utilized (see section on SSD and SSB collection), the control program loads a 1.0 in register ASB to replace the previously-calculated M+SSB. The control program next causes the transfer of the contents of register SHIFT, which presently contains the value WR1−SSD, into MPC 1204 (see FIG. 16A). The control program then causes the multiplication of the value in MPC by the M+SSB value in register ASB. The value in CMIN 1206 is transferred into LMIN 1222, preserving the position at which the brightness for the current processing pass is being calculated. The control program now enters the MIN loop again, and processing proceeds as described in the Minimum MIN Determination section.

NORMALIZED BRIGHTNESS CALCULATION AND TRANSFER

The normalized brightness calculation and transfer is executed during instructions 6F-7A. If the brightness generator control program finds flag FLG off, indicating that the present pass is not the first processing pass for the current piping cycle, the control program waits for SHIFT to indicate that it has normalized (see section entitled Fixed and Floating Point Transfers and Transformations) the product of WR1−SSD and M+SSB. When SHIFT has finished the required normalization, the control program transfers the contents of SHIFT into MPC, and then multiplies, in MULT, the transferred contents of SHIFT by the previously-calculated WR2. The result, the brightness for the current chute processing pass, is then transferred to register ASB. The current brightness value in ASB is then compared with the brightness calculated on the previous chute processing pass (stored in BOLD). If the current brightness is larger than the previous brightness, the current brightness is transferred to BOLD, replacing the previous brightness value. The value in LMIN, the position at which the current brightness has been calculated, is then transferred to POS. If the current brightness is less than or equal to the previously-calculated brightness, the control program retains the previous brightness and position, discarding the just-calculated quantities.

The control program now checks the value in CMIN. If it is other than a command, indicating that the chutes still contain data to be processed, the control program proceeds to collect the next SSD and SSB for the next chute processing pass. If CMIN contains a command, indicating that all data in the chutes have been processed, the control program turns BUSY off, in preparation for the next piping cycle, and transfers the contents of BOLD and POS into BRBG in preparation for placing them on the Data Bus. The control program then couples the brightness generator with the microcomputer. The control program then places the contents of BRBG (brightness and position) on the Data Bus and generates a DV on signal to cause the microcomputer to read the Data Bus. The control program then decouples the brightness generator from the Data Bus. When the decouple is complete, the control program checks the contents of CMIN again. If the command it contains is an EOF, indicating that no more data remains to be piped against the current query, processing control returns to location L2, and a new initialization processing cycle begins.

If the command in CMIN is not an EOF, then the control program checks the brightness value in BOLD. If it is 1.0 (exact match), indicating that no more piping needs to be done against the present data base entry file, processing control also returns to location L2 so that the pipers will be reset for a new piping cycle.

If the final brightness value is less than 1.0, BOLD is set to zero and the brightness generator is coupled to the microcomputer for piper chute filling in preparation for piping the next entry against the present query. The brightness generator then returns to instruction L4 to receive the new ES, DDA, and M data and begin a new piping cycle.

(b) DETAILED DESCRIPTION OF THE BRIGHTNESS GENERATOR

Detailed operation of the brightness generator and controlling instruction code program is better understood by referring to FIGS. 16A and 16B and Table 11.

Referring now to FIGS. 16A and 16B, there is shown in detailed block diagram the brightness generator 1018. The brightness generator includes table lookup Read-Only Memory ROM 1184 for calculating the value of the reciprocal of a quantity ($1/N$) as well as the reciprocal of a quantity cubed ($1/N^3$). The ROM 1184 is coupled to the R-BUS 1167 by means of a ROM decode 1176, and the output of the ROM is coupled to the I-BUS 1187 through data selector 1178 and ROM transfer gate 1180. Coupled to the I-BUS is a seven-bit register QS 1208 containing the value of QS. Also coupled to the I-BUS are seven-bit registers ES 1185 and M 1212 containing therein the value of ES and M respectively. The I-BUS is coupled to the R-BUS through the series connection of transfer gates 1186 and 1154. The R-BUS is coupled to the A input of subtractor 1156 through transfer gate 1174. The control electrode of transfer gate 1154 is coupled directly to the ESROM control signal while the control electrode of transfer gate 1174 is coupled to the ESROM control signal through inverter 1175. The B input of subtracter 1156 is coupled directly to the S-BUS 1165.

The output of register ES is coupled to the S-BUS through transfer gate 1172. The output of the M register is also coupled to the S-BUS through transfer gate 1152. Connected to the S-BUS through transfer gate 1177 is a constant value word that is equal to zero. The control electrode of transfer gate 1177 is connected to control signal ZERO such that a high on ZERO causes the quantity zero to be copied into the B input of subtracter 1156. The output of subtracter 1156 is coupled to the I-BUS through transfer gate 1158. The output of register SHIFT 1169 is connected to the A input of eight-bit by eight-bit multiplier 1168 and to the I-BUS through transfer gate 1170. The register SHIFT output Q is also coupled to the input of the 8-bit register MPC 1204. The output Q of register MPC is applied to the B input of multiplier 1168. The A*B output of the multiplier 1168 is applied to the M-BUS 1189 through transfer gate 1166. The M-BUS 1189 is coupled to the I-BUS through transfer gate 1160. The M-BUS is also coupled to the B input of adder 1179. The A input of adder 1179 is coupled to the I-BUS through transfer gate 1164. The output of adder 1179 is applied to the input of exponent register EXP 1171, and the output of register EXP is applied to the input of adder register 1179. The input of register WR2 is coupled to the I-BUS. The output of register WR2 is coupled to the M-BUS through transfer gate 1182. The input of register SHIFT is coupled to the M-BUS. The Data Bus is coupled to the D1 input of register BRBG 1224. The output of register BRBG is coupled to the B input of subtracter 1143. The A input of subtractor 1143 is coupled to the I-BUS through transfer gate 1145. The output Q of subtracter 1143 is coupled to the input of register ASD through transfer gate 1141. The output Q of register ASD is coupled to the A input of subtracter 1143. The I-BUS is coupled directly to the input of register WR1. The output Q of register WR1 is coupled to the input of register ASD through transfer gate 1300. The control electrode of transfer gate 1200 is coupled to the ASDWR1 control signal while the control electrode of transfer gate 1141 is coupled to control signal ASDWR1 through inverter 1181.

The B input of adder 1192 is connected to the A-BUS 1191. The A-BUS 1191 is connected to the I-BUS through transfer gate 1188. The output of adder 1192 is coupled to the input of register ASB 1210. The output of register ASB is coupled to the A input of adder 1192. One output of register ASB 1210 is also coupled to the input of register BOLD and to the S-BUS through transfer gate 1183. Also coupled to the input of register BOLD through transfer gate 1148 is the I-BUS. The output of register BOLD is coupled to the B-BUS 1193 which in turn is coupled to the D2 input of the BRBG register. The inverted output of register BOLD, that is, $\overline{Q}$, is coupled to the A-BUS 1191 through transfer gate 1194.

The output of BRBG is coupled to the Data Bus through line driver 1142, and to the I-BUS 1187 through transfer gate 1150. The output of BRBG is also coupled to the input of register CMIN 1206. The output Q of register CMIN is coupled to the input of register LMIN 1222, and the output of register LMIN is coupled to the input of register POS. The output of the register POS 1202 is coupled to the B-BUS 1193.

(c) DETAILED DESCRIPTION OF THE BRIGHTNESS INSTRUCTION PROGRAM

The control logic block that issues the control signals that execute the operation of the brightness generator is shown in FIG. 18. The control logic block 1140 includes a 56×64 Read-Only Memory ROM 1147 for storing instructions associated with a brightness generator control program. The program counter 1151 stores the address of the instruction location of an instruction stored in the ROM 1147. The program counter 1151 is advanced by means of an external clock signal coupled to the Clock input terminal C of the program counter.

In the present embodiment, an external clock operating at 5 MHZ clock rate is used.

The program counter 1151 is enabled or disabled by a Program counter Enable PE control signal from the instruction decode module 1149. Upon receipt of each clock pulse, the program counter 1151 advances by 1 in hexadecimal order to the next instruction number. The advance occurs, however, only if control signal PE is not low. Control signal PE is low whenever a READY on wait, DV on wait, or ENABLED wait instruction is currently in the instruction register 1155, and the appropriate external control signal READY, DV or ENABLED input to the instruction decode module 1149 is off. Otherwise, control signal PE is high and the program counter advances by 1. The wait instructions and the external control signals are explained during the detailed description of the brightness generator operation.

If the Parallel Load PL control signal is high at the same time that the PE control signal is high and a clock pulse arrives, the program counter 1151 does not advance by 1. Instead, it loads the address present on its input address lines 0–6 directly into its counter registers in order to execute jump instructions. These seven address lines are connected to bits 0–6 of the instruction register. Control signal PL is high (jump instructions are executed) whenever a conditional or nonconditional jump instruction is currently in the instruction register 1155 and the appropriate test control signal input to the instruction decode module is high. The jump instructions and test control signals are explained during the detailed description of the brightness generator operation. A Power On Reset POR control signal is coupled to the POR input terminal of the program counter 1151. A POR control signal is issued by the microcomputer and causes the brightness generator program counter to reset to the 00 instruction. A POR signal overrides all other signals to the program counter.

The address decoder 1153 is coupled between the program counter 1151 and the ROM 1147. The address decoder decodes the 6-bit program counter output, i.e., Q0 through Q5 (see FIG. 18) and causes the four instructions whose location in the ROM is decoded by decoder 1153 to appear in the instruction register 1155, which is 56 bits wide, and thus, accommodates four 14-bit instructions. Address lines Q6 and Q7 from the program counter 1151 select one of the four instructions for execution. The instruction decode module 1149 is coupled to the instruction register 1155 and decodes the instruction contained therein as selected by the eight address lines of the program counter 1151. The outputs (see FIG. 18) of the instruction decode 1149 are the control signals that control the various hardware elements that execute the brightness generator operation. The high or low state of each control signal is set in accordance with the states specified by each instruction decoded from instruction register 1155.

A Power On Reset POR pulse originating in the microcomputer causes the program counter in the brightness generator controller to be reset to 00. The POR pulse also causes control signal ENT to become low. Control signal RESET high causes the program counter in all the active pipers to be reset to 00. Control signal OUTE low disables line driver 1142, thus decoupling the output of BRBG register from the Data Bus. Control signal ENT low causes the microcomputer to decouple its data output from the Data Bus. Resetting the program counter to 00 initiates brightness generator operation.

In the following description of instruction intrepretation, control signals not described as high are low, regardless of their state during the previous instruction. The eight exceptions to this are control signals BUSY, OUTE, GO, ENT, ENR, FLG, EQE, and DZ. Once made high or low, they remain in that state during subsequent instructions until a second instruction specifically changes their state. Instructions are numbered in the hexadecimal (base 16) notation.

During instruction 00, control signal GO is caused to become low. When control signal GO is low, all pipers are maintained in a disable state. This instruction concludes brightness generator initialization. The brightness generator logical operation is considered to start (or restart) normally with instruction 01 for a new piping cycle with a new query against a new data base entry file, or with instruction 0B for the same query piped against a new entry of the same data base entry file.

During instructions 01, 02, and 03, control signal RESET is caused to become high. Control signal RESET high causes the pipers to institute reset processing by causing all piper program counters to be reset to instruction 00 (see description of piper processing). Piper reset causes the pipers to receive new QS, PW, and piping array data from the microcomputer.

During instruction 04, control signal BUSY is caused to become low. If all piper BUSY control signals are low, instruction 04 causes control signal READY to become high.

BUSY high indicates that a particular piper or the brightness generator is still executing a particular processing phase (a sub-group of instructions that produce a specified intermediate result). When a piper or the brightness generator finishes a processing phase, the corresponding BUSY control signal is set low. Concurrently, the status of control signal READY is checked. As long as any other piper or the brightness generator is executing the previous processing phase, the control signal BUSY, controlled by such piper or the brightness generator, will be high thereby causing READY to remain low, consequently preventing the waiting pipers or the brightness generator from commencing the next processing phase. At such time that the final piper or the brightness generator completes the previous processing phase and causes its control signal BUSY to become low, the READY control signal becomes high, and all of the pipers and the brightness generator commence executing the next processing phase at the same time. Thus, control signal BUSY through its effect on control signal READY provides processing phase synchronization. (Control signal DV provides synchronization of instruction execution within a processing phase, when required). Processing phase synchronization takes place at each READY on (high) wait instruction, for example, at instruction 4E.

During instruction 05, control signal FLG is caused to become high causing a logical 1 to be stored in the FLG register. The status of control signal FLG is tested during instruction 6F.

During instruction 06, control signal BLDR is caused to become high. Control signal BLDR high causes the register BOLD to be cleared (all bits set to zero). Instructions 07 and 08 signal the microcomputer 1010 to initiate data transmittal to the pipers necessary to begin a new piping cycle.

During instruction 07, control signal ENT (transmit enable) is caused to become high. Control signal ENT high causes microcomputer 1010 to couple its output to the Data Bus and to cause control signal ENR (receive enable) to become high.

During instruction 08, the status of control signal ENR is checked. As long as control signal ENR remains low, the program counter remains at instruction 08. When control signal ENR is detected as being high, indicating that the microcomputer is connected to the Data Bus, the program counter is incremented to instruction 09.

During instruction 09, the status of control signal DV (data valid) is checked; control signal CTS is caused to become low; and control signal BRC1 is caused to become high. As long as control signal DV remains high at each iteration of instruction 09, the program counter is inhibited from incrementing to the next instruction. Control signal CTS low causes the microcomputer to place a data word containing new QS and BDA data, on the Data Bus. Control signal BRC1 high causes the data (bit pattern) on the Data Bus to be copied into the BRBG register at each iteration of the instruction. When control signal DV is detected as being low, indicating that valid data from the microcomputer exists on the Data Bus, the program counter is incremented to instruction 0A. Note that the final iteration of instruction 09 has copied the Data Bus data into the register BRBG.

During instruction 0A, control signals BR and QSC are caused to become high. Control signal BR high causes gate 1150 to become conductive, allowing the value in the register BRBG to be copied onto the I-BUS. Control signal QSC high enables the QS register to receive bits 8 through 14 of the I-BUS and the BDA register to receive bit 7 of the I-BUS.

During instruction 0B, the status of control signal DV is checked while control signal CTS is caused to become low, and control signal BRC1 is caused to become high, as described for instruction 09. CTS low indicates that the brightness generator is ready to receive new ES, DDA, and M data.

During instruction 0C, the status of control signal BREOF, generated by the BRBG register, is checked. If control signal BREOF is high, indicating that the BRBG register contains an EOF command as a result of instruction 0B, the program counter is incremented to instruction 2B thereby terminating the current piping cycle before any piper chutes are loaded. If BREOF is low, indicating that the BRBG register contains data or a command other than an EOF, the program counter is incremented to instruction 0D thereby inititating piper chute filling.

During instruction 0D, control signal GO is caused to become high. Control signal GO high enables the pipers to begin chute filling (see description of piper instruction 17 in description detailed piper operation). Piper enabling is used for those instruction sequences that must be performed by each piper serially, rather than simultaneously.

During instruction 0E, control signals BR and ESMC are caused to become high. Control signal BR high causes gate 1150 to become conductive, allowing the value in the BRBG register to be copied onto the I-BUS. Control signal ESMC high simultaneously enables the ES register to receive bits 8-14 of the I-BUS;

the M register to receive bits 0–6 of the I-BUS; and register DDA to receive bit 7 of the I-BUS.

During the following instructions that cause a transfer of data into register SHIFT and register EXP, the state of control flags SHF and DTAF are set according to the required data transformations of register SHIFT. The state of the SHF and DTAF flags is shown in the brightness generator flow diagram. During instructions 0F and 10, control signals MR, SUBR, and SHC are caused to become high. Control signal MR high causes the value in register M to be copied onto the S-BUS, which is connected directly to the B input of subtracter 1156. Since the output of register QS is connected directly to the A input of subtracter 1156, the A-B output of the subtracter equals the quantity QS-M. Control signal SUBR high causes gate 1158 to become conductive, thereby copying the A-B output of subtracter 1156 onto the I-BUS. Since control signals MPY and WR2 are both low, the output of NOR gate 1162 is high, maintaining gate 1160 conductive, Gate 1160 conductive causes the value on the I-BUS to be copied onto the M-BUS. Control signal SHC high enables register SHIFT to receive the data on the M-BUS. This instruction occurs twice to allow time for the output of subtracter 1156 to stabilize.

During instruction 11, control signal MPCC is caused to become high. Control signal MPCC high enables the MPC register to receive the value in register SHIFT. The output of register MPC provides the B input to multiplier MULT 1168. This instruction is always the first step in multiplying two numbers.

During instruction 12, control signals ZERO, SUBR, and SHC are caused to become high. Control signal ZERO high causes a zero to be copied onto the S-BUS and thus to the B input of subtracter 1156. Since the output of register QS is directly connected to the A input of subtracter 1156, the value at the A-B output of subtracter 1156 is the value in register QS. Control signal SUBR high causes gate 1158 to become conductive, thus causing the A-B output of subtracter 1156 to be copied onto the I-BUS. Since control signals MPY and WR2 are both low, gate 1160 is conductive, as described in the description of instruction OF, causing the value on the I-BUS to be copied onto the M-BUS. Control signal SHC high enables register SHIFT to receive the value on the M-BUS.

During instructions 13 and 14, NO-OP (no operation) instructions are executed. These instructions, together with instruction 15, use three clock periods, the time required for the A*B output of MULT 1168 to stabilize. The A*B output of MULT equals the value in the MPC register (input B) multiplied by the value in register SHIFT (input A).

During instruction 15, control signal BUSY is caused to become high, thus, causing the READY control signal to become low synchronizing piper processing at location E1 (brightness generator instruction 4E and piper instruction 22).

Instruction 16 transfers the result of the multiplication during instructions OF through 12 back into the register SHIFT. During instruction 16, control signals MPY and SHC are caused to become high. Control signal MPY high simultaneously causes the output of NOR gate 1162 to become low, making gate 1160 nonconductive, and causing gate 1166 to become conductive, allowing the A*B output of MULT to be copied onto the M-BUS. Control signal SHC high enables register SHIFT to receive the value on the M-BUS.

This completes the calculation of quantity WR1 in the brightness generator.

During instruction 17, control signals SH and WR1C are caused to become high. Control signal SH high causes gate 1170 to become conductive, allowing the value in register SHIFT to be copied onto the I-BUS. Control signal WR1C enables the WR1 register to read and copy the value on the I-BUS.

The multiple logic paths implemented by instructions 18 through 27, 30 through 4C, and 56 through 57 cause to be calculated, as appropriate, one of the 12 values for WR2 shown in Table 10. These values depend on the status of flags DDA and BDA, and the relative magnitudes of ES and QS. All reciprocal values of ES, QS, $ES^3$, and $QS^3$ are obtained from ROM 1184 as decoded "table lookup" items. The other intermediate calculations and final WR2 value are obtained by multiplication in MULT. The register SHIFT converts data values between fixed point and floating point formats, as required by flags SHF, DTAF, and exponent register EXP.

During instruction 18, control signal EQ1 is caused to become high, and the status of control signal SUBN and SUBO outputs from subtracter 1156 are checked. Control signal EQ1 high causes gate 1172 to become conductive, which allows the value in register ES to be copied onto the S-BUS. The S-BUS is connected directly to the B input of subtracter 1156, and the output of register QS is connected directly to the A input of subtractor 1156, thus the subtracter output equals the quantity QS-ES. If control signal SUBN is high, indicating that the subtraction results are less than zero (i.e., the quantity ES is greater than the quantity QS), control signal EQER is caused to become high; resetting flag register EQE to zero, causing output signal, EQE, to become high. If control signal SUBN is low, indicating that the quantity QS is equal to or greater than the quantity ES, the program counter is incremented to instruction 30.

During instructions 19 and 1A, control signals ESROM and ROMSEL are caused to become high. Control signal ESROM high causes gate 1174 to become nonconductive and gate 1154 to become conductive, decoupling the output of register QS from the R-BUS and connecting the output of register ES to the R-BUS. Simultaneously, ROM decode module 1176 outputs the ROM address of the registers containing the value $1/ES^3$ and 1/ES. Control signal ROMSEL high causes ROM data selector 1178 to select the 1/N output of the ROM. This instruction is executed twice to allow the ROM selection and decode logic to stabilize.

During instruction 1B, control signals ROM and WR2C are caused to become high. Control signal ROM high causes gate 1180 to become conductive, allowing the output of the data selector 1178 to be copied onto the I-BUS. Control signal WR2C enables the WR2 register to receive the value on the I-BUS.

During instruction 1C, the status of control signal DDA, generated by flag register DDA, is checked. If control signal DDA is high, indicating that the WR1-SSD portion of the brightness equation is not to be used, the program counter is incremented to instruction 33. If control signal DDA is low, indicating that the brightness equation is to use the quantity WR1=SSD, the program counter is incremented to instruction 1D.

During instruction 1D, control signals WR2 and SHC are caused to become high. Control signal WR2 high simultaneously causes the output of NOR gate 1162 to become low, and causes gate 1182 to be conductive, allowing the value in the WR2 register (1/ES) to be copied onto the M-BUS. Control signal SHC high enables the register SHIFT to copy the value on the M-BUS.

During instruction 1E, the value in register SHIFT (1/ES) is copied into the MPC register, as described for instruction 11.

During instruction 1F, control signals ROMSEL, ROM, and SHC high cause the quantity 1/QS to be obtained from the ROM and copied into register SHIFT. Note that with control signal ESROM held low, the ROM decoder 1176 receives QS via gate 1174, which, when decoded, selects 1/QS and 1QS$^3$ in ROM 1184.

During instructions 20 and 21, NO-OP (no operation) instructions are executed. The three clock cycles required for these instructions and instruction 22 allow time for the A*B output of multiplier 1168 to stabilize.

During instruction 22, the status of control signal BDA, generated by flag register BDA, is checked. If control signal BDA is high, indicating that the M+SSB portion of the brightness equation is not to be used, the program counter is incremented to instruction 45.

During instruction 23, control signals MPY and SHC are high, and the output A*B of multiplier 1168 is copied into register SHIFT.

During instruction 24, the status of control signal SHDN, generated by register SHIFT, is checked. As long as SHDN is low, indicating that register SHIFT is still shifting data in accordance with flags SHF and DTAF, the program counter is not incremented. When control signal SHDN is detected as being high (shifting finished), the program counter is incremented to instruction 25.

During instruction 25, control signal MPCC is high, and the value in register SHIFT is copied into the MPC register.

During instruction 26, control signals ROMSEL, ROM, and SHC are high, and the quantity 1/QS is copied into register SHIFT. After instruction 27, the program counter = 44.

During instruction 2B, control signal ENT is caused to become low (the BRBG register contains an EOF command, see instruction 0C). Control signal ENT low causes the microcomputer to decouple its output from the Data Bus. The microcomputer in turn causes control signal ENR to become low, thus communicating such decoupling to the brightness generator.

During instruction 2C, the status of control signal ENR is checked. If control signal ENR is high, the program counter is incremented to instruction 2D and then to 2C once again. When control signal ENR becomes low, indicating that the microcomputer has decoupled from the Data Bus, the program counter is decremented to instruction 01. At instruction 01, the pipers are reset to commence chute reloading.

The operational loop comprising instructions 0C, 2B, 2C, and 2D is used by the microcomputer to reset the pipers before chute loading begins by substituting an EOF command in place of an ES/DDA/M data word.

During instruction 30, when the quantity ES is not greater than the quantity QS, control signal EQ1 is caused to become high such that the value is register ES is copied into the subtracter 1156. Control signal SUB0, generated by subtracter 1156, is then checked. If control signal SUB0 is high, indicating that the quantity QS equals the quantity ES, control signal EQES is caused to become high, setting flag register EQE to 1 (and thus control signal EQE high). The program counter is then incremented to instruction 31. If control signal SUB0 is low, indicating that the quantities QS and ES are not equal, control signal EQER is caused to become high, resetting flag register EQE to 0 (and thus control signal EQE low), and the program counter is incremented to instruction 37.

During instruction 31, the status of control signal DDA is checked, as described for instruction 1C. If control signal DDA is high, the program counter is incremented to instruction 4B. If control signal DDA is low, the program counter is incremented to instruction 32.

During instruction 32, control signals ROM and WR2C are high, and the quantity 1/QS$^3$ is copied from ROM 1184 into the WR2 register. Note that control signal ROMSEL low causes data selector 1178 to select the 1/N$^3$ output of the ROM 1184.

During instruction 33, the status of control signal BDA is checked, as described for instruction 22. Control signal BDA high causes the program counter to be incremented to instruction 3F. BDA low causes the program counter to be incremented to instruction 34.

During instruction 34, the program counter is incremented to instruction 4D.

During instruction 37, control signals ES and SHC are high when the quantity QS is greater than the quantity ES (as determined by instructions 18 and 30), and the value in the ES register is copied into register SHIFT. Control signal ES high causes gate 1186 to become conductive, allowing the contents of the ES register to be copied onto the I-BUS. Control signal SHC high enables register SHIFT to receive the value on the I-BUS.

During instruction 38, control signal SHDN (SHIFT register shift status) is checked. SHDN high causes the program counter to increment to instruction 39.

During intruction 39, the value in register SHIFT is copied into the MPC register upon the issuance of a Chip Enable signal (i.e., control signal MPCC high).

During instruction 3A, the status of control signal DDA is checked, as described for instruction 1C. Control signal DDA high causes the program counter to be decremented to instruction 1F. DDA low causes the program counter to be incremented to instruction 3B.

During instruction 3B, control signals ROM and SHC are high, and the quantity 1/QS$^3$ is copied into the register SHIFT.

During instruction 3C, the program counter is decremented to instruction 22.

When control signal BDA is high, instruction 3F is executed. During instruction 3F, control signals WR2 and SHC are high, and the value in the WR2 register is copied into register SHIFT.

During instruction 40, control signal MPCC is high, and the value in register SHIFT is copied into register MPC.

During instruction 41, control signals ZERO, SUBR, and SHC are high, and the value in register QS is copied into register SHIFT.

During instruction 42, the status of control signal SHDN is checked. When control signal SHDN becomes high, indicating that register SHIFT has finished its shift operation, the program counter is incremented to instruction 43.

During instructions 43 and 44, two NO-OP instructions are executed. The two clock periods provide adequate time for the A*B output of multiplier 1168 to stabilize (following the execution of either instruction 42 or instruction 27).

During instruction 45, control signals MPY and SHC are high, and the A*B output of multiplier 1168 is copied into register SHIFT.

During instruction 46, control signal SHDN is checked, as described for instruction 42.

During instruction 47, control signals SH, EX, and WR2C are caused to become high. Control signal SH high causes gate 1170 to become conductive, allowing the value in register SHIFT to be copied onto the I-BUS. Control signal EX high causes gate 1164 to become conductive. Gate 1164 conductive allows the value in register EXP to be copied onto the I-BUS. Control signal WR2C enables the WR2 register to receive the value on the I-BUS. Since the output of register SHIFT has been shifted to occupy bits 0–7, and the output of register EXP occupies bits 8–13, the data copied into the WR2 register is in floating point format.

During instruction 48, the program counter is incremented to instruction 4D.

During instruction 4B, the status of control signal BDA is checked, as described for instruction 22. If control signal BDA is high, the program counter is incremented to instruction 56. Instruction 56 uses control signals KSEL, K, and WR2C high to cause a constant equal to 1.0 in floating point format to be copied from the KROM 1144 into register WR2. Note that KSEL high selects the floating point 1.0, whereas KSEL low selects the fixed point 1.0 in the KROM 1144. Instruction 57 causes the program counter to be decremented to instruction 4D. The control program increments to instruction 56 only when control signal BDA is high to cause the constant 1.0 to replace the M+SSB factor of the brightness equation when the factor is not to be used. If control signal BDA is low, the program counter is incremented to instruction 4C.

During instruction 4C, control signals ROMSEL, ROM, and WR2C are high, and the value 1/QS is copied into register WR2.

During instruction 4D, control signal BUSY is caused to become low, signalling the pipers through control signal READY that the brightness generator has finished determination of the WR2 factor of the brightness equation. At this point in program execution, register WR2 contains one of the 12 values indicated in Table 10, as determined by the status of flags DDA and BDA, and the magnitude of ES relative to QS.

During instruction 4E, the status of control signal READY is checked, as previously described. When control signal READY becomes high, indicating that the pipers have completed chute loading, the program counter is incremented to instruction 4F.

During instructions 4F-53, control signal ENT is caused to become low, control signal BUSY is caused to become high, and the program halts until control signal ENR low indicates that the microcomputer output is removed from the Data Bus. Control signal BUSY is caused to become high at this point to keep the pipers from beginning their minimum MIN determination processing phase until the microcomputer has decoupled from the Data Bus. When control signal ENR is detected as low, the program counter is incremented to instruction 59.

During instruction 59, control signal BUSY is caused to become low, thus signalling the pipers via the READY control signal to begin minimum MIN determination.

Four NO-OP instructions are executed during instructions 5A through 5D. This allows four clock periods for the pipers to execute the preliminary instructions for minimum MIN determination and be ready at location E4 for a DV on (low) signal from the brightness generator.

During instruction 64, control signal LMINC is caused to become high. Control signal LMINC high enables register LMIN to receive the value in register CMIN. On a first processing pass when the program counter has been incremented from instruction 5E, instruction 64 serves as a timing step only, since no valid information has yet been copied into register CMIN. During instruction 64, the current minimum MIN value (the MIN value associated with the DSUM and BSUM values to be used to calculate the next brightness value) is copied from register CMIN into register LMIN, as the position value for that brightness value.

During instructions 65 through 6B, the brightness generator initiates and synchronizes minimum MIN determination in the pipers (instructions 65 and 66), stores the MIN value found during any given MIN compare loop (instruction 67), and reiterates instructions 65 through 76 until the minimum value of MIN is found (instruction 6B).

During instruction 6C, control signals MPY and SHC are high, and the A*B output of multiplier 1168 is copied into register SHIFT. After instruction 6C, register SHIFT contains the product of the first two factors of the brightness equation.

During instructions 6D and 6E, piper enabling is halted (control signal GO is caused to become low), and control signal BUSY is caused to become high. This ensures resynchronization of pipers and brightness generator processing at location E6 (see FIG. 11 and FIG. 17) for the transmittal of DSUM and BSUM values to the brightness generator (see piper instructions 42 through 4F).

During instruction 6F, the status of control signal FLG, generated by the FLG register 1230, is checked. Control signal FLG high indicates that the brightness generator and pipers are executing the first brightness calculation. The program counter is incremented to instructions AE and AF, where control signal FLGR causes control signal FLG to become low, and the program counter is incremented to instruction 7B, bypassing the last phase of brightness calculation. Control signal FLG low indicates that the brightness generator and pipers are in a second or subsequent processing pass, and that DSUM and BSUM values have been collected and processed. The program counter is incremented to instruction 70 in order to complete brightness calculation.

During instruction 70, the status of control signal SHDN is checked. Control signal SHDN high indicates that register SHIFT has completed the required data word bit shifting initiated by instruction 6C. The program counter is incremented to instruction 71.

During instruction 71, control signal MPCC is high, and the value in register SHIFT is copied into register MPC. This transfer places the product of the first two factors of the brightness equation at the B input of MULT 1168.

During instruction 72, control signals WR2 and SHC are high, and the value in register WR2 is copied into register SHIFT. This transfer places the third factor of the brightness equation; namely, WR2, calculated to be one of the 12 values in Table 10, at the A input of MULT 1168.

During instructions 73 through 75, NO-OP instructions are issued to allow the output of MULT 1168 to stabilize.

During instruction 76, control signals MPY and SHC are high, and the A*B output of MULT 1168 is copied into register SHIFT.

When the shifting required by instruction 76 is detected as being complete (instruction 77), the resultant value in register SHIFT is the brightness value for the current piper chute processing pass.

The brightness value in register SHIFT is copied into the ASB register as follows. During instruction 78, control signals SH, BTOS, and ASBC are caused to become high. Control signal SH high causes gate 1170 to become conductive, allowing the value in register SHIFT to be copied onto the I-BUS. The I-BUS is connected to the A-BUS through gate 1188. This gate is normally held conductive by the output of NOR gate 1190 in the absence of either a control signal M or BXFER being high. Thus, since control signals M and BXFER are both low for this instruction, the value on the I-BUS is copied onto the A-BUS. Note that the A-BUS accepts bits 2 through 11 of the I-BUS, thereby truncating the two least significant (unused) bits of the brightness value copied from register SHIFT. Control signal BTOS high causes the B input of adder 1192 to be presented at the adder output A+B (with the addition function inhibited). Control signal ASBC enables the ASB register to receive the A+B output of adder 1192.

During instructions 79 and 7A, the brightness just calculated for the completed chute processing pass, now in the ASB register, is compared to the largest brightness previously found (in register BOLD), and the larger of the two brightness values is retained in register BOLD. Thus, during instruction 79, control signal BXFER is caused to become high. Control signal BXFER high causes gate 1194 to become conductive, thus allowing the complement of the value in register BOLD to be copied onto the A-BUS and thus appear at the B input of adder 1192. Concurrently, control signal BXFER causes the output of NOR gate 1190 to become low, causing gate 1188 to become nonconductive, thus decoupling the I-BUS from the A-BUS. If the addition of the value in register ASB and the complement of the value in register BOLD (i.e., ASB-BOLD) results in a carry bit at bit position 9, true if (and only if) the value in ASB is greater than the value in BOLD, the newly-calculated brightness is greater than any previously-calculated brightness. Consequently, control signal CO, generated by adder 1192, is caused to become high. CO high causes the program counter to be incremented to instruction 7A, which causes the value in register BOLD to be replaced with that in register ASB. If control signal CO is low, indicating that the brightness value in register BOLD is equal to or greater than the brightness value in register ASB, the program counter is incremented to instruction 7B, thus, preserving the brightness value in register BOLD.

During instruction 7A, control signals BOLDC and POSC are caused to become high. Control signal BOLDC high enables register BOLD to receive the output of register ASB. Control signal POSC high enables register POS to receive the value in register LMIN. Register POS now contains the position (MIN) value associated with the just-calculated brightness value.

The B-BUS 1193 in turn is directly connected to the D2 input of register BRBG, see FIG. 16B.

During instruction 7B, control signal CMDCN, generated by register CMIN, is checked. Control signal CMDCN high indicates that a command word exists in register CMIN, and that all data in the piper's chutes have been processed. The program counter is incremented to instruction B3 in preparation for transmitting the highest brightness found and associated position to the microcomputer. Control signal CMDCN low indicates that more noncommand word data remains to be processed, and the program counter is incremented to instruction 7C to continue such processing.

During instruction 7C, control signal BUSY is caused to become low. This allows control signal READY to become high at location E6 (instruction 7D), as previously described, causing the pipers to begin transferring their DSUM and BSUM values to the brightness generator.

During instruction 7D (a READY on wait instruction), control signal READY high indicates that the pipers have completed their piping processing phase (piper instructions 37 through 41), and the program counter is incremented to instruction 7E to begin DSUM and BSUM value collection.

During instruction 7E, control signal GO is caused to become high, enabling each piper sequence to transmit its DSUM and BSUM values to the brightness generator.

During instruction 7F, control signals M, BTOS, and ASBC are caused to become high. Control signal M high causes gate 1196 to become conductive, allowing the value in register M to be copied onto the A-BUS 1191. Control signal M also causes the output of NOR gate 1190 to become low, causing gate 1188 to become nonconductive and decoupling the I-BUS from the A-BUS. This latter action precludes interference between the value on the I-BUS and the value in register M 1212. The M value is copied into register ASB in preparation for the sequential addition of the BSUMs from the pipers during instruction 89 and 8A.

During instructions 80 and 81, NO-OP instructions are executed to coordinate timing with the just-enabled piper in sending its DSUM and BSUM to the brightness generator.

During instruction 82, control signals ASDWR1, ASDC, and DZS are caused to become high. Control signal ASDWR1 high causes gate 1300 to become conductive, and gate 1141 to become nonconductive, allowing the value in register WR1 to be coupled onto the D-BUS, while simultaneously decoupling the A-B output of subtractor 1143 from the D-BUS 1195. The quantity in register WR1 was previously calculated during instructions 0F through 17. Control signal ASDC high enables register ASD to receive the value in register WR1. The value in register WR1 is copied into register ASD in preparation for the sequential subtraction of the DSUMs from pipers at instruction 8. Control signal DZS high causes a binary 1 to be placed into register DZ, thus making its output control signal, DZ, high. This control signal is used in determining the value of control signal EXACT at instruction 8D.

During instruction 83, control signal DV is caused to become low. The purpose of this signal is to synchronize the brightness generator and piper operation at location E8 (instruction 85).

During instruction 84, control signals D, SHC, EX, and EXR are used to store the quantity 1.0 into register SHIFT and a zero in register EXP. This instruction clears register EXP initializing both EXP and SHIFT for the receipt of new data values.

During instruction 85, the status of control signal DV is checked. Concurrently, control signal BRC1 high causes the value on the Data Bus to be copied into register BRBG. The value currently on the Data Bus is the DSUM value of the currently-enabled piper (see piper instructions 43 through 47). The brightness generator detects whether its control signal DV is on. DV on indicates that the currently-enabled piper's DSUM is on the Data Bus and thus now in register BRBG. The program counter is next incremented to instruction 86.

During instruction 86, control signal DV is again caused to become low in order to synchronize the brightness generator and piper operation at location E9 (instruction 88).

During instruction 87, control signal ASDC high enables register ASD to receive the contents of the D-BUS 1195. The D-BUS contains the A-B output of subtracter 1143. At the A input of subtracter 1143, at instruction 86, was the value in register ASD, namely, WR1 (see instruction 82). At the B input of 1143, at instruction 86, was the value in register BRBG. Thus, after instruction 87, register ASD contains the quantity WR1 minus the DSUM of the currently-enabled piper minus the DSUMs of previously-enabled pipers. The quantity in register ASD is placed at input A of subtracter 1143 in preparation for the subtraction of the next DSUM value. When the last piper in the string containing chute data has had its DSUM subtracted from the value in register ASD, the calculation of the first factor of the brightness generator, WR1-SSD is accomplished. During instruction 87, control signal BRO, generated by the BRBG register, is checked. Control signal BRO low indicates that the quantity in register BRBG is not zero. Control signal DZR is thus caused to become high, replacing the binary 1 in register DZ with a 0. In turn, control signal DZ, generated by the register DZ, is caused to become low. At the end of DSUM collection, if all DSUM values received from the pipers were zero, control signal DZ will be high as set in instruction 82. Control signal DZ is a combinatorial input (see FIG. 16C) to the EXACT determination logic circuit.

During instruction 88, the status of control signal DV is checked. This instruction detects the synchronizing DV low control signal generated at instruction 86, and simultaneously uses control signal BRC1 to enable register BRBG to receive the value on the Data Bus. At this point in the synchronized processing of the pipers and the brightness generator, the Data Bus contains the BSUM value of the currently-enabled piper.

During instruction 89, control signal BR high is used to cause the value in register BRBG (BSUM from the currently-enabled piper) to be copied onto the I-BUS through gate 1150. The contents of register BRBG are simultaneously copied onto the A-BUS through gate 1188, which is held conductive by the output of NOR gate 1190. Instruction 89 causes the value in register BRBG to be present at the B input of adder 1192, where it is summed with the current value in register ASB present at the A input of adder 1192.

During instruction 8A, control signal ASBC is high, and thus enables register ASB to receive the A+B output of adder 1192. Register ASB now contains M plus the BSUM of the currently-enabled piper plus the BSUMs of any previously-enabled pipers. When the last piper in the string (see FIG. 12) containing chute data has had its BSUM added to the value in register ASB, the second factor of the brightness equation, M+SSB, is calculated. After instruction 8A, the new value in register ASB is present at input A of adder 1192 ready to be added to the next BSUM value collected during the next execution of instruction 88.

During instruction 8B, the status of control signal READY is checked. READY low indicates that at least one piper is waiting at location E8 with its DSUM value on the Data Bus. The program counter is decremented to instruction 83, and instructions 83 through 8A are executed to collect that piper's DSUM and BSUM values, and subtracting DSUM from the cumulative value in the ASD register while adding BSUM to the cumulative value in the ASB register. READY high indicates that all pipers with chute data have presented their DSUMs and BSUMS to the brightness generator. The program counter is then incremented to instruction 8C.

During instruction 8C, control signal GO is caused to become low to inhibit piper enabling, causing piper processing to halt at locations E12 and E11, or at location E4 if no pipers have NMD commands to process.

During instruction 8D, the status of control signal EXACT is checked. Control signal EXACT is the output of special combinatorial logic (see FIGS. 16A-16C) whose inputs at this point in brightness generator processing detect if the query and data base entry being compared are exact matches. Exact matches (i.e., brightness equal to 1.0) are detected with the combinatorial logic. An exact match occurs between a query and entry when both have the same number of events (the quantity ES equals the quantity QS), and when each contains the same event types in the same order (i.e., M=0 and all DSUMs=0), and when all weighting factors are equal to 1 (BSUM=QS). Under these conditions, the status of the control signal input to the EXACT logic are determined as follows. The value M (missing events) equals 0, causing control signal MZ to be high, all collected DSUMs will equal zero (causing control signal DZ to be high), and ES will be equal to QS, causing control signal EQE to be high. Additionally, control signal SUB0 will be high, since the value in ABS will equal QS (there are no missing events and a BSUM value of 1.0 is obtained for each QS event). To obtain the SUB0 input to the EXACT logic, instruction 8D causes control signal ASBS to become high, making gate 1183 conductive. This places the value in the ASB register onto the S-BUS and at the B input to subtractor 1156. Thus, if QS=ASB, then SUB0 will be high. If all of these conditions are true (all indicated control signals high), then control signal EXACT is caused to become high, and the program counter is incremented to B1, bypassing further brightness equation processing. Note that control signal DDA or BDA high overrides their respective associated control signals in determining the status of control signal EXACT. If control signal EXACT is detected as being low, indicating a less than exact match between query and entry, the program counter is incremented to instruction 8E.

During instruction 8E, the status of control signal DDA is checked. If control signal DDA high indicates that the WR1-SSD factor of the brightness equation is not to be used, the program counter is incremented to instruction 95. If control signal DDA is low, indicating that WR1-SSD is to be used, the program counter is incremented to instruction 8F.

During instruction 8F, control signals ASD and SHC are caused to become high. Control signal ASD high causes gate 1145 to become conductive, allowing the value in register ASD to be copied onto the I-BUS. Control signal SHC high enables register SHIFT to receive the value on the I-BUS through gate 1160, which is held conductive by the output of NOR gate 1162.

During instruction 90, the program counter is incremented to instruction 97.

During instruction 95, incremented from instruction 8E when DDA=1, control signals KSEL, K, and SHC are set high, thereby copying the value 1.0 (in floating point format) into register SHIFT. Instruction 95 causes the constant 1.0 to replace the factor QR1-SSD of the brightness equation when the factor is not to be used.

Instruction 96 is a NO-OP instruction included for timing purposes.

During instruction 97, the status of control signal READY is checked. READY high indicates that there are no pipers waiting at instruction E12 to process NMD commands, and the program counter is incremented to instruction 98 to initiate the next minimum MIN determination phase in the pipers. If READY is low, the program counter is incremented to instruction 9D in order to initiate NMD processing in the pipers.

During instruction 9D, control signal ENT is caused to become high, causing the microcomputer to couple with the brightness generator and pipers, as previously described.

During instruction 9E, the status of control signal ENR is checked. When ENR becomes high, indicating that the microcomputer 1010 is ready to exchange data, the program counter is incremented to instruction 9F.

During instruction 9F, control signal GO is caused to become high, which enables the first piper with an NMD command to being NMD processing at location E12.

During instruction A0, control signal BUSY is caused to become high, causing control signal READY to become low, and thereby causing any pipers not requiring NMD servicing (or that have completed NMD servicing) to wait at location E11 until NMD processing for all pipers is completed.

During instruction A1, A NO-OP command is executed for timing purposes.

During instructions A2 and A3, control signal DV is caused to become low, synchronizing piper operation at location E13 and causing the microcomputer to copy the value on the Data Bus (at this point an NMD command from a piper) into its input register.

Again, the NO-OP command at instruction A4 is for timing. Its positioning between instructions A2 and A3, and instruction A4 does not allow the brightness generator to respond to its own control signal DV, but rather, wait for the DV control signal issued by the microcomputer in response to the CTS control signal issued by the piper whose NMD command the microcomputer has just received. The interposition of instruction A4 has this effect due to the sequential logic through which the received DV signal passes. This logic causes the internal received DV signal to become low (true) one clock period after the external DV signal becomes low (true) and to return to the high (false) state at the begining of the next clock period regardless of the status of the external DV signal. Thus, the internal DV signal goes low during instruction A3 and then returns high during instruction A4 and is thus high (false) during instruction A5.

During instruction A5, the status of control signal DV is checked while, simultaneously, control signal BRC1 high is used to enable register BRBG to receive the value on the Data Bus. As long as control signal DV remains high, the program counter remains at instruction A5 for each iteration of the instruction. Control signal DV low indicates that the microcomputer has data on the Data Bus in response to the previous control signal CTS low from the currently-enabled piper, and the program counter is incremented to instruction A6.

During instruction A6, control signal BRCMD, generated by register BRBG, is checked. BRCMD high indicates that register BRBG contains a command and is thus the last data word of the current NMD chute refill. The program counter is incremented to instruction A7 to terminate the chute refill loop. If register BRBG contains other than a command (indicating that at least one more chute refill data word remains to be sent by the microcomputer to the currently-enabled piper), the program counter is decremented to instruction A5 to wait for the next control signal DV low from the microcomputer and to copy the accomanying data word into register BRBG.

During instruction A7, control signal ENT is caused to become low. ENT low causes the microcomputer to decouple from the Data Bus.

During instruction A8, control signal GO is caused to become low. Control signal GO low prevents the next piper, or the same piper, with an NMD command, from being enabled, i.e., holds its internal control program at location E12, until communication is reestablished with the microcomputer and the next NMD command is transmitted by the pipers.

During instruction A9, the status of control signal ENR is checked. As long as control signal ENR is high, the program counter increments to instruction AA and then back to instruction A9 to repeat the interrogation of control signal ENT. When control signal ENT is found to be low, indicating that the microcomputer has decoupled from the Data Bus, the program counter is incremented to instruction AB.

During instructions AB and AC, control signal BUSY is caused to become low, causing control signal READY to become high when all pipers have finished NMD command processing. This releases any pipers waiting at location E11 to reenter the minimum MIN determination processing phase. The program counter then decrements to instruction 97.

During instruction 97, the status of control signal READY is checked once again. If pipers remain with NMD commands to service, their BUSY control signals will be high, holding control signal READY low, and the brightness generator reenters the NMD command processing loop at instruction 9D, as described above. If there are no pipers with NMD commands to service, all BUSYs are low, making READY high, and the program counter is incremented to instruction 98.

During instruction 98, control signal GO is caused to become high, enabling piper number 1, and thereby causing it to place its MINREG (see FIG. 9B) register contents on the Data Bus to initiate the first step in the new phase of minimum MIN determination (piper control program instructions 2F through 34).

During instructions 99 through 9A, and 61 through 63, the brightness generator returns to brightness equation processing. If control signal BDA is low (instruction 99), the program counter is incremented directly to the next brightness equation multiplication step. If control signal BDA is high, indicating that the M+SSB factor of the brightness equation is not to be used, the constant 1.0 is caused to be copied into register ASB by means of control signals K, BTOS, and ASBC being high (instruction 61). The constant 1.0 replaces the value of M+SSB determined during instructions 86 through 8B. Next to the value in register SHIFT, containing either WR1-SSD or the constant 1.0, as determined during instructions 8E through 90 and 95, is copied into register MPC for presentation at the B input of MULT 1168 by means of control signal MPCC being high (instruction 62). The value in register ASB is next copied into register SHIFT to be later placed at the A input of MULT 1168 (instruction 63). Three clock periods later, the output of MULT 1168 contains the product of the first two factors of the brightness equation, (WR1-SSD) (M-SSB), as determined by the DSUM and BSUM values received from the pipers and the status of control signals DDA and BDA.

Processing now continues with instructions 64 through 7B, as previously described. These instructions multiply the product of the first two brightness equation factors by the third factor, WR2.

During instruction B3, when a command word is found to be in register CMIN, control signal BUSY is caused to become low as an initiating step to prepare for a new chute processing pass.

During instruction B4, control signal BRC2 is caused to become high. Control signal BRC2 high enables the register BRBG to receive the data presented at its D2 input. Bits 0 through 7 of this input are connected directly to the output of register POS, which contains the position of query-to-entry at which the brightness value in register BOLD was calculated (see instructions 78 through 7A). Bits 8 through 14 of the D2 input are connected directly to the output of register BOLD, which contains the highest of the brightnesses calculated in the previous chute processing passes. After instruction B4, this highest brightness and associated position are ready to be transferred to the microcomputer.

To transfer the brightness and position, the brightness generator is coupled to the microcomputer via instructions B5 and B6. The instructions B7 through BB accomplish the transfer as follows. First, the register BRBG output is copied onto the Data Bus using control signal OUTE high (instruction B7). Next, control signal DV is caused to become low for two clock periods to signal the microcomputer that data exists on the bus (instructions B8 and B9). The DV control signal causes the microcomputer to enable it to receive the value on the Data Bus. Instruction BA next causes control signal ENT to become low to initiate the decoupling of the microcomputer from the Data Bus. The extra DV signal during instruction B9, and instruction BA allows two clock periods for the microcomputer to copy the contents of the Data Bus. Instruction BB uses control signal OUTE low to cause the brightness and position information to be decoupled from the Data Bus.

During instruction C2, the status of control signal CMDEOF, generated by register CMIN, is checked. If control signal CMDEOF is high, indicating that the piping data just processed included the last data in the entry file being piped, the program counter is decremented to instruction 01 to begin a new piping cycle. If CMDEOF is low, indicating that more data remains in the current entry file to pipe, the program counter is incremented to instruction C3.

During instruction C3, the status of control signal BLD1, generated by register BOLD, is checked. Control signal BLD1 high indicates that the brightness value is 1.0 (as determined by control signal EXACT), and therefore that no more data in the current entry file need be processed. The program counter is then also decremented to instruction 01. If control signal BLD1 is low, indicating a brightness of less than 1.0, the program counter is incremented to instruction C4.

During instruction C4, register BOLD is cleared to zero using control signal BLDR high. This initializes the register for a new cycle of chute processing and brightness calculation.

During instructions C5 and C6, communication is established with the microcomputer using control signals ENT and ENR high. This sets the stage for piper chute reloading and the reception of new ES, DDA, and M values in preparation for the next piping cycle.

Instruction C7 causes the program counter to be decremented to instruction 0B to begin a new piping cycle that retains the previous QS and PW values.

L. SUMMARY OF THE SECOND EMBODIMENT

In summary, there has been disclosed a method utilizing a plurality of processing means such as the processing means 1016. Each processing means comprises a plurality of data stores, for example chutes or storage locations in chute memory 1014. For each data store, there is a corresponding temporary store, for example, a pocket or storage location in the pocket memory 1034. The method determines a particular criterion value, i.e., brightness, and an associated positional value, i.e., the value stored in POS 1202. The criterion value and the associated positional value indicate the degree of match between the juxtaposition of a plurality of event types of a query and a plurality of corresponding event types of a stored data base entry. The method utilizes a priorly-formed array of data values, for example see the data values in Table 7A. Each data value represents the number of event positions between the occurrence of an event type in the query and the occurrence of a corresponding event type in the stored data base. A group of one or more data values is provided for each of a plurality of different query event types. Each different group is stored in a different data store with the data values thereof arranged in a monotonic order from the first end, for example see Table 7A. The method includes the following steps:

Designate in each processing means a data value in each of a plurality of data stores as a first data value, for example, at FIG. 11, instruction 1F, all the TOCPTR registers are set so that they point to the smallest data value in each chute, i.e., the top-of-chute. This is done for each of the data stores in each of the data processing means.

Detect in each processing means at least one of the designated first data values having a predetermined magnitude relative to the other designated first data values in such processing means. For example, during FIG. 11, instructions 1C through 26, the data value at the top of each data store is compared with the data value at the top of each of the other data stores using a MIN logic block 1036 that is coupled to each data store. Once the data store, that is, the storage location in the chute memory, is detected, the smallest data value is then copied from the output MINOUT of the MIN finding logic block 1029 onto the IBUS, and subsequently into the MINREG register, (see FIGS. 9A and 9B).

Determine from among the detected values for all of the processing means that detected value which has a predetermined magnitude relative to the others and provide a corresponding determined value. In this regard, during FIG. 11, instructions 68-6E and 2F-34, the MIN value, i.e., the detected value, in each processing means is compared with the MIN value of a next processing means, and the minimum value of such two MIN values is returned to each processing means and placed in their MINREG registers. The foregoing process is repeated, and the value just determined is compared with the value in the BREG register, i.e., BREG presently contains the MIN value of the corresponding processing means, and the minimum value therebetween is returned and copied into the MINREG register of the data processor just tested. At the conclusion of the testing of all processing means, the smallest of the MIN values determined in each processing means will appear in the MINREG register of each processing means.

Storing in each processing means the at least one detected data value in the temporary store which corresponds to the data store in which such detected data value is detected. In this regard, during FIG. 11, instruction 3E, the data value at the top of each data store is compared with the data value in the MINREG register, and during instruction 73, if the value compared during instruction 3E are found to be equal, the data value at the top of the data store is copied onto the IBUS and subsequently to the corresponding pocket POC or storage location in the pocket memory.

Forming in each processing means for each of the individual data stores thereof a first distance value which represents the algebraic difference between the determined data value and the designated data value in such data store. By way of example, during FIG. 11, instructions 38-41 and 73-75, the MINREG register in combination with subtractor 1086 are used to form the algebraic difference, D1, between the detected data value and the data value at the top-of-chute.

Forming in each processing means for each of the individual data stores thereof a second distance value, D2, representing the algebraic difference between the determined data value and a data value in the temporary store corresponding to such individual data store. In this regard, during FIG. 11, instructions 38-41 and 73-75, the MINREG register in combination with subtractor 1088 and the pocket memory 1034 are used to form the algebraic difference between the detected data value in a particular data store and the data value in the corresponding pocket.

Selecting for each processing means for each of the individual data stores a distance value from the corresponding first and second distance values, the selected distance value having a predetermined magnitude relative to the other. To this end, during FIG. 11, instructions 38-41 and 73-75, the values D1 and D2 for each particular data store are compared in comparator 1090.

Form in each processing means for a detected data value a sum-of-distance value representing the sum of the absolute values of the selected distance values formed therefrom. In this regard, during FIG. 11, instructions 38-41 and 73-75, the adder register 1060 in combination with subtractor 1088 and subtractor 1086 are used to sum the absolute value of the selected distance values. In this regard, the distance values sequentially determined are in effect summed into the DSUM register 1059.

Designate in each processing means a new data value in the data value store containing the at least one detected data value, and repeating the aforementioned steps using the new data value as a designated data value. In this regard, during FIG. 11, instructions 73 and 74, the TOCPTR register for the data store in which the detected data value was stored, i.e., the smallest data value, is incremented by 1 so that the next data value in the data store is indicated as a new designated data value in the data store.

The determined data values and the corresponding sum-of-distance values provided in each processing means during the aforementioned steps are utilized for deriving such criterion value and positional value. The actual comparison is accomplished utilizing registers ASB and BOLD, see FIG. 16A.

Additionally, during the step of utilizing, a positional value is provided. The positional value, which is also the detected data value used in the steps discussed above, is stored in register POS (see FIG. 16B).

In each processing means, the data value in the groups are arranged in the monotonic order with the smallest data value as a first data value, and the step of detecting comprising the step of detecting the smallest data value of the first data values. To this end, the output MINOUT of the MIN finding logic block 1029 detects the smallest data value of the first data values.

The step of determining comprises the step of determining the smallest of the designated first data values. To this end, during FIG. 11, instructions 68-6E and 2F-34, the MIN value in each processing means is compared with the MIN value of the other processing means. At the conclusion of the comparison of all processing means, the smallest value of the MIN determined in each processing means will appear in the MINREG register of each processing means.

The step of selecting comprises the step of selecting the smallest of the first and second distance values. In this regard, comparator 1090 in combination with subtractor 1088 and subtractor 1086 are used to compare the first and second distance values and select the smallest value therefrom.

Each data processor has a store for a pipewidth value PW, and the method includes for each processing means the additional step of detecting a predetermined relation between each albebraic difference used in the step of forming a sum-of-distance value and a value in the pipewidth store. To this end, the selected first or second distance value, i.e., D1 or D2 respectively, is compared in comparator 1092 with the value in the pipewidth value store PW to detect the predetermined relationship therebetween. Operative upon the last step, detection is made to such predetermined relation as to a particular algebraic difference for substituting a predetermined value for such algebraic difference when forming such a sum-of-distance value. To this end, during FIG. 11, instructions 38-41 and 73-75, if the value PW is greater than either the selected first or second distance value, the quantity QS or query size is substituted for the first or second selected distance value.

In each processing means if the formed first distance value represents a value of zero for a particular data store, the designated data value is stored in the temporary store corresponding to such data store, and the next data value in such data store is designated as the first data value. To this end, during FIG. 11, instruction 74, the TOCPTR register is incremented by 1 so that the next data value in the data store is indicated as a first data value. The data processing means includes a store for a positional value wherein for a determined data value a positional value corresponding to the determined data value is stored in the positional value store. To this end, the determined data value is stored in the positional value store POS.

In each processing means, a weighting value is stored in the data store in association with each of said data values, and the method includes the step of combining the weighting values that are associated with the data values that are used in the step of forming a sum-of-distance value and thereby form a sum-of-weighting value. To this end, during FIG. 11, instructions 38–41 and 73–75, adder register 1062 in combination with comparator 1106 and the pocket memory are used in forming a sum-of-weighting value in a BSUM register 1061.

In each processing means for each temporary store and corresponding data store which have a data value in the temporary store and a designated first data value of the corresponding group, the method includes the steps of detecting if the distance values formed from the data value in the temporary store and the designated data value of the corresponding group are equal. To this end, comparator 1090 in combination with the pocket memory, MINREG register, and subtracters 1086 and 1088, detect if the first and second distance values are equal. Operative upon the last step, selection is made from the two weighting values that are associated with the two data values which are associated with the two distance values detected to be equal, that weighting value which has a predetermined magnitude relative to the other. To this end, comparator 1106 in combination with the pocket memory select that weighting value which has a predetermined magnitude relative to the other. The selected weighting value is then utilized in the step of combining the weighting values. To this end, adder register 1062 and BSUM register 1061 are used in combining the weighting values.

The step of selecting from the two weighting values comprises the step of selecting the largest weighting value of the two weighting values. In this regard, comparator 1106 is used in the selection of the largest weighting value of the two weighting values.

For a determined data value, the sum-of-distance value and the corresponding sum-of-weighting value formed in each processing means are combined to form a criterion value. In this regard, during FIG. 17, instructions OD-77, register ASB 1210 in combination with adder register 1192, multiplier 1168, and register SHIFT 1169 (see FIG. 16A) are used to form a criterion value.

The processing means includes a store BOLD for a criterion value and for a determined data value, the sum-of-distance value and a corresponding sum-of-weighting value formed in each processing means are combined to form a criterion value. The criterion value replaces a priorly-formed criterion value in the criterion value store if such newly-formed criterion value has a predetermined relation to the value in the criterion value store. To this end, during FIG. 17, instruction 79, the value in the criterion value store is compared with the newly-formed criterion value.

The value in the criterion value store is replaced with the newly-formed criterion value when the newly-formed criterion value exceeds the value in the criterion value store. To this end, during FIG. 17 and instruction 7A, the newly-formed criterion value in register ASB replaces a priorly-formed criterion value in register BOLD. The data processing means includes a store for a positional value, and the value in the positional value is replaced with the positional value corresponding to the detected data value used in forming a criterion value having the predetermined relation to the value in the criterion value store. To this end, during FIG. 17 and instruction 7A, the detected data value stored in register LMIN corresponding to the newly-formed criterion value is transferred into the positional value store POS.

The step of utilizing comprises the step of forming a criterion value B as follows:

Evaluating the equation:

$$B = (QS(QS - M) - SSD)(M + SSB) \frac{MIN(QS,ES)}{MAX(QS,ES)} \cdot \frac{1}{QS^3}$$

where:
QS = the plurality of events of a query,
ES = the plurality of events of a stored data base entry,
M = the number of events in the query for which at least one corresponding event type is not found in the query,
SSD = is the total of the sum-of-distance values of the data processing means,
SSB = is the total of the sum-of-weighting values of the data processing means,
MAX(QS,ES) = is the larger of QS and ES, and
MIN(QS,ES) = is the smaller of QS and ES.

In this regard, the equation is solved during FIG. 17, instructions OD-78 using the registers and functional blocks shown in FIG. 16A.

The recited steps are repeated until all data values in the data stores and all the processing means have been processed in accordance with the method.

APPENDIX A

| Ill. Table No. | Index of Tables |
|---|---|
| 1A | Comparison of Query Word Tent to Entry Word Statement |
| 1B | Array of the Number of Locations Between Like Events of Table 1A for an Initial Juxtaposition in the O Shift Position |
| 2 | Sample Data Array |
| 3A–3H | Processing of the Sample Data Array of Table 2 |
| 4 | Program Listing of Logical Equations of the Chute Memory and Chute Handler |
| 5 | Program Listing of Logical Equations of the Dimness Generator |
| 6A | Example of a Layered Data Base |
| 6B | Query-to-Entry Positions and Chute Data Generation |
| 6C | Package Sequence Query |
| 6D | Zero Position of Package Query to Data Base Entry |
| 6E–6O | Package Query Event Numbers Chute Data Generation |
| 7A–7N | Chute/Pocket Processing Passes 1 through 14 |
| 8 | Terms and Definitions of Control Signals and Registers Used in the Data Processing Means |
| 9 | Piper Instruction Code Program |
| 10 | WR2 Calculation Variable Values vs. DDA and BDA Flags |
| 11 | Brightness Generator Instruction Code Program |

TABLE 1 (a)

| SHIFT LOCATION | -3 | -2 | -1 | 0 | 1 | 2 | 3 | 4 | 5 | 6 | 7 | 8 | NO. OF LOCATIONS | | | | | |
|---|---|---|---|---|---|---|---|---|---|---|---|---|---|---|---|---|---|---|
| ENTRY | | | | S | T | A | T | E | M | E | N | T | T | E | N | T | Sum | Shift Location |
| | T | E | N | T | | | | | | | | | 4 | 6 | 8 | 1 | 19 | -3 |
| | | T | E | N | T | | | | | | | | 3 | 5 | 7 | 0 | 15 | -2 |
| | | | T | E | N | T | | | | | | | 2 | 4 | 6 | 1 | 13 | -1 |
| | | | | T | E | N | T | | | | | | 1 | 3 | 5 | 0 | 9 | 0 |
| QUERY | | | | | T | E | N | T | | | | | 0 | 2 | 4 | 1 | 7 | 1 |
| | | | | | | T | E | N | T | | | | 1 | 1 | 3 | 2 | 7 | 2 |
| | | | | | | | T | E | N | T | | | 0 | 0 | 2 | 2 | 4 | 3 |
| | | | | | | | | T | E | N | T | | 1 | 1 | 1 | 1 | 4 | 4 |
| | | | | | | | | | T | E | N | T | 2 | 0 | 0 | 0 | 2 | 5 |
| | | | | | | | | | | T | E | N | 2 | 1 | 1 | 1 | 5 | 6 |
| | | | | | | | | | | | T | E | 1 | 2 | 2 | 2 | 7 | 7 |
| | | | | | | | | | | | | T | 0 | 3 | 3 | 3 | 9 | 8 |

TABLE 1 (b)

| T | 1 | 3 | 8 |
|---|---|---|---|
| E | 3 | 5 | |
| N | 5 | | |
| T | -2 | 0 | 5 |

TABLE 2

| CHUTE/POCKET NO. | POCKET | (TOP) | CHUTE | (BOTTOM) |
|---|---|---|---|---|
| 0 | EMPTY | 4/.6 | 0/.5 | |
| 1 | EMPTY | 5/.3 | 3/.7 | 1/.4 |
| 2 | EMPTY | 3/.9 | 1/1 | -1/.7 |
| 3 | EMPTY | EMPTY | | |
| 4 | EMPTY | 1/.8 | -3/1 | -4/.8 | d Register = 0
b Register = 0
D Register = Very large value
B Register = 0
PSN Register = 0

TABLE 3 (a)

Processing Step 1

| CHUTE/POCKET NO. | POCKET | (TOP) | CHUTE | (BOTTOM) |
|---|---|---|---|---|
| 0 | -64/0 | * 4/.6 | 0/.5 | |
| 1 | (5/.3) | ** 3/.7 | 1/.4 | |
| 2 | -64/0 | *** 3/.9 | 1/1 | -1/.7 |
| 3 | -64/0 | *** EMPTY | | |
| 4 | -64/0 | * 1/.8 | -3/1 | -4/.8 |

*Rule 2
**Rules 1 and 2d
***Rule 2c d Register = 1 + 0 + 2 + 5 + 4 = 12$^1$
b Register = .6 + .3 + .9 + 1 + .8 = 3.6
D Register = 12
B Register = 3.6  } Rule 3
PSN Register = 5

$^1 |5 - 4| + |5 - 5| + |5 - 3| + QS + |5 - 1| = 12$

TABLE 3 (b)

Processing Step 2

| CHUTE/POCKET NO. | POCKET | (TOP) | CHUTE | (BOTTOM) |
|---|---|---|---|---|
| 0 | (4/.6) | ** | 0/.5 | |
| 1 | 5/.3 | *** 3/.7 | 1/.4 | |
| 2 | -64/0 | * 3/.9 | 1/1 | -1/.7 |
| 3 | -64/0 | EMPTY | | |
| 4 | -64/0 | * 1/.8 | -3/1 | -4/.8 |

*Rule 2
**Rules 1 and 2d
***Rule 2b d Register = 0 + 1 + 1 + 5 + 3 = 10
b Register = .6 + .7 + .9 + 1 + .8 = 4.0
D Register = 10
B Register = 4.0  } Rule 3
PSN Register = 4

TABLE 3 (c)

Process Step 3

| CHUTE/POCKET NO. | POCKET | (TOP) | CHUTE | (BOTTOM) |
|---|---|---|---|---|

TABLE 3 (c)-continued

| | | | | | |
|---|---|---|---|---|---|
| 0 | *** | 4/.6 | 0/.5 | | |
| 1 | | 3/.7 ← | * | 1/.4 | |
| 2 | | 3/.9 ← | * | 1/1 | −1/.7 |
| 3 | | −64/0 | EMPTY | | |
| 4 | | −64/0 | ** 1/.8 | −3/1 | −4/.8 |

*Rule 1 and 1a
**Rule 2
***Rule 2a d Register   = 1 + 0 + 0 + 5 + 2 = 8
b Register   = .6 + .7 + .9 + 1 + .8 = 4.0
D Register   = 8
B Register   = 4.0     } Rule 3
PSN Register = 3

TABLE 3 (d)

Processing Step 4

| CHUTE/POCKET NO. | POCKET | (TOP) | CHUTE | (BOTTOM) |
|---|---|---|---|---|
| 0 | 4/.6 | 0/.5 ** | | |
| 1 | ***1/.4 ← * | | | |
| 2 | 1/1 ← * ** | | −1/.7 | |
| 3 | −64/0 | EMPTY | | |
| 4 | 1/.8 ← * | | −3/1 | −4/.8 |

*Rule 1 and 1a
**Rule 2a
***Rule 2 d Register   = 1 + 0 + 0 + 5 + 0 = 6
b Register   = .5 + .4 + 1 + 1 + .8 = 3.7
D Register   = 6
B Register   = 3.7    } Rule 3
PSN Register = 1

TABLE 3 (e)

Processing Step 5

| CHUTE/POCKET NO. | POCKET | (TOP) | CHUTE | (BOTTOM) |
|---|---|---|---|---|
| 0 | 0/.5 *** ← | | | |
| 1 | 1/.4 * | | | |
| 2 | 1/1 | −1/.7 | | |
| 3 | −64/0 ** | EMPTY | | |
| 4 | 1/.8 | −3/1 | −4/.8 | |

*Rule 2b
**Rule 2a
***Rule 2 d Register   = 0 + 1 + 1 + 5 + 1 = 8
b Register   = .5 + .4 + 1 + 1 + .8 = 3.7
D Register   = 6
B Register   = 3.7    } Rule 3
PSN Register = 1

TABLE 3 (f)

Processing Step 6

TABLE 3 (f)-continued

| CHUTE/POCKET NO. | POCKET | (TOP) | CHUTE | (BOTTOM) |
|---|---|---|---|---|
| 0 | *0/.5 | | | |
| 1 | 1/.4 | | | |
| 2 | 1/.7 | | | |
| 3 | −64/0 | | EMPTY ** | |
| 4 | 1/.8 | | −3/1 | −4/.8 |

*Rule 2
**Rule 2b
d Register = 1 + 2 + 0 + 5 + 2 = 10
b Register = .5 + .4 + .7 + 1 + 1 = 3.6
D Register = 6 ⎫
B Register = 3.7 ⎬ Rule 3
PSN Register = 1 ⎭

TABLE 3 (g)

Processing Step 7

| CHUTE/POCKET NO. | POCKET | (TOP) | CHUTE | (BOTTOM) |
|---|---|---|---|---|
| 0 | 0/.5 | | | |
| 1 | 1/.4 | | | |
| 2 | 1/.7 | | | |
| 3 | −64/0 | | EMPTY | |
| 4 | −3/1 | | | −4/.8 |

*Rule 2
d Register = 3 + 4 + 2 + 5 + 0 = 14
b Register = .5 + .4 + .7 + 1 + 1 = 3.6
D Register = 6 ⎫
B Register = 3.7 ⎬ Rule 3
PSN Register = 1 ⎭

TABLE 3 (h)

Processing Step 8

| CHUTE/POCKET NO. | POCKET | (TOP) | CHUTE | (BOTTOM) |
|---|---|---|---|---|
| 0 | 0/.5 | | | |
| 1 | 1/.4 | | | |
| 2 | 1/.7 | | | |
| 3 | −64/0 | | EMPTY ** | |
| 4 | −4/.8 | | | |

*Rule 2
**Rule 2c
d Register = 4 + 5 + 3 + 5 + 0 = 17
b Register = .5 + .4 + .7 + 1 + .8 = 3.4
D Register = 6 ⎫
B Register = 3.7 ⎬ Rule 3
PSN Register = 1 ⎭

TABLE 4

| STATE | OPERATION | FUNCTION |
|---|---|---|
| 0 | IF CEMPTY = 1, GO TO STATE 0 | Idle in zero state until CEMPTY is cleared by the microprocessor. |
| 1 | CONT, MIN, QTR ← QTLF(LFMAR) | For the LFMARth item in QTLF, set CONT to 1 or zero with bit 12 of QTLF word (1 = more entries to processes; 0 = last entry processed). Set MIN to field MIN (bits 5-0) and QTR to field MAX (bits 11-6). |
| | NEXTREF ← −64 | Set candidate value for XREF to −64 (more negative than any possible TOS or POC value in system). |
| 2 | SPR ← SPM(QTR) | Read QTRth entry of SPM into SPR (initialize stack pointer). SPR is now the pointer into the QTRth chute |

TABLE 4-continued

| STATE | OPERATION | FUNCTION |
|---|---|---|
| 3 | COMP2 ← QTR, MIN | stack.<br>Load QTR and MIN into comparator in preparation for equality test in state 5. |
|  | SPR ← SPR−1 | Decrement SPR to point to the first TOS item in chute. |
| 4 | EMQS ← CMEM(QTR:SPR) | Load the TOS (less brightness value) of the SPRth item of the QTRth chute stack into EMQS. |
|  | PMEM(QTR) (MSB) ← 1 | Set PE bit in XPOC to indicate an empty pocket initially. |
| 5 | COMP1 ← EMQS, NEXTREF<br>If EMQS .GT. NEXTREF, THEN<br>NEXTREF ← EMQS | Load COMP1 with EMQS and NEXTREF. If EMQS is greater than NEXTREF (at a value of −64 for the first chute processed) then replace NEXTREF with EMQS. |
|  | If QTRMIN = 0, THEN DO;<br>QTR ← QTR−1;<br>GO TO STATE 2 | If the result of the comparison in state 3 indicates that QTR does not yet equal MIN, then decrement QTR to point to the next chute to process and go back to state 2 to look at the next chute TOS and compare it with NEXTREF. If QTRMIN = 1 (TOS scan complete), then proceed to state 6. |
| 6 | XREF ← NEXTREF;<br>NEXTREF ← −64 | Set XREF to the most positive TOS, and re-initialize NEXTREF to find next XREF. |
|  | QTR ← QTLF(LFMAR) |  |
| 7 | SPR ← SPM(QTR) | Read the QTRth item of SPM into SPR (initialize stack pointer). |
| 8 | NO OP | Check for zero in SPR. |
| 9 | IF SPR = 0,<br>Then SE = 1;<br>ELSE DO:<br>SE = 0;<br>SPR ← SPR−1 | If the present stack is empty, then set stack empty flag. Otherwise, if stack is not empty than clear flag and decrement stack pointer to point to TOS. |
| 10 | XTOS, EMQS ← CMEM(QTR:SPR) | Read TOS data into XTOS to make it available to the DG. Copy the TOS field into EQMS to begin the next sequence of comparisons to obtain the new XREF. |
| 11 | XPOC ← PMEM(QTR);<br>PE ← PMEM(QTR) (MSB) | Read the pocket value of the chute being processed into XPOC in preparation for making it available to the DG. Set the pocket empty flag to the value in the MSB of the PMEM item. |
|  | IF SE = 1,<br>THEN DO:<br>EQ ← 0;<br>CHRDY ← 1;<br>GO TO STATE 19 | If the chute is empty, clear the EQ flag to indicate to the DG that XTOS is not equal to XREF, set CHRDY to make XREF, XTOS, and XPOC available to the DG, and skip to state 19 to wait for DG response. Otherwise, continue to state 12. |
| 12 | COMP1 ← EMQS, XREF | Place present TOS and XREF into comparator in preparation for test in state 14. |
| 13 | NO OP | Check if EMQS equals NEXTREF. |
| 14 | IF EMQS = XREF,<br>THEN DO:<br>EQ = 1<br>ELSE DO:<br>EQ = 0;<br>GO TO STATE 18 | If EMQS and XREF are equal, then set the equals flag and proceed to state 15.<br>Otherwise, clear the equals flag and go to state 18 and make data available to the DG. States 15 and 16 move the TOS of the chute being examined into the pocket. |
| 15 | SPM(QTR) ← SPR | Write the decremented value of SPR back into SPM |
|  | BUS ← CMEM(QTR:SPR) | Use the data bus as a temporary register to hold the TOS value to be transferred to the pocket. |
| 16 | PMEM(QTR) ← BUS;<br>PMEM(QTR) (MSB) ← 0 | Read the TOS data held on the bus into the pocket location. Set the MSB of the PMEM word to indicate a full pocket (clear PE). |
|  | IF SPR = 0,<br>THEN DO:<br>CHRDY = 1;<br>GO TO STATE 19<br>ELSE SPR ← SPR−1 | If the chute is now empty then set CHRDY to indicate to the DG that data items are available, and go to state 19.<br>Otherwise, decrement SPR to point to the next item in the stack (uncovered when the previous TOS placed in the pocket) in preparation for a new |

TABLE 4-continued

| STATE | OPERATION | FUNCTION |
|---|---|---|
| | | EMQS/NEXTREF compare cycle, and proceed to state 17. |
| 17 | EMQS ← CMEM(QTR:SPR) | Read the new TOS into EMQS as a new XREF candidate. (For first pass, NEXTREF set to −64 in state 6.) |
| 18 | CHRDY = 1 | Make data available to the DG for further processing. |
| | COMP ← EMQS, NEXTREF; IF EMQS .GT. NEXTREF, THEN NEXTREF ← EMQS | Load EMQS and NEXTREF into comparator. If EMQS is greater than NEXTREF, then set NEXTREF equal to EMQS. (Continued the process of finding the most positive value in TOS for any given TOS scan.) |
| 19 | COMP1 ← NEXTREF, −64 COMP2 ← QTR, MIN | Load NEXTREF and −64 in comparator in preparation for test in state 21. |
| 20 | IF CHRDY = 1, GO TO STATE 20 | Idle in state 20 until the DG clears CHRDY, indicating that it has transferred the available data set items (XREF, XTOS, XPOC). |
| 21 | IF QTRMIN = 1, THEN IF NEXTREF = −64 THEN DO: CHDONE = 1; GO TO STATE 22 | If QTR = MIN (QTRMIN = 1), indicating that all TOS's of all chutes in entry have been scanned), and if NEXTREF = −64 (no new TOS value was found as candidate for XREF), then all values in all chute stacks have been processed. Set the CHDONE flag to signal the DG that the CH is finished processing this entry and go to state 22. |
| | ELSE GO TO STATE 6; | If NEXTREF contains a value greater than −64, then more chute values remain to be processed. Go to state 6 and reinitialize QTR to begin processing at the first chute of the present entry again. |
| | ELSE DO: QTR ← QTR-1; GO TO STATE 7 | If QTRMIN = 0 (QTR not equal to MIN) then more chutes remain to be processed on this TOS scan through present entry. Decrement QTR to point to the next chute to be processed, and go to state 7 to reinitialize the stack pointer for that chute. |
| | IF CONT = 0, THEN DO; CEMPTY = 1; GO TO STATE 0; | If the last entry in CMEM (pointed to by last item in QTLF with CONT bit set to 0) has just been processed, set CEMPTY to latch in CH in the idle state and go to state 0 to await reinitialization by the PC. |
| | ELSE DO: LFMAR ← LFMAR−1; GO TO STATE 1 | Otherwise, select the next entry in CMEM to process, go to state 1, and look for the first XREF value for this entry. |

TABLE 5

| STATE | OPERATION | FUNCTION |
|---|---|---|
| 0 | IF DGDONE = 1, THEN GO TO STATE 0 ELSE; | Idle in state 0 until DGDONE cleared by the PC. |
| | CHDONE = 0; PASS1 = 1 | When DGDONE is cleared, reset CHDONE and set PASS1 to indicate that this is a first pass through a new entry. |
| 1 | SDC ← 0; SBC ← 0 | Clear the sum-of-distance candidate and sum-of-brightness candidate to accept first round of new data. Initial condition for iteration across the chutes. |
| 2 | IF CHRDY = 0, THEN GO TO STATE 2; ELSE; CHRDY = 0; | Idle in state 2 until the CH signals that it has valid data for the DG. When data are available for the CH, reset CHRDY to indicate that the CH is to con- |
| | LOOP = $\overline{\text{QTRMIN}}$ REF ← XREF; POC ← XPOC; TOS ← XTOS; | tinue processing set LOOP to the complement of QTRMIN, and transfer a CH data set to the appropriate registers. State 2 is the initial state for each chute-pocket-reference distance calculation. |
| 3 | IF EQ = 0 | If TOS and REF are not equal, load the appropriate ALU. |
| | THEN DO: ALU1 ← POC2, REF; | Determine the difference between REF and the pocket value being processed. If the |

TABLE 5-continued

| STATE | OPERATION | FUNCTION |
|---|---|---|
| | D1 ← REF-POC2;<br>IF D1 .LT. 0, (state 4)<br>THEN DO:<br>ALU1 ← POC2, REF;<br>D1 ← POC2-REF;<br>THEN DO:<br>ALU2 ← TOS2, REF;<br>D2 ← REF-TOS2;<br>IF D2 .LT. 0, (state 4)<br>THEN DO:<br>ALU2 ← TOS2, REF;<br>D2 ← TOS2-REF;<br>IF EQ = 1<br>THEN DO:<br>E1 ← TOS1;<br>GO TO STATE 11; | first subtraction gives a negative result,<br>operands are exchanged and subtracted<br>again to find the absolute value of the<br>difference.<br><br>Determine the difference between REF and<br>the top-of-chute value being processed.<br>If the first subtraction gives a negative<br>result, operands are exchanged and sub-<br>tracted again to find the absolute value<br>of the difference.<br><br>TOS = REF, so difference is zero. Save<br>the associated brightness for calculating<br>the brightness sum. |
| 4 | IF PE = 1 AND SE = 0,<br>THEN DO:<br>E1 ← TOS1;<br>DR ← F2;<br>GO TO STATE 8;<br>IF PE = 0 AND SE = 1,<br>THEN DO;<br>E1 ← POC1;<br>DR ← F1<br>GO TO STATE 8;<br>IF PE = 0 AND SE = 0,<br>THEN DO:<br>D1 ← F1;*<br>D2 ← F2;* | For this chute, the pocket is empty and<br>the TOS is full, save the TOS brightness<br>and the difference between the TOS and REF.<br><br>For this chute, the pocket is full and the<br>TOS is empty, so save the pocket brightness<br>and the difference between the pocket and<br>REF.<br><br>Both a pocket value and a TOS value exist<br>fo this chute. Save both for testing<br>in states 5-7. |
| 5 | COMP1 ← POC1, TOS1;<br>COMP2 ← D1, D2 | Compare brightnesses and differences. |
| 6 | NO OP | Check if D1 .LT. D2, D2 .LT. D1, D2 = D1;<br>POC1 .GE. TOS1 |
| 7 | IF D1 .LT. D2,<br>THEN DO:<br>DR ← D1;<br>E1 ← POC1;<br>IF D2 .LT. D1,<br>THEN DO:<br>DR ← D2;<br>E1 ← TOS1;<br>IF D1 = D2 AND POC1 .GE. TOS1<br>THEN DR ← D1; E1 ← POC1;<br><br><br><br><br><br>IF D1 = D2 AND TOS1 .GT. POC1,<br>THEN DR ← D2; E1 ← TOS1; | The difference between the pocket and REF<br>is less than the difference between TOS<br>and REF, so save the former along with<br>its associated brightness.<br>The difference between TOS and REF is less<br>than the difference between the pocket and<br>REF so save the former along with its<br>associated brightness.<br><br>REF is equidifferenced from TOS and<br>the pocket, but the brightness associated<br>with the pocket is greater than that<br>associated with the TOS, so save the<br>pocket-to-REF difference and the associated<br>brightness.<br><br>REF is equidifferenced from TOS and the<br>pocket, but the brightness associated<br>with TOS is greater than that associated<br>with the pocket, thus save the difference<br>between TOS and REF and the associated<br>brightness. |
| 8 | COMP2 ← DR, PW | Compare the difference selected in state 7<br>to pipewidth. |
| 9 | IF DR .GT. PW,<br>THEN DR ← QS | The difference is greater than the pipe-<br>width, so substitute query size for the<br>distance. |
| 10 | ALU1 ← DR, SDC; SDC ← F1<br><br>ALU2 ← E1, SBC; SBC ← F2<br><br><br>IF LOOP = 0, GO TO STATE 12<br><br><br><br><br>ELSE;<br>GO TO STATE 2 | Sum the latest difference found with the<br>other differences from this chute scan.<br>Sum the brightness associated with the<br>latest difference found with the other<br>brightnesses for this chute pass.<br>This completes one scan across the chutes,<br>so go to state 12 to update the sum-of-<br>differences and sum-of-brightness<br>"winner" register and REF.<br>Chute scan is not yet complete. Go to<br>state 2 and process the next data set<br>from the CH. |
| 11 | ALU2 ← SBC, E1; SBC ← F2<br><br><br><br><br>IF LOOP = 0,<br>THEN GO TO STATE 12<br>ELSE; | (See state 3.) Difference from REF<br>measured for same chute as REF difference<br>is zero, thus save TOS brightness for<br>brightness sum. |

TABLE 5-continued

| STATE | OPERATION | FUNCTION |
|---|---|---|
|  | GO TO STATE 2 |  |
| 12 | COMP1 ← SDC, SDW; COMP2 ← SBC, SBW | Compare the difference and brightness candidates against previous winners. This state is entered after scanning across all chutes. |
| 13 | NO OP | Check if SDC.LT.SDW, SDC.EQ.SDW SDC.GT.SDW, SBC.LT.SBW SBC.EQ.SBW SBC.GT.SBN |
| 14 | IF SDC .LT. SDW OR (SDC = SDW AND SBC .GT. SBW) or PASS1 = 1, THEN SDW ← SDC; SBW ← SBC; PSN ← REF; PASS1 = 0 | Update SDW (sum-of-difference winner), SBW (sum-of-brightness winner), and REF. Three conditions update these registers: (1) PASS1 = 1. This is the first pass through the chutes, so SBW and SDW are empty; force an update. (2) SDC is less the SDW, so SDC is the winner. (3) Differences the same, but candidate has a greater brightness. Clear PASS1 since DG is now ready for a second pass. |
|  | DGDONE = CHDONE IF DGDONE = 0, THEN GO TO STATE 1; ELSE; GO TO STATE 0 | If the CH is not done, go to state 1 to clear the SDC and SBC registers to prepare for the next chute scan. If the CH is done, notify the PC, then go to state 0 and idle until the PC clears DGDONE. |

*F1 = Output of ALU1; F2 = output of ALU2.

TABLE 6A

EXAMPLE OF A LAYERED DATA BASE

| | | | | | | | | | |
|---|---|---|---|---|---|---|---|---|---|
| SENTENCE LAYER | ENTRY | 1 | | 2 | | | | | |
|  | EVENTS | 1 2 3 4 | | 1 2 3 4 5 | | | | | |
|  | EVENT TYPE | 1 2 3 4 | | 5 6 2 7 8 | | | | | |
| WORD LAYER | ENTRY | 1 | 2 | 3 | 4 | 5 | 6 | 7 | 8 |
|  | EVENT | 1 2 3 4 | 1 2 | 1 2 3 | 1 2 3 4 | 1 2 3 | 1 2 3 | 1 2 3 4 | 1 2 3 4 5 6 7 |
|  | EVENT TYPE | THIS | IS | THE | TIME | ONE | DAY | LIKE | ANOTHER |

TABLE 6C

| PACKAGE 1 | SENTENCE 2 | QUERY 3 |
|---|---|---|
| 1/.5 | 6/.8 | 3/.7 |

TABLE 6C-continued

| PACKAGE 1 | SENTENCE 2 | QUERY 3 |
|---|---|---|
| 4/.6 | | 8/.5 |

TABLE 6B

QUERY-TO-ENTRY POSITIONS AND CHUTE DATA GENERATION

| ENTRY EVENT: | 1 | 2 | 3 | 4 | 5 | | | | | | POSITION | CHUTE DATA | |
|---|---|---|---|---|---|---|---|---|---|---|---|---|---|
| ENTRY EVENT TYPES: | 32 | 2 | 1 | 8 | 1 | | | | | | | | |
| QUERY EVENT: | 1 | 2 | 3 | 4 | | | | | | | | | |
| QUERY EVENT TYPES: | 2 | 8 | 13 | 1 | | | | | | | | | |
|  | 1 | 2 | 3 | 4 | 5 | | | | | | | | |
|  | 32 | 2 | 1 | 8 | 1 | | | | | | | | |
| 2 | 8 | 13 | 1 | . | . | . | . | . | . | . | −3 | CHUTE 1* | 1 |
|  | 2 | 8 | 13 | 1 | . | . | . | . | . | . | −2 | | |
|  |  | 2 | 8 | 13 | 1 | . | . | . | . | . | −1 | CHUTE 2** | 2 |
|  |  |  | 2 | 8 | 13 | 1 | . | . | . | . | 0 | | |
|  |  |  |  | 2 | 8 | 13 | 1 | . | . | . | 1 | CHUTE 3*** | −1 1 |
|  |  |  |  |  | 2 | 8 | 13 | 1 | . | . | 2 | | |
|  |  |  |  |  |  | 2 | 8 | 13 | 1 | . | 3 | | |
|  |  |  |  |  |  |  | 2 | 8 | 13 | 1 . | 4 | POSITIONS TO BE PROCESSED: −1, 1, and 2 | |

*QUERY EVENT TYPE 2
**QUERY EVENT TYPE 8
***QUERY EVENT TYPE 1

TABLE 6D

ZERO POSITION OF PACKAGE QUERY TO DATA BASE ENTRY

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY | | | | | | | | | | | | |

TABLE 6D-continued

| EVENT TYPES: | 1 | 5 | 37 | 26 | 8 | 3 | 2 | 18 | 21 | 110 | 360 | 87 |
|---|---|---|---|---|---|---|---|---|---|---|---|---|
| | 21/.6 | 21/.7 | 3/.4 | 110/.2 | 7/.9 | 20/.5 | 110/.1 | 21/.9 | 345/.2 | 19/.7 | 360/.6 | |
| | 8/.5 | 360/.8 | 52/.3 | 360/.5 | 23/.2 | 25/.8 | 360/1 | 36/.2 | 91/.5 | 109/1 | 87/1 | |
| PACKAGE QUERY EVENT TYPES: | 95/.6 | 52/.4 | 21/.5 | 19/.8 | 108/.1 | 54/.1 | | 230/.5 | 105/.2 | 7/.9 | 109/.8 | |
| | 101/.1 | 13/.9 | 360/.8 | 109/.8 | | 202/.4 | | 9/.9 | 135/.6 | 10/.5 | 93/1 | |
| | 321/.9 | | 19/.7 | | | | | | 250/.1 | 11/.8 | | |
| | | | 31/.2 | | | | | | | | | |

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| (CONT.) ENTRY EVENT TYPES: | 19 | 36 | 109 | 6 | 7 | 205 | 89 | 118 | 130 | 230 | 321 | 345 |

TABLE 6E

PACKAGE QUERY EVENT NUMBER 1
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | (8) | 4 | 52 | 18 | (21) | 110 | 360 | 87 |

(21/.6) — (9 − 1 = 8)
(8/.5) — (5 − 1 = 4)

PACKAGE QUERY EVENT TYPES:
95/.6
101/.1     PIPER 1 CHUTE 1 DATA: 4/.5  8/.6
321/.9

| EVENT NUMBER | 13 | 14 | 15 | 16 | 17 | 18 | 19 | 20 | 21 | 22 | 23 | 24 |
|---|---|---|---|---|---|---|---|---|---|---|---|---|
| (CONT.) ENTRY EVENT TYPES: | 19 | 36 | 109 | 6 | 7 | 205 | 89 | 118 | 130 | 230 | 321 | 345 |

TABLE 6F

PACKAGE QUERY EVENT NUMBER 2
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | (52) | 18 | (21) | 110 | (360) | 87 |

(21/.7) — (9 − 2 = 7)
(360/.8) — (11 − 2 = 9)
(52/.4) — (7 − 2 = 5)

PACKAGE QUERY EVENT TYPES:

13/.9     PIPER CHUTE 2 DATA: 5/.4  7/.7  9/.8

| EVENT NUMBER | 13 | 14 | 15 | 16 | 17 | 18 | 19 | 20 | 21 | 22 | 23 | 24 |
|---|---|---|---|---|---|---|---|---|---|---|---|---|
| (CONT.) ENTRY EVENT TYPES: | 19 | 36 | 109 | 6 | 7 | 205 | 89 | 118 | 130 | 230 | 321 | 345 |

TABLE 6G

PACKAGE QUERY EVENT NUMBER 3
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|

TABLE 6G-continued

PACKAGE QUERY EVENT NUMBER 3
CHUTE DATA GENERATION

ENTRY
EVENT TYPES: 1　　5　　37　　26　　8　　③　②18　　㉑　　110　　③⑥⓪　　87

PACKAGE QUERY
EVENT TYPES:
- ③/.4 ⎤ (6 − 3 = 3)
- ㊾/.3 ⎤ (7 − 3 = 4)
- ㉑/.5 ⎤ (9 − 3 = 6)
- 360/.8
- (13 − 3 = 10) 16/.7 ⎤ (11 − 3 = 8)
- 31/.2

PIPER 1 CHUTE 3 DATA: 3/.4　4/.3　6/.5　8/.8　10/.7

| EVENT NUMBER (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | ⑲ | 36 | 109 | 6 | 7 | 205 | 89 | 118 | 130 | 230 | 321 | 345 |

TABLE 6H

PACKAGE QUERY EVENT NUMBER 4
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | ⑪⓪ | ③⑥⓪ | 87 |

PACKAGE QUERY
EVENT TYPES:
- 110/.2 ⎤ (10 − 4 = 6)
- 360/.5 ⎤ (11 − 4 = 7)
- (13 − 4 = 9) ⎡ 19/.8
- (15 − 4 = 11) ⎡ 109/.8

PIPER 1 CHUTE 4 DATA: 6/.2　7/.5　9/.8　11/.8

| EVENT NUMBER (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | ⑲ | 36 | ⑩⑨ | 6 | 7 | 205 | 89 | 118 | 130 | 230 | 321 | 345 |

TABLE 6I

PACKAGE QUERY EVENT NUMBER 5
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

TABLE 6I-continued

PACKAGE QUERY EVENT NUMBER 5
CHUTE DATA GENERATION

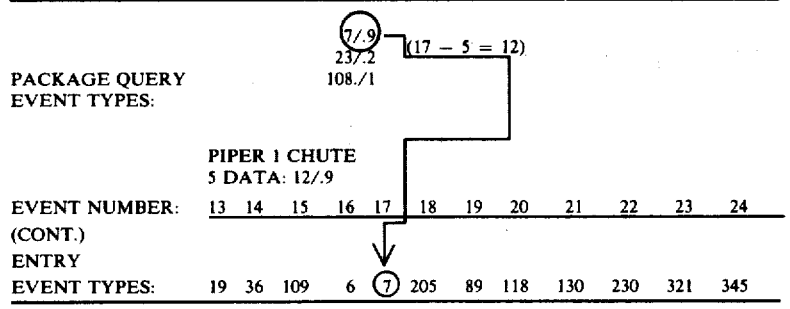

| | | | | | | | | | | | | |
|---|---|---|---|---|---|---|---|---|---|---|---|---|
| PACKAGE QUERY EVENT TYPES: | | | 7/.9 237.2 108./1 | (17 − 5 = 12) | | | | | | | | |

PIPER 1 CHUTE 5 DATA: 12/.9

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| (CONT.) ENTRY EVENT TYPES: | 19 | 36 | 109 | 6 | ⑦ | 205 | 89 | 118 | 130 | 230 | 321 | 345 |

TABLE 6J

PACKAGE QUERY EVENT NUMBER 6
NO MATCHING ENTRY EVENTS

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |
| | | | | | | 20/.5 | | | | | | |
| | | | | | | 25/.8 | | | | | | |
| PACKAGE QUERY EVENT TYPES: | | | | | | 54/.1 | | | | | | |
| | | | | | | 202/.4 | | | | | | |

NO MATCHING ENTRY EVENTS: M = M + 1

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| (CONT.) ENTRY EVENT TYPES: | 19 | 36 | 109 | 6 | 7 | 205 | 89 | 118 | 130 | 230 | 321 | 345 |

TABLE 6K

PACKAGE QUERY EVENT NUMBER 7
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | ⑩ | ㊱ | 87 |

110/. — (10 − 7 = 3)
360/1 — (11 − 7 = 4)

PACKAGE QUERY EVENT TYPES:

PIPER 1 CHUTE 6 DATA: 3/.1 4/1

| EVENT NUMBER: | 13 | 14 | 15 | 16 | 17 | 18 | 19 | 20 | 21 | 22 | 23 | 24 |
|---|---|---|---|---|---|---|---|---|---|---|---|---|
| (CONT.) ENTRY EVENT TYPES: | 19 | 36 | 109 | 6 | 7 | 205 | 89 | 118 | 130 | 230 | 321 | 345 |

TABLE 6L

PACKAGE QUERY EVENT NUMBER 8

CHUTE DATE GENERATION

| EVENT NUMBER | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

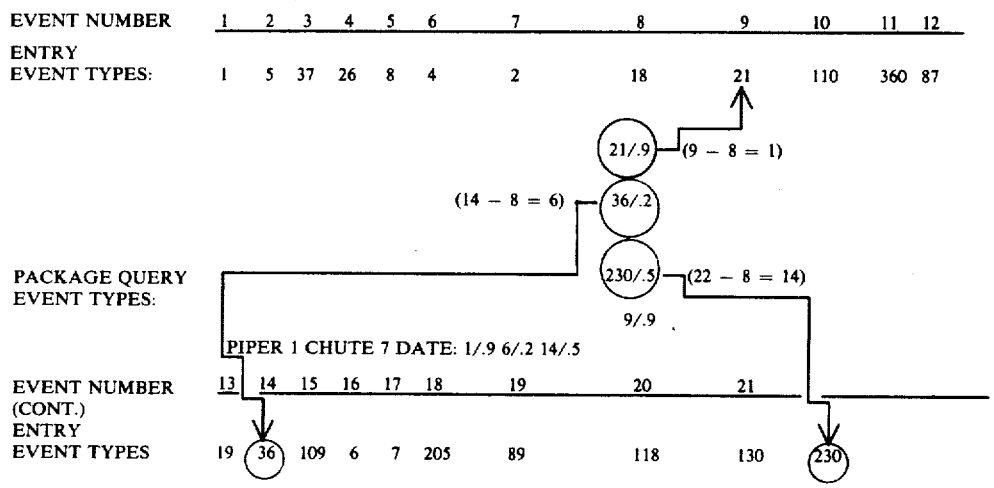

PACKAGE QUERY EVENT TYPES:

PIPER 1 CHUTE 7 DATE: 1/.9 6/.2 14/.5

| EVENT NUMBER (CONT.) | 13 | 14 | 15 | 16 | 17 | 18 | 19 | 20 | 21 |
|---|---|---|---|---|---|---|---|---|---|
| ENTRY EVENT TYPES | 19 | 36 | 109 | 6 | 7 | 205 | 89 | 118 | 130 | 230 |

TABLE 6M

PACKAGE QUERY EVENT NUMBER 9

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

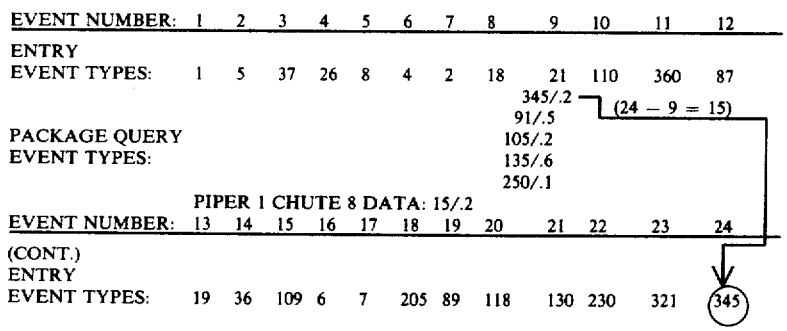

PACKAGE QUERY EVENT TYPES:
345/.2
91/.5
105/.2
135/.6
250/.1

PIPER 1 CHUTE 8 DATA: 15/.2

| EVENT NUMBER: (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 321 | 345 |

TABLE 6N

PACKAGE QUERY EVENT NUMBER 10

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

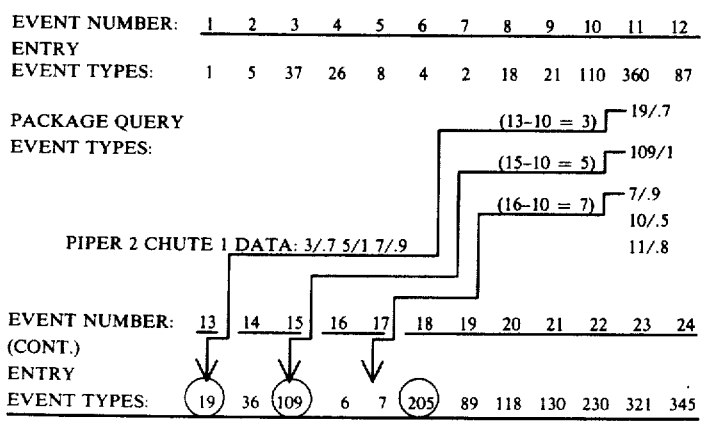

PACKAGE QUERY EVENT TYPES:
(13−10 = 3) 19/.7
(15−10 = 5) 109/1
(16−10 = 7) 7/.9
10/.5
11/.8

PIPER 2 CHUTE 1 DATA: 3/.7 5/1 7/.9

| EVENT NUMBER: (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | 109 | 6 | 7 | 205 | 89 | 118 | 130 | 230 | 321 | 345 |

TABLE 60
PACKAGE QUERY EVENT NUMBER 11
CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

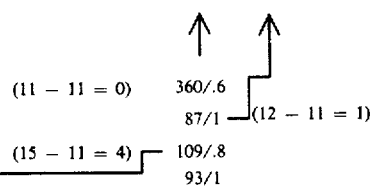

(11 − 11 = 0)  360/.6
87/1  (12 − 11 = 1)

PACKAGE QUERY  
EVENT TYPES: (15 − 11 = 4)  109/.8  
93/1  
PIPER 2 CHUTE 2 DATA:  
0/.6 1/1 4/.8

| EVENT NUMBER: (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | 19 | 36 | (109) | 6 | 7 | 205 | 89 | 118 | 130 | 230 | 321 | 345 |

TABLE 7A
CHUTE/POCKET PROCESSING PASS: 1

| CHUTE/POCKET (CPTR) | POCKETS | 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1 | 1 | EOC | <u>4/.5</u> | 8/.6 | EOC | | | | | | | | | | | | | |
| | 2 | EOC | <u>5/.4</u> | 7/.7 | 9/.8 | EOC | | | | | | | | | | | | |
| | 3 | EOC | <u>3/.4</u> | 4/.3 | 6/.5 | 8/.8 | 10/.7 | EOC | | | | | | | | | | |
| | 4 | EOC | <u>6/.2</u> | 7/.5 | 9/.8 | 11/.8 | EOC | | | | | | | (UNDERSCORE INDICATES CURRENT | | | | |
| | 5 | EOC | <u>12/.9</u> | EOC | | | | | | | | | | TOP-OF-CHUTE) | | | | |
| | 6 | EOC | <u>3/.1</u> | 4/1 | EOC | | | | | | | | | | | | | |
| | 7 | EOC | <u>1/.9</u> | 6/.2 | 14/.5 | EOC | | | | | | | | | | | | |
| | 8 | EOC | <u>15/.2</u> | EOC | | | | | | | | | | | | | | |
| PIPER 2 | 1 | EOC | <u>3/.7</u> | 5/1 | 7/.9 | EOC | | | | | | | | | | | | |
| | 2 | 0/.6 | 0/.6 | <u>1/1</u> | 4/.8 | EOD | | | | | | | | | | | | |
| | 3 | EOC | EOC | | | | | | | | | | | | | | | |
| | 4 | DOC | EOC | | | | | | | | | | (UNDERSCORE INDICATES CURRENT | | | | | |
| | 5 | EOC | EOC | | | | | | | | | | TOP-OF-CHUTE) | | | | | |
| | 6 | EOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 0 | MINREG = 0 | CANDIDATE BRIGHTNESS (BOLD) = .127995 |
| CPTR = 12345678 | CPTR = 123 | CANDIDATE POSITION (LMIN) = 0 |
| TOCPTR 1 = 1 | TOCPTR 1 = 1 | SELECTED CRITERION BRIGHTNESS (B) = .127995 |
| TOCPTR 2 = 1 | TOCPTR 2 = 12 | SELECTED POSITION (POS) = 0 |
| TOCPTR 3 = 1 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 1 | TOCPTR 6 = 1 | BDA = 0 |
| TOCPTR 7 = 1 | TOCPTR 7 = 1 | |
| TOCPTR 8 = 1 | TOCPTR 8 = 1 | |
| D1 = 4 5 3 6 12 3 1 15 | D1 = 3 0 | |
| D2 = - - - - - - - - | D2 = - - | |
| DSUM = 4+5+3+6+11+3+1+11=44 | DSUM = 3+0=3 | |
| BSUM = .5+.4+.4+.2+.9+.1+.9+.2=3.6 | BSUM = .7+.6=1.3 | A dash (-) in D1 or D2 indicates that chute (or pocket) contained a command value and thus no difference was formed. |
| QS = 11 | QS = 11 | |
| PW = 9 | PW = 9 | |

TABLE 7B
CHUTE/POCKET PROCESSING PASS: 2

| CHUTE/POCKET | CHUTES | CHUTE DATA WORDS |
|---|---|---|

TABLE 7B-continued

CHUTE/POCKET PROCESSING PASS: 2

| (CPTR) | POCKETS | 1 | 2 | 3 | 4 | 5 | 6 | 7 | 8 | 9 | 10 | 11 | 12 | 13 | 14 | 15 | 16 | (TOCPTR) |
|---|---|---|---|---|---|---|---|---|---|---|---|---|---|---|---|---|---|---|
| PIPER 1 | 1 | EOC | <u>4/.5</u> | 8/.6 | EOC | | | | | | | | | | | | | |
| | 2 | EOC | <u>5/.4</u> | 7/.7 | 9/.8 | EOC | | | | | | | | | | | | |
| | 3 | EOC | <u>3/.4</u> | 4/.3 | 6/.5 | 8/.8 | 10/. | EOC | | | (UNDERSCORE INDICATES CURRENT | | | | | | | |
| | 4 | DOC | <u>6/.2</u> | 7/.5 | 9/.8 | 11/.8 | EOC | | | | TOP-OF-CHUTE) | | | | | | | |
| | 5 | EOC | <u>12/.9</u> | EOC | | | | | | | | | | | | | | |
| | 6 | EOC | <u>3/.1</u> | 4/1 | EOC | | | | | | | | | | | | | |
| | 7 | 1/.9 | 1/.9 | <u>6/.2</u> | 14/.5 | EOC | | | | | | | | | | | | |
| | 8 | EOC | <u>15/.2</u> | EOC | | | | | | | | | | | | | | |
| PIPER 2 | 1 | EOC | <u>3/.7</u> | 5/1 | 7/.9 | EOC | | | | | | | | | | | | |
| | 2 | 1/1 | 0/.6 | 1/1 | <u>4/.8</u> | EOD | | | | | | | | | | | | |
| | 3 | EOC | EOC | | | | | | | | | | | | | | | |
| | 4 | EOC | EOC | | | | | | | | (UNDERSCORE INDICATES CURRENT | | | | | | | |
| | 5 | EOC | EOC | | | | | | | | TOP-OF-CHUTE) | | | | | | | |
| | 6 | DOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 1 | MINREG = 1 | CANDIDATE BRIGHTNESS (BOLD) = .151860 |
| CPTR = 12345678 | CPTR = 123 | CANDIDATE POSITION (LMIN) = 1 |
| TOCPTR 1 = 1 | TOCPTR 1 = 1 | SELECTED CRITERION BRIGHTNESS (B) = .151860 |
| TOCPTR 2 = 1 | TOCPTR 2 = 23 | SELECTED POSITION (POS) = 1 |
| TOCPTR 3 = 1 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 1 | TOCPTR 6 = 1 | BDA = 0 |
| TOCPTR 7 = 12 | TOCPTR 7 = 1 | |
| TOCPTR 8 = 1 | TOCPTR 8 = 1 | |
| D1 = 3 4 2 5 11 2 0 14 | D1 = 2 0 | |
| D2 = - - - - - - - | D2 = - 1 | |
| DSUM = 3+4+2+5+11+2+0+11=38 | DSUM = 2+0=2 | A dash (-) in D1 or D2 indicates that chute |
| BSUM = .5+.4+.4+.2+.9+.1+.9+.2=3.6 | BSUM = .7+1=1.7 | (or pocket) contained a command value and thus no |
| QS = 11 | QS = 11 | difference was formed. |
| PW = 9 | PW = 9 | |

TABLE 7C

CHUTE/POCKET PROCESSING PASS: 3

| CHUTE/POCKET (CPTR) | POCKETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1 | 1 | EOC | <u>4/.5</u> | 8/.6 | EOC | | | | | | | | | | | | | |
| | 2 | EOC | <u>5/.4</u> | 7/.7 | 9/.8 | EOC | | | | | | | | | | | | |
| | 3 | 3/.4 | 3/.4 | <u>4/.3</u> | 6/.5 | 8/.8 | 10/.7 | EOC | | | | | | | | | | |
| | 4 | EOC | <u>6/.2</u> | 7/.5 | 9/.8 | 11/.8 | EOC | | | | (UNDERSCORE INDICATES PRESENT | | | | | | | |
| | 5 | EOC | <u>12/.9</u> | EOC | | | | | | | TOP-OF-CHUTE) | | | | | | | | |
| | 6 | 3/.1 | 3/.1 | <u>4/1</u> | EOC | | | | | | | | | | | | | |
| | 7 | 1/.9 | 1/.9 | <u>6/.2</u> | 14/.5 | EOC | | | | | | | | | | | | |
| | 8 | EOC | <u>15/.2</u> | EOC | | | | | | | | | | | | | | |
| PIPER 2 | 1 | 3/.7 | 3/.7 | <u>5/1</u> | 7/.9 | EOC | | | | | | | | | | | | |
| | 2 | 1/1 | 0/.6 | 1/1 | <u>4/.8</u> | EOD | | | | | | | | | | | | |
| | 3 | EOC | EOC | | | | | | | | | | | | | | | |
| | 4 | EOC | EOC | | | | | | | | (UNDERSCORE INDICATES PRESENT | | | | | | | |
| | 5 | EOC | EOC | | | | | | | | TOP-OF-CHUTE) | | | | | | | |
| | 6 | EOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 3 | MINREG = 3 | CANDIDATE BRIGHTNESS (BOLD) = .170145 |
| CPTR = 12345678 | CPTR = 123 | CANDIDATE POSITION (LMIN) = 3 |
| TOCPTR 1 = 1 | TOCPTR 1 = 12 | SELECTED CRITERION BRIGHTNESS (B) = .170145 |
| TOCPTR 2 = 1 | TOCPTR 2 = 3 | SELECTED POSITION (POS) = 13 |
| TOCPTR 3 = 12 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 12 | TOCPTR 6 = 1 | BDA = 0 |

TABLE 7C-continued

CHUTE/POCKET PROCESSING PASS: 3

| | |  |
|---|---|---|
| TOCPTR 7 = 2 | TOCPTR 7 = 1 | |
| TOCPTR 8 = 1 | TOCPTR 8 = 1 | |
| D1 = 1 2 0 3 9 0 3 12 | D1 = 0 1 | |
| D2 = - - - - - - 2 - | D2 = - 2 | |
| DSUM = 1+2+0+3+9+0+2+11=28 | DSUM = 0+1=1 | |
| BSUM = .5+.4+.4+.2+.9+.1+.9+.2=3.6 | BSUM = .7+.8=1.5 | A dash (-) in D1 or D2 indicates that chute (or |
| QS = 11 | QS = 11 | pocket) contained a command value and |
| PW = 9 | PW = 9 | thus no difference was formed |

TABLE 7D

CHUTE/POCKET PROCESSING PASS: 4

| CHUTE/POCKET (CPTR) | | POCKETS | CHUTES | | | | | | | | | | | | | | | | CHUTE DATA WORDS (TOCPTR) |
|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | |
| PIPER 1 | 1 | 4/.5 | 4/.5 | <u>8/.6</u> | EOC | | | | | | | | | | | | | | |
| | 2 | EOC | <u>5/.4</u> | 7/.7 | 9/.8 | EOC | | | | | | | | | | | | | |
| | 3 | 4/.3 | 3/.4 | 4/.3 | <u>6/.5</u> | 8/.8 | 10/.7 | EOC | | | | | | | | | | | |
| | 4 | EOC | <u>6/.2</u> | 7/.5 | 9/.8 | 11/.8 | EOC | | | | | | | (UNDERSCORE INDICATES CURRENT | | | | | |
| | 5 | EOC | <u>12/.9</u> | EOC | | | | | | | | | | TOP-OF-CHUTE) | | | | | |
| | 6 | 4/1 | 3/.1 | 4/1 | <u>EOC</u> | | | | | | | | | | | | | | |
| | 7 | 1/.9 | 1/.9 | <u>6/.2</u> | 14/.5 | EOC | | | | | | | | | | | | | |
| | 8 | EOC | <u>15/.2</u> | EOC | | | | | | | | | | | | | | | |
| PIPER 2 | 1 | 3/.7 | 3/.7 | <u>5/1</u> | 7/.9 | EOC | | | | | | | | | | | | | |
| | 2 | 4/.8 | 0/.6 | 1/1 | 4/.8 | <u>EOD</u> | | | | | | | | | | | | | |
| | 3 | EOC | EOC | | | | | | | | | | | | | | | | |
| | 4 | EOC | EOC | | | | | | | | | | (UNDERSCORE INDICATES CURRENT | | | | | |
| | 5 | EOC | EOC | | | | | | | | | | | TOP-OF-CHUTE) | | | | | |
| | 6 | EOC | EOC | | | | | | | | | | | | | | | | |
| | 7 | EOC | EOC | | | | | | | | | | | | | | | | |
| | 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 4 | MINREG = 4 | CANDIDATE BRIGHTNESS (BOLD) = .190254 |
| CPTR = 1 2 3 4 5 6 7 8 | CPTR = 1 2 3 | CANDIDATE POSITION (LMIN) = 4 |
| TOCPTR 1 = 1 2 | TOCPTR 1 = 2 | SELECTED CRITERION BRIGHTNESS (B) = .190254 |
| TOCPTR 2 = 1 | TOCPTR 2 = 3 4 | SELECTED POSITION (POS) = 3 4 |
| TOCPTR 3 = 2 3 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 2 3 | TOCPTR 6 = 1 | BDA = 0 |
| TOCPTR 7 = 2 | TOCPTR 7 = 1 | |
| TOCPTR 8 = 1 | TOCPTR 8 = 1 | |
| D1 = 0 1 0 2 8 0 2 11 | D1 = 1 0 | |
| D2 = - - 1 - - 1 3 - | D2 = 1 3 | |
| DSUM = 0+1+0+2+8+0+2+11=24 | DSUM = 1+0=1 | |
| BSUM = .5+.4+.3+.2+.9+1+.2+.2=3.7 | BSUM = 1+.8=1.8 | A dash (-) in D1 or D2 indicates that a chute |
| QS = 11 | QS = 11 | (or pocket) contained a command value and thus |
| PW = 9 | PW = 9 | no difference was formed. |

TABLE 7E

CHUTE/POCKET PROCESSING PASS: 5

| CHUTE/POCKET (CPTR) | | POCKETS | CHUTES | | | | | | | | | | | | | | | | CHUTE DATA WORDS (TOCPTR) |
|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | |
| PIPER 1 | 1 | 4/.5 | 4/.5 | <u>8/.6</u> | EOC | | | | | | | | | | | | | | |
| | 2 | 5/.4 | 5/.4 | <u>7/.7</u> | 9/.8 | EOC | | | | | | | | | | | | | |
| | 3 | 4/.3 | 3/.4 | 4/.3 | <u>6/.5</u> | 8/.8 | 10/.7 | EOC | | | | | | | | | | | |
| | 4 | DOC | <u>6/.2</u> | 7/.5 | 9/.8 | 11/.8 | EOC | | | | | | | (UNDERSCORE INDICATES CURRENT | | | | | |
| | 5 | EOC | <u>12/.9</u> | EOC | | | | | | | | | | TOP-OF-CHUTE) | | | | | |
| | 6 | 4/1 | 3/.1 | 4/1 | <u>EOC</u> | | | | | | | | | | | | | | |
| | 7 | 1/.9 | 1/.9 | <u>6/.2</u> | 14/.5 | EOC | | | | | | | | | | | | | |
| | 8 | EOC | <u>15/.2</u> | EOC | | | | | | | | | | | | | | | |
| PIPER 2 | 1 | 5/1 | 3/.7 | 5/1 | <u>7/.9</u> | EOC | | | | | | | | | | | | | |
| | 2 | 4/.8 | 0/.6 | 1/1 | 4/.8 | <u>EOD</u> | | | | | | | | | | | | | |
| | 3 | EOC | EOC | | | | | | | | | | | | | | | | |
| | 4 | EOC | EOC | | | | | | | | | | (UNDERSCORE INDICATES CURRENT | | | | | |

TABLE 7E-continued

CHUTE/POCKET PROCESSING PASS: 5

|   |     |     |
|---|-----|-----|
| 5 | EOC | EOC |
| 6 | EOC | EOC |
| 7 | EOC | EOC |
| 8 | EOC | EOC |

(TOP-OF-CHUTE)

| PIPER 1 REGISTERS | PIPER 2 REGISTERS | BRIGHTNESS GENERATOR REGISTERS |
|---|---|---|
| MINREG = 5 | MINREG = 5 | CANDIDATE BRIGHTNESS (BOLD) = .198416 |
| CPTR = 1 2 3 4 5 6 7 8 | CPTR = 1 2 3 | CANDIDATE POSITION (LMIN) = 5 |
| TOCPTR 1 = 2 | TOCPTR 1 = 2 3 | SELECTED CRITERION BRIGHTNESS (B) = .198416 |
| TOCPTR 2 = 1 2 | TOCPTR 2 = 4 | SELECTED POSITION (POS) = 5 |
| TOCPTR 3 = 3 | TOCPTR 3 = 1 | M = 1 |
| TOCPTR 4 = 1 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 2 | TOCPTR 7 = 1 | |
| TOCPTR 8 = 1 | TOCPTR 8 = 1 | |
| D1 = 3 0 1 1 7 - 1 10 | D1 = 0 - | |
| D2 = 1 - 1 - - 1 4 - | D2 = 2 1 | |
| DSUM = 1+0+1+1+7+1+1+11=23 | DSUM = 0+1=1 | |
| BSUM = .5+.4+.5+.2+.9+1+.2+.2=3.9 | BSUM = 1+.8=1.8 | A dash (-) in D1 or D2 indicates that a chute (or pocket) contained a command value and thus no difference was formed. |
| QS = 11 | QS = 11 | |
| PW = 9 | PW = 9 | |

TABLE 7F

CHUTE/POCKET PROCESSING PASS: 6

| CHUTE/POCKET (CPTR) | POCKETS | 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1  1 | 4/.5 | 4/.5 | 8/.6 | EOC | | | | | | | | | | | | | | |
| 2 | 5/.4 | 5/.4 | 7/.7 | 9/.8 | EOC | | | | | | | | | | | | | |
| 3 | 6/.5 | 3/.4 | 4/.3 | 6/.5 | 8/.8 | 10/.7 | EOC | | | | | | | | | | | |
| 4 | 6/.2 | 6/.2 | 7/.5 | 9/.8 | 11/.8 | EOC | | | | | | | | | | | | (UNDERSCORE INDICATES PRESENT TOP-OF-CHUTE) |
| 5 | EOC | 12/.9 | EOC | | | | | | | | | | | | | | | |
| 6 | 4/1 | 3/.1 | 4/1 | EOC | | | | | | | | | | | | | | |
| 7 | 6/.2 | 1/.9 | 6/.2 | 14/.5 | EOC | | | | | | | | | | | | | |
| 8 | EOC | 15/.2 | EOC | | | | | | | | | | | | | | | |
| PIPER 2  1 | 5/1 | 3/.7 | 5/1 | 7/.9 | EOC | | | | | | | | | | | | | |
| 2 | 4/.8 | 0/.6 | 1/1 | 4/.8 | EOD | | | | | | | | | | | | | |
| 3 | EOC | EOC | | | | | | | | | | | | | | | | |
| 4 | EOC | EOC | | | | | | | | | | | | | | | | (UNDERSCORE INDICATES PRESENT TOP-OF-CHUTE) |
| 5 | EOC | EOC | | | | | | | | | | | | | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 6 | MINREG = 6 | CANDIDATE BRIGHTNESS (BOLD) = .212706 |
| CPTR = 1 2 3 4 5 6 7 8 | CPTR = 1 2 3 | CANDIDATE POSITION (LMIN) = 6 |
| TOCPTR 1 = 2 | TOCPTR 1 = 3 | SELECTED CRITERION BRIGHTNESS (B) = .212706 |
| TOCPTR 2 = 2 | TOCPTR 2 = 4 | SELECTED POSITION (POS) = 6 |
| TOCPTR 3 = 3 4 | TOCPTR 3 = 1 | M = 1 |
| TOCPTR 4 = 1 2 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 2 3 | TOCPTR 7 = 1 | |
| TOCPTR 8 = 1 | TOCPTR 8 = 1 | |
| D1 = 2 1 0 0 6 - 0 - | D1 = 1 - | |
| D2 = 2 1 - - 2 3 9 | D2 = 1 2 | |
| DSUM = 2+1+0+0+6+2+0+9=20 | DSUM = 1+2=3 | |
| BSUM = .6+.7+.5+.2+.9+1+.2+.2=4.3 | BSUM = 1+.8=1.8 | A dash (-) in D1 or D2 indicates that chute (or pocket) contained a command value and thus no difference was formed. |
| QS = 11 | QS = 11 | |
| PW = 9 | PW = 9 | |

TABLE 7G

CHUTE/POCKET PROCESSING PASS: 7

| CHUTE/ | | CHUTE DATA |
|---|---|---|

TABLE 7G-continued

CHUTE/POCKET PROCESSING PASS: 7

| POCKET (CPTR) | POCKETS | \multicolumn{16}{c}{CHUTES} | WORDS (TOCPTR) |
| | | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|---|
| PIPER 1 | 1 | 4/.5 | 8/.6 | EOC | | | | | | | | | | | | | | |
| | 2 | 7/.7 | 5/.4 | 7/.7 | 9/.8 | EOC | | | | | | | | | | | | |
| | 3 | 6/.5 | 3/.4 | 4/.3 | 6/.5 | 8/.8 | 10/.7 | EOC | | | | | | | | | | |
| | 4 | 7/.5 | 6/.2 | 7/.5 | 9/.8 | 11/.8 | EOC | | | (UNDERSCORE INDICATES CURRENT TOP-OF-CHUTE) | | | | | | | | |
| | 5 | EOC | 12/.9 | EOC | | | | | | | | | | | | | | |
| | 6 | 4/1 | 3/.1 | 4/1 | EOC | | | | | | | | | | | | | |
| | 7 | 6/.2 | 1/.9 | 6/.2 | 14/.5 | EOC | | | | | | | | | | | | |
| | 8 | EOC | 15/.2 | EOC | | | | | | | | | | | | | | |
| PIPER 2 | 1 | 7/.9 | 3/.7 | 5/1 | 7/.9 | EOC | | | | | | | | | | | | |
| | 2 | 4/.8 | 0/.6 | 1/1 | 4/.8 | EOD | | | | | | | | | | | | |
| | 3 | EOC | EOC | | | | | | | | | | | | | | | |
| | 4 | EOC | EOC | | | | | | | (UNDERSCORE INDICATES CURRENT TOP-OF-CHUTE) | | | | | | | | |
| | 5 | EOC | EOC | | | | | | | | | | | | | | | |
| | 6 | EOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 7 | MINREG = 7 | CANDIDATE BRIGHTNESS (BOLD) = .230303 |
| CPTR = 1 2 3 4 5 6 7 8 | CPTR = 1 2 3 | CANDIDATE POSITION (LMIN) = 7 SELECTED |
| TOCPTR 1 = 2 | TOCPTR 1 = 3 4 | CRITERION BRIGHTNESS (B) = .230303 |
| TOCPTR 2 = 2 3 | TOCPTR 2 = 4 | SELECTED POSITION (POS) = 7 |
| TOCPTR 3 = 4 | TOCPTR 3 = 1 | M = 1 |
| TOPCTR 4 = 2 3 | TOPCTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = 1 0 1 0 5 - 7 8 | D1 = 0 - | |
| D2 = 3 2 1 1 - 3 1 - | D2 = 2 3 | |
| DSUM = 1+0+1+0+5+3+1+8 = 19 | DSUM = 0+3 = 3 | A dash (-) in D1 or D2 indicates that chute (or pocket) contained a command value and thus no difference was formed. |
| BSUM = .6+.7+.8+.5+.9+1+.2+.2 = 4.9 | BSUM = .9+.8 = 1.7 | |
| QS = 11 | QS = 11 | |
| PW = 9 | PW = 9 | |

TABLE 7H

CHUTE/POCKET PROCESSING PASS: 8

| CHUTE/ POCKET (CPTR) | POCKETS | \multicolumn{16}{c}{CHUTES} | CHUTE DATA WORDS (TOCPTR) |
| | | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|---|
| PIPER 1 | 1 | 8/.6 | 4/.5 | 8/.6 | EOC | | | | | | | | | | | | | |
| | 2 | 7/.7 | 5/.4 | 7/.7 | 9/.8 | EOC | | | | | | | | | | | | |
| | 3 | 8/.8 | 3/.4 | 4/.3 | 6/.5 | 8/.8 | 10/.7 | EOC | | | | | | | | | | |
| | 4 | 7/.5 | 6/.2 | 7/.5 | 9/.8 | 11/.8 | EOC | | | (UNDERSCORE INDICATES CURRENT TOP-OF-CHUTE) | | | | | | | | |
| | 5 | EOC | 12/.9 | EOC | | | | | | | | | | | | | | |
| | 6 | 4/1 | 3/.1 | 4/1 | EOC | | | | | | | | | | | | | |
| | 7 | 6/.2 | 1/.9 | 6/.2 | 14/.5 | EOC | | | | | | | | | | | | |
| | 8 | EOC | 15/.2 | EOC | | | | | | | | | | | | | | |
| PIPER 2 | 1 | 7/.9 | 3/.7 | 5/1 | 7/.9 | EOC | | | | | | | | | | | | |
| | 2 | 4/.8 | 0/.6 | 1/1 | 4/.8 | EOD | | | | | | | | | | | | |
| | 3 | EOC | EOC | | | | | | | | | | | | | | | |
| | 4 | EOC | EOC | | | | | | | (UNDERSCORE INDICATES CURRENT TOP-OF-CHUTE) | | | | | | | | |
| | 5 | EOC | EOC | | | | | | | | | | | | | | | |
| | 6 | EOC | EOC | | | | | | | | | | | | | | | |
| | 7 | EOC | EOC | | | | | | | | | | | | | | | |
| | 8 | EOC | EOC | | | | | | | | | | | | | | | |

| PIPER 1 REGISTERS | PIPER 2 REGISTERS | BRIGHTNESS GENERATOR REGISTERS |
|---|---|---|
| MINREG = 8 | MINREG = 8 | CANDIDATE BRIGHTNESS (BOLD) = .236915 |
| CPTR = 1 2 3 4 5 6 7 8 | CPTR = 1 2 3 | CANDIDATE POSITION (LMIN) = 8 SELECTED |
| TOCPTR 1 = 2 3 | TOCPTR 1 = 4 | CRITERION BRIGHTNESS (B) = .236915 |
| TOCPTR 2 = 3 | TOCPTR 2 = 4 | SELECTED POSITION (POS) = 8 |
| TOCPTR 3 = 4 5 | TOCPTR 3 = 1 | M = 1 |
| TOCPTR 4 = 3 | TOCPTR 4 = 1 | ES = 24 |
| TOCPTR 5 = 1 | TOCPTR 5 = 1 | DDA = 0 |

TABLE 7H-continued

CHUTE/POCKET PROCESSING PASS: 8

| | | |
|---|---|---|
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = 01014-67 | D1 = -- | |
| D2 = 4121-42- | D2 = 14 | |
| DSUM = 0+1+0+1+4+4+2+7=19 | DSUM = 1+4=5 | |
| BSUM = .6+.8+.8+.8+.9+1+.2+.2=5.3 | BSUM = .9+.8=1.7 | A dash (-) in D1 or D2 indicates that chute (or pocket) contained a command value and thus no difference was formed. |
| QS = 11 | QS = 11 | |
| PW = 9 | PW = 9 | |

TABLE 7I

CHUTE/POCKET PROCESSING PASS: 9

| CHUTE/POCKET (CPTR) | | POCKETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|---|
| PIPER 1 | 1 | 8/.6 | 4/.5 | 8/.6 | EOC | | | | | | | | | | | | | | |
| | 2 | 9/.8 | 5/.4 | 7/.7 | 9/.8 | EOC | | | | | | | | | | | | | |
| | 3 | 8/.8 | 3/.4 | 4/.3 | 6/.5 | 8/.8 | 10/.7 | EOC | | | | | | | | | | | |
| | 4 | 9/.8 | 6/.2 | 7/.5 | 9/.8 | 11/.8 | EOC | | | | (UNDERSCORE INDICATES CURRENT TOP-OF-CHUTE) | | | | | | | | |
| | 5 | DOC | 12/.9 | EOC | | | | | | | | | | | | | | | |
| | 6 | 4/1 | 3/.1 | 4/1 | EOC | | | | | | | | | | | | | | |
| | 7 | 6/.2 | 1/.9 | 6/.2 | 14/.5 | EOC | | | | | | | | | | | | | |
| | 8 | EOC | 15/.2 | EOC | | | | | | | | | | | | | | | |
| PIPER 2 | 1 | 7/.9 | 3/.7 | 5/1 | 7/.9 | EOC | | | | | | | | | | | | | |
| | 2 | 4/.8 | 0/.6 | 1/1 | 4/.8 | EOD | | | | | | | | | | | | | |
| | 3 | EOC | DOC | | | | | | | | | | | | | | | | |
| | 4 | EOC | EOC | | | | | | | | (UNDERSCORE INDICATES CURRENT TOP-OF-CHUTE) | | | | | | | | |
| | 5 | EOC | EOC | | | | | | | | | | | | | | | | |
| | 6 | EOC | EOC | | | | | | | | | | | | | | | | |
| | 7 | EOC | EOC | | | | | | | | | | | | | | | | |
| | 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 9 | MINREG = 9 | CANDIDATE BRIGHTNESS (BOLD) = .231405 |
| CPTR = 12345678 | CPTR = 123 | CANDIDATE POSITION (LMIN) = 9 |
| TOCPTR 1 = 3 | TOCPTR 1 = 4 | SELECTED CRITERION BRIGHTNESS (B) = .236915 |
| TOCPTR 2 = 34 | TOCPTR 2 = 4 | SELECTED POSITION (POS) = 8 |
| TOCPTR 3 = 5 | TOCPTR 3 = 1 | M = 1 |
| TOCPTR 4 = 34 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = -0103-56 | D1 = -- | |
| D2 = 1212-53- | D2 = 25 | |
| DSUM = 1+0+1+0+3+5+3+6=19 | DSUM = 2+5=7 | |
| BSUM = .6+.8+.8+.8+.9+1+.2+.2=5.3 | BSUM = .9+.8=1.7 | A dash (-) in D1 or D2 indicates that chute (or pocket) contained a command value and thus no difference was formed. |
| QS = 11 | QS = 11 | |
| PW = 9 | PW = 9 | |

TABLE 7J

CHUTE/POCKET PROCESSING PASS: 10

| CHUTE/POCKET (CPTR) | | POCKETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|---|
| PIPER 1 | 1 | 8/.6 | 4/.5 | 8/.6 | EOC | | | | | | | | | | | | | | |
| | 2 | 9/.8 | 5/.4 | 7/.7 | 9/.8 | EOC | | | | | | | | | | | | | |
| | 3 | 10/.7 | 3/.4 | 4/.3 | 6/.5 | 8/.8 | 10/.7 | EOC | | | | | | | | | | | |
| | 4 | 9/.8 | 6/.2 | 7/.5 | 9/.8 | 11/.8 | EOC | | | | (UNDERSCORE INDICATES CURRENT TOP-OF-CHUTE) | | | | | | | | |
| | 5 | EOC | 12/.9 | EOC | | | | | | | | | | | | | | | |
| | 6 | 4/1 | 3/.1 | 4/1 | EOC | | | | | | | | | | | | | | |
| | 7 | 6/.2 | 1/.9 | 6/.2 | 14/.5 | EOC | | | | | | | | | | | | | |
| | 8 | EOC | 15/.2 | EOC | | | | | | | | | | | | | | | |
| PIPER 2 | 1 | 7/.9 | 3/.7 | 5/1 | 7/.9 | EOC | | | | | | | | | | | | | |
| | 2 | 4/.8 | 0/.6 | 1/1 | 4/.8 | EOD | | | | | | | | | | | | | |
| | 3 | EOC | EOC | | | | | | | | | | | | | | | | |

TABLE 7J-continued

CHUTE/POCKET PROCESSING PASS: 10

| | | | |
|---|---|---|---|
| 4 | EOC | EOC | |
| 5 | EOC | EOC | (UNDERSCORE INDICATES CURRENT |
| 6 | EOC | EOC | TOP-OF-CHUTE) |
| 7 | EOC | EOC | |
| 8 | EOC | EOC | |

| PIPER 1 REGISTERS | PIPER 2 REGISTERS | BRIGHTNESS GENERATOR REGISTERS |
|---|---|---|
| MINREG = 10 | MINREG = 10 | CANDIDATE BRIGHTNESS (BOLD) = .225895 |
| CPTR = 1 2 3 4 5 6 7 8 | CPTR = 1 2 3 | CANDIDATE POSITION (LMIN) = 10 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 5 6 | TOCPTR 3 = 1 | M = 1 |
| TOCPTR 4 = 4 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = - - 0 1 2 - 4 5 | D1 = - - | |
| D2 = 2 1 2 1 - 6 4 - | D2 = 3 6 | |
| DSUM = 2+1+0+1+2+6+4+5=21 | DSUM = 3+6=9 | |
| BSUM = .6+.8+.7+.8+.9+1+.5+.2=5.5 | BSUM = .9+.8=1.7 | A dash (-) in D1 or D2 indicates that chute (or |
| QS = 11 | QS = 11 | pocket) contained a command value and |
| PW = 9 | PW = 9 | thus no difference was formed. |

TABLE 7K

CHUTE/POCKET PROCESSING PASS: 11

| CHUTE/POCKET (CPTR) | POCKETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|
| PIPER 1  1 | 8/.6 | 4/.5 | 8/.6 | EOC | | | | | | | | | | | | | | |
| 2 | 9/.8 | 5/.4 | 7/.7 | 9/.8 | EOC | | | | | | | | | | | | | |
| 3 | 10/.7 | 3/.4 | 4/.3 | 6/.5 | 8/.8 | 10/.7 | EOC | | | | | | | | | | | |
| 4 | 11/.7 | 6/.2 | 7/.5 | 9/.8 | 11/.8 | EOC | | | | | | | | | | (UNDERSCORE INDICATES CURRENT | | |
| 5 | EOC | 12/.9 | EOC | | | | | | | | | | | | TOP-OF-CHUTE) | | | |
| 6 | 4/1 | 3/.1 | 4/1 | EOC | | | | | | | | | | | | | | |
| 7 | 6/.2 | 1/.9 | 6/.2 | 14/.5 | EOC | | | | | | | | | | | | | |
| 8 | EOC | 15/.2 | EOC | | | | | | | | | | | | | | | |
| PIPER 2  1 | 7/.9 | 3/.7 | 5/1 | 7/.9 | EOC | | | | | | | | | | | | | |
| 2 | 4/.8 | 0/.6 | 1/1 | 4/.8 | EOD | | | | | | | | | | | | | |
| 3 | EOC | EOC | | | | | | | | | | | | | | | | |
| 4 | EOC | EOC | | | | | | | | | | | | (UNDERSCORE INDICATES CURRENT | | | | |
| 5 | EOC | EOC | | | | | | | | | | | | TOP-OF-CHUTE) | | | | |
| 6 | EOC | EOC | | | | | | | | | | | | | | | | |
| 7 | EOC | EOC | | | | | | | | | | | | | | | | |
| 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 11 | MINREG = 11 | CANDIDATE BRIGHTNESS (BOLD) = .220248 |
| CPTR = 1 2 3 4 5 6 7 8 | CPTR = 1 2 3 | CANDIDATE POSITION (LMIN) = 11 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 6 | TOCPTR 3 = 1 | M = 1 |
| TOCPTR 4 = 4 5 | TOCPTR 4 = 1 | ES = 24 |
| TOCPTR 5 = 1 | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = - - - 0 1 - 3 4 | D1 = - - | |
| D2 = 3 2 1 2 - 7 5 - | D2 = 4 7 | |
| DSUM = 3+2+1+0+1+7+3+4=21 | DSUM = 4+7=11 | |
| BSUM = .6+.8+.7+.8+.9+1+.5+.2=5.5 | BSUM = .9+.8=1.7 | A dash (-) in D1 or D2 indicates that chute (or |
| QS = 11 | QS = 11 | pocket) contained a command value and |
| PW = 9 | PW = 9 | thus no difference was formed. |

TABLE 7L

CHUTE/POCKET PROCESSING PASS: 12

| CHUTE/ | | CHUTE DATA |
|---|---|---|

TABLE 7L-continued

CHUTE/POCKET PROCESSING PASS: 12

| POCKET (CPTR) | | POCKETS | CHUTES 1 | 2 | 3 | 4 | 5 | 6 | 7 | 8 | 9 | 10 | 11 | 12 | 13 | 14 | 15 | 16 | WORDS (TOCPTR) |
|---|---|---|---|---|---|---|---|---|---|---|---|---|---|---|---|---|---|---|---|
| PIPER 1 | 1 | 8/.6 | 4/.5 | 8/.6 | EOC | | | | | | | | | | | | | | |
| | 2 | 9/.8 | 5/.4 | 7/.7 | 9/.8 | EOC | | | | | | | | | | | | | |
| | 3 | 10/.7 | 3/.4 | 4/.3 | 6/.5 | 8/.8 | 10/.7 | EOC | | | | | | | | | | | |
| | 4 | 11/.7 | 6/.2 | 7/.5 | 9/.8 | 11/.8 | EOC | | | | (UNDERSCORE INDICATES CURRENT | | | | | | | | |
| | 5 | 12/.9 | 12/.9 | EOC | | | | | | | TOP-OF-CHUTE) | | | | | | | | |
| | 6 | 4/1 | 3/.1 | 4/1 | EOC | | | | | | | | | | | | | | |
| | 7 | 6/.2 | 1/.9 | 6/.2 | 14/.5 | EOC | | | | | | | | | | | | | |
| | 8 | EOC | 15/.2 | EOC | | | | | | | | | | | | | | | |
| PIPER 2 | 1 | 7/.9 | 3/.7 | 5/1 | 7/.9 | EOC | | | | | | | | | | | | | |
| | 2 | 4/.8 | 0/.6 | 1/1 | 4/.8 | EOD | | | | | | | | | | | | | |
| | 3 | EOC | EOC | | | | | | | | | | | | | | | | |
| | 4 | EOC | EOC | | | | | | | | (UNDERSCORE INDICATES CURRENT | | | | | | | | |
| | 5 | DOC | EOC | | | | | | | | TOP-OF-CHUTE) | | | | | | | | |
| | 6 | EOC | EOC | | | | | | | | | | | | | | | | |
| | 7 | EOC | EOC | | | | | | | | | | | | | | | | |
| | 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 12 | MINREG = 12 | CANDIDATE BRIGHTNESS (BOLD) = .206405 |
| CPTR = $12345678$ | CPTR = $123$ | CANDIDATE POSITION (LMIN) = 12 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 6 | TOCPTR 3 = 1 | M = 1 |
| TOCPTR 4 = 5 | TOCPTR 4 = 1 | ES = 24 |
| TOCPTR 5 = $12$ | TOCPTR 5 = 1 | DDA = 0 |
| TOCPTR 6 = 3 | TOCPTR 6 = 1 | BDA = 0 |
| TOCPTR 7 = 3 | TOCPTR 7 = 1 | |
| TOCPTR 8 = 1 | TOCPTR 8 = 1 | |
| D1 = - - - - 0 - 2 3 | D1 = - - | |
| D2 = 4 3 2 1 - 8 6 - | D2 = 5 8 | |
| DSUM = 4+3+2+1+0+8+2+3=23 | DSUM = 5+8=13 | |
| BSUM = .6+.8+.7+.7+.9+1+.5+.2=5.4 | BSUM = .9+.8=1.7 | A dash (-) in D1 or D2 indicates that chute (or pocket) contained a command value and thus no difference was formed. |
| QS = 11 | QS = 11 | |
| PW = 9 | PW = 9 | |

TABLE 7M

CHUTE/POCKET PROCESSING PASS: 13

| CHUTE/ POCKET (CPTR) | | POCKETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|---|
| PIPER 1 | 1 | 8/.6 | 4/.5 | 8/.6 | EOC | | | | | | | | | | | | | | |
| | 2 | 9/.8 | 5/.4 | 7/.7 | 9/.8 | EOC | | | | | | | | | | | | | |
| | 3 | 10/.7 | 3/.4 | 4/.3 | 6/.5 | 8/.8 | 10/.7 | EOC | | | | | | | | | | | |
| | 4 | 11/.7 | 6/.2 | 7/.5 | 9/.8 | 11/.8 | EOC | | | | (UNDERSCORE INDICATES CURRENT | | | | | | | | |
| | 5 | 12/.9 | 12/.9 | EOC | | | | | | | TOP-OF-CHUTE) | | | | | | | | |
| | 6 | 4/1 | 3/.1 | 4/1 | EOC | | | | | | | | | | | | | | |
| | 7 | 14/.5 | 1/.9 | 6/.2 | 14/.5 | EOC | | | | | | | | | | | | | |
| | 8 | EOC | 15/.2 | EOC | | | | | | | | | | | | | | | |
| PIPER 2 | 1 | 7/.9 | 3/.7 | 5/1 | 7/.9 | EOC | | | | | | | | | | | | | |
| | 2 | 4/.8 | 0/.6 | 1/1 | 4/.8 | EOD | | | | | | | | | | | | | |
| | 3 | EOC | EOC | | | | | | | | | | | | | | | | |
| | 4 | EOC | EOC | | | | | | | | (UNDERSCORE INDICATES CURRENT | | | | | | | | |
| | 5 | EOC | EOC | | | | | | | | TOP-OF-CHUTE) | | | | | | | | |
| | 6 | EOC | DOC | | | | | | | | | | | | | | | | |
| | 7 | EOC | EOC | | | | | | | | | | | | | | | | |
| | 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 14 | MINREG = 14 | CANDIDATE BRIGHTNESS (BOLD) = .172934 |
| CPTR = $12345678$ | CPTR = $123$ | CANDIDATE POSITION (LMIN) = 13 |
| TOCPTR 1 = 3 | TOCPTR 1 = 4 | SELECTED |
| TOCPTR 2 = 4 | TOCPTR 2 = 4 | CRITERION BRIGHTNESS (B) = .236915 |
| TOCPTR 3 = 6 | TOCPTR 3 = 1 | SELECTED POSITION (POS) = 8 |
| TOCPTR 4 = 5 | TOCPTR 4 = 1 | M = 1 |
| TOCPTR 5 = 2 | TOCPTR 5 = 1 | ES = 24 |
| | | DDA = 0 |

TABLE 7M-continued

CHUTE/POCKET PROCESSING PASS: 13

| | | |
|---|---|---|
| TOCPTR 6 = 3 | TOCPTR 6 = 1 | BDA = 0 |
| TOCPTR 7 = *3* 4 | TOCPTR 7 = 1 | |
| TOCPTR 8 = 1 | TOCPTR 8 = 1 | |
| D1 = - - - - - 0 1 | D1 = - - | |
| D2 = 6 5 4 3 2 10 8 - | D2 = 7 10 | |
| DSUM = 6+5+4+3+2+10+0+1=31 | DSUM = 7+10=17 | A dash (-) in D1 or D2 indicates that chute (or |
| BSUM = .6+.8+.7+.7+.9+1+.5+.2=5.4 | BSUM = .9+.8=1.7 | pocket) contained a command value and |
| QS = 11 | QS = 11 | thus no difference was formed. |
| PW = 9 | PW = 9 | |

TABLE 7N

CHUTE/POCKET PROCESSING PASS: 14

| CHUTE/POCKET (CPTR) | | POCKETS | CHUTES 1 | 2 | 3 | 4 | 5 | 6 | 7 | 8 | 9 | 10 | 11 | 12 | 13 | 14 | 15 | 16 | CHUTE DATA WORDS (TOCPTR) |
|---|---|---|---|---|---|---|---|---|---|---|---|---|---|---|---|---|---|---|---|
| PIPER 1 | 1 | 8/.6 | 4/.5 | 8/.6 | <u>EOC</u> | | | | | | | | | | | | | | |
| | 2 | 9/.8 | 5/.4 | 7/.7 | 9/.8 | <u>EOC</u> | | | | | | | | | | | | | |
| | 3 | 10/.7 | 3/.4 | 4/.3 | 6/.5 | 8/.8 | 10/.7 | <u>EOC</u> | | | | | | | | | | | |
| | 4 | 11/.7 | 6/.2 | 7/.5 | 9/.8 | 11/.8 | <u>EOC</u> | | | | | | | | | | (UNDERSCORE INDICATES CURRENT TOP-OF-CHUTE) | | |
| | 5 | 12/.9 | 12/.9 | <u>EOC</u> | | | | | | | | | | | | | | | |
| | 6 | 4/1 | 3/.1 | 4/1 | <u>EOC</u> | | | | | | | | | | | | | | |
| | 7 | 14/.5 | 1/.9 | 6/.2 | 14/.5 | <u>EOC</u> | | | | | | | | | | | | | |
| | 8 | 15/.2 | 15/.2 | <u>EOC</u> | | | | | | | | | | | | | | | |
| PIPER 2 | 1 | 7/.9 | 3/.7 | 5/1 | 7/.9 | <u>EOC</u> | | | | | | | | | | | | | |
| | 2 | 4/.8 | 0/.6 | 1/1 | 4/.8 | <u>EOD</u> | | | | | | | | | | | | | |
| | 3 | EOC | EOC | | | | | | | | | | | | | | | | |
| | 4 | EOC | EOC | | | | | | | | | | | | | | (UNDERSCORE INDICATES CURRENT TOP-OF-CHUTE) | | |
| | 5 | EOC | EOC | | | | | | | | | | | | | | | | |
| | 6 | EOC | EOC | | | | | | | | | | | | | | | | |
| | 7 | EOC | EOC | | | | | | | | | | | | | | | | |
| | 8 | EOC | EOC | | | | | | | | | | | | | | | | |

| PIPER 1 REGISTERS | PIPER 2 REGISTERS | BRIGHTNESS GENERATOR REGISTERS |
|---|---|---|
| MINREG = 15 | MINREG = 15 | CANDIDATE BRIGHTNESS (BOLD) = .150620 |
| CPTR = *12345678* | CPTR = *123* | CANDIDATE POSITION (LMIN) = 15 |
| TOCPTR 1 = 3 | TOCPTR 1 = 4 | SELECTED CRITERION BRIGHTNESS (B) = .236915 |
| TOCPTR 2 = 4 | TOCPTR 2 = 4 | SELECTED POSITION (POS) = 8 |
| TOCPTR 3 = 6 | TOCPTR 3 = 1 | M = 1 |
| TOCPTR 4 = 5 | TOCPTR 4 = 1 | ES = 24 |
| TOCPTR 5 = 2 | TOCPTR 5 = 1 | DDA = 0 |
| TOCPTR 6 = 3 | TOCPTR 6 = 1 | BDA = 0 |
| TOCPTR 7 = 4 | TOCPTR 7 = 1 | |
| TOCPTR 8 = *1* 2 | TOCPTR 8 = 1 | |
| D1 = - - - - - - 0 | D1 = - - | |
| D2 = 7 6 5 4 3 11 1 - | D2 = 8 11 | |
| DSUM = 7+6+5+4+3+11+1+0=37 | DSUM = 8+11=19 | |
| BSUM = .6+.8+.7+.7+.9+1+.5+.2=5.4 | BSUM = .9+.8=1.7 | A dash (-) in D1 or D2 indicates that chute (or pocket) contained a command value and thus no difference was formed. |
| QS = 11 | QS = 11 | |
| PW = 9 | PW = 9 | |

TABLE 8

| TERM | DEFINITION |
|---|---|
| ASB | Register in which brightness partial sums (BSUMs) are collected from the pipers and added to the number of missing events, M, as they are received to produce the quantity M + SSB (where SSB = BSUM1 . . . + BSUMN). Also used to store current brightness score. |
| ASD | Register in which distant partial sums (DSUMs) are collected from the pipers and subtracted from WR1 as they are received to produce the quantity WR1 − SSD (where SSD = DSUM + DSUM2 + . . . + DSUMn). |
| BCF | Brightness Correction Factor. A factor used in the brightness |

TABLE 8-continued

| TERM | DEFINITION |
|---|---|
| | equation to correct the brightness obtained for a current query/entry pair by the average prior brightness value associated with the piping of the query on the previous level. |
| BDA | Brightness Disable Flag. When set by the external processor, indicates that the (M + SSB)/QS portion of the brightness equation is to be set to 1.0. |
| Bi | Brightness value register whose content is to be summed in BSUM. Output of piping logic block. |
| BOLD | Register containing the largest brightness value thus far found on any chute processing pass of a given piping cycle. When all chutes have been processed, contains the largest brightness obtainable for a given query/entry pair; i.e., the brightness corresponding to the position of best fit of query and entry. |
| BREG | Interface register for both incoming and outgoing information on the data bus. |
| BRIGHTNESS (B) | One of two fields in a chute data word; specifically, bits 8–14. |
| BSUM | Sum-of-brightnesses register (10 bits.) |
| BUSY | An internal signal that, when on, holds the common RDY line off, thus preventing any array pipers from entering their next operational phase until the "slowest" piper or the brightness generator has finished its present processing segment. |
| CARRY | An internal signal set when a piper wishes to enable other pipers in the system; i.e., works in conjunction with LAST to control COUT. |
| CHUTE ARRAY | A set of eight memories called chute. Each chute contains 16 words of 16 bits each. The chute is addressed by CPTR, and each word within the chute is addressed by TOCPTR. |
| CHUTE PROCESSING PASS | The sequence of microinstructions required to obtain a brightness score for one set of top-of-chute values at a given relative position of query-to-entry. |
| CI1, CI2, CI3 (CARRY IN) | Three input signals which, when all three are on, fulfills the necessary preconditions for a piper enabled condition. |
| CMIN | Register CMIN contains the current MIN value as determined by the minimum MIN determination processing and stored in the MINREG register of all active pipers. This value represents the relative position of query-to-entry associated with the current set of top-of-chute values. |
| COMMAND (CMD) | A chute or bus data word with bit 15 = 1. There are four such command words. EOC (End-of-Chute), EOD (End-of-Data), EOF (End-of-File) and NMD (Need-More-Data). |
| COUT (CARRY OUT) | An enabling signal sent from |

TABLE 8-continued

| TERM | DEFINITION |
| --- | --- |
| | one piper to subsequent pipers "below" it on the data bus. |
| | COUT = CARRY · $\overline{\text{LAST}}$. |
| CPTR (CHUTE POINTER) | A register used to address the chute array. CPTR holds the number of the chute being accessed; i.e., 0–7. |
| CTS(CLEAR TO SEND) | A signal that indicates to the external processor that the piping array is ready for more data. |
| DDA | Distance Disable Flag. When set by the external processor, indicates that the (WRI − SSD)/$QS^2$ portion of the brightness equation is to be set to 1.0. |
| Di | Difference value register, whose content is to be summed in DSUM. Output of piping logic block. |
| DISCONNECT | An acknowledgement that a logical communication link no longer exists between the external processor and the piping array; i.e., the external processor will not use the bus while a disconnect is in force. This frees the bus for communication between the pipers and the brightness generator. A disconnect is achieved when both the ENT and ENR lines are off. |
| DISTANCE (D) | One of two fields in a chute data word; specifically, bits 0–7. |
| DSUM | Sum-of-distances determined by each piper for the current set of top-of-chute values in relation to the current MIN value. |
| DTAF | A signal that indicates in which mode, fixed or floating, a quantity is to be transferred into shift register SHIFT. DTAF = 0 indicates a floating mode transfer; DTAF = 1 indicates a fixed mode transfer. |
| DV (DATA VALID) | A signal line connected to all elements of the piping array and the external processor that, when turned on by the brightness generator or external processor, signals the elements waiting for the DV on signal that valid data exists on the bus, or that data which the waiting element has placed on the bus has been read. |
| DZ | A flag that, when set indicates, that the sum of all DSUM values received from the pipers is zero; i.e., SSD = 0. |
| ENABLED | An internal piper state. A piper is said to be enabled with all CARRY IN inputs (CI1, CI2, CI3) are on and its CARRY is off. |
| E1–E14 | Corresponding points in the microinstruction sets of both the brightness generator and the pipers where piping array processing is resynchronized after a period of asynchronous operation. |
| E1–E14 | Corresponding points in the microinstruction sets of both the brightness generator and the pipers where piping array processing is resynchronized after a period of asynchronous operation. |
| ENR ON | An input from the external pro- |

TABLE 8-continued

| TERM | DEFINITION |
|---|---|
| (RECEIVE ENABLE) | cessor to the brightness generator indicating that the external processor is prepared to send data to, or received data from, the piping array(opposite of the disconnect condition). |
| ENT ON (TRANSMIT ENABLE) | An output from the brightness generator to the external processor to signal the external processor to establish communication by sending an ENR ON in response. |
| EOC (END-OF-CHUTE) | A command word that, when encountered at the top of a chute, indicates that no more data exists in a particular chute. |
| EOD (END-OF-DATA) | A command word that signals the end of a chute data for a particular data base entry. |
| EOF (END-OF-FILE) | A command word that signals the end of data base entries for a particular piping cycle. |
| EQE | A flag that, when set, indicates that ES = QS. |
| ES | Entry size; the number of events that make up the data base entry currently being piped. |
| EXACT | A signal that, when TRUE, indicates that the current query and entry being piped are exact matches. |
| EXP | Exponent Register. Contains the adjusted algebraic sum of the exponents of the two factors of a floating point product. Correctly locates the binary point of a floating point number. |
| EXTERNAL PROCESSOR | A software-controlled computer system that supplied chute data to the pipers, receives brightness and position data from the brightness generator, and controls piping array initialization. |
| FLG | A flag that, when set, indicates that the chute processing pass just completed was the first pass for a particular piping cycle. |
| GO | An output used by the brightness generator to activate "look ahead" enabling of the pipers. |
| LAST | An internal flag which, when on, indicates that this is the last piper in line holding valid chute data (see COUT). |
| LCF | Length Correction Factor. A factor used on brightness equation that corrects the brightness obtained by the ratio of query-to-entry length. |
| LMIN | A register used to hold the CMIN value used in the just-completed chute processing pass. |
| L1-L16 | Points in the piper logic design designating the first microinstruction following an entry point in the logic flow where processing control reenters the microinstruction sequence from a processing loop or a return. |
| L1-L37 | Points in the brightness generator logic diagram designating the first microinstruction following an entry point in the logic flow where processing control reenters the microinstruction sequence from a processing loop or a return. |

TABLE 8-continued

| TERM | DEFINITION |
| --- | --- |
| M | The number of missing events; i.e., the number of events in the query that are not in the entry. Also the name of the register containing the quantity M. |
| MIN | See CMIN. |
| MINREG | A register holding the MIN value established by minimum MIN determination processing as being the smallest MIN value existing in the piping array (i.e., across all active pipers) on a given chute processing pass. |
| MPC | Multiplicand Register. Holds one of two numbers (input B) to be multiplied in MPX. |
| MPX | Eight-bit by eight-bit multiplier. |
| MULT | Output of MPX containing the product of the values in MPC and the lower eight bits of SHIFT. |
| NMD (NEED-MORE-DATA) | A command word indicating that more chute data exists in the external processor for a particular chute. When sent to the external processor, results in more chute data being sent for the chute containing the NMD. |
| PARTIAL BRIGHTNESS SUM | The sum-of-brightness(BSUM)for one chute processing pass in a given piper. |
| PARTIAL DISTANCE SUM | Ths sum-of-distances(DSUM)for one chute processing pass for a given piper. |
| PIPING CYCLE | The piping array microinstruction sequence required to determine the position of best fit of a particular query and entry, along with the concomitant brightness score. Consists of one or more chute processing passes. |
| POCKET MEMORY | An eight-word memory. Each word, called a pocket. is associated with a particular chute of the chute array. Each pocket is 16 bits wide. |
| POP FLAG | An internal indicator set by the piping logic indicating that the top-of-chute being examined by the piping logic must be "popped", or transferred, into its corresponding pocket. |
| POS | Register containing the position of best fit for a given query and entry. |
| POSITION | The relative position of an entry vis-a-vis a query at which a brightness is being determined from the associated top-of-chute values on a given chute processing pass. |
| POR | Power On Reset. Resets the piping array for a new piping cycle. |
| PW (PIPEWIDTH) | A seven-bit binary constant used by the piping logic. |
| QS | Query Size. The number of events in a query. |
| RDY (READY) | A line which, when off, indicates that at least one piper or the brightness generator has not completed a particular processing sequence (see BUSY). |
| RST (RESET) | A line which, when turned on by the brightness generator, forces all pipers to reinitialize and disables all piper bus output drivers. |

TABLE 8-continued

| TERM | DEFINITION |
|---|---|
| SHIFT | A shift register used with EXP for changing the data to fixed or floating point formats. The lower eight bits serve as the A input to MPX. |
| SHF | A flag that, when set, indicates that data in the SHIFT/EXP register set will be adjusted to the floating point format and transferred out as such; otherwise, the data will be adjusted to fixed point format and transferred out as such. |
| SSB | The sum-of-brightness (BSUMs) sent by the pipers. This quantity does not exist independently in the machine except by implication in register ASB as the quantity M + SSB. |
| SSD | The sum-of-distances (DSUMs) sent by the pipers. This quantity does not exist independently in the brightness generator except by implication in register ASD as the quantity WR1 − SSD. |
| TOCPTR (TOP-OF-CHUTE POINTER) | A counter register associated with each chute that indicates the location of the current top-of-chute within each chute. |
| TOP-OF-CHUTE (TOC) | The word in each chute currently being addressed by the TOCPTR associated with that chute. The complete address of a particular TOC is TOC(TOCPTR) (CPTR). |
| TOP-OF-CHUTE VALUES | Those values at a given position (MIN) used to derive DSUM and BSUM in a given piper on a particular chute processing pass. |
| OUTE | An internal signal that, when on, connects bus register BREG to the bus (tristate output). |
| WR1 | A brightness equation term equal to QS(QS-M). |
| WR2 | A brightness equation term equal to $LCF/QS^3$ as modified by the effect of flags DDA and BDA. |

TABLE 9

PIPER INSTRUCTION CODE PROGRAM

| INSTRUCTION NUMBER | SUBROUTINE ENTRY | | INSTRUCTION |
|---|---|---|---|
| | POINT | | |
| 0000 | L1: | CLR | CPTR |
| 0001 | | CLR | CARRY |
| 0002 | | CLR | BUSY |
| 0003 | | WAIT | DVBREG |
| 0004 | | MOVE | QS,BREG |
| 0005 | L2: | CLR | ALLTOC |
| 0006 | | CLR | LAST |
| 0007 | L3: | MOVE | POCTOC,EOC |
| 0008 | | SUM | CPTR |
| 0009 | | MOVE | POCTOC,EOC |
| 000A | | SUM | CPTR |
| 000B | | MOVE | POCTOC,EOC |
| 000C | | SUM | CPTR |
| 000D | | MOVE | POCTOC,EOC |
| 000E | | SUM | CPTR |
| 000F | | MOVE | POCTOC,EOC |
| 0010 | | SUM | CPTR |
| 0011 | | MOVE | POCTOC,EOC |
| 0012 | | SUM | CPTR |
| 0013 | | MOVE | POCTOC,EOC |
| 0014 | | SUM | CPTR |
| 0015 | | MOVE | POCTOC,EOC |
| 0016 | | CLR | CPTR |
| 0017 | | WAIT | ENABLE |
| 0018 | | SETF | BUSY |

TABLE 9-continued

PIPER INSTRUCTION CODE PROGRAM

| INSTRUCTION NUMBER | SUBROUTINE ENTRY | | INSTRUCTION |
|---|---|---|---|
| 0019 | L4: | WAIT | DVTOC |
| 001A | | JPNC | BRCMD,L4 |
| 001B | | JPNC | CPTR7,L4 |
| 001C | | JPNC | BREOD,L5 |
| 001D | | SETF | LAST |
| 001E | L5: | SETF | CARRY |
| 001F | | CLR | ALLTOC |
| 0020 | | NOOP | |
| 0021 | | CLR | BUSY |
| 0022 | | WAIT | RDY |
| 0023 | | CLR | CARRY |
| 0024 | | CLR | CPTR |
| 0025 | | CLR | SD |
| 0026 | | CLR | SB |
| 0027 | | MOVE | MINREG,MIN |
| 0028 | | MOVE | BREG,MINREG |
| 0029 | | WAIT | RDY |
| 002A | | GOTO | L6 |
| 002B | | NOOP | |
| 002C | | NOOP | |
| 002D | | NOOP | |
| 002E | | NOOP | |
| 002F | L7: | WAIT | DVBREG |
| 0030 | | JPNC | BRLEMR,L8 |
| 0031 | | CLR | BUSY |
| 0032 | | SETF | CARRY |

TABLE 9-continued
PIPER INSTRUCTION CODE PROGRAM

| INSTRUCTION NUMBER | SUBROUTINE ENTRY | INSTRUCTION | |
|---|---|---|---|
| 0033 | | MOVE | MINREG,BREG |
| 0034 | L9: | JPNC | RDY,L7 |
| 0035 | | CLR | CARRY |
| 0036 | | JPNC | MNCMD,L2 |
| 0037 | | SETF | BUSY |
| 0038 | L13: | JPNC | POCM,L10 |
| 0039 | | NOOP | |
| 003A | | NOOP | |
| 003B | | NOOP | |
| 003C | | NOOP | |
| 003D | | SUM | SB |
| 003E | | JPNC | POPOFF,L11 |
| 003F | | SUM | SD |
| 0040 | L12: | JPNC | CPTR7,L13 |
| 0041 | L10: | CLR | BUSY |
| 0042 | | WAIT | RDY |
| 0043 | | MOVE | BREG,SD |
| 0044 | | SETF | BUSY |
| 0045 | | WAIT | ENABLE |
| 0046 | | SETF | OUTE |
| 0047 | | CLR | SD |
| 0048 | | WAIT | DV |
| 0049 | | MOVE | BREG,SB |
| 004A | | NOOP | |
| 004B | | CLR | BUSY |
| 004C | | SETF | CARRY |
| 004D | | CLR | OUTE |
| 004E | | WAIT | RDY |
| 004F | | CLR | CARRY |
| 0050 | | SETF | BUSY |
| 0051 | L14: | JPNC | NMD,L15 |
| 0052 | | MOVE | BREG,TOC |
| 0053 | | WAIT | ENABLE |
| 0054 | | SETF | OUTE |
| 0055 | | CLR | TOCPTR |
| 0056 | | WAIT | DV |
| 0057 | | CLR | OUTE |
| 0058 | L16: | WAIT | DVTOC |
| 0059 | | JPNC | BRCMD,L16 |
| 005A | | CLR | TOCPTR |
| 005B | | GOTO | L4 |
| 005C | | NOOP | |
| 005D | | NOOP | |
| 005E | | NOOP | |
| 005F | | NOOP | |
| 0060 | L15: | CLR | BUSY |
| 0061 | | SETF | CARRY |
| 0062 | | CLR | SB |
| 0063 | | WAIT | RDY |
| 0064 | | CLR | CARRY |
| 0065 | | MOVE | MINREG,MIN |
| 0066 | L8: | MOVE | BREG,MINREG |
| 0067 | L6: | SETF | BUSY |
| 0068 | | JPNC | ENABLE,L7 |
| 0069 | | SETF | OUTE |
| 006A | | CLR | BUSY |
| 006B | | WAIT | DV |
| 006C | | SETF | CARRY |
| 006D | | CLR | OUTE |
| 006E | | GOTO | L9 |
| 006F | | NOOP | |
| 0070 | | NOOP | |
| 0071 | | NOOP | |
| 0072 | | NOOP | |
| 0073 | L11: | MOVE | POC,TOC |
| 0074 | | JPNC | BRCMD,L12 |
| 0075 | | GOTO | L22 |

TABLE 10

| DDA | BDA | ES = QS | QS < ES | ES < QS |
|---|---|---|---|---|
| 0 | 0 | $\dfrac{1}{QS^3}$ | $\dfrac{1}{(ES)(QS)^2}$ | $\dfrac{ES}{QS^4}$ |
| 0 | 1 | $\dfrac{1}{QS^2}$ | $\dfrac{1}{(ES)(QS)}$ | $\dfrac{ES}{QS^3}$ |
| 1 | 0 | $\dfrac{1}{QS}$ | $\dfrac{1}{ES}$ | $\dfrac{ES}{QS^2}$ |
| 1 | 1 | 1 | $\dfrac{QS}{ES}$ | $\dfrac{ES}{QS}$ |

TABLE 11
BRIGHTNESS GENERATOR CODE PROGRAM

| INSTRUCTION NUMBER | SUBROUTINE ENTRY POINT | INSTRUCTION | |
|---|---|---|---|
| 0000 | L1: | CLR | GO |
| 0001 | L2: | SETF | RESET |
| 0002 | | SETF | RESET |
| 0003 | | SETF | RESET |
| 0004 | | CLR | BUSY |
| 0005 | | SETF | FLG |
| 0006 | | CLR | BOLD |
| 0007 | | SETF | ENT |
| 0008 | L3: | JPNC | ENR,L3 |
| 0009 | | WAIT | DV |
| 000A | | MOVE | QS,BRBG |
| 000B | L4: | WAIT | DV |
| 000C | | JPNC | BREOF,L5 |
| 000D | | SETF | GO |
| 000E | | MOVE | ES,BRBG |
| 000F | | SHIFT | QSM,1,1,0 |
| 0010 | | SHIFT | QSM,1,1,0 |
| 0011 | | MOVE | MPC,SHFT |
| 0012 | | SHIFT | QS,1,1,0 |
| 0013 | | NOOP | |
| 0014 | | NOOP | |
| 0015 | | SETF | BUSY |
| 0016 | | SHIFT | MULT,1,1,0 |
| 0017 | | MOVE | WR1,SHFT |
| 0018 | | JPNC | QSESLZ,L6 |
| 0019 | | SETF | ESDIV |
| 001A | | SETF | ESDIV |
| 001B | | MOVE | WR2,NDIV |
| 001C | | JPNC | DDAZ,L9 |
| 001D | | SHIFT | WR2,0,0,0 |
| 001E | | MOVE | MPC,SHFT |
| 0019 | L8: | SHIFT | NDIV,0,0,0 |
| 0020 | | NOOP | |
| 0021 | | NOOP | |
| 0022 | L13: | JPNC | BDAZ,L16 |
| 0023 | | SHIFT | MULT,0,0,0 |
| 0024 | | WAIT | SDONE |
| 0025 | | MOVE | MPC,SHFT |
| 0026 | | SHIFT | NDIV,0,0,0 |
| 0027 | | GOTO | L15 |
| 0028 | | NOOP | |
| 0029 | | NOOP | |
| 002A | | NOOP | |
| 002B | L5: | CLR | ENT |
| 002C | L5A: | JPNC | ENR,L2 |
| 002D | | GOTO | L5A |
| 002E | | NOOP | |
| 002F | | NOOP | |
| 0030 | L6: | JPNC | QSESZ,L7 |
| 0031 | | JPNC | DDAZ,L10 |
| 0032 | | MOVE | WR2,N3DIV |
| 0033 | L9: | JPNC | BDAZ,L12 |
| 0034 | | GOTO | L14 |
| 0035 | | NOOP | |
| 0036 | | NOOP | |
| 0037 | L7: | SHIFT | ES,0,1,1 |
| 0038 | | WAIT | SDONE |
| 0039 | | MOVE | MPC,SHFT |
| 003A | | JPNC | DDAZ,L8 |
| 003B | | SHIFT | N3DIV,0,0,0 |
| 003C | | GOTO | L13 |
| 003D | | NOOP | |
| 003E | | NOOP | |
| 003F | L12: | SHIFT | WR2,0,0,0 |
| 0040 | | MOVE | MPC,SHFT |
| 0041 | | SHIFT | QS,0,1,1 |
| 0042 | | WAIT | SDONE |
| 0043 | | NOOP | |
| 0044 | L15: | NOOP | |

TABLE 10-continued

| DDA | BDA | ES = QS | QS < ES | ES < QS |
|---|---|---|---|---|
| 1 | 0 | $\dfrac{1}{QS}$ | $\dfrac{1}{ES}$ | $\dfrac{ES}{QS^2}$ |
| 1 | 1 | 1 | $\dfrac{QS}{ES}$ | $\dfrac{ES}{QS}$ |

TABLE 11-continued

BRIGHTNESS GENERATOR CODE PROGRAM

| INSTRUCTION NUMBER | SUBROUTINE ENTRY POINT | INSTRUCTION | |
|---|---|---|---|
| 0045 | L16: | SHIFT | MULT,0,0,0 |
| 0046 | | WAIT | SDONE |
| 0047 | | MOVE | WR2,SHFT |
| 0048 | | GOTO | L14 |
| 0049 | | NOOP | |
| 004A | | NOOP | |
| 004B | L10: | JPNC | BDAZ,L11 |
| 004C | | MOVE | WR2,NDIV |
| 004D | L14: | CLR | BUSY |
| 004E | | WAIT | RDY |
| 004F | | CLR | ENT |
| 0050 | | SETF | BUSY |
| 0051 | | NOOP | |
| 0052 | L17A: | JPNC | ENR,L17 |
| 0053 | | GOTO | L17A |
| 0054 | | NOOP | |
| 0055 | | NOOP | |
| 0056 | L11: | MOVE | WR2,C1E |
| 0057 | | GOTO | L14 |
| 0058 | | NOOP | |
| 0059 | L17: | CLR | BUSY |
| 005A | | NOOP | |
| 005B | | NOOP | |
| 005C | | NOOP | |
| 005D | | NOOP | |
| 005E | | GOTO | L18 |
| 005F | | NOOP | |
| 0060 | | NOOP | |
| 0061 | L31: | MOVE | ASB,C1 |
| 0062 | L32: | MOVE | MPC,SHFT |
| 0063 | | SHIFT | ASB,0,1,0 |
| 0064 | L18: | MOVE | LMIN,CMIN |
| 0065 | L19: | SETF | DV |
| 0066 | | WAIT | DV |
| 0067 | | MOVE | CMIN,BRBG |
| 0068 | | NOOP | |
| 0069 | | NOOP | |
| 006A | | NOOP | |
| 006B | | JPNC | RDY,L19 |
| 006C | | SHIFT | MULT,0,0,0 |
| 006D | | CLR | GO |
| 006E | | SETF | BUSY |
| 006F | | JPNC | FLGZ,L20 |
| 0070 | | WAIT | SDONE |
| 0071 | | MOVE | MPC,SHFT |
| 0072 | | SHIFT | WR2,0,0,0 |
| 0073 | | NOOP | |
| 0074 | | NOOP | |
| 0075 | | NOOP | |
| 0076 | | SHIFT | MULT,1,0,0 |
| 0077 | | WAIT | SDONE |
| 0078 | | MOVE | ASB,SHFT |
| 0079 | | JPNC | ASBBGZ,L21 |
| 007A | | MOVE | POS,LMIN |
| 007B | L21: | JPNC | CMINNC,L33 |
| 007C | | CLR | BUSY |
| 007D | | WAIT | RDY |
| 007E | | SETF | GO |
| 007F | | MOVE | ASB,ME |
| 0080 | | NOOP | |
| 0081 | | NOOP | |
| 0082 | | MOVE | ASD,WR1 |
| 0083 | L22: | SETF | DV |
| 0084 | | SHIFT | C1,1,1,0 |
| 0085 | | WAIT | DV |
| 0086 | | SETF | DV |
| 0087 | | MOVE | ASD,ASDB |
| 0088 | | WAIT | DV |
| 0089 | | MOVE | ASBB,ASBB |
| 008A | | MOVE | ASB,ASBB |
| 008B | | JPNC | RDY,L22 |
| 008C | | CLR | GO |
| 008D | | JPNC | NEXACT,L30 |
| 008E | | JPNC | DDAZ,L23 |
| 008F | | SHIFT | ASD,0,1,1 |
| 0090 | | GOTO | L24 |
| 0091 | | NOOP | |
| 0092 | | NOOP | |
| 0093 | | NOOP | |
| 0094 | | NOOP | |
| 0095 | L23: | SHIFT | C1E,0,0,0 |
| 0096 | | NOOP | |
| 0097 | L24: | JPNC | RDY,L25 |
| 0098 | | SETF | GO |
| 0099 | | JPNC | BDAZ,L31 |
| 009A | | GOTO | L32 |
| 009B | | NOOP | |
| 009C | | NOOP | |
| 009D | L25: | SETF | ENT |
| 009E | L25A: | JPNC | ENR,L25A |
| 009F | | SETF | GO |
| 00A0 | | SETF | BUSY |
| 00A1 | | NOOP | |
| 00A2 | | SETF | DV |
| 00A3 | | SETF | DV |
| 00A4 | | NOOP | |
| 00A5 | | WAIT | DV |
| 00A6 | | JPNC | BRCMD,L26 |
| 00A7 | | CLR | ENT |
| 00A8 | | CLR | GO |
| 00A9 | L27: | JPNC | ENR,L28 |
| 00AA | | GOTO | L27 |
| 00AB | L28: | CLR | BUSY |
| 00AC | | GOTO | L24 |
| 00AD | | NOOP | |
| 00AE | L20: | CLR | FLG |
| 00AF | | GOTO | L21 |
| 00B0 | | NOOP | |
| 00B1 | L30: | MOVE | ASB,C1 |
| 00B2 | | MOVE | POS,LMIN |
| 00B3 | L33: | CLR | BUSY |
| 00B4 | | MOVE | BRBG,BOLD |
| 00B5 | | SETF | ENT |
| 00B6 | L34: | JPNC | ENR,L34 |
| 00B7 | | SETF | OUTE |
| 00B8 | | SETF | DV |
| 00B9 | | SETF | DV |
| 00BA | | CLR | ENT |
| 00BB | | CLR | OUTE |
| 00BC | L35: | JPNC | ENR,L36 |
| 00BD | | GOTO | L35 |
| 00BE | | NOOP | |
| 00BF | | NOOP | |
| 00C0 | | NOOP | |
| 00C1 | | NOOP | |
| 00C2 | L36: | JPNC | CMINNF,L2 |
| 00C3 | | JPNC | BOLDN1,L2 |
| 00C4 | | CLR | BOLD |
| 00C5 | | SETF | ENT |
| 00C6 | L37: | JPNC | ENR,L37 |
| 00C7 | | GOTO | L4 |

What is claimed is:

1. A method utilizing data processing means comprising a plurality of data stores and a corresponding temporary store for each such data store, the method determining a particular criterion value and an associated positional value for the degree of match between the juxtaposition of a plurality of event types of a query and a plurality of event types of a stored data base entry, the method utilizing a priorly-formed array of data values, each data value representing the number of event positions between the occurrence of an event type in the query, the occurrence of a corresponding event type in the stored data base, a group of one or more data values being provided for each of a plurality of different query event types, each different group being stored in a different data store with the data values thereof arranged in monotonic order from a first end, the method comprising the steps of:

(a) designating a data value in each of a plurality of data stores as a first data value;

(b) detecting at least one of the designated first data values having a predetermined magnitude relative to the other designated first data values;

(c) storing the at least one detected data value in the temporary store which corresponds to the data store in which such detected data value is detected;

(d) forming for each of individual data stores a first distance value which represents the algebraic difference between the detected data value and the designated data value in such data store;

(e) forming for each of individual data stores a second distance value representing the algebraic difference between the detected data value and a data value in the temporary store corresponding to such individual data store;

(f) selecting for each of individual data stores a distance value from the corresponding first and second distance values, the selected distance value having a predetermined magnitude relative to the other;

(g) forming for a detected data value a sum-of-distance value representing the sum of the absolute values of the selected distance values formed therefrom;

(h) designating a new data value in the data value store containing the at least one detected data value and repeating the steps (b)–(h) using such new data value as a designated data value, the step of designating a new data value including the step of designating, in a predetermined order in the monotonic order of data values, the next data value from the one which was previously designated; and (i) utilizing the detected data values and the corresponding sum-of-distance values provided during steps (b)-14 (h) for deriving such criterion value and positional value.

2. A method according to claim 1 wherein the data values in the groups are arranged in the monotonic order with the smallest data value as a first data value and wherein the step of detecting the at least one of the designated first data values having a predetermined magnitude relative to the other designated first data values comprises the step of detecting the smallest data value of the first data values.

3. A method according to claim 1 wherein the step of storing the at least one detected data value in the temporary store comprises the step of storing other designated data values in the corresponding temporary stores, which data values are of the same value as the detected data value.

4. A method according to claim 1 wherein the step of selecting comprises the step of selecting the smallest of the first and second distance values.

5. A method according to claim 1 wherein there is a store for a pipewidth value and the method comprises the additional steps of:

(a) detecting a predetermined relation between each selected distance value and a value in the pipewidth value store; and (b) operative upon the last step detecting such predetermined relation, as to a particular selected distance value, for substituting a predetermined value for such selected distance value when forming a sum-of-distance value.

6. A method according to claim 1 wherein, if a formed first distance value is zero for a particular data store, the designated data value is stored in the temporary store corresponding to such data store and the next value in such data store is designated as a first data value.

7. A method according to claim 1 wherein a weighting value is stored in association with each of said data values, the method comprising the additional step of combining the weighting values that are associated with the data values that are used in the step of forming a sum-of-distance value and to thereby form sum-of-weighting values.

8. A method according to claim 7 wherein for each temporary store and corresponding data store which have a data value in the temporary store and a designated first data value of the corresponding group, the method comprising the steps of:

(a) detecting if the distance values formed from the data value in the temporary store and the designated data value of the corresponding group are equal;

(b) selecting from the two weighting values that are associated with the two data values which are associated with the two distance values detected to be equal, that weighting value which has a predetermined magnitude relative to the other; and (c) utilizing the selected weighting value in the step of combining the weighting values.

9. A method according to claim 8 wherein the step of selecting from the two weighting values comprises the step of selecting the largest weighting value of the two weighting values.

10. A method according to claim 9 wherein the step of utilizing comprises the step of combining, for a detected data value, the corresponding sum-of-distance value and the corresponding sum-of-weighting value in forming such criterion value.

11. A method according to claim 10 wherein the data processing means comprises a store for a criterion value and wherein for a detected data value the sum-of-distance value and the corresponding sum-of-weighting value are combined in forming the criterion value, the criterion value replacing a priorly-formed criterion value in the criterion value store if such newly-formed criterion value has a predetermined relation to the value in the criterion value store.

12. A method according to claim 11 wherein the value in the criterion value store is replaced with the newly-formed criterion value when the newly-formed criterion value exceeds the value in the criterion value store.

13. A method according to claim 12 wherein the data processor means includes a store for a positional value wherein for a detected data value a positional value corresponding to the detected data value is stored in the positional value store.

14. A method according to claim 13 wherein the value in the positional value store is replaced with the positional value corresponding to the detected data value used in forming a criterion value having the predetermined relation to the value in the criterion value store.

15. The method according to claim 14 wherein the step of utilizing comprises the step of forming a criterion value "B" as follows:

$$B = (QS(QS - M) - SSD)(M + SSB)\frac{MIN(QS,ES)}{MAX(QS,ES)} \cdot \frac{1}{QS^3}$$

where:
- QS = the plurality of events of a query;
- ES = the plurality of events of a stored data base entry;
- M = the number of events in the query for which at least one corresponding event type is not found in the query;
- SSD = is the total of the sum-of-distance values of the data processing means;
- SSB = is the total of the sum-of-weighting values of the data processing means;
- MAX(QS,ES) = is the larger of QS and ES; and
- MIN(QS,ES) = is the smaller of QS and ES.

16. A method according to claim 14 comprising the step of repeating the recited steps until all data values in the data stores have been processed in accordance with the method.

17. Data processing means comprising a plurality of data stores and a corresponding temporary store for each such data store, the data processing means determining a particular criterion value and an associated position value for a match between the juxtaposition of a plurality of event types of a query and a plurality of event types of a stored data base, the data processing means utilizing a priorly-formed array of data values, each data value representing the number of event positions between the occurrence of an event type in the query and the occurrence of a corresponding event type in the stored data base, a group of one or more data values being provided for each of a plurality of different query event types, each different group being stored in a different data store with the values thereof arranged in monotonic order from a first end, the data processing means comprising:

(a) means for designating a data value in each of a plurality of data stores as a first data value;

(b) means for detecting at least one of the designated first data values having a predetermined magnitude relative to the other designated first data values;

(c) means for storing the at least one detected data value in the temporary store which corresponds to the data store in which such detected data value is detected;

(d) means for forming for each of individual data stores a first distance value which represents the algebraic difference between the detected data value and the designated data value in such data store;

(e) means for forming for each of individual data stores a second distance value representing the algebraic difference between the detected data value and a data value in the temporary store corresponding to such individual data store;

(f) means for selecting for each of individual data stores a distance value from the corresponding first and second distance values, the selected distance value having a predetermined magnitude relative to the other;

(g) means for forming for a detected data value a sum-of-distance value representing the sum of the absolute values of the selected distance values formed therefrom;

(h) means for designating a new data value in the data value store containing the at least one detected data value wherein the designated value is the next data value from the one which was previously-designated the next data value in a predetermined order in the monotonic order of data values; and (i) means for utilizing the detected data values and the corresponding sum-of-distance values for deriving such criterion value and positional value.

18. A data processing means according to claim 17 wherein the next data value in the monotonic order is designated as a first data value of its group after storing a data value from the group in the temporary store and comprising:

means for repeating the operation of the recited means utilizing such next first data value.

19. A data processing means according to claim 17 wherein the groups are arranged in the monotonic order with the smallest data value as the first data value and wherein the means for detecting a predetermined relation of a data value to the other data values comprises means for detecting the smallest data value.

20. A data processing means according to claim 17 wherein the means for selecting comprises means for selecting the smallest of the first and second distance values.

21. A data processing means according to claim 17 comprising:
a store for a sum-of-distance value; and
means for replacing a value in the sum-of-distance value store with a newly-formed sum-of-distance value.

22. The data processing means according to claim 17 wherein the means for storing the at least one detected data value in the temporary store comprises means for storing other designated values in the corresponding temporary stores which data values are of the same value as the detected data value.

23. The data processing means according to claim 17 comprising:
a store for a pipewidth value;
means for detecting a predetermined relation between each selected distance value and a value in the pipewidth value store; and
means operative upon the last means for detecting such predetermined relation as to a particular selected distance value for substituting a predetermined value for such selected distance value when forming a sum-of-distance value.

24. The data processing means according to claim 17 comprising means for designating the next value in a data store as a first data value if for such a particular data store a formed first distance value is zero.

25. Data processing means according to claim 17 wherein a weighting value is stored in association with each of said values and comprising:
a store for a sum-of-weighting value;
means for combining the weighting values that are associated with the data values that are used in forming a sum-of-distance value and to thereby form a sum-of-weighting value; and
means for replacing a value in the weighting value store with the formed sum-of-weighting value.

26. Data processing means according to claim 25 comprising:
means for replacing the value in the sum-of-weighting value store with the sum-of-weighting value upon such completion of a newly-formed corresponding sum-of-distance value.

27. A data processing means according to claim 26 comprising:
- means for detecting if the distance values formed from the data value in the temporary store and the designated data value of the corresponding group are equal;
- means for selecting from the two weighting values which are associated with the two distance values detected to be equal, that weighting value which has a predetermined magnitude relative to the other; and
- means for utilizing the selected weighting value in combining the weighting values.

28. The data processing means according to claim 27 includes means for selecting the largest weighting value of the two weighting values.

29. The data processing means according to claim 28 wherein the means for utilizing comprises means for combining, for a detected data value, the corresponding sum-of-distance value and the corresponding sum-of-weighting value to form a criterion value.

30. The data processing means according to claim 29 including:
- a store for a criterion value; and
- means for replacing a priorly-formed criterion value in the criterion value store if such newly-formed criterion value has a predetermined relation to the value in the criterion value store.

31. The data processing means according to claim 30 including means for replacing the value in the criterion value store with a newly-formed criterion value when the newly-formed criterion value exceeds the value in the criterion value store.

32. The data processing means according to claim 31 including:
- a store for a positional value; and
- means for storing a positional value in the positional value store for each corresponding detected data value.

33. The data processing means according to claim 32 including means for replacing in the positional value store the positional value corresponding to the detected data value used in forming a criterion value having the predetermined relation to the value in the criterion value store.

34. The data processing means according to claim 33 wherein the means for utilizing comprises means for forming a criterion value "B" as follows:

$$B = (QS(QS - M) - SSD)(M + SSB)\frac{MIN(QS,ES)}{MAX(QS,ES)} \cdot \frac{1}{QS^3}$$

where:
- QS = the plurality of events of a query;
- ES = the plurality of events of a stored data base entry;
- M = the number of events in the query for which at least one corresponding event type is not found in the query;
- SSD = is the total of the sum-of-distance values of the data processing means;
- SSB = is the total of the sum-of-weighting values of the data processing means;
- MAX(QS,ES) = is the larger of QS and ES; and
- MIN(QS,ES) = is the smaller of QS and ES.

35. The data processing means according to claim 34 comprising means for enabling the recited means to repeat the operation thereof until all the data values in the data stores have been processed.

36. A method utilizing data processing means comprising a store for a dimness value, a store for a positional value, a plurality of data stores, and a temporary store for each such data store, the method determining a particular match between a plurality of event types of a query and a plurality of event types of a stored data base, the method utilizing a priorly-formed array of data values, each data value representing the number of event positions between the juxtaposition of an event type in the query and a corresponding event type in the stored data base, a group of one or more data values being provided for each of a plurality of different query event types, each different group being stored in a different data store with the data values thereof arranged in monotonic order from a first end, the method comprising the steps of:
- (a) detecting the data value at the first ends of the groups having a predetermined relation to other data values at the first ends of the groups in data stores;
- (b) transferring the detected data value from the corresponding group to the corresponding temporary store, replacing a previous data value therein;
- (c) combining data values to form a dimness value representing the sum of the absolute values of algebraic differences where each algebraic difference is taken between the data value which is detected in the preceding step and different ones of the data values existing at the first ends of the groups in the data stores and in the temporary stores;
- (d) detecting if the dimness value formed in the last step has a predetermined relation to the value in the dimness value store;
- (e) replacing a value in the dimness value store with such formed dimness value if such formed dimness value is detected as having such predetermined relation; and
- (f) replacing a value in the positional store with such detected data value which is used in the step of combining if the dimness value formed from such data value is detected as having such predetermined relation.

37. A method according to claim 36 wherein the next data value in the monotonic order is at the first end of its group after transferring a data value from the group; and
repeating the steps of the method utilizing such next data value as the one at the first end.

38. A method according to claim 36 wherein the groups are arranged in the monotonic order with the largest data value at the first end and wherein the step of detecting a predetermined relation of a data value to the other data values comprises the step of detecting the largest data value.

39. A method according to claim 36 wherein the step of detecting if the dimness value has a predetermined relation comprises the step of:
detecting if the formed dimness value is smaller than the value in the dimness value store.

40. A method according to claim 36 wherein the data processing means comprises a store for a weighting value and wherein a different weighting value is stored in association with each of said data values, the method comprising the additional steps of:
- (a) combining the weighting values which are associated with the data values which are combined in the step of forming a dimness value and to thereby form a sum-of-weighting value; and (b) selectively replacing a value in the weighting value store with such formed sum-of-weighting value.

41. A method according to claim 40 wherein the value in the weighting value store is replacing upon such detection that a newly-formed dimness value has such predetermined relation.

42. A method according to claim 36 wherein the step of transferring a value to the temporary stores comprises the step of:

transferring additional data values to the corresponding temporary stores which data values are of the same value as the detected data value.

43. A method according to claim 36 wherein for each temporary store and corresponding data store which contain a data value in both the temporary store and the first end of the corresponding group, the step of combining comprises the steps of:

(a) determining the algebraic difference between the detected data value and the data value in such temporary store;

(b) determining the algebraic difference between the detected data value and the data value at the first end of such group;

(c) detecting the algebraic difference in the preceding two steps which has a predetermined relation to the other; and (d) selecting such detected algebraic difference in forming a dimness value representing the sum of the absolute value of the algebraic differences.

44. A method according to claim 40 wherein for each temporary store and corresponding data store which contain a data value in both the temporary store and at the first end of the corresponding group, the method including the steps of:

(a) detecting if the data values in the temporary store and in the first end of the corresponding group are equal;

(b) selecting from the two weighting values that are associated with the two data values which are detected to be equal, that weighting value which has a predetermined magnitude relative to the other; and (c) utilizing the selected weighting value in the step of combining the weighting values.

45. A method according to claim 36 wherein there is a store for a pipewidth value and the method comprises the additional steps of:

(a) detecting a predetermined relation between each algebraic difference in the step of combining a value in the pipewidth value store;

(b) operative upon the last step, detecting such predetermined relation as to a particular algebraic difference for substituting a predetermined value for such algebraic difference when forming a dimness value representing such sum of the absolute values of the algebraic differences.

46. A method according to claim 36 comprising the step of:

repeating the recited steps until all data values in the temporary stores and data stores have been processed in accordance with the method.

47. Data processing means for determining a particular match between a plurality of event types of a query and a plurality of event types of a stored data base, utilizing a priorly-formed array of data values, each data value representing the number of event positions between the juxtaposition of an event type in the query and a corresponding event type in the stored data base, a group of one or more data values being provided for each of a plurality of different query event types, the processing means comprising:

(a) a store for a dimness value;

(b) a store for a positional value;

(c) a plurality of data stores, each different group being stored in a different data store with the data values thereof arranged in a monotonic order from a first end;

(d) a temporary store for each such data store;

(e) means for detecting the data value at the first ends of the groups having a predetermined relation to other data values at the first ends of the groups in data stores;

(f) means for transferring the detected data value from the corresponding group to the corresponding temporary store, replacing a previous data value therein;

(g) means for combining data values to form a dimness value representing the sum of the absolute values of algebraic differences where each algebraic difference is taken between the data value which is transferred to the temporary store by the preceding means and different ones of the data values existing at the first ends of the groups in the data stores and in the temporary stores;

(h) means for detecting if the dimness value formed by the preceding means has a predetermined relation to the value in the dimness value store;

(i) means for replacing a value in the dimness value store with such formed dimness value if such formed dimness value is detected as having such predetermined relation; and (j) means for replacing a value in the positional store with such data value which is used by the means for combining if the dimness value formed from such data value is detected as having such predetermined relation.

48. A data processing means according to claim 47 wherein the next data value in the monotonic order is at the first end of its group after transferring a data value from the group; and means for repeating the operation of the recited means utilizing such next data value.

49. A data processing means according to claim 47 wherein the groups are arranged in the monotonic order with the largest data value at the first end and wherein the means for detecting a predetermined relation of a data value to the other data values comprises means for detecting the largest data value.

50. A data processing means according to claim 47 wherein the means for detecting if the dimness value has a predetermined relation comprises means for detecting if the formed dimness value is smaller than the value in the dimness value store.

51. Data processing means according to claim 47 wherein a different weighting value is stored in association with each of said data values and comprising:

a store for a weighting value;

means for combining the weighting values which are associated with the data values which are combined in forming a dimness value and to thereby form a sum-of-weighting value; and means for selectively replacing a value in the weighting value store with the formed sum-of-weighting value.

52. Data processing means according to claim 51 comprising:
means for replacing the value in the weighting value store upon such detection that a newly-formed dimness value has such predetermined relation.

53. Data processing means according to claim 47 wherein the means for transferring a value to the temporary store comprises:
means for transferring additional data elements to the corresponding temporary store which data elements are of the same value as the detected data value.

54. Data processing means according to claim 47 wherein the means for combining comprises:
means operative for each temporary store and corresponding data store which contain a data value in both the temporary store and the first end of the corresponding group, for determining the algebraic difference between the detected data value and the data value in such temporary store;
means for determining the algebraic difference between the data value detected by the last means and the data value at the first end of the corresponding group;
means for detecting the algebraic difference formed in the preceding two recited means which has a predetermined relation to the other; and
means for selecting such detected algebraic difference in forming a dimness value representing the sum of the absolute values of the algebraic differences.

55. Data processing means according to claim 51 comprising:
means operative, for each temporary store and corresponding data store which contain a data value in both the temporary store and at the first end of the corresponding group, for detecting if the data values in the temporary store and in the first end of the corresponding group are equal;
means for selecting from the two weighting values that are associated with the two data values which are detected to be equal, that weighting value which has a predetermined magnitude relative to the other; and
the means for combining weighting values utilizing the selected weighting value in combining the weighting values.

56. Data processing means according to claim 47 wherein the means for combining data values further comprises means for forming each of said algebraic differences, the data processing means further comprising:
a store for a pipewidth value;
means for detecting a predetermined relation between each such algebraic difference value and a value in the pipewidth value store;
means operative upon the last means detecting such predetermined relation as to a particular algebraic difference value for substituting a predetermined value for such algebraic difference when forming a dimness value representing such sum of the absolute values of the algebraic differences.

57. Data processing means according to claim 47 comprising:
means for enabling the recited means to repeat the operation thereof until all data values in the temporary stores and data stores have been processed.

* * * * *

UNITED STATES PATENT AND TRADEMARK OFFICE
CERTIFICATE OF CORRECTION

PATENT NO. : 4,290,115

DATED : September 15, 1981

INVENTOR(S) : Paul E. Pitt et al

It is certified that error appears in the above-identified patent and that said Letters Patent is hereby corrected as shown below:

Col. 1, line 64 "accordig" should be -- according --;
col. 7, line 17 "3" should be -- 2 --;
col. 9 line 16 after "16" insert -- prior --;
col. 12, line 27 "and d" should be -- the d --;
col. 19, line 11 "1-bit" should be -- 8-bit --; line 44 "complete" should be -- completed --;
col. 24, line 60 after "20" insert -- data --;
col. 29, line 63 "PSS1" should be -- PASS1 --;
col. 32, line 19 "value" (first occurrence) should be -- values --; "values" (end of line" should be -- value --;
col. 36, line 26 "5" should be -- 3 --;
col. 37, line 32 "within" should be -- with --;
col. 37, line 63 "od" should be -- of --;
col. 39, line 12 "5x4x6x4x3x4x4x5x5x4" should be -- 5x4x6x4x3x4x2x4x5x5x4 --;

col. 39, line 32 "in" should be -- is --; line 48 "even" should be -- event --;
col. 41 line 44 "of" should be -- the --;
col. 45, line 23 "-" should be -- = --; line 24 add a period before "D(TOC(TOCPTR)"; line 29 after "(CPTR)" add a closing parenthesis; line 39 after "CPTR)" add a closing parenthesis; line 57 after "(CPTR)" add a closing parenthesis; line 63 after "(CPTR)" add a closing parenthesis; line 67 after "(CPTR)" add a closing parenthesis; line 68 after "(CPTR)" add a closing parenthesis;
col. 46, line 1, after "(CPTR)" add a closing parenthesis; line 3 after "(CPTR)" add a closing parenthesis; line 4 after "(CPTR)" add a closing parenthesis; line 8 after "(CPTR)" add a closing parenthesis; line 34 change "2A-2N" to -- 7A-7N --;

col. 48, line 1 "meand" should be -- means --; line 27 "equal" should be -- equals --;
col. 51 line 66 "the piper" should be -- for piper --;
col. 52 line 49 "D1" should be -- D2 --; line 58 of
col. 54 "and" should be -- an --;
col. 58 line 21 before "registers" insert -- pointer --;
col. 59 line 5 "E4B" should be -- E4A --; line 22 "EAB" should be -- E4B --;

UNITED STATES PATENT AND TRADEMARK OFFICE
CERTIFICATE OF CORRECTION

PATENT NO. : 4,290,115
DATED : Sept. 15, 1981
INVENTOR(S) : Paul E. Pitt et al

It is certified that error appears in the above-identified patent and that said Letters Patent is hereby corrected as shown below:

Col. 60, line 49 "the" (first occurrence) should be -- to --;
col. 62, line 23 after "brightness" insert -- generator --;
col. 64 line 18 "rest" should be -- reset --; line 28 after "CWRT," insert -- PWRT, --;
col. 65, line 63 "LAST" should be -- $\overline{\text{LAST}}$ --; line 64 "LAST" should be--LAST--;
col. 68, line 16, "A< B" should be -- $\overline{A < B}$ --;
   line 23 "A< B" should be -- $\overline{A < B}$ --;
   line 29 "A< B" should be -- $\overline{A < B}$ --;
col. 70, line 37, "is" should be -- in --;
col. 71, line 47 "subtrated" should be -- subtracted --;
col. 75, line 66, "enocoder" should be -- encoder --;
col. 76, line 8 "Bues" should be -- Bus --; line 30 "Cntrol" should be -- Control --;
col. 77, line 64 "pipeing" should be -- piping --;
col. 78, line 28 after "QS,ES)"delete the ] and add -- $.\frac{1}{\overline{QS}_3}$ --;

col. 78, line 48 delete "cl"; move "FIXED POINT FORMAT" down to be the centered heading for the next paragraph;
col. 81, line 2 "pipe" should be -- piper --; line 51 "pipe" should be --piper--
col. 84 line 9 "if" should be -- is --;
col. 85 line 31 "to" should be -- for --;
col. 97 line 64 "is" should be -- in --;
col. 102 line 27 "piper" should be -- piper in --; line 50 "coupled" should be -- copied --; line 67 "D,SHC" should be -- K,SHC --;
col. 121-122, about 7 lines up from end of Table, "in CH*" should be -- the CH --;
col. 123-124, about line 26 on the page, "fo this chute" should be -- for this chute --;
col. 125-126, about line 11 on the page, "SBC.GT.SBN." should be -- SBC.GT.SBW.--;
about line 59 on the page, before "POSITIONS TO BE PROCESSED", the 4 should be positioned under the 3 in the line above;

UNITED STATES PATENT AND TRADEMARK OFFICE
CERTIFICATE OF CORRECTION

PATENT NO. : 4,290,115

DATED : Sept. 15, 1981

INVENTOR(S) : Paul E. Pitt et al.

It is certified that error appears in the above-identified patent and that said Letters Patent is hereby corrected as shown below:

Col. 129-130, Table 6G, the first arrow should point to the 3 in a circle, the second arrow should point to the 2 in a circle; "360/.8" should be circled; "19/.7" should be circled and the line with "(13-3=10)" over the top should be connected to the side of the circle so that it reads as follows:

UNITED STATES PATENT AND TRADEMARK OFFICE
CERTIFICATE OF CORRECTION

PATENT NO. : 4,290,115

DATED : Sept. 15, 1981

INVENTOR(S) : Paul E. Pitt et al.

Page 4 of 7

It is certified that error appears in the above-identified patent and that said Letters Patent is hereby corrected as shown below:

Col. 133-134, Table 6H, 360/.5 should be circled, 109/.8 should be circled, and the arrow from such circle should extend to "109" in the circle located in the horizontal line of numbers between numbers "36" and "6" so that it reads as follows:

TABLE 6H

PACKAGE QUERY EVENT NUMBER 4

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | | 8 | 4 | 2 | 18 | 21 | (110) | (360) 87 |

PACKAGE QUERY EVENT TYPES: (110/.2) ⌐(10 − 4 = 6)
(360/.5) ⌐(11 − 4 = 7)
(13 − 4 = 9) (19/.8)
(15 − 4 = 11) (109/.8)
PIPER 1 CHUTE 4 DATA: 6/.2  7/.5  9/.8  11/.8

| EVENT NUMBER: (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | (19) | 36 | (109) | 6 | 7 | 205 | 89 | 118 | 130 | 230 | 321 | 345 |

UNITED STATES PATENT AND TRADEMARK OFFICE
CERTIFICATE OF CORRECTION

PATENT NO. : 4,290,115

DATED : Sept. 15, 1981

INVENTOR(S) : Paul E. Pitt et al.

It is certified that error appears in the above-identified patent and that said Letters Patent is hereby corrected as shown below:

Col. 133-134, Table 6L, under Event Number 9, "21" should be circled, in the line for "EVENT NUMBER (CONT.)" "CHUTE 7 DATE" should be -- CHUTE 7 DATA --, after "21" add the following additional numbers in the same line -- 22 23 24 --, the number "22" should be placed over the circled "230", add --321-- under the newly added number "23", add -- 345 -- under the newly added number "24" so that it reads as follows:

133                134

TABLE 6L

PACKAGE QUERY EVENT NUMBER 8

CHUTE DATE GENERATION

| EVENT NUMBER | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | ㉑ | 110 | 360 | 87 |

PACKAGE QUERY EVENT TYPES:
- 21/.9  (9 − 8 = 1)
- 36/.2  (14 − 8 = 6)
- 230/.5  (22 − 8 = 14)
- 9/.9

PIPER 1 CHUTE 7 DATA: 1/.9  6/.2  14/.5

| EVENT NUMBER (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES | 19 | ㊱ | 109 | 6 | 7 | 205 | 89 | 118 | 130 | ㉚ | 321 | 345 |

UNITED STATES PATENT AND TRADEMARK OFFICE
CERTIFICATE OF CORRECTION

PATENT NO. : 4,290,115

DATED : Sept. 15, 1981

INVENTOR(S) : Paul E. Pitt et al.

It is certified that error appears in the above-identified patent and that said Letters Patent is hereby corrected as shown below:

Col. 133, 134, Table 6M under Event Number 9, "345/.2" should be circled; Table 6N under Event Number 11, "19/.7" should be circled and moved left one position under Event Number 10, "109/1" should be circled and moved left one position under Event Number 10, "7/.9" should be circled and moved left one position under Event Number 10, and "10/.5" and "11/.8" should each be moved left one position under Event Number 10; on the bottom line, Event Types "7" should be circled, "205" should not be circled, so that it reads as follows:

TABLE 6N

PACKAGE QUERY EVENT NUMBER 10

CHUTE DATA GENERATION

| EVENT NUMBER: | 1 | 2 | 3 | 4 | 5 | 6 | 7 | 8 | 9 | 10 | 11 | 12 |
|---|---|---|---|---|---|---|---|---|---|---|---|---|
| ENTRY EVENT TYPES: | 1 | 5 | 37 | 26 | 8 | 4 | 2 | 18 | 21 | 110 | 360 | 87 |

PACKAGE QUERY EVENT TYPES:
(13-10 = 3) (19/.7)
(15-10 = 5) (109/1)
(16-10 = 7) (7/.9)
10/.5
11/.8

PIPER 2 CHUTE 1 DATA: 3/.7 5/.1 7/.9

| EVENT NUMBER: (CONT.) | 13 | 14 | 15 | 16 | 17 | 18 | 19 | 20 | 21 | 22 | 23 | 24 |
|---|---|---|---|---|---|---|---|---|---|---|---|---|
| ENTRY EVENT TYPES: | (19) | 36 | (109) | 6 | (7) | 205 | 89 | 118 | 130 | 230 | 321 | 345 |

UNITED STATES PATENT AND TRADEMARK OFFICE
CERTIFICATE OF CORRECTION

PATENT NO. : 4,290,115

DATED : Sept. 15, 1981

INVENTOR(S) : PAUL E. PITT et al.

It is certified that error appears in the above-identified patent and that said Letters Patent is hereby corrected as shown below:

Col. 135-136, Table 6O, under EVENT NUMBER "11", "360", "360/.6", "87/1" and "109/.8" should be circled, and under EVENT NUMBER 12, "87" should be circled;

Col. 139-140, Table 7E under POCKETS, "DOC" should be -- EOC --;

Col. 149-150, Table 7M under POCKETS 1, "DOC" should be -- EOC --;

Col. 151-152, Table 8, three and four lines from bottom of page, "DSUM+DSUM2+ ... +DSUMn" should be -- DSUM1+DSUM2+ ... +DSUMN --;

Col. 157, one line below "LCF", "on" should be -- in --;

Col. 167, line 39, delete "14".

Col. 141,142, in Table 7F, under "POCKETS" "6./5" should be -- 6/.5 --.

Signed and Sealed this

Twenty-fifth Day of March 1986

[SEAL]

Attest:

DONALD J. QUIGG

Attesting Officer

Commissioner of Patents and Trademarks